US008555273B1

(12) United States Patent
Chia et al.

(10) Patent No.: US 8,555,273 B1
(45) Date of Patent: Oct. 8, 2013

(54) NETWORK FOR UPDATING ELECTRONIC DEVICES

(75) Inventors: Teck Chia, Aliso Viejo, CA (US); John D. V. Dinh, San Diego, CA (US); James P. Gustafson, Irvine, CA (US)

(73) Assignee: Palm. Inc., Sunnyvale, CA (US)

(*) Notice: Subject to any disclaimer, the term of this patent is extended or adjusted under 35 U.S.C. 154(b) by 1054 days.

(21) Appl. No.: 10/943,455

(22) Filed: Sep. 17, 2004
(Under 37 CFR 1.47)

Related U.S. Application Data

(60) Provisional application No. 60/503,932, filed on Sep. 17, 2003.

(51) Int. Cl.
*G06F 9/44* (2006.01)
(52) U.S. Cl.
USPC .......................... 717/173; 717/168; 717/172
(58) Field of Classification Search
None
See application file for complete search history.

(56) References Cited

U.S. PATENT DOCUMENTS

| | | | |
|---|---|---|---|
| 4,337,376 A | 6/1982 | Gruenberg | |
| 4,344,091 A | 8/1982 | Gardner et al. | |
| 4,429,387 A | 1/1984 | Kaminski | |
| 4,493,083 A | 1/1985 | Kinoshita | |
| 4,783,841 A | 11/1988 | Crayson | |
| 4,807,182 A | 2/1989 | Queen | |
| 4,809,170 A | 2/1989 | Leblang et al. | |
| 5,084,816 A | 1/1992 | Boese et al. | |
| 5,155,847 A | 10/1992 | Kirouac et al. | |
| 5,204,960 A | 4/1993 | Smith et al. | |
| 5,261,055 A | 11/1993 | Moran et al. | |
| 5,274,823 A | 12/1993 | Brenner et al. | |
| 5,325,531 A | 6/1994 | McKeeman et al. | |
| 5,392,353 A | 2/1995 | Morales | |

(Continued)

FOREIGN PATENT DOCUMENTS

| | | |
|---|---|---|
| CA | 2339923 | 3/2000 |
| CA | 2414281 | 5/2002 |

(Continued)

OTHER PUBLICATIONS

Terry et al. Managing Update Conflicts in Bayou, a Weakly Connected Replicated Storage System, 1995, Proceedings of the fifteenth ACM symposium on Operating systems principles, pp. 172-182, Retrieved on [May 24, 2012] Retrieved from the Internet: URL<http://d1.acm.org/citation.cfm?id=224070>.*

(Continued)

*Primary Examiner* — Thuy Dao
*Assistant Examiner* — Cheneca Smith

(57) ABSTRACT

Disclosed herein is an electronic device network for lifecycle management of firmware and software in electronic devices. The electronic device network may also be adapted to manage configuration parameters in the electronic devices. Lifecycle management provided by the electronic device network may include firmware and software downloading, firmware and software updating, and remote locking and remote enabling of electronic device capability. An update store module in the electronic device network may be adapted to dispense update packages to requesting electronic devices. The electronic devices may employ one or a plurality of update agents to update software and firmware therein. A boot loader in the electronic device is capable of determining whether an update agent is to be invoked or whether a previous backup copy of the update agent in non-volatile memory is to be invoked upon determining, based upon status information, that an update is to be conducted, rather than a normal startup operation without updates.

40 Claims, 41 Drawing Sheets

(56) References Cited

U.S. PATENT DOCUMENTS

| | | |
|---|---|---|
| 5,410,703 A | 4/1995 | Nilsson et al. |
| 5,418,837 A | 5/1995 | Johansson et al. |
| 5,420,616 A | 5/1995 | Suemitsu et al. |
| 5,421,006 A | 5/1995 | Jablon et al. |
| 5,442,771 A | 8/1995 | Filepp et al. |
| 5,444,765 A | 8/1995 | Marui et al. |
| 5,450,589 A | 9/1995 | Maebayashi et al. |
| 5,463,766 A | 10/1995 | Schieve et al. |
| 5,471,592 A | 11/1995 | Gove et al. |
| 5,479,637 A | 12/1995 | Lisimaque et al. |
| 5,479,654 A | 12/1995 | Squibb |
| 5,481,713 A | 1/1996 | Wetmore et al. |
| 5,491,807 A | 2/1996 | Freeman et al. |
| 5,491,821 A | 2/1996 | Kilis |
| 5,535,357 A | 7/1996 | Moran et al. |
| 5,563,931 A | 10/1996 | Bishop et al. |
| 5,579,522 A | 11/1996 | Christeson et al. |
| 5,586,328 A | 12/1996 | Caron et al. |
| 5,594,903 A | 1/1997 | Bunnell et al. |
| 5,596,738 A | 1/1997 | Pope |
| 5,598,531 A | 1/1997 | Hill |
| 5,598,534 A | 1/1997 | Haas |
| 5,606,693 A | 2/1997 | Nilsen et al. |
| 5,608,910 A | 3/1997 | Shimakura |
| 5,623,604 A | 4/1997 | Russell et al. |
| 5,628,016 A | 5/1997 | Kukol |
| 5,649,112 A | 7/1997 | Yeager et al. |
| 5,649,200 A | 7/1997 | Leblang et al. |
| 5,666,293 A | 9/1997 | Metz et al. |
| 5,675,628 A | 10/1997 | Hokkanen |
| 5,677,708 A | 10/1997 | Matthews, III |
| 5,689,712 A | 11/1997 | Heisch |
| 5,704,031 A | 12/1997 | Mikami et al. |
| 5,708,709 A | 1/1998 | Rose |
| 5,715,462 A | 2/1998 | Iwamoto et al. |
| 5,717,737 A | 2/1998 | Doviak et al. |
| 5,721,824 A | 2/1998 | Taylor |
| 5,724,526 A | 3/1998 | Kunita |
| 5,727,202 A | 3/1998 | Kucala |
| 5,729,735 A | 3/1998 | Meyering |
| 5,752,039 A | 5/1998 | Tanimura |
| 5,752,042 A | 5/1998 | Cole et al. |
| 5,764,658 A | 6/1998 | Sekiguchi et al. |
| 5,774,715 A | 6/1998 | Madany et al. |
| 5,778,440 A | 7/1998 | Yiu et al. |
| 5,781,921 A | 7/1998 | Nichols |
| 5,790,860 A | 8/1998 | Wetmore et al. |
| 5,790,974 A | 8/1998 | Tognazzini |
| 5,794,254 A | 8/1998 | McClain |
| 5,802,554 A | 9/1998 | Caceres et al. |
| 5,805,899 A | 9/1998 | Evans et al. |
| 5,809,251 A | 9/1998 | May et al. |
| 5,815,722 A | 9/1998 | Kalwitz et al. |
| 5,822,692 A | 10/1998 | Krishan et al. |
| 5,826,012 A | 10/1998 | Lettvin |
| 5,832,000 A | 11/1998 | Lin et al. |
| 5,832,520 A | 11/1998 | Miller |
| 5,835,777 A | 11/1998 | Staelin |
| 5,838,981 A | 11/1998 | Gotoh |
| 5,845,077 A | 12/1998 | Fawcett |
| 5,875,404 A | 2/1999 | Messiet |
| 5,878,124 A | 3/1999 | Griesmer et al. |
| 5,878,256 A | 3/1999 | Bealkowski et al. |
| 5,881,292 A | 3/1999 | Sigal et al. |
| 5,896,566 A | 4/1999 | Averbuch et al. |
| 5,901,310 A | 5/1999 | Rahman et al. |
| 5,901,330 A | 5/1999 | Sun et al. |
| 5,913,027 A | 6/1999 | Matsuda et al. |
| 5,919,247 A | 7/1999 | Van Hoff et al. |
| 5,930,504 A | 7/1999 | Gabel |
| 5,931,909 A | 8/1999 | Taylor |
| 5,933,498 A | 8/1999 | Schneck et al. |
| 5,937,019 A | 8/1999 | Padovani |
| 5,943,406 A | 8/1999 | Leta et al. |
| 5,944,839 A | 8/1999 | Isenberg |
| 5,953,653 A | 9/1999 | Josenhans et al. |
| 5,954,817 A | 9/1999 | Janssen et al. |
| 5,960,189 A | 9/1999 | Stupek, Jr. et al. |
| 5,960,445 A | 9/1999 | Tamori et al. |
| 5,968,182 A | 10/1999 | Chen et al. |
| 5,974,179 A | 10/1999 | Caklovic |
| 5,974,250 A | 10/1999 | Angelo et al. |
| 5,974,454 A | 10/1999 | Apfel et al. |
| 5,987,325 A | 11/1999 | Tayloe |
| 5,999,978 A | 12/1999 | Angal et al. |
| 6,006,034 A | 12/1999 | Heath et al. |
| 6,009,274 A | 12/1999 | Fletcher et al. |
| 6,009,497 A | 12/1999 | Wells et al. |
| 6,011,973 A | 1/2000 | Valentine et al. |
| 6,014,561 A | 1/2000 | Molne |
| 6,018,747 A | 1/2000 | Burns et al. |
| 6,021,415 A | 2/2000 | Cannon et al. |
| 6,021,428 A | 2/2000 | Miloslavsky |
| 6,029,004 A | 2/2000 | Bortnikov et al. |
| 6,031,830 A | 2/2000 | Cowan |
| 6,032,044 A | 2/2000 | Shannon et al. |
| 6,038,636 A | 3/2000 | Brown, III et al. |
| 6,041,333 A | 3/2000 | Bretschneider et al. |
| 6,044,270 A | 3/2000 | Raith |
| 6,044,403 A | 3/2000 | Gerszberg et al. |
| 6,047,242 A | 4/2000 | Benson |
| 6,047,279 A | 4/2000 | Barrack et al. |
| 6,052,531 A | 4/2000 | Waldin et al. |
| 6,052,600 A | 4/2000 | Fette et al. |
| 6,058,435 A | 5/2000 | Sassin et al. |
| 6,064,814 A | 5/2000 | Capriles et al. |
| 6,070,012 A | 5/2000 | Eitner et al. |
| 6,070,142 A | 5/2000 | McDonough et al. |
| 6,073,206 A | 6/2000 | Piwonka et al. |
| 6,073,214 A | 6/2000 | Fawcett |
| 6,077,315 A | 6/2000 | Greenbaum et al. |
| 6,080,207 A | 6/2000 | Kroening et al. |
| 6,081,518 A | 6/2000 | Bowman-Amuah |
| 6,081,731 A | 6/2000 | Boltz et al. |
| 6,088,759 A | 7/2000 | Hasbun et al. |
| 6,097,942 A | 8/2000 | Laiho |
| 6,097,966 A | 8/2000 | Hanley |
| 6,105,063 A | 8/2000 | Hayes, Jr. |
| 6,112,024 A | 8/2000 | Almond et al. |
| 6,112,197 A | 8/2000 | Chatterjee et al. |
| 6,115,693 A | 9/2000 | McDonough et al. |
| 6,115,737 A | 9/2000 | Ely et al. |
| 6,117,187 A | 9/2000 | Staelin |
| 6,126,327 A | 10/2000 | Bi et al. |
| 6,128,695 A | 10/2000 | Estakhri et al. |
| 6,128,713 A | 10/2000 | Eisler et al. |
| 6,131,096 A | 10/2000 | Ng et al. |
| 6,134,530 A | 10/2000 | Bunting et al. |
| 6,138,002 A | 10/2000 | Alperovich et al. |
| 6,138,239 A | 10/2000 | Veil |
| 6,138,249 A | 10/2000 | Nolet |
| 6,141,564 A | 10/2000 | Bruner et al. |
| 6,145,012 A | 11/2000 | Small |
| 6,148,192 A | 11/2000 | Ahvenainen |
| 6,148,441 A | 11/2000 | Woodward |
| 6,151,643 A | 11/2000 | Cheng et al. |
| 6,157,559 A | 12/2000 | Yoo |
| 6,163,274 A | 12/2000 | Lindgren |
| 6,167,567 A | 12/2000 | Chiles et al. |
| 6,178,452 B1 | 1/2001 | Miyamoyo |
| 6,189,096 B1 | 2/2001 | Haverty |
| 6,195,546 B1 | 2/2001 | Leung et al. |
| 6,195,946 B1 | 3/2001 | Lott et al. |
| 6,198,946 B1 | 3/2001 | Shin et al. |
| 6,199,204 B1 | 3/2001 | Donohue |
| 6,202,207 B1 | 3/2001 | Donohue |
| 6,209,111 B1 | 3/2001 | Kadyk et al. |
| 6,209,127 B1 | 3/2001 | Mori et al. |
| 6,212,281 B1 | 4/2001 | Vanstone |
| 6,212,489 B1 | 4/2001 | Klein et al. |
| 6,212,659 B1 | 4/2001 | Zehavi |
| 6,230,319 B1 | 5/2001 | Britt, Jr. et al. |
| 6,233,332 B1 | 5/2001 | Anderson et al. |
| 6,256,497 B1 | 7/2001 | Chambers |

(56) References Cited

U.S. PATENT DOCUMENTS

| | | | |
|---|---|---|---|
| 6,262,973 B1 | 7/2001 | Shiraishi et al. | |
| 6,263,214 B1 | 7/2001 | Yazaki et al. | |
| 6,266,809 B1 | 7/2001 | Craig et al. | |
| 6,266,810 B1 * | 7/2001 | Tanaka et al. | 717/173 |
| 6,272,333 B1 | 8/2001 | Smith | |
| 6,278,449 B1 | 8/2001 | Sugiarto et al. | |
| 6,279,153 B1 | 8/2001 | Bi et al. | |
| 6,282,709 B1 | 8/2001 | Reha et al. | |
| 6,289,509 B1 | 9/2001 | Kryloff | |
| 6,292,492 B1 | 9/2001 | Bonomi et al. | |
| 6,301,710 B1 | 10/2001 | Fujiwara | |
| 6,308,061 B1 | 10/2001 | Criss et al. | |
| 6,311,322 B1 | 10/2001 | Ikeda et al. | |
| 6,317,872 B1 | 11/2001 | Gee et al. | |
| 6,321,263 B1 | 11/2001 | Luzzi et al. | |
| 6,321,348 B1 | 11/2001 | Kobata | |
| 6,324,402 B1 | 11/2001 | Waugh et al. | |
| 6,330,715 B1 | 12/2001 | Razzaghe-Ashrafi | |
| 6,333,980 B1 | 12/2001 | Hollatz et al. | |
| 6,334,212 B1 | 12/2001 | Nakajima | |
| 6,343,379 B1 | 1/2002 | Ozawa et al. | |
| 6,345,288 B1 | 2/2002 | Reed et al. | |
| 6,347,331 B1 | 2/2002 | Dutcher et al. | |
| 6,349,205 B1 | 2/2002 | Fang et al. | |
| 6,353,737 B1 | 3/2002 | Herzog | |
| 6,357,021 B1 | 3/2002 | Kitagawa et al. | |
| 6,360,362 B1 | 3/2002 | Fichtner et al. | |
| 6,360,366 B1 | 3/2002 | Heath et al. | |
| 6,366,584 B1 | 4/2002 | Gulliford et al. | |
| 6,366,777 B1 | 4/2002 | Uusitalo | |
| 6,367,072 B1 | 4/2002 | Justice et al. | |
| 6,374,250 B2 | 4/2002 | Ajtai et al. | |
| 6,381,740 B1 | 4/2002 | Miller et al. | |
| 6,381,742 B2 | 4/2002 | Forbes et al. | |
| 6,389,464 B1 | 5/2002 | Krishnamurthy et al. | |
| 6,393,018 B2 | 5/2002 | Miloslavsky | |
| 6,393,585 B1 | 5/2002 | Houha et al. | |
| 6,397,385 B1 | 5/2002 | Kravitz | |
| 6,400,965 B1 | 6/2002 | Phillips et al. | |
| 6,405,364 B1 | 6/2002 | Bowman-Amuah | |
| 6,408,175 B1 | 6/2002 | Park | |
| 6,408,434 B1 | 6/2002 | Fujiwara | |
| 6,418,311 B1 | 7/2002 | Chmaytelli et al. | |
| 6,421,776 B1 | 7/2002 | Hillis et al. | |
| 6,425,125 B1 | 7/2002 | Fries et al. | |
| 6,426,955 B1 | 7/2002 | Gossett-Dalton, Jr. et al. | |
| 6,438,585 B2 | 8/2002 | Mousseau et al. | |
| 6,442,660 B1 | 8/2002 | Henerlau et al. | |
| 6,442,754 B1 | 8/2002 | Curtis | |
| 6,445,914 B1 | 9/2002 | Findikli et al. | |
| 6,446,206 B1 | 9/2002 | Feldbaum | |
| 6,449,270 B1 | 9/2002 | Miloslavsky | |
| 6,456,732 B1 | 9/2002 | Kimbell et al. | |
| 6,456,843 B1 | 9/2002 | Daly | |
| 6,457,175 B1 | 9/2002 | Lerche | |
| 6,463,300 B1 | 10/2002 | Oshima | |
| 6,466,999 B1 | 10/2002 | Sliger et al. | |
| 6,470,496 B1 * | 10/2002 | Kato et al. | 717/173 |
| 6,477,531 B1 | 11/2002 | Sullivan et al. | |
| 6,477,703 B1 | 11/2002 | Smith et al. | |
| 6,487,403 B2 | 11/2002 | Carroll | |
| 6,487,717 B1 | 11/2002 | Brunemann et al. | |
| 6,493,871 B1 | 12/2002 | McGuire et al. | |
| 6,504,932 B1 | 1/2003 | Vasnier et al. | |
| 6,505,228 B1 | 1/2003 | Schoening et al. | |
| 6,526,574 B1 | 2/2003 | Jones | |
| 6,529,729 B1 | 3/2003 | Nodoushani et al. | |
| 6,530,036 B1 | 3/2003 | Frey, Jr. | |
| 6,535,894 B1 | 3/2003 | Schmidt et al. | |
| 6,536,038 B1 | 3/2003 | Ewertz et al. | |
| 6,542,504 B1 | 4/2003 | Mahler et al. | |
| 6,542,906 B2 | 4/2003 | Korn | |
| 6,546,243 B2 | 4/2003 | Tiedemann, Jr. et al. | |
| 6,546,492 B1 | 4/2003 | Walker et al. | |
| 6,546,552 B1 | 4/2003 | Peleg | |
| 6,549,770 B1 | 4/2003 | Marran | |
| 6,553,113 B1 | 4/2003 | Dhir et al. | |
| 6,556,842 B1 | 4/2003 | Ericsson | |
| 6,564,369 B1 | 5/2003 | Hove et al. | |
| 6,571,244 B1 | 5/2003 | Larson | |
| 6,574,657 B1 | 6/2003 | Dickenson | |
| 6,577,229 B1 | 6/2003 | Bonneau et al. | |
| 6,581,105 B2 | 6/2003 | Miloslavsky et al. | |
| 6,587,684 B1 | 7/2003 | Hsu et al. | |
| 6,587,685 B2 | 7/2003 | Mittal et al. | |
| 6,591,095 B1 | 7/2003 | Palaniswamy et al. | |
| 6,591,098 B1 | 7/2003 | Shieh et al. | |
| 6,594,723 B1 | 7/2003 | Chapman et al. | |
| 6,594,822 B1 | 7/2003 | Schweitz et al. | |
| 6,595,856 B1 | 7/2003 | Ginsburg et al. | |
| 6,601,153 B1 | 7/2003 | Engelbrecht et al. | |
| 6,601,212 B1 | 7/2003 | Guha et al. | |
| 6,603,854 B1 | 8/2003 | Judkins et al. | |
| 6,603,968 B2 | 8/2003 | Anvekar et al. | |
| 6,606,744 B1 | 8/2003 | Mikurak | |
| 6,615,038 B1 | 9/2003 | Moles et al. | |
| 6,615,240 B1 | 9/2003 | Sullivan et al. | |
| 6,615,404 B1 | 9/2003 | Garfunkel et al. | |
| 6,622,017 B1 | 9/2003 | Hoffman | |
| 6,625,451 B1 | 9/2003 | La Medica et al. | |
| 6,640,334 B1 | 10/2003 | Rasmussen | |
| 6,643,506 B1 | 11/2003 | Criss et al. | |
| 6,647,260 B2 | 11/2003 | Dusse et al. | |
| 6,651,249 B2 | 11/2003 | Waldin et al. | |
| 6,658,090 B1 | 12/2003 | Harjunen et al. | |
| 6,659,345 B2 | 12/2003 | Sukeda et al. | |
| 6,665,376 B1 | 12/2003 | Brown | |
| 6,665,861 B1 | 12/2003 | Francis et al. | |
| 6,668,049 B1 | 12/2003 | Koch et al. | |
| 6,668,336 B2 | 12/2003 | Lasser | |
| 6,671,265 B1 | 12/2003 | Hwang et al. | |
| 6,675,201 B1 | 1/2004 | Parkkinen | |
| 6,675,382 B1 | 1/2004 | Foster | |
| 6,683,993 B1 | 1/2004 | Mead | |
| 6,684,396 B1 | 1/2004 | Brittain et al. | |
| 6,687,341 B1 | 2/2004 | Koch et al. | |
| 6,687,901 B1 | 2/2004 | Imamatsu | |
| 6,690,788 B1 | 2/2004 | Bauer et al. | |
| 6,694,314 B1 | 2/2004 | Sullivan et al. | |
| 6,694,336 B1 | 2/2004 | Multer et al. | |
| 6,697,808 B1 | 2/2004 | Hurwood et al. | |
| 6,697,969 B1 | 2/2004 | Merriam | |
| 6,698,013 B1 | 2/2004 | Bertero et al. | |
| 6,704,303 B1 | 3/2004 | Bowman-Amuah | |
| 6,714,642 B2 | 3/2004 | Dhir et al. | |
| 6,721,713 B1 | 4/2004 | Guheen et al. | |
| 6,721,946 B1 | 4/2004 | Fogarty et al. | |
| 6,725,048 B2 | 4/2004 | Mao et al. | |
| 6,725,056 B1 | 4/2004 | Moles et al. | |
| 6,725,392 B1 | 4/2004 | Frey et al. | |
| 6,728,531 B1 | 4/2004 | Lee et al. | |
| 6,728,950 B2 | 4/2004 | Davis et al. | |
| 6,730,027 B2 | 5/2004 | Iliff | |
| 6,731,932 B1 | 5/2004 | Rune et al. | |
| 6,741,848 B2 | 5/2004 | Timonen et al. | |
| 6,741,934 B2 | 5/2004 | Chen et al. | |
| 6,741,980 B1 | 5/2004 | Langseth et al. | |
| 6,742,025 B2 | 5/2004 | Jennery et al. | |
| 6,754,181 B1 | 6/2004 | Elliott et al. | |
| 6,754,895 B1 | 6/2004 | Bartel et al. | |
| 6,754,896 B2 | 6/2004 | Mishra et al. | |
| 6,757,263 B1 | 6/2004 | Olds | |
| 6,760,730 B1 | 7/2004 | Kataoka | |
| 6,763,104 B1 | 7/2004 | Judkins et al. | |
| 6,763,403 B2 | 7/2004 | Cheng et al. | |
| 6,772,338 B1 | 8/2004 | Hull | |
| 6,775,267 B1 | 8/2004 | Kung et al. | |
| 6,775,423 B2 | 8/2004 | Kulkarni et al. | |
| 6,779,177 B1 | 8/2004 | Bahrs et al. | |
| 6,785,834 B2 | 8/2004 | Chefalas et al. | |
| 6,789,215 B1 | 9/2004 | Rupp et al. | |
| 6,798,876 B1 | 9/2004 | Bala | |
| 6,799,155 B1 | 9/2004 | Lindemann et al. | |
| 6,802,061 B1 | 10/2004 | Parthasarathy et al. | |

(56) References Cited

U.S. PATENT DOCUMENTS

| | | |
|---|---|---|
| 6,807,574 B1 | 10/2004 | Partovi et al. |
| 6,813,571 B2 | 11/2004 | Lightbody et al. |
| 6,816,719 B1 | 11/2004 | Heinonen et al. |
| 6,820,214 B1 | 11/2004 | Cabrera et al. |
| 6,820,259 B1 | 11/2004 | Kawamata et al. |
| 6,823,432 B2 | 11/2004 | Ruffle et al. |
| 6,832,373 B2 * | 12/2004 | O'Neill .................. 717/171 |
| 6,836,657 B2 | 12/2004 | Ji et al. |
| 6,839,841 B1 | 1/2005 | Medvinsky et al. |
| 6,842,628 B1 | 1/2005 | Arnold et al. |
| 6,845,370 B2 | 1/2005 | Burkey et al. |
| 6,847,970 B2 | 1/2005 | Keller et al. |
| 6,850,533 B2 | 2/2005 | Gerszberg et al. |
| 6,850,614 B1 | 2/2005 | Collins |
| 6,856,676 B1 | 2/2005 | Pirot et al. |
| 6,873,988 B2 | 3/2005 | Herrmann et al. |
| 6,879,685 B1 | 4/2005 | Peterson et al. |
| 6,880,051 B2 | 4/2005 | Timpanaro-Perrotta |
| 6,883,168 B1 | 4/2005 | James et al. |
| 6,885,862 B1 | 4/2005 | Pearson |
| 6,889,054 B2 | 5/2005 | Himmel et al. |
| 6,895,387 B1 | 5/2005 | Roberts et al. |
| 6,904,405 B2 | 6/2005 | Suominen |
| 6,918,112 B2 | 7/2005 | Bourke-Dunphy et al. |
| 6,922,722 B1 | 7/2005 | Mann et al. |
| 6,925,300 B2 | 8/2005 | Horne |
| 6,925,467 B2 | 8/2005 | Gu et al. |
| 6,928,108 B2 | 8/2005 | Nelson et al. |
| 6,928,468 B2 | 8/2005 | Leermakers |
| 6,941,129 B2 | 9/2005 | Marce et al. |
| 6,941,453 B2 | 9/2005 | Rao |
| 6,944,621 B1 | 9/2005 | Collart |
| 6,948,099 B1 | 9/2005 | Tallam |
| 6,948,104 B2 | 9/2005 | Herley et al. |
| 6,950,660 B1 | 9/2005 | Hsu et al. |
| 6,956,846 B2 | 10/2005 | Lewis et al. |
| 6,957,041 B2 | 10/2005 | Christensen et al. |
| 6,957,062 B2 | 10/2005 | Castrogiovanni et al. |
| 6,966,058 B2 | 11/2005 | Earl et al. |
| 6,968,179 B1 | 11/2005 | De Vries |
| 6,968,543 B2 | 11/2005 | Takahara et al. |
| 6,970,181 B1 | 11/2005 | Fadel |
| 6,970,189 B1 | 11/2005 | Bernstein et al. |
| 6,981,020 B2 | 12/2005 | Miloslavsky et al. |
| 6,983,458 B1 | 1/2006 | Honda |
| 6,986,133 B2 | 1/2006 | O'Brien et al. |
| 6,990,656 B2 | 1/2006 | Ersek et al. |
| 6,990,660 B2 | 1/2006 | Moshir et al. |
| 6,996,603 B1 | 2/2006 | Srinivasan |
| 6,999,990 B1 | 2/2006 | Sullivan et al. |
| 7,002,919 B1 | 2/2006 | El-Sayed |
| 7,003,534 B2 | 2/2006 | Peng |
| 7,007,049 B2 | 2/2006 | Peng |
| 7,024,557 B1 | 4/2006 | Moles et al. |
| 7,027,586 B2 | 4/2006 | Bushey et al. |
| 7,031,972 B2 | 4/2006 | Ren et al. |
| 7,032,033 B1 | 4/2006 | Ledoux et al. |
| 7,036,007 B2 * | 4/2006 | Schelling et al. .................. 713/1 |
| 7,039,594 B1 | 5/2006 | Gersting |
| 7,047,448 B2 | 5/2006 | Rao et al. |
| 7,050,566 B2 | 5/2006 | Becerra et al. |
| 7,055,098 B2 | 5/2006 | Hull et al. |
| 7,055,148 B2 | 5/2006 | Marsh et al. |
| 7,058,860 B2 | 6/2006 | Miller et al. |
| 7,058,978 B2 | 6/2006 | Feuerstein et al. |
| 7,061,891 B1 | 6/2006 | Kilfoyle et al. |
| 7,062,031 B2 | 6/2006 | Becerra et al. |
| 7,065,347 B1 | 6/2006 | Vikse et al. |
| 7,069,452 B1 | 6/2006 | Hind et al. |
| 7,069,545 B2 | 6/2006 | Wang et al. |
| 7,069,578 B1 | 6/2006 | Prus et al. |
| 7,073,127 B2 | 7/2006 | Wang et al. |
| 7,073,172 B2 | 7/2006 | Chamberlain |
| 7,076,051 B2 | 7/2006 | Brown et al. |
| 7,080,371 B1 * | 7/2006 | Arnaiz et al. .................. 717/170 |
| 7,080,372 B1 | 7/2006 | Cole |
| 7,086,049 B2 | 8/2006 | Goodman |
| 7,089,036 B2 | 8/2006 | Prise |
| 7,089,549 B2 | 8/2006 | Venkiteswaran |
| 7,096,311 B2 | 8/2006 | Chiang |
| 7,099,896 B2 | 8/2006 | Fields et al. |
| 7,103,172 B2 | 9/2006 | Brown et al. |
| 7,106,843 B1 | 9/2006 | Gainsboro et al. |
| 7,110,525 B1 | 9/2006 | Heller et al. |
| 7,111,201 B2 | 9/2006 | Largman et al. |
| 7,117,172 B1 | 10/2006 | Black |
| 7,117,195 B2 | 10/2006 | Chantrain et al. |
| 7,120,909 B1 | 10/2006 | Shibuya |
| 7,130,896 B2 | 10/2006 | Engel et al. |
| 7,136,857 B2 | 11/2006 | Chen et al. |
| 7,137,034 B2 | 11/2006 | Largman et al. |
| 7,143,115 B2 | 11/2006 | Jones et al. |
| 7,143,153 B1 | 11/2006 | Black et al. |
| 7,145,898 B1 | 12/2006 | Elliott |
| 7,146,002 B1 | 12/2006 | Smith et al. |
| 7,146,609 B2 | 12/2006 | Thurston et al. |
| 7,149,508 B2 | 12/2006 | Herle |
| 7,150,015 B2 | 12/2006 | Pace et al. |
| 7,165,173 B1 | 1/2007 | Herle |
| 7,171,660 B2 | 1/2007 | McCaleb et al. |
| 7,181,731 B2 | 2/2007 | Pace et al. |
| 7,194,728 B1 | 3/2007 | Sirota et al. |
| 7,200,390 B1 | 4/2007 | Henager et al. |
| 7,206,576 B2 | 4/2007 | Jain et al. |
| 7,210,010 B2 | 4/2007 | Ogle |
| 7,216,343 B2 | 5/2007 | Das et al. |
| 7,222,340 B2 | 5/2007 | Willis, II |
| 7,230,951 B2 | 6/2007 | Mizell et al. |
| 7,231,411 B1 | 6/2007 | Lu |
| 7,240,356 B2 | 7/2007 | Iki et al. |
| 7,242,929 B2 | 7/2007 | Draluk et al. |
| 7,263,379 B1 | 8/2007 | Parkulo et al. |
| 7,266,371 B1 | 9/2007 | Amin et al. |
| 7,269,821 B2 | 9/2007 | Sahinoja et al. |
| 7,274,911 B2 | 9/2007 | Li |
| 7,275,243 B2 | 9/2007 | Gibbons et al. |
| 7,277,529 B1 | 10/2007 | Wuthnow et al. |
| 7,287,068 B1 | 10/2007 | Eriksson et al. |
| 7,292,846 B2 | 11/2007 | Mittal |
| 7,310,720 B2 | 12/2007 | Cornett |
| 7,313,791 B1 | 12/2007 | Chen et al. |
| 7,324,815 B2 | 1/2008 | Ross et al. |
| 7,349,695 B2 | 3/2008 | Oommen et al. |
| 7,350,205 B2 | 3/2008 | Ji |
| 7,353,533 B2 | 4/2008 | Wright et al. |
| 7,367,027 B1 | 4/2008 | Chen et al. |
| 7,369,851 B2 | 5/2008 | Okonnen et al. |
| 7,373,109 B2 | 5/2008 | Pohja et al. |
| 7,376,711 B2 | 5/2008 | Du et al. |
| 7,386,846 B2 * | 6/2008 | Rajaram .................. 717/173 |
| 7,405,537 B2 | 7/2008 | Hoffman et al. |
| 7,409,685 B2 | 8/2008 | Chen et al. |
| 7,415,706 B1 | 8/2008 | Raju et al. |
| 7,433,936 B2 | 10/2008 | Zhu et al. |
| 7,461,294 B2 | 12/2008 | Sano |
| 7,469,306 B2 | 12/2008 | Ng |
| 7,493,128 B2 | 2/2009 | Tang et al. |
| 7,500,143 B2 | 3/2009 | Buia et al. |
| 7,509,496 B2 | 3/2009 | Skog et al. |
| 7,509,652 B2 | 3/2009 | Niemi |
| 7,518,504 B2 | 4/2009 | Peeters |
| 7,523,155 B2 | 4/2009 | Hayes, Jr. |
| 7,526,563 B2 | 4/2009 | Ingimundarson et al. |
| 7,555,750 B1 | 6/2009 | Lilley |
| 7,577,722 B1 | 8/2009 | Khandekar et al. |
| 7,584,466 B1 | 9/2009 | Rao |
| 7,657,884 B2 | 2/2010 | Okonnen et al. |
| 7,657,886 B1 | 2/2010 | Chen et al. |
| 7,673,300 B2 | 3/2010 | Herle et al. |
| 7,673,325 B2 | 3/2010 | Vincent et al. |
| 7,680,828 B2 | 3/2010 | Gorelik |
| 7,689,981 B1 | 3/2010 | Gustafson |
| 7,698,698 B2 | 4/2010 | Skan |
| 7,707,570 B2 | 4/2010 | Yoshimura et al. |

(56) References Cited

U.S. PATENT DOCUMENTS

| | | |
|---|---|---|
| 7,725,889 B2 | 5/2010 | Gustafson et al. |
| 7,739,679 B2 | 6/2010 | Qumei |
| 7,784,065 B2 | 8/2010 | Polivy et al. |
| 7,797,693 B1 | 9/2010 | Gustafson et al. |
| 7,797,695 B2 | 9/2010 | Motta |
| 7,818,556 B2 | 10/2010 | Lima et al. |
| 7,823,148 B2 | 10/2010 | Deshpande et al. |
| 7,823,155 B2 | 10/2010 | Misra et al. |
| 7,844,964 B2 | 11/2010 | Marolia |
| 7,873,714 B2 | 1/2011 | Kaappa et al. |
| 7,889,869 B2 | 2/2011 | Ypya et al. |
| 8,063,929 B2 | 11/2011 | Kurtz et al. |
| 8,099,078 B2 | 1/2012 | Lazaridis |
| 2001/0008024 A1 | 7/2001 | Inaba |
| 2001/0018673 A1 | 8/2001 | Goldband et al. |
| 2001/0029178 A1 | 10/2001 | Criss et al. |
| 2001/0042112 A1 | 11/2001 | Slivka et al. |
| 2001/0047363 A1 | 11/2001 | Peng |
| 2001/0047441 A1 | 11/2001 | Robertson |
| 2001/0048728 A1 | 12/2001 | Peng |
| 2001/0049263 A1 | 12/2001 | Zhang |
| 2001/0052066 A1 | 12/2001 | Lee et al. |
| 2001/0053688 A1 | 12/2001 | Rignell et al. |
| 2001/0055414 A1 | 12/2001 | Thieme |
| 2001/0056348 A1 | 12/2001 | Hyde-Thomson et al. |
| 2002/0010702 A1 | 1/2002 | Ajtai et al. |
| 2002/0023258 A1 | 2/2002 | Elwahab et al. |
| 2002/0030634 A1 | 3/2002 | Noda et al. |
| 2002/0046400 A1 | 4/2002 | Burch |
| 2002/0052938 A1 | 5/2002 | Kanemitsu |
| 2002/0053044 A1 | 5/2002 | Gold et al. |
| 2002/0059526 A1 | 5/2002 | Dillon et al. |
| 2002/0072359 A1 | 6/2002 | Moles et al. |
| 2002/0073304 A1 | 6/2002 | Marsh et al. |
| 2002/0073309 A1 | 6/2002 | Kurn et al. |
| 2002/0075824 A1 | 6/2002 | Willekes et al. |
| 2002/0078142 A1 | 6/2002 | Moore et al. |
| 2002/0078185 A1 | 6/2002 | Swerup et al. |
| 2002/0078209 A1 | 6/2002 | Peng |
| 2002/0085704 A1 | 7/2002 | Shires |
| 2002/0087668 A1 | 7/2002 | San Martin et al. |
| 2002/0090934 A1 | 7/2002 | Mitchelmore |
| 2002/0091568 A1 | 7/2002 | Kraft et al. |
| 2002/0091815 A1 | 7/2002 | Anderson et al. |
| 2002/0092008 A1 | 7/2002 | Kehne et al. |
| 2002/0092010 A1 | 7/2002 | Fiske |
| 2002/0092011 A1 | 7/2002 | Liu et al. |
| 2002/0095615 A1 | 7/2002 | Hastings et al. |
| 2002/0099726 A1 | 7/2002 | Crudele et al. |
| 2002/0100028 A1 | 7/2002 | Kosaka et al. |
| 2002/0114384 A1 | 8/2002 | Nelson et al. |
| 2002/0116261 A1 | 8/2002 | Moskowitz et al. |
| 2002/0116665 A1 | 8/2002 | Pickover et al. |
| 2002/0120776 A1 | 8/2002 | Eggebraaten et al. |
| 2002/0120810 A1 | 8/2002 | Brouwer |
| 2002/0123335 A1 | 9/2002 | Luna et al. |
| 2002/0124209 A1 | 9/2002 | Faust et al. |
| 2002/0129355 A1 | 9/2002 | Velten et al. |
| 2002/0131404 A1 | 9/2002 | Mehta et al. |
| 2002/0144254 A1 | 10/2002 | Owada |
| 2002/0152005 A1 | 10/2002 | Bagnordi |
| 2002/0156863 A1 | 10/2002 | Peng |
| 2002/0157089 A1 | 10/2002 | Patel et al. |
| 2002/0157090 A1 | 10/2002 | Anton, Jr. |
| 2002/0159479 A1 | 10/2002 | Watanuki et al. |
| 2002/0162098 A1 | 10/2002 | Suzuki |
| 2002/0166027 A1 | 11/2002 | Shirasawa et al. |
| 2002/0170052 A1 | 11/2002 | Radatti |
| 2002/0174422 A1 | 11/2002 | Kelley et al. |
| 2002/0178241 A1 | 11/2002 | Eriksson |
| 2002/0184619 A1 | 12/2002 | Meyerson |
| 2002/0188886 A1 | 12/2002 | Liu et al. |
| 2002/0194532 A1 | 12/2002 | Nagasawa |
| 2002/0197991 A1 | 12/2002 | Anvekar et al. |
| 2002/0198971 A1 | 12/2002 | Resnick et al. |
| 2002/0198976 A1 | 12/2002 | Davenport |
| 2003/0005108 A1 | 1/2003 | Bartley et al. |
| 2003/0005362 A1 | 1/2003 | Miller et al. |
| 2003/0005426 A1 | 1/2003 | Scholtens et al. |
| 2003/0009752 A1 | 1/2003 | Gupta |
| 2003/0009753 A1* | 1/2003 | Brodersen et al. ............ 717/172 |
| 2003/0013434 A1 | 1/2003 | Rosenberg et al. |
| 2003/0018524 A1 | 1/2003 | Fishman et al. |
| 2003/0018764 A1 | 1/2003 | Shell et al. |
| 2003/0018810 A1 | 1/2003 | Karagiannis et al. |
| 2003/0018889 A1 | 1/2003 | Burnett et al. |
| 2003/0022657 A1* | 1/2003 | Herschberg et al. .......... 455/414 |
| 2003/0022663 A1 | 1/2003 | Rajaram et al. |
| 2003/0023573 A1 | 1/2003 | Chan et al. |
| 2003/0023849 A1 | 1/2003 | Martin, Jr. et al. |
| 2003/0023964 A1 | 1/2003 | Rajaram et al. |
| 2003/0027563 A1 | 2/2003 | Herle et al. |
| 2003/0027581 A1 | 2/2003 | Jokinen et al. |
| 2003/0033525 A1 | 2/2003 | Rajaram |
| 2003/0033599 A1 | 2/2003 | Rajaram et al. |
| 2003/0037075 A1 | 2/2003 | Hannigan et al. |
| 2003/0041125 A1 | 2/2003 | Salomon |
| 2003/0043180 A1 | 3/2003 | Gusler et al. |
| 2003/0044086 A1 | 3/2003 | Jia et al. |
| 2003/0046485 A1 | 3/2003 | Zitlaw |
| 2003/0046680 A1 | 3/2003 | Gentry |
| 2003/0054811 A1 | 3/2003 | Han et al. |
| 2003/0055919 A1 | 3/2003 | Fong et al. |
| 2003/0061323 A1 | 3/2003 | East et al. |
| 2003/0061384 A1 | 3/2003 | Nakatani |
| 2003/0065738 A1 | 4/2003 | Yang et al. |
| 2003/0066062 A1 | 4/2003 | Brannock et al. |
| 2003/0074658 A1 | 4/2003 | Kim |
| 2003/0074672 A1 | 4/2003 | Daniels |
| 2003/0081557 A1 | 5/2003 | Mettala et al. |
| 2003/0081786 A1 | 5/2003 | Nakano et al. |
| 2003/0084177 A1 | 5/2003 | Mulligan |
| 2003/0084283 A1 | 5/2003 | Pixton |
| 2003/0084434 A1 | 5/2003 | Ren et al. |
| 2003/0084435 A1 | 5/2003 | Messer et al. |
| 2003/0092438 A1 | 5/2003 | Moore et al. |
| 2003/0100303 A1 | 5/2003 | Armbruster et al. |
| 2003/0101246 A1 | 5/2003 | Lahti |
| 2003/0101446 A1 | 5/2003 | McManus et al. |
| 2003/0103484 A1 | 6/2003 | Oommen et al. |
| 2003/0110412 A1 | 6/2003 | Neville |
| 2003/0110484 A1* | 6/2003 | Famolari ...................... 717/173 |
| 2003/0117956 A1 | 6/2003 | Lee |
| 2003/0121032 A1 | 6/2003 | Cho et al. |
| 2003/0131226 A1 | 7/2003 | Spencer et al. |
| 2003/0133552 A1 | 7/2003 | Pillai et al. |
| 2003/0143991 A1 | 7/2003 | Minear et al. |
| 2003/0154471 A1 | 8/2003 | Teachman et al. |
| 2003/0156719 A1 | 8/2003 | Cronce |
| 2003/0162533 A1 | 8/2003 | Moles et al. |
| 2003/0172094 A1 | 9/2003 | Lauria et al. |
| 2003/0172138 A1 | 9/2003 | McCormack et al. |
| 2003/0172175 A1 | 9/2003 | McCormack et al. |
| 2003/0177485 A1 | 9/2003 | Waldin et al. |
| 2003/0182414 A1 | 9/2003 | O'Neill |
| 2003/0186689 A1 | 10/2003 | Herle et al. |
| 2003/0186722 A1 | 10/2003 | Weiner |
| 2003/0188120 A1 | 10/2003 | Maeda |
| 2003/0188156 A1 | 10/2003 | Yasala et al. |
| 2003/0191955 A1 | 10/2003 | Wagner et al. |
| 2003/0195110 A1 | 10/2003 | Moody et al. |
| 2003/0195753 A1 | 10/2003 | Homuth |
| 2003/0195951 A1 | 10/2003 | Wittel et al. |
| 2003/0196110 A1 | 10/2003 | Lampson et al. |
| 2003/0204640 A1 | 10/2003 | Sahinoja et al. |
| 2003/0214919 A1 | 11/2003 | Kilfoyle et al. |
| 2003/0217193 A1 | 11/2003 | Thurston et al. |
| 2003/0217358 A1 | 11/2003 | Thurston et al. |
| 2003/0221190 A1 | 11/2003 | Deshpande et al. |
| 2003/0226030 A1 | 12/2003 | Hurst et al. |
| 2003/0226137 A1 | 12/2003 | Nagao |
| 2003/0233649 A1 | 12/2003 | Reimert |
| 2004/0006760 A1 | 1/2004 | Gove et al. |
| 2004/0008113 A1 | 1/2004 | Pradhan et al. |

(56) References Cited

U.S. PATENT DOCUMENTS

| | | |
|---|---|---|
| 2004/0015952 A1 | 1/2004 | Lajoie et al. |
| 2004/0017831 A1 | 1/2004 | Shen et al. |
| 2004/0018831 A1 | 1/2004 | Majmundar et al. |
| 2004/0031027 A1 | 2/2004 | Hiltgen |
| 2004/0031029 A1 | 2/2004 | Lee et al. |
| 2004/0031030 A1* | 2/2004 | Kidder et al. ............ 717/172 |
| 2004/0031031 A1 | 2/2004 | Rudelic |
| 2004/0034853 A1 | 2/2004 | Gibbons et al. |
| 2004/0038692 A1 | 2/2004 | Muzaffar |
| 2004/0039801 A9 | 2/2004 | Srinivasan et al. |
| 2004/0040020 A1 | 2/2004 | Yang |
| 2004/0041800 A1 | 3/2004 | Daniels |
| 2004/0043788 A1 | 3/2004 | Mittal |
| 2004/0049394 A1 | 3/2004 | Burger et al. |
| 2004/0049609 A1 | 3/2004 | Simonson et al. |
| 2004/0054764 A1 | 3/2004 | Aderton et al. |
| 2004/0054995 A1 | 3/2004 | Lee |
| 2004/0058651 A1 | 3/2004 | Ross et al. |
| 2004/0058652 A1 | 3/2004 | McGregor et al. |
| 2004/0059725 A1 | 3/2004 | Sharangpani et al. |
| 2004/0062130 A1 | 4/2004 | Chiang |
| 2004/0068721 A1 | 4/2004 | O'Neill et al. |
| 2004/0068724 A1 | 4/2004 | Gardner et al. |
| 2004/0072578 A1 | 4/2004 | Keutmann et al. |
| 2004/0073901 A1 | 4/2004 | Imamatsu |
| 2004/0073912 A1 | 4/2004 | Meza |
| 2004/0078427 A1 | 4/2004 | Gil et al. |
| 2004/0082346 A1 | 4/2004 | Skytt et al. |
| 2004/0083472 A1 | 4/2004 | Rao et al. |
| 2004/0088281 A1 | 5/2004 | Matsuishi |
| 2004/0088694 A1 | 5/2004 | Ho |
| 2004/0092255 A1 | 5/2004 | Ji et al. |
| 2004/0093342 A1 | 5/2004 | Arbo et al. |
| 2004/0093523 A1 | 5/2004 | Matsuzaki et al. |
| 2004/0093557 A1 | 5/2004 | Kawatani |
| 2004/0093597 A1 | 5/2004 | Rao et al. |
| 2004/0095457 A1 | 5/2004 | Pokomy et al. |
| 2004/0098413 A1 | 5/2004 | Peng |
| 2004/0098421 A1 | 5/2004 | Peng |
| 2004/0098427 A1 | 5/2004 | Peng |
| 2004/0098715 A1 | 5/2004 | Aghera et al. |
| 2004/0103214 A1 | 5/2004 | Adwankar et al. |
| 2004/0103340 A1 | 5/2004 | Sundareson et al. |
| 2004/0107416 A1 | 6/2004 | Buban et al. |
| 2004/0110497 A1 | 6/2004 | Little |
| 2004/0111582 A1 | 6/2004 | Maeda et al. |
| 2004/0111702 A1 | 6/2004 | Chan |
| 2004/0111723 A1 | 6/2004 | Moles et al. |
| 2004/0117322 A1 | 6/2004 | Bjorksten et al. |
| 2004/0117760 A1 | 6/2004 | McFarling |
| 2004/0117785 A1 | 6/2004 | Kincaid |
| 2004/0123188 A1 | 6/2004 | Srinivasan et al. |
| 2004/0123270 A1 | 6/2004 | Zhuang et al. |
| 2004/0123282 A1 | 6/2004 | Rao |
| 2004/0126803 A1 | 7/2004 | Cash et al. |
| 2004/0133887 A1 | 7/2004 | Herle et al. |
| 2004/0143573 A1 | 7/2004 | Burkey et al. |
| 2004/0143836 A1 | 7/2004 | McCormack et al. |
| 2004/0148379 A1 | 7/2004 | Ogura |
| 2004/0150519 A1 | 8/2004 | Husain et al. |
| 2004/0152455 A1 | 8/2004 | Herle |
| 2004/0153327 A1 | 8/2004 | Liu et al. |
| 2004/0153356 A1 | 8/2004 | Lockwood et al. |
| 2004/0158583 A1 | 8/2004 | Kaappa |
| 2004/0158829 A1 | 8/2004 | Beresin et al. |
| 2004/0166839 A1 | 8/2004 | Okkonen et al. |
| 2004/0168165 A1 | 8/2004 | Kokkinen |
| 2004/0174264 A1 | 9/2004 | Reisman et al. |
| 2004/0187103 A1* | 9/2004 | Wickham et al. ............ 717/168 |
| 2004/0190693 A1 | 9/2004 | Beiermeister |
| 2004/0192280 A1 | 9/2004 | Dalton et al. |
| 2004/0192299 A1 | 9/2004 | Wilson et al. |
| 2004/0192306 A1 | 9/2004 | Elkarat et al. |
| 2004/0194081 A1 | 9/2004 | Qumei et al. |
| 2004/0198447 A1 | 10/2004 | Larsson |
| 2004/0204117 A1 | 10/2004 | Weiner |
| 2004/0208182 A1 | 10/2004 | Boles et al. |
| 2004/0215702 A1 | 10/2004 | Hamasaki et al. |
| 2004/0215755 A1 | 10/2004 | O'Neill |
| 2004/0215830 A1 | 10/2004 | Shenfield |
| 2004/0224679 A1 | 11/2004 | Okoro et al. |
| 2004/0226008 A1 | 11/2004 | Jacobi et al. |
| 2004/0229684 A1 | 11/2004 | Blackburn et al. |
| 2004/0237081 A1 | 11/2004 | Homiller |
| 2004/0239975 A1 | 12/2004 | Kawaura et al. |
| 2004/0242286 A1 | 12/2004 | Benco et al. |
| 2004/0243991 A1 | 12/2004 | Gustafson et al. |
| 2004/0243992 A1 | 12/2004 | Gustafson et al. |
| 2004/0243993 A1 | 12/2004 | Okkonen et al. |
| 2004/0244008 A1 | 12/2004 | Lee |
| 2004/0250245 A1 | 12/2004 | Rao et al. |
| 2004/0255291 A1 | 12/2004 | Sierer et al. |
| 2004/0257208 A1 | 12/2004 | Huang et al. |
| 2004/0261072 A1 | 12/2004 | Herle et al. |
| 2004/0261073 A1 | 12/2004 | Herle et al. |
| 2004/0267481 A1 | 12/2004 | Resnick et al. |
| 2004/0267833 A1 | 12/2004 | Meller et al. |
| 2004/0268041 A1 | 12/2004 | Smith |
| 2005/0005268 A1 | 1/2005 | Zilavy et al. |
| 2005/0010552 A1 | 1/2005 | Kaappa et al. |
| 2005/0010585 A1 | 1/2005 | Sahinoja et al. |
| 2005/0027867 A1 | 2/2005 | Mueller et al. |
| 2005/0033774 A1 | 2/2005 | Brentano et al. |
| 2005/0033829 A1 | 2/2005 | Oommen |
| 2005/0037762 A1 | 2/2005 | Gurbani et al. |
| 2005/0038955 A1 | 2/2005 | Chen |
| 2005/0039178 A1 | 2/2005 | Marolia et al. |
| 2005/0050538 A1* | 3/2005 | Kawamata et al. ............ 717/168 |
| 2005/0055397 A1 | 3/2005 | Zhu et al. |
| 2005/0055453 A1 | 3/2005 | Zhu |
| 2005/0055595 A1 | 3/2005 | Frazer et al. |
| 2005/0060361 A1 | 3/2005 | Chatrath et al. |
| 2005/0060699 A1 | 3/2005 | Kim et al. |
| 2005/0066019 A1 | 3/2005 | Egan et al. |
| 2005/0071385 A1 | 3/2005 | Rao |
| 2005/0073438 A1 | 4/2005 | Rodgers et al. |
| 2005/0079863 A1 | 4/2005 | Macaluso |
| 2005/0084079 A1 | 4/2005 | Lang |
| 2005/0086328 A1 | 4/2005 | Landram et al. |
| 2005/0096025 A1 | 5/2005 | Qumei et al. |
| 2005/0097544 A1 | 5/2005 | Kim |
| 2005/0102615 A1 | 5/2005 | Roman et al. |
| 2005/0114493 A1 | 5/2005 | Mandato et al. |
| 2005/0114504 A1 | 5/2005 | Marolia et al. |
| 2005/0114852 A1 | 5/2005 | Chen et al. |
| 2005/0132179 A1 | 6/2005 | Glaum et al. |
| 2005/0132349 A1 | 6/2005 | Roberts et al. |
| 2005/0135286 A1 | 6/2005 | Nurminen et al. |
| 2005/0136942 A1 | 6/2005 | Timiri et al. |
| 2005/0144609 A1 | 6/2005 | Rothman et al. |
| 2005/0144612 A1 | 6/2005 | Wang et al. |
| 2005/0148359 A1 | 7/2005 | Joeressen |
| 2005/0153741 A1 | 7/2005 | Chen et al. |
| 2005/0160195 A1 | 7/2005 | Bruner et al. |
| 2005/0170863 A1 | 8/2005 | Shostak |
| 2005/0172117 A1 | 8/2005 | Aura |
| 2005/0172141 A1 | 8/2005 | Gayde et al. |
| 2005/0182697 A1 | 8/2005 | Rao |
| 2005/0198062 A1 | 9/2005 | Shapiro |
| 2005/0198379 A1 | 9/2005 | Panasyuk et al. |
| 2005/0204068 A1 | 9/2005 | Zhu et al. |
| 2005/0204353 A1 | 9/2005 | Ji |
| 2005/0210458 A1* | 9/2005 | Moriyama et al. ............ 717/168 |
| 2005/0216902 A1 | 9/2005 | Schaefer |
| 2005/0216903 A1 | 9/2005 | Schaefer |
| 2005/0220079 A1 | 10/2005 | Asokan |
| 2005/0227677 A1 | 10/2005 | Kallio |
| 2005/0227683 A1 | 10/2005 | Draluk et al. |
| 2005/0228847 A1 | 10/2005 | Hayes Jr. |
| 2005/0228874 A1 | 10/2005 | Edgett et al. |
| 2005/0233733 A1 | 10/2005 | Roundtree et al. |
| 2005/0234967 A1 | 10/2005 | Draluk et al. |
| 2005/0239447 A1 | 10/2005 | Holzman et al. |
| 2005/0246703 A1 | 11/2005 | Ahonen |

(56) References Cited

U.S. PATENT DOCUMENTS

| | | |
|---|---|---|
| 2005/0251848 A1 | 11/2005 | Al-Janabi |
| 2005/0257214 A1 | 11/2005 | Moshir et al. |
| 2005/0264404 A1 | 12/2005 | Franczyk et al. |
| 2005/0268296 A1 | 12/2005 | Marolia et al. |
| 2005/0272455 A1 | 12/2005 | Oommen |
| 2005/0278399 A1 | 12/2005 | Herle et al. |
| 2005/0278715 A1 | 12/2005 | Herle et al. |
| 2005/0282533 A1 | 12/2005 | Draluk et al. |
| 2006/0007901 A1 | 1/2006 | Roskowski et al. |
| 2006/0010437 A1 | 1/2006 | Marolia |
| 2006/0015626 A1 | 1/2006 | Hallamaa et al. |
| 2006/0015860 A1 | 1/2006 | Liu et al. |
| 2006/0020947 A1 | 1/2006 | Hallamaa et al. |
| 2006/0026228 A1 | 2/2006 | Kim |
| 2006/0031449 A1 | 2/2006 | Hallamaa et al. |
| 2006/0036493 A1 | 2/2006 | Aufricht et al. |
| 2006/0036874 A1 | 2/2006 | Cockerille et al. |
| 2006/0036941 A1 | 2/2006 | Neil |
| 2006/0039313 A1 | 2/2006 | Chou et al. |
| 2006/0039561 A1 | 2/2006 | Ypya et al. |
| 2006/0052089 A1 | 3/2006 | Khurana et al. |
| 2006/0053066 A1 | 3/2006 | Sherr et al. |
| 2006/0059481 A1 | 3/2006 | Smith et al. |
| 2006/0068786 A1 | 3/2006 | Florence |
| 2006/0072847 A1 | 4/2006 | Chor et al. |
| 2006/0079224 A1 | 4/2006 | Welnick et al. |
| 2006/0080635 A1 | 4/2006 | Anwar et al. |
| 2006/0080650 A1 | 4/2006 | Winters et al. |
| 2006/0080659 A1 | 4/2006 | Ganji |
| 2006/0080681 A1 | 4/2006 | Anwar et al. |
| 2006/0087982 A1 | 4/2006 | Kuure et al. |
| 2006/0089999 A1 | 4/2006 | Xiang et al. |
| 2006/0101040 A1 | 5/2006 | Ren et al. |
| 2006/0106806 A1 | 5/2006 | Sperling et al. |
| 2006/0129414 A1 | 6/2006 | Hallamaa et al. |
| 2006/0130046 A1 | 6/2006 | O'Neill |
| 2006/0158510 A1 | 7/2006 | Lia et al. |
| 2006/0160533 A1 | 7/2006 | Chou et al. |
| 2006/0161599 A1 | 7/2006 | Rosen |
| 2006/0173976 A1 | 8/2006 | Vincent et al. |
| 2006/0174242 A1 | 8/2006 | Zhu et al. |
| 2006/0176397 A1 | 8/2006 | Panabaker |
| 2006/0181553 A1 | 8/2006 | Choe et al. |
| 2006/0190608 A1 | 8/2006 | Sahinoja et al. |
| 2006/0193337 A1 | 8/2006 | Paila et al. |
| 2006/0200658 A1 | 9/2006 | Penkethman |
| 2006/0200814 A1 | 9/2006 | Kontinen et al. |
| 2006/0203722 A1 | 9/2006 | Oommen |
| 2006/0203738 A1 | 9/2006 | Fok et al. |
| 2006/0212561 A1 | 9/2006 | Feng |
| 2006/0212937 A1 | 9/2006 | Natarajan |
| 2006/0217111 A1 | 9/2006 | Marolia et al. |
| 2006/0223528 A1 | 10/2006 | Smith |
| 2006/0224712 A1 | 10/2006 | Aho |
| 2006/0236325 A1 | 10/2006 | Rao et al. |
| 2006/0242305 A1 | 10/2006 | Alnas |
| 2006/0246922 A1 | 11/2006 | Gasbarro et al. |
| 2006/0248172 A1 | 11/2006 | Zurawka et al. |
| 2006/0258344 A1 | 11/2006 | Chen |
| 2006/0271659 A1 | 11/2006 | Mittal et al. |
| 2006/0277590 A1 | 12/2006 | Limont et al. |
| 2007/0014243 A1 | 1/2007 | Meyer et al. |
| 2007/0028226 A1 | 2/2007 | Chen et al. |
| 2007/0036294 A1 | 2/2007 | Chaudhuri et al. |
| 2007/0041545 A1 | 2/2007 | Gainsboro |
| 2007/0043849 A1 | 2/2007 | Lill et al. |
| 2007/0049265 A1 | 3/2007 | Kaimal et al. |
| 2007/0093243 A1 | 4/2007 | Kapadekar et al. |
| 2007/0106806 A1 | 5/2007 | Tu et al. |
| 2007/0132774 A1 | 6/2007 | Fan et al. |
| 2007/0133484 A1 | 6/2007 | Albal et al. |
| 2007/0150444 A1 | 6/2007 | Chesnais et al. |
| 2007/0150524 A1 | 6/2007 | Eker et al. |
| 2007/0169073 A1 | 7/2007 | O'Neill et al. |
| 2007/0169075 A1* | 7/2007 | Lill et al. ............... 717/168 |
| 2007/0169089 A1 | 7/2007 | Bantz et al. |
| 2007/0169099 A1 | 7/2007 | Rao et al. |
| 2007/0186108 A1 | 8/2007 | Passarella et al. |
| 2007/0190939 A1 | 8/2007 | Abel |
| 2007/0192158 A1 | 8/2007 | Kim |
| 2007/0192453 A1 | 8/2007 | Copeland et al. |
| 2007/0200713 A1 | 8/2007 | Weber et al. |
| 2007/0220504 A1 | 9/2007 | Eker |
| 2007/0226805 A1 | 9/2007 | Jeal et al. |
| 2007/0259633 A1 | 11/2007 | Rao |
| 2007/0277169 A1 | 11/2007 | Rao et al. |
| 2007/0282621 A1 | 12/2007 | Altman et al. |
| 2007/0283003 A1 | 12/2007 | Broyles et al. |
| 2007/0294684 A1 | 12/2007 | Kumashiro et al. |
| 2008/0032763 A1 | 2/2008 | Giobbi |
| 2008/0043726 A1 | 2/2008 | Herrero-Veron et al. |
| 2008/0046583 A1 | 2/2008 | Rao |
| 2008/0062900 A1 | 3/2008 | Rao |
| 2008/0062926 A1 | 3/2008 | Oba |
| 2008/0108321 A1 | 5/2008 | Taaghol et al. |
| 2008/0127320 A1 | 5/2008 | De Lutiis et al. |
| 2008/0144590 A1 | 6/2008 | Rantanen et al. |
| 2008/0154633 A1 | 6/2008 | Ishibashi et al. |
| 2008/0160983 A1 | 7/2008 | Poplett et al. |
| 2008/0196019 A1 | 8/2008 | Meller et al. |
| 2008/0205419 A1 | 8/2008 | Shin et al. |
| 2008/0208928 A1 | 8/2008 | Hernandez |
| 2008/0244049 A1 | 10/2008 | Normark et al. |
| 2008/0271023 A1 | 10/2008 | Bone et al. |
| 2009/0030965 A1 | 1/2009 | Hayes, Jr. |
| 2009/0064341 A1 | 3/2009 | Hartung et al. |
| 2009/0113386 A1 | 4/2009 | Eker et al. |
| 2009/0190757 A1 | 7/2009 | Chen et al. |
| 2009/0204845 A1 | 8/2009 | Herscovitz et al. |
| 2009/0219848 A1 | 9/2009 | Lohmar et al. |
| 2009/0328099 A1 | 12/2009 | Praden et al. |
| 2010/0185727 A1 | 7/2010 | Mittal |
| 2010/0275010 A1 | 10/2010 | Ghirardi |
| 2010/0279733 A1 | 11/2010 | Karsten et al. |
| 2010/0287308 A1 | 11/2010 | Robbin et al. |
| 2011/0022948 A1 | 1/2011 | Brown et al. |
| 2011/0209055 A1 | 8/2011 | Plestid et al. |

FOREIGN PATENT DOCUMENTS

| | | |
|---|---|---|
| CN | 1864429 | 11/2006 |
| CN | 1906574 | 1/2007 |
| CN | 101043372 | 9/2007 |
| CN | 101543016 | 9/2009 |
| CN | 101595469 | 12/2009 |
| CN | 101904105 | 12/2010 |
| DE | 10115729 | 10/2001 |
| DE | 112007002863 | 10/2009 |
| DE | 112008002767 | 10/2010 |
| EP | 0717353 | 6/1996 |
| EP | 0803812 | 10/1997 |
| EP | 0811942 | 12/1997 |
| EP | 1049346 | 11/2000 |
| EP | 1052571 | 11/2000 |
| EP | 1077407 | 2/2001 |
| EP | 1152338 | 11/2001 |
| EP | 1176840 | 1/2002 |
| EP | 1184785 | 3/2002 |
| EP | 1256865 | 11/2002 |
| EP | 1282989 A1 | 2/2003 |
| EP | 1333375 | 6/2003 |
| EP | 1331833 | 7/2003 |
| EP | 1584005 | 7/2004 |
| EP | 1597668 | 8/2004 |
| EP | 1654640 | 12/2004 |
| EP | 1639435 | 1/2005 |
| EP | 1652100 | 1/2005 |
| EP | 1652075 | 2/2005 |
| EP | 1513317 | 3/2005 |
| EP | 1515571 | 3/2005 |
| EP | 1519600 | 3/2005 |
| EP | 1660996 | 3/2005 |
| EP | 1665041 | 4/2005 |
| EP | 1668951 | 6/2005 |

(56) References Cited

FOREIGN PATENT DOCUMENTS

| | | |
|---|---|---|
| EP | 1563436 | 8/2005 |
| EP | 1584016 | 10/2005 |
| EP | 1691282 | 8/2006 |
| EP | 1705832 | 9/2006 |
| EP | 1732037 | 12/2006 |
| EP | 2024850 | 2/2009 |
| EP | 2025095 | 2/2009 |
| EP | 2047420 | 4/2009 |
| EP | 2087644 | 8/2009 |
| EP | 2104992 | 9/2009 |
| EP | 1614034 | 1/2012 |
| GB | 2426151 | 11/2006 |
| GB | 2458047 | 9/2009 |
| GB | 2468225 | 9/2010 |
| JP | 61173360 | 8/1986 |
| JP | 07160490 | 6/1995 |
| JP | 07219780 | 8/1995 |
| JP | 08202626 | 8/1996 |
| JP | 8202626 | 8/1996 |
| JP | 11003223 | 1/1999 |
| JP | 11161479 | 6/1999 |
| JP | 11272454 | 10/1999 |
| JP | 11345127 | 12/1999 |
| JP | 2001233353 | 2/2003 |
| KR | 19990050594 | 11/1999 |
| KR | 2002-0034228 | 5/2000 |
| KR | 20010046714 | 6/2001 |
| KR | 20010076555 | 8/2001 |
| KR | 2001-0100328 | 11/2001 |
| KR | 20010100328 | 11/2001 |
| KR | 20020034228 | 5/2002 |
| KR | 100506785 | 8/2005 |
| KR | 1020050088193 | 9/2005 |
| KR | 1020080008425 | 3/2006 |
| KR | 1020060064660 | 6/2006 |
| KR | 1020060064663 | 6/2006 |
| KR | 1020060089229 | 8/2006 |
| KR | 20090035044 | 4/2009 |
| KR | 100986487 | 10/2010 |
| KR | 101085987 | 11/2011 |
| TW | 090107418 | 1/2003 |
| WO | WO9632679 | 10/1996 |
| WO | WO9838823 | 9/1998 |
| WO | WO9856149 | 12/1998 |
| WO | WO9921382 | 4/1999 |
| WO | WO9957900 | 11/1999 |
| WO | WO0001187 | 1/2000 |
| WO | WO0002358 | 1/2000 |
| WO | WO0022860 | 4/2000 |
| WO | WO0106798 | 1/2001 |
| WO | WO0186985 | 11/2001 |
| WO | WO0223925 | 3/2002 |
| WO | WO0225438 | 3/2002 |
| WO | WO0241147 | 5/2002 |
| WO | WO 0241147 A1 * | 5/2002 |
| WO | WO03010656 | 2/2003 |
| WO | WO03012574 | 2/2003 |
| WO | WO03025742 | 3/2003 |
| WO | WO03034765 | 4/2003 |
| WO | WO03049381 | 6/2003 |
| WO | WO2004031889 | 4/2004 |
| WO | WO2004038546 | 5/2004 |
| WO | WO2004042538 | 5/2004 |
| WO | WO2004049104 | 6/2004 |
| WO | WO2004049115 | 6/2004 |
| WO | WO2004049314 | 6/2004 |
| WO | WO2004059956 | 7/2004 |
| WO | WO2004061551 | 7/2004 |
| WO | WO2004061615 | 7/2004 |
| WO | WO2004063899 | 7/2004 |
| WO | WO2004066091 | 8/2004 |
| WO | WO2004070571 | 8/2004 |
| WO | WO2004072773 | 8/2004 |
| WO | WO2004086196 | 10/2004 |
| WO | WO2004095457 | 11/2004 |
| WO | WO2004109510 | 12/2004 |
| WO | WO2005001665 | 1/2005 |
| WO | WO2005004395 | 1/2005 |
| WO | WO2005008940 | 1/2005 |
| WO | WO2005013123 | 2/2005 |
| WO | WO2005015343 | 2/2005 |
| WO | WO2005024628 | 3/2005 |
| WO | WO2005031570 | 4/2005 |
| WO | WO2005036916 | 4/2005 |
| WO | WO2005041459 | 5/2005 |
| WO | WO2005079334 | 9/2005 |
| WO | WO2006003254 | 1/2006 |
| WO | WO2007112108 | 10/2007 |
| WO | WO2007117514 | 10/2007 |
| WO | WO2007146710 | 12/2007 |
| WO | WO2008003081 | 1/2008 |
| WO | WO2008008880 | 1/2008 |
| WO | WO2008014454 | 1/2008 |
| WO | WO2008022195 | 2/2008 |
| WO | WO2008022198 | 2/2008 |
| WO | WO2008028072 | 3/2008 |
| WO | WO2008033962 | 3/2008 |
| WO | WO2008045700 | 4/2008 |
| WO | WO2008048905 | 4/2008 |
| WO | WO2008067446 | 6/2008 |
| WO | WO2009051760 | 4/2009 |

OTHER PUBLICATIONS

Munson et al.Sync: a Java framework for mobile collaborative applications, Computer, Jun. 1997, pp. 59-66, Retrieved on [May 24, 2012] Retrieved from the Internet: URL<http://ieeexplore.ieee.org/stamp/stamp.jsp?tp=&arnumber=587549>.*

Farnham et al. IST-Trust: a perspective on the reconfiguration of future mobile terminals using software download, The 11th IEEE International Symposium on Personal, Indoor and Mobile Radio Communications, 2000, Retrieved on [May 24, 2012] Retrieved from the INternet: URL< http://ieeexplore.ieee.org/stamp/stamp.jsp?tp=&arnumber=881582>.*

"Focus on OpenView a guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the $1^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

Bettini, L., "Software Update via Mobile Agent Based Programming," Proc. ACM SAC, Jan. 1, 2002, pp. 32-36.

Bitfone Corp., CA Office Action Jun. 8, 2007, CA App. No. 2,414,281, 4 p.

Bitfone Corp., CN Office Action Jun. 5, 2009, CN App. No. 200610067641.4, 12 p.

Bitfone Corp., CN Office Action Dec. 20, 2010, CN App. No. 200610067641.4, 3 p.

Bitfone Corp., EP Office Action Mar. 16, 2010, EP App. No. EP04777313.0, 8 p.

Bitfone Corp., EP Search Report Mar. 22, 2012, EP App. No. 06251423.7, 6 p.

Bitfone Corp., EP Office Action Mar. 26, 2010, EP App. No. 04785381.7, 5 p.

Bitfone Corp., EP Office Action May 11, 2012, EP App. No. 04777313.0, 9 p.

Bitfone Corp., EP Search Report Jan. 18, 2008, EP App No. 04759830.5, 5 p.

Bitfone Corp., EP Search Report Mar. 30, 2011, EP App. No. 06251423.7, 7 p.

(56) References Cited

OTHER PUBLICATIONS

Bitfone Corp., EP Search Report Jul. 1, 2011, EP App. No. 06251423.7, 11 p.
Bitfone Corp., EP Search Report Jul. 4, 2006, EP App. No. EP06250739.7, 7 p.
Bitfone Corp., EP Search Report Jul. 19, 2006, EP App. No. 06251512.7, 8 p.
Bitfone Corp., EP Search Report Nov. 26, 2009, EP App. No. EP04777313.0, 3 p.
Bitfone Corp., Int'l Prelim Rpt Jan. 9, 2006, PCT App. No. PCT/US2004/022598, 7 p.
Bitfone Corp., Int'l Prelim Rpt Jan. 30, 2006, PCT App. No. PCT/US2004/024876, 8 p.
Bitfone Corp., Int'l Prelim Rpt Mar. 6, 2006, PCT App. No. PCT/US2004/028433, 8 p.
Bitfone Corp., Int'l Prelim Rpt Mar. 13, 2006, PCT App. No. PCT/US2004/021037, 7 p.
Bitfone Corp., Int'l Prelim Rpt Mar. 27, 2006, PCT App. No. PCT/US2004/031547, 9 p.
Bitfone Corp., Int'l Prelim Rpt Aug. 5, 2005, PCT App No. PCT/US2004/002950, 6 p.
Bitfone Corp., Int'l Prelim Rpt Aug. 12, 2005, PCT App. No. PCT/US2004/002084, 4 p.
Bitfone Corp., Int'l Prelim Rpt Sep. 30, 2008, PCT App. No. PCT/US2007/007489, 4 p.
Bitfone Corp., Int'l Prelim Rpt Oct. 1, 2005, PCT App. No. PCT/U52004/008918, 4 p.
Bitfone Corp., Int'l Prelim Rpt Oct. 28, 2008, PCT App. No. PCT/US2004/000694, 4 p.
Bitfone Corp., Int'l Prelim Rpt Nov. 7, 2006, PCT App. No. PCT/US2005/004520, 4 p.
Bitfone Corp., Int'l Prelim Rpt Dec. 8, 2005, PCT App. No. PCT/US2004/017731, 8 p.
Bitfone Corp., Int'l Prelim Rpt Dec. 10, 2008, PCT App. No. PCT/US2007/070534, 9 p.
Bitfone Corp., Int'l Prelim Rpt, Apr. 3, 2006, PCT App. No. PCT/US2004/033071, 9 p.
Bitfone Corp., Int'l Search Report & Written Opinion Jan. 4, 2005, PCT App. No. PCT/US2004/002084, 8 p.
Bitfone Corp., Int'l Search Report & Written Opinion Jan. 14, 2005, PCT App. No. PCT/US2004/011219, 9 p.
Bitfone Corp., Int'l Search Report & Written Opinion Jul. 14, 2008, PCT App. No. PCT/US2004/001574, 16 p.
Bitfone Corp., Int'l Search Report Jan. 10, 2005, PCT App. No. PCT/US2003/033241, 3 p.
Bitfone Corp., Int'l Search Report Jan. 19, 2005, PCT App. No. PCT/US2004/024876, 1 p.
Bitfone Corp., Int'l Search Report Jan. 25, 2005, PCT App. No. PCT/US2003/037265, 3 p.
Bitfone Corp., Int'l Search Report Jan. 25, 2005, PCT App. No. PCT/US2004/033071, 3 p.
Bitfone Corp., Int'l Search Report Jan. 30, 2006, PCT App. No. PCT/US2004/021037, 3 p.
Bitfone Corp., Int'l Search Report Feb. 10, 2005, PCT App. No. PCT/US2004/031547, 3 p.
Bitfone Corp., Int'l Search Report Mar. 7, 2005, PCT App. No. PCT/US2004/002950, 4 p.
Bitfone Corp., Int'l Search Report Mar. 16, 2005, PCT App. No. PCT/US2004/008918, 3 p.
Bitfone Corp., Int'l Search Report Apr. 12, 2008, PCT App. No. PCT/US2004/063899, 3 p.
Bitfone Corp., Int'l Search Report Apr. 22, 2004, PCT App. No. PCT/US2003/027620, 4 p.
Bitfone Corp., Int'l Search Report Apr. 23, 2008, PCT App. No. PCT/US2007/007489, 3 p.
Bitfone Corp., Int'l Search Report May 26, 2005, PCT App. No. PCT/US2004/028433, 7 p.
Bitfone Corp., Int'l Search Report Jun. 22, 2005, PCT App. No. PCT/US2003/041555, 3 p.
Bitfone Corp., Int'l Search Report Jul. 20, 2005, PCT App. No. PCT/US2004/022598, 3 p.
Bitfone Corp., Int'l Search Report Jul. 27, 2005, PCT App No. PCT/US2003/035934, 3 p.
Bitfone Corp., Int'l Search Report Aug. 23, 2005, PCT App. No. PCT/US2004/017731, 6 p.
Bitfone Corp., Int'l Search Report Oct. 3, 2006, PCT App. No. PCT/US2005/004520, 3 p.
Bitfone Corp., Int'l Search Report Oct. 3, 2008, PCT App. No. PCT/US2004/000694, 3 p.
Bitfone Corp., Int'l Search Report Oct. 14, 2004, PCT App. No. PCT/US2003/035377, 4 p.
Bitfone Corp., Int'l Search Report Dec. 3, 2004, PCT App. No. PCT/US2003/036995, 4 p.
Bitfone Corp., Int'l Search Report, Jul. 20, 2006, PCT App. No. PCT/US2003/027727, 8 p.
Bitfone Corp., JP Final Office Action Jun. 6, 2006, Jap. App. No. 2002-543291, 10 p.
Bitfone Corp., JP Office Action Nov. 8, 2005, JP App. No. 2002-543291, 13 p.
Bitfone Corp., KR Office Action Feb. 16, 2011, KR App. No. KR-10-2006-7006350, 4 p.
Bitfone Corp., KR Office Action Apr. 10, 2008, KR App. No. KR10-2006-7004343, 7 p.
Bitfone Corp., KR Office Action May 21, 2008, KR App. No. KR10-2006-7004488, 8 p.
Bitfone Corp., KR Office Action Aug. 21. 2007, KR App. No. KR10-2006-7004343, 5 p.
Bitfone Corp., KR Office Action Aug. 21, 2007, KR App. No. KR10-2006-7004488, 5 p.
Bitfone Corp., Written Opinion Jan. 19, 2005, PCT App. No. PCT/US2004/017731, 7 p.
Bitfone Corp., Written Opinion Jan. 30, 2006, PCT App. No. PCT/US2004/021037, 6 p.
Bitfone Corp., Written Opinion Mar. 26, 2006, PCT App. No. PCT/US2004/031547, 8 p.
Bitfone Corp., Written Opinion Jul. 20, 2005, PCT App. No. PCT/US2004/022598, 6 p.
Bitfone Corp., Written Opinion Dec. 4, 2005, PCT App. No. PCT/US2004/017731, 7 p.
Burns et al., "In-Place Reconstruction of Version Differences," IEEE Transactions on Knowledge and Data Engineering, Vo. 15. No. 4, Jul./Aug. 2003, pp. 973-984.
Ciancarini et al., "Using a Coordination Language to Specify and Analyze Systems Containing Modile Components," ACM Transactions, vol. 9. No. 2, Apr. 2000, pp. 167-198.
Claise et al., "IPFIX Protocol Specification", IPFIX Working Group, Jun. 2003, retrieved from: http://tools.ietf.org/html/draft-ietf-ipfix-protocol-00.
CRC Press LLC., "Overview of Cryptography," Copyright 1997 CRC Press LLC, 48 p.
Fasbender et al., "Any Network, Any Terminal, Anywhere," IEEE Personal Communications, Apr. 1999, pp. 22-30, IEEE Press. 1999.
Hadjiefthymiades et al., "ESW4: Enhanced Scheme for WWW Computing in Wireless Communication Environments," ACM SIGCOMM Computer Communication Review, vol. 29, Issue 5, pp. 24-35, ACM Press, Oct. 1999.
Hoffmeyer et al., "Radio Software Download for Commercial Wireless Reconfigurable Devices," IEEE Communications Magazine, IEEE Service Center, New York NY, US. vol. 42, No. 3, Mar. 2004, pp. S26-S32.
HPC, Int'l Search Report Sep. 5, 2007, PCT App. No. PCT/US2007/008415, 2 p.
HPDC, CN Office Action Sep. 22, 2011, CN App. No. 200780044370.3, 9 p.
HPDC, EP Office Action Jan. 22, 2010, EP App. No. 04701739.7, 7 p.
HPDC, EP Office Action Feb. 4, 2011, EP App. No. 07843502.1, 4 p.
HPDC, EP Office Action Feb. 9, 2011, EP App. No. 04759830.5, 3 p.
HPDC, EP Office Action Mar. 4, 2011, EP App. No. 07813468.1, 9 p.
HPDC, EP Office Action Mar. 23, 2010, EP App. No. 04705590.0, 10 p.
HPDC, EP Office Action Apr. 3, 2009, EP App. No. 04779823.6, 7 p.

(56) References Cited

OTHER PUBLICATIONS

HPDC, EP Office Action Apr. 11, 2008, EP App. No. 04759830.5, 5 p.
HPDC, EP Office Action Apr. 23, 2009, EP App. No. 04701739.7, 7 p.
HPDC, EP Office Action May 4, 2011, EP App. No. 04759830.5, 3 p.
HPDC, EP Office Action May 11, 2010, EP App. No. 03759224.3, 6 p.
HPDC, EP Office Action Jun. 3, 2009, EP App. No. 01991949.7, 7p.
HPDC, EP Office Action Jun. 30, 2009, EP App. No. 07798184.3, 5 p.
HPDC, EP Office Action Jul. 27, 2011, EP App. No. 07844241.5, 6 p.
HPDC, EP Office Action Aug. 12, 2011, EP App. No. 04759830.5. 56 p.
HPDC, EP Office Action Aug. 30, 2011, EP App. No. 04779823.6, 6 p.
HPDC, EP Office Action Sep. 2, 2010, EP App. No. 04759830.5, 4 p.
HPDC, EP Office Action Sep. 7, 2009, EP App. No. 07844241.5, 3 p.
HPDC, EP Office Action Sep. 18, 2009, EP App. No. 07843502.1, 2 p.
HPDC, EP Office Action Oct. 15, 2009, EP App. No. 04785067.2, 6 p.
HPDC, EP Office Action Oct. 27, 2009, EP App. No. 04782849.6, 3 p.
HPDC, EP Office Action Nov. 10, 2009, EP App. No. 07798184.3, 4 p.
HPDC, EP Supp. Search Report Feb. 6, 2009, EP App. No. 04701739, 3 p.
HPDC, EP Search Report Feb. 23, 2010, EP App. No. 03789910.1, 5 p.
HPDC, EP Search Report Mar. 6, 2009, EP App. No. 01991949.7, 7 p.
HPDC, EP Search Report Jun. 3, 2009, EP App. No. 01991949.7, 7 p.
HPDC, EP Search Report Aug. 9, 2010, EP App. No. 03789910.1, 6 p.
HPDC, EP Search Report Oct. 19, 2009, EP App. No. 07813468.1, 10 p.
HPDC, EP Search Report Nov. 13, 2009, EP App. No. 04756990.0, 4 p.
HPDC, EP Search Report Nov. 24, 2008, EP App. No. 04779823.6, 3 p.
HPDC, EP Search Report Nov. 25, 2009, EP App. No. 04705590.0, 6 p.
HPDC, EP Supp. Search Report Feb. 6, 2009, EP App. No. 004701739.7, 3 p.
HPDC, EP Supp. Search Report Jan. 26, 2010, EP App. No. 03759224.3, 3 p.
HPDC, EP Supp. Search Report Dec. 22, 2009, EP App. No. 03789910.1, 7 p.
HPDC, GB Office Action Feb. 25, 2011, GB App. No. 0910190.8, 6 p.
HPDC, GB Office Action Jul. 26, 2011, GB App. No. 0910190.8, 1 p.
HPDC, GB Office Action Sep. 20, 2011, GB App. No. 1007372.4, 3 p.
HPDC, GB Office Action Dec. 22, 2011, GB App. No. 1007372.4, 2 p.
HPDC, Int'l Prelim Rpt Jan. 6, 2009, PCT App. No. PCT/US2007/072493, 8 p.
HPDC, Int'l Prelim Rpt Jan. 13, 2009, PCT App. No. PCT/US2007/073340, 8 p.
HPDC, Int'l Prelim Rpt Jan. 27, 2009, PCT App. No. PCT/US2007/074586, 5 p.
HPDC, Int'l Prelim Rpt Feb. 17, 2009, PCT App. No. PCT/US2007/076001, 7 p.
HPDC, Int'l Prelim Rpt Feb. 17, 2009, PCT App. No. PCT/US2007/076006, 7 p.
HPDC, Int'l Prelim Rpt Mar. 3, 2009, PCT App. No. PCT/US2007/077288, 7 p.
HPDC, Int'l Prelim Rpt Mar. 17, 2009, PCT App. No. PCT/US2007/078326, 7 p.
HPDC, Int'l Prelim Rpt Apr. 7, 2009, PCT App. No. PCT/US2007/079920, 8 p.
HPDC, Int'l Prelim Rpt Apr. 20, 2010, PCT App. No. PCT/US2008/011824, 6 p.
HPDC, Int'l Prelim Rpt Apr. 22, 2009, PCT App. No. PCT/US2007/081273, 8 p.
HPDC, Int'l Prelim Rpt Jun. 3, 2009, PCT App. No. PCT/US2007/085903, 6 p.
HPDC, Int'l Prelim Rpt Sep. 30, 2008, PCT App. No. PCT/US2007/008415, 7 p.
HPDC, Int'l Search Report Jan. 3, 2008, PCT App. No. US2007/073340, 5 p.
HPDC, Int'l Search Report Jan. 31, 2008, PCT App. No. PCT/US2007/076001, 3 p.
HPDC, Int'l Search Report Feb. 14, 2008, PCT App. No. PCT/US2007/072493, 5 p.
HPDC, Int'l Search Report Mar. 5, 2008, PCT App. No. PCT/US2007/078326, 5 p.
HPDC, Int'l Search Report Mar. 25, 2009, PCT App. No. PCT/US2008/011824, 2p.
HPDC, Int'l Search Report Mar. 27, 2008, PCT App. No. PCT/US2007/079920, 3 p.
HPDC, Int'l Search Report Apr. 10, 2008, PCT App No. PCT/US2007/070534, 7 p.
HPDC, Int'l Search Report Jun. 26, 2008, PCT App. No. PCT/US2007/076006, 5 p.
HPDC, Int'l Search Report Jul. 18, 2008, PCT App. No. PCT/US2007/077288, 5 p.
HPDC, Int'l Search Report Aug. 13, 2008, PCT App. No. PCT/US2007/085903, 3 p.
HPDC, Int'l Search Report Sep. 2, 2008, PCT App. No. PCT/US2007/081273, 5 p.
HPDC, Int'l Search Report Oct. 24, 2008, PCT App. No. PCT/US2007/074586, 3 p.
HPDC, JP Office Action Nov. 8, 2005, JP App. No. 2002-543291, 13 p.
HPDC, KR Office Action May 6, 2010, KR App. No. 10-2009-7005363, 3 p.
HPDC, KR Office Action Nov. 11, 2009, KR App. No. 10-2009-7005363, 2 p.
HPDC, Written Opinion Apr. 17, 2010, PCT App. No. PCT/US2008/011824, 4 p.
IBM, "System Firmware Update Method Before Rebooting the Operating System," Research Disclosure, Mason Publications, vol. 425, No. 86, Sep. 1, 2009, 2 p.
Ding et al., "Client Server Computing in Mobile Environments," ACM Computing Surveys, vol. 31, No. 2, Jun. 1999, pp. 117-157.
Jones, F., "Jambala-lntelligence beyond digital wireless," Ericsson Review No. 3, 1998, pp. 126-131.
Klein et al., "Compressed Delta Encoding for LZSS Encoded Files," 2007 Data Compression Conference (DCC'07) IEEE Computer Society, 10 p.
Koenig et al., "Re: ext2—available+used not equal to total," Dec. 31, 1998, accessed on Oct. 9, 2007 from <http://www.uwsg.iu.edu/hypermail/linux/kernel/9901.0/0270.html>, Linux Kernel Archive, 2 p.
Lindholm et al., "Fast and Simple XML Tree Dfferencing by Sequence Alignment," DocEng '06, Oct. 10-13, 2006, Amsterdam, The Netherlands, Copyright 2006 ACM, pp. 75-84.
Memorymanagement.org, http://web.archive.org/web/20020313115607/http://www.memorymanagement.org/glossary, 3 p. 2003.
Meng et al., "Schema-Guided Wrapper Maintenance for Web-Data Extraction," WIDM'03, Nov. 7-8, 2003, pp. 1-8.
Meyers, W. J., "Design of a Microcode Link Editor," Proceedings of the 13th Annual Workshop on Microprogramming, pp. 165-170.
Microsoft, "Computer Dictionary," Microsoft Press, 2002, pp. 372, 373, 380, 423 and 565.
Oommen, P., "A Framework for Integrated Management of Mobile-Stations Over-the-Air," Integrated Network Management Proceedings, 2001 IEEE/IFIP International Symposium on May 14-18, 2001, pp. 247-256.

(56) References Cited

OTHER PUBLICATIONS

Oommen, P., "Over the Air Handset Management," Emerging Technologies Symposium; Broadband, Wireless Internet Access, 2000 IEEE Apr. 10-11, 2000, 4 p.

Open Mobile Alliance, "Device Management Protocol, Candidate," Ver 1.2, Jun. 2, 2006.

Open Mobile Alliance, "Generic Content Download Over the Air Specification," Version 1.0, Sep. 12, 2002, 42 p.

Pant et al., Software Reliability Predictions for Distributed Software, IEEE, 1998, pp. 11-21.

Park et al., "A Low-cost Memory Architecture with NAND XIP for Mobile Embedded Systems," CODES+ISSS'03, Oct. 1-3, 2003, pp. 138-143.

Pedram, M., "Power Optimization and Management in Embedded Systems," Jan. 2001, pp. 239-244.

Peymandoust et al., "Low Power Embedded Software Optimization Using Symbolic Algebra," Mar. 2002, pp. 1-7.

Raskar et al., "Image Fusion for Context Enhancement and Video Surrealism," Proceedings of the Third Int'l. Symposium on Non-Photorealistic Animation and Rendering (NPAR2004), Jun. 7-9, 2004, 9 p.

Satoh et al., Experiment of Component-Based Software Development on Multiple Distributed Object Environments, IEEE, 1998, 8 p.

Sevanto et al., "Introducing Quality-of-Service and Traffic Classes into Wireless Mobile Networks," WOWMOM 98 Dallas, Texas, USA, Copyright ACM 1998 pp. 21-30.

Symborski, C. W., "Updating Softwaare and Configuration Data in a Distributed Communications Nev.'Vork". 1988 Computer NetworKing Symposium, 8 p.

Varshney et al., "Emerging Mobile and Wireless Networks," Communications of the ACM Jun. 2000, vol. 43, No. 6, pp. 73-81.

W3C, XML Signature Syntax and Processing, (2nd edition), Jun. 10, 2008, 1 p. [Online] http://www.w3.org/TR/xmldsig-core/.

White, Ron, "How Computers Work," Millennium Ed., Que Corporation, Indianapolis, IN, 1999, 284 p.

Yergeau, F., "UTF-8, a transformation format of ISO 10646," Jan. 1998, Alis Technologies, 10 p.

Yoshimura et al., "Mobile Streaming Media CDN Enabled by Dynamic SMIL," WWW2003, May 7-11, 2002, Honolulu, Hawaii, ACM, pp. 651-661.

Wheatley, Office Action Dec. 27, 2011, U.S. Appl. No. 12/057,044, filed Mar. 27, 2008, 6 p.

Rao, Office Action Nov. 14, 2008, U.S. Appl. No. 11/057,361, filed Feb. 14, 2005, 8 p.

Insun, Office Action Feb. 3, 2010, U.S. Appl. No. 11/111,276, filed Apr. 21, 2005, 10 p.

Insun, Office Action Jul. 12, 2010, U.S. Appl. No. 11/111,276, filed Apr. 21, 2005, 11 p.

Iyad, Office Action Jan. 28, 2008, U.S. Appl. No. 11/100,305, filed Apr. 6, 2005, 20 p.

Iyad, Final Office Action Jul. 22, 2008, U.S. Appl. No. 11/100,305, filed Apr. 6, 2006, 11 p.

Iyad, Office Action Jan. 21, 2009, U.S. Appl. No. 11/100,305, filed Apr. 6, 2005, 7 p.

Iyad, Final Office Action Jul. 8, 2009, U.S. Appl. No. 11/100,305, filed Apr. 6, 2005, 25 p.

Shao-Chun, Office Action Dec. 11, 2008, U.S. Appl. No. 11/120,556, filed May 3, 2005, 28 p.

Shao-Chun, Final Office Action May 26, 2009, U.S. Appl. No. 11/120,556, filed May 3, 2005, 30 p.

Shao-Chun, Office Action Oct. 28, 2009, U.S. Appl. No. 11/120,556, filed May 3, 2005, 31 p.

Shao-Chun, Final Office Action May 13, 2010, U.S. Appl. No. 11/120,556, filed May 3, 2005 32 p.

Shao-Chun, Office Action Nov. 29, 2010, U.S. Appl. No. 11/120,556, filed May 3, 2005, 26 p.

Shao-Chun, Office Action Oct. 29, 2008, U.S. Appl. No. 11/124,866, filed May 9, 2005, 13 p.

Shao-Chun, Office Action May 5, 2009, U.S. Appl. No. 11/124,866, filed May 9, 2005, 14 p.

Shao-Chun, Office Action Nov. 12, 2008, U.S. Appl. No. 11/144,537, filed Jun. 3, 2005, 16 p.

Shao-Chun, Final Office Action Apr. 29, 2009, U.S. Appl. No. 11/144,537, filed Jun. 3, 2005, 22 p.

Sunil, Office Action Aug. 20, 2008, U.S. Appl. No. 11/189,344, filed Jul. 26, 2005, 12 p.

Sunil, Final Office Action Feb. 19, 2009, U.S. Appl. No. 11/189,344, filed Jul. 26, 2005, 13 p.

Sunil, Office Action Aug. 19, 2009, U.S. Appl. No. 11/189,344, filed Jul. 26, 2005, 10 p.

Sunil, Office Action Sep. 4, 2008, U.S. Appl. No. 11/226,032, filed Sep. 14, 2005, 17 p.

Sunil, Final Office Action Jul. 6, 2009, U.S. Appl. No. 11/226,032, filed Sep. 14, 2005, 17 p.

Sunil, Office Action Dec. 14, 2009, U.S. Appl. No. 11/226,032, filed Sep. 14, 2005, 23 p.

Sunil, Final Office Action Apr. 29, 2010, U.S. Appl. No. 11/226,032, filed Sep. 14, 2005, 16 p.

Rao, Office Action Aug. 21, 2009, U.S. Appl. No. 11/247,463, filed Oct. 11, 2005, 18 p.

Rao, Final Office Action Jul. 13, 2010, U.S. Appl. No. 11/247,463, filed Oct. 11, 2005, 19 p.

Rao, Office Action Mar. 8, 2011, U.S. Appl. No. 11/247,463, filed Oct. 11, 2005, 20 p.

Rao, Final Office Action Aug. 30, 2011, U.S. Appl. No. 11/247,463, filed Oct. 11, 2005, 20 p.

Shao-Chun, Office Action Jul. 8, 2009, U.S. Appl. No. 11/316,291, filed Dec. 21, 2005, 18 p.

Shao-Chun, Final Office Action Dec. 2, 2009, U.S. Appl. No. 11/316,291, filed Dec. 21, 2005, 18 p.

Giovanni, Office Action Jul. 8, 2009, U.S. Appl. No. 11/316,292, filed Dec. 21, 2005, 8 p.

Giovanni, Office Action Jan. 25, 2010, U.S. Appl. No. 11/316,292, filed Dec. 21, 2005, 7 p.

Shao-Chun, Office Action May 27, 2009, U.S. Appl. No. 11/352,813, filed Feb. 13, 2006, 31 p.

Sunil, Office Action Jun. 10, 2008, U.S. Appl. No. 11/352,702, filed Feb. 13, 2006, 8 p.

Sunil, Final Office Action Mar. 30, 2009, U.S. Appl. No. 11/352,702, filed Feb. 13, 2006, 11 p.

Sunil, Office Action Sep. 28, 2009, U.S. Appl. No. 11/352,702, filed Feb. 13, 2006, 9 p.

Sunil, Final Office Action Mar. 16, 2010, U.S. Appl. No. 11/352,702, filed Feb. 13, 2006, 11 p.

Rao, Office Action Feb. 17, 2009, U.S. Appl. No. 11/374,481, filed Mar. 9, 2006, 17 p.

Rao, Final Office Action Jul. 21, 2009, U.S. Appl. No. 11/374,481, filed Mar. 9, 2006, 18 p.

Rao, Office Action Jan. 4, 2010, U.S. Appl. No. 11/374,481, filed Mar. 9, 2006, 10 p.

Jason, Office Action Oct. 16, 2008, U.S. Appl. No. 11/369,561, filed Mar. 7, 2006, 13 p.

Jason, Final Office Action May 8, 2009, U.S. Appl. No. 11/369,561, filed Mar. 7, 2006, 14 p.

Rao, Office Action Mar. 12, 2009, U.S. Appl. No. 11/385,162, filed Mar. 21, 2006, 6 p.

Rao, Office Action Sep. 25, 2009, U.S. Appl. No. 11/385,162, filed Mar. 21, 2006, 8 p.

Rao, Final Office Action May 4, 2010, U.S. Appl. No. 11/385,162, filed Mar. 21, 2006, 8 p.

Sunil, Office Action Nov. 13, 2008, U.S. Appl. No. 11/189,944, filed Jul. 26, 2005, 19 p.

Sunil, Final Office Action Apr. 27, 2009, U.S. Appl. No. 11/189,944, filed Jul. 26, 2005, 21 p.

Glenn, Office Action May 29, 2009, U.S. Appl. No. 11/478,108, filed Jun. 28, 2006, 19 p.

Glenn, Office Action Dec. 18, 2009, U.S. Appl. No. 11/478,108, filed Jun. 28, 2006, 17 p.

Glenn, Final Office Action Apr. 27, 2010, U.S. Appl. No. 11/478,108, filed Jun. 28, 2006, 17 p.

Glenn, Office Action Sep. 2, 2010, U.S. Appl. No. 11/478,108, filed Jun. 28, 2006, 21 p.

(56) References Cited

OTHER PUBLICATIONS

Glenn, Office Action Dec. 29, 2010, U.S. Appl. No. 11/478,108, filed Jun. 28, 2006, 16 p.
Rao, Office Action Apr. 6, 2010, U.S. Appl. No. 11/397,187, filed Apr. 4, 2006, 12 p.
Giovanni, Office Action May 26, 2010, U.S. Appl. No. 11/500,754, filed Aug. 7, 2006, 12 p.
Giovanni, Final Office Action Sep. 2, 2010, U.S. Appl. No. 11/500,754, filed Aug. 7, 2006, 17 p.
Uma, Office Action Oct. 6, 2009, U.S. Appl. No. 11/707,505, filed Feb. 16, 2007, 16 p.
Uma, Final Office Action Mar. 8, 2010, U.S. Appl. No. 11/707,505, filed Feb. 16, 2007 17 p.
Uma, Office Action Dec. 10, 2010, U.S. Appl. No. 11/707,505, filed Feb. 16, 2007 12 p.
Sunil, Office Action Oct. 7, 2010, U.S. Appl. No. 11/824,344, filed Jun. 29, 2007, 7 p.
Marko, Office Action Apr. 6, 2009, U.S. Appl. No. 11/732,267, filed Apr. 2, 2007, 23 p.
Marko, Final Office Action Oct. 19, 2009, U.S. Appl. No. 11/732,267, filed Apr. 2, 2007, 10 p.
Rao, Office Action Oct. 19, 2009, U.S. Appl. No. 11/799,586, filed May 2, 2007, 18 p.
Rao, Final Office Action Mar. 8, 2010, U.S. Appl. No. 11/799,586, filed May 2, 2007, 18 p.
Rao, Office Action Aug. 18, 2010, U.S. Appl. No. 11/799,586, filed May 2, 2007, 19 p.
Rao, Office Action Mar. 21, 2008, U.S. Appl. No. 11/728,517, filed Mar. 26, 2007, 17 p.
Rao, Office Action Oct. 20, 2008, U.S. Appl. No. 11/728,517, filed Mar. 26, 2007, 21 p.
Rao, Office Action Apr. 13, 2009, U.S. Appl. No. 11/728,517, filed Mar. 26, 2007, 23 p.
Rao, Office Action Dec. 3, 2009, U.S. Appl. No. 11/728,517, filed Mar. 26, 2007, 19 p.
Rao, Final Office Action Jun. 24, 1970, U.S. Appl. No. 11/728,517, filed Mar. 26, 2007, 25 p.
Marolia, Office Action Jul. 28, 2009, U.S. Appl. No. 11/827,583, filed Jul. 12, 2007, 18 p.
Rao, Office Action Jun. 16, 2009, U.S. Appl. No. 11/839,143, filed Aug. 15, 2007, 11 p.
Rao, Final Office Action Jan. 8, 2010, U.S. Appl. No. 11/839,143, filed Aug. 15, 2007, 15 p.
Rao, Office Action Aug. 4, 2010, U.S. Appl. No. 11/839,143, filed Aug. 15, 2007, 16 p.
Rao, Final Office Action Oct. 5, 2011, U.S. Appl. No. 11/839,143, filed Aug. 15, 2007, 20 p.
Rao, Office Action May 13, 2011, U.S. Appl. No. 11/839,143, filed Aug. 15, 2007, 17 p.
Rao, Final Office Action Aug. 23, 2011, U.S. Appl. No. 11/839,143, filed Aug. 15, 2007, 17 p.
Rao, Office Action Sep. 17, 2009, U.S. Appl. No. 11/847,658, filed Aug. 30, 2007, 10 p.
Rao, Office Action Mar. 25, 2010, U.S. Appl. No. 11/847,658, filed Aug. 30, 2007, 11 p.
Rao, Office Action Aug. 25, 2010, U.S. Appl. No. 11/847,658, filed Aug. 30, 2007, 13 p.
Rao, Office Action Nov. 18, 2010, U.S. Appl. No. 11/847,658, filed Aug. 30, 2007, 11 p.
Rao, Office Action Aug. 24, 2010, U.S. Appl. No. 11/854,414, filed Sep. 12, 2007, 14 p.
Rao, Office Action Nov. 17, 2009, U.S. Appl. No. 11/947,322, filed Nov. 29, 2007, 15 p.
Rao, Final Office Action May 14, 2010, U.S. Appl. No. 11/947,322, filed Nov. 29, 2007, 22 p.
Rao, Office Action Dec. 27, 2010, U.S. Appl. No. 11/947,322, filed Nov. 29, 2007, 43 p.
Rao, Final Office Action May 26, 2011, U.S. Appl. No. 11/947,322, filed Nov. 29, 2007, 40 p.
Rao, Office Action Jan. 9, 2012, U.S. Appl. No. 11/947,322, filed Nov. 29, 2007, 40 p.
Brunet, Office Action Jan. 25, 2006, U.S. Appl. No. 10/822,092, filed Apr. 9, 2004, 14 p.
Brunet, Final Office Action Aug. 23, 2006, U.S. Appl. No. 10/822,092, filed Apr. 9, 2004, 13 p.
Brunet, Office Action Feb. 22, 2007, U.S. Appl. No. 10/822,092, filed Apr. 9, 2004, 19 p.
Brunet, Final Office Action Nov. 15, 2007, U.S. Appl. No. 10/822,092, filed Apr. 9, 2004, 22 p.
Brunet, Office Action Apr. 4, 2008, U.S. Appl. No. 10/822,092, filed Apr. 9, 2004, 27 p.
Brunet, Final Office Action Sep. 23, 2008, U.S. Appl. No. 10/822,092, filed Apr. 9, 2004, 28 p.
Brunet, Office Action Mar. 8, 2007, U.S. Appl. No. 10/889,693, filed Jul. 12, 2004, 17 p.
Brunet, Final Office Action Nov. 28, 2007, U.S. Appl. No. 10/889,693, filed Jul. 12, 2004, 19 p.
Brunet, Office Action Jun. 25, 2008, U.S. Appl. No. 10/889,693, filed Jul. 12, 2004, 69 p.
Brunet, Final Office Action Dec. 23, 2008, U.S. Appl. No. 10/889,693, filed Jul. 12, 2004, 23 p.
Brunet, Office Action Jun. 29, 2006, U.S. Appl. No. 10/999,606, filed Nov. 29, 2004, 9 p.
Brunet, Final Office Action Mar. 7, 2007, U.S. Appl. No. 10/999,606, filed Nov. 29, 2004, 10 p.
Brunet, Office Action Apr. 18, 2008, U.S. Appl. No. 10/999,606, filed Nov. 29, 2004, 6 p.
Brunet, Office Action Apr. 24, 2009, U.S. Appl. No. 10/999,606, filed Nov. 29, 2004, 12 p.
Brunet, Final Office Action Aug. 20, 2009, U.S. Appl. No. 10/999,606, filed Nov. 29, 2004, 16 p.
Brunet, Office Action Nov. 10, 2009, U.S. Appl. No. 10/999,606, filed Nov. 29, 2004, 16 p.
Brunet, Final Office Action Feb. 18, 2010, U.S. Appl. No. 10/999,606, filed Nov. 29, 2004, 16 p.
Shao-Chun, Office Action Jun. 6, 2007, U.S. Appl. No. 11/125,974, filed May 9, 2005, 9 p.
Shao-Chun, Office Action Jan. 17, 2008, U.S. Appl. No. 11/125,974, filed May 9, 2005, 9 p.
Shao-Chun, Final Office Action Aug. 18, 2008, U.S. Appl. No. 11/125,974, filed May 9, 2005, 13 p.
Jeffrey, Office Action Jul. 26, 2006, U.S. Appl. No. 11/247,459, filed Oct. 11, 2005, 9 p.
Jeffrey, Office Action May 15, 2007, U.S. Appl. No. 11/247,459, filed Oct. 11, 2005, 10 p.
Jeffrey, Office Action Oct. 31, 2007, U.S. Appl. No. 11/247,459, filed Oct. 11, 2005, 26 p.
O'Neill, Office Action Aug. 25, 2006, U.S. Appl. No. 10/311,462, filed May 13, 2003, 24 p.
O'Neill, Office Action Mar. 5, 2010, U.S. Appl. No. 10/311,462, filed May 13, 2003, 23 p.
O'Neill, Final Office Action Jul. 23, 2010, U.S. Appl. No. 10/311,462, filed May 13, 2003, 24 p.
O'Neill, Office Action Nov. 18, 2009, U.S. Appl. No. 11/335,312, filed Jan. 19, 2006, 12 p.
O'Neill, Office Action Mar. 12, 2004, U.S. Appl. No. 10/404,601, filed Apr. 1, 2003, 28 p.
Shao-Chun, Final Office Action Jul. 25, 2006, U.S. Appl. No. 10/411,784, filed Apr. 11, 2003, 22 p.
Shao-Chun, Office Action Mar. 27, 2007, U.S. Appl. No. 10/411,784, filed Apr. 11, 2003, 16 p.
Shao-Chun, Final Office Action Oct. 18, 2007, U.S. Appl. No. 10/411,784, filed Apr. 11, 2003, 15 p.
Rao, Examiner's Answer Dec. 6, 2011, U.S. Appl. No. 11/427,635, filed Jan. 24, 2005, 19 p.
Rao, Final Office Action Jun. 10, 2011, U.S. Appl. No. 11/427,635, filed Jan. 24, 2005, 18 p.
Rao, Office Action Dec. 27, 2010, U.S. Appl. No. 11/427,635 filed Jan. 24, 2005, 13 p.
Rao, Office Action Mar. 31, 2010, U.S. Appl. No. 11/427,635 filed Jan. 24, 2005, 14 p.

(56) References Cited

OTHER PUBLICATIONS

Rao, Office Action Oct. 15, 2009, U.S. Appl. No. 11/427,635, filed Jan. 24, 2005, 11 p.
Rao, Final Office Action Apr. 30, 2009, U.S. Appl. No. 11/427,635, filed Jan. 24, 2005, 13 p.
Rao, Office Action Nov. 26, 2008, U.S. Appl. No. 11/427,635, filed Jan. 24, 2005, 15 p.
Rao, Examiner's Answer Mar. 16, 2011, U.S. Appl. No. 11/043,813, filed Jan. 26, 2005, 16 p.
Rao, Final Office Action Aug. 20, 2010, U.S. Appl. No. 11/043,813, filed Jan. 26, 2005, 16 p.
Rao, Office Action Mar. 9, 2010, U.S. Appl. No. 11/043,813, filed Jan. 26, 2005, 14 p.
Rao, Final Office Action Nov. 13, 2009, U.S. Appl. No. 11/043,813, filed Jan. 26, 2005, 15 p.
Rao, Office Action Mar. 30, 2009, U.S. Appl. No. 11/043,813, filed Jan. 26, 2005, 11 p.
Rao, Office Action Oct. 3, 2008, U.S. Appl. No. 11/043,813, filed Jan. 26, 2005, 23 p.
Chen, Examiner's Answer Aug. 16, 2012, U.S. Appl. No. 11/099,870, filed Apr. 6, 2005, 12 p.
Chen, Final Office Action Dec. 23, 2011, U.S. Appl. No. 11/099,870, filed Apr. 6, 2005, 12 p.
Chen, Office Action Jul. 6, 2011, U.S. Appl. No. 11/099,870, filed Apr. 6, 2005, 13 p.
Chen, Final Office Action Nov. 26, 2010, U.S. Appl. No. 11/099,870, filed Apr. 6, 2005, 9 p.
Chen, Office Action Jun. 24, 2010, U.S. Appl. No. 11/099,870, filed Apr. 6, 2005, 7 p.
Chen, Office Action Nov. 30, 2009, U.S. Appl. No. 11/099,870, filed Apr. 6, 2005, 8 p.
Chen, Final Office Action Apr. 14, 2009, U.S. Appl. No. 11/099,870, filed Apr. 6, 2005, 19 p.
Chen, Office Action Sep. 24, 2008, U.S. Appl. No. 11/099,870, filed Apr. 6, 2005, 7 p.
Chen, Office Action Apr. 25, 2008, U.S. Appl. No. 11/099,870, filed Apr. 6, 2005, 5 p.
Chen, Final Office Action Oct. 11, 2007, U.S. Appl. No. 11/099,870, filed Apr. 6, 2005, 16 p.
Chen, Office Action Aug. 24, 2006, U.S. Appl. No. 11/099,870, filed Apr. 6, 2005, 15 p.
Zhu, Examiner's Answer Aug. 16, 2012, U.S. Appl. No. 11/386,560, filed Mar. 22, 2006, 9 p.
Zhu, Final Office Action Feb. 16, 2012, U.S. Appl. No. 11/386,560, filed Mar. 22, 2006, 23 p.
Zhu, Office Action Sep. 30, 2011, U.S. Appl. No. 11/386,560, filed Mar. 22, 2006, 19 p.
Zhu, Final Office Action Mar. 3, 2011, U.S. Appl. No. 11/386,560, filed Mar. 22, 2006, 24 p.
Zhu, Office Action Sep. 15, 2010, U.S. Appl. No. 11/386,560, filed Mar. 22, 2006, 21 p.
Zhu, Office Action Mar. 31, 2010, U.S. Appl. No. 11/386,560, filed Mar. 22, 2006, 17 p.
Chen, Decision on Appeal Jun. 29, 2012, U.S. Appl. No. 11/637,550, filed Dec. 12, 2006, 9 p.
Chen, Examiner's Answer Mar. 30, 2009, U.S. Appl. No. 11/637,550, filed Dec. 12, 2006, 18 p.
Chen, Final Office Action May 22, 2008, U.S. Appl. No. 11/637,550, filed Dec. 12, 2006, 18 p.
Chen, Office Action Oct. 5, 2007, U.S. Appl. No. 11/637,550, filed Dec. 12, 2006, 20 p.
Chen, Final Office Action Jul. 27, 2012, U.S. Appl. No. 12/057,067, filed Mar. 27, 2008, 20 p.
Chen, Office Action Feb. 2, 2012, U.S. Appl. No. 12/057,067, filed Mar. 27, 2008, 18 p.
Chen, Final Office Action Jul. 28, 2011, U.S. Appl. No. 12/057,067, filed Mar. 27, 2008, 17 p.
Chen, Office Action Feb. 16, 2011, U.S. Appl. No. 12/057,067, filed Mar. 27, 2008, 22 p.
O'Neill, Final Office Action Jul. 17, 2012, U.S. Appl. No. 10/411,835, filed Apr. 11, 2003, 32 p.
O'Neill, Office Action Feb. 10, 2012, U.S. Appl. No. 10/411,835, filed Apr. 11, 2003, 26 p.
O'Neill, Advisory Action Jul. 29, 2011, U.S. Appl. No. 10/411,835, filed Apr. 11, 2003, 3 p.
O'Neill, Advisory Action Jun. 28, 2011, U.S. Appl. No. 10/411,835, filed Apr. 11, 2003, 3 p.
O'Neill, Final Office Action Apr. 11, 2011, U.S. Appl. No. 10/411,835, filed Apr. 11, 2003, 29 p.
O'Neill, Office Action Nov. 8, 2010, U.S. Appl. No. 10/411,835, filed Apr. 11, 2003, 26 p.
O'Neill, Office Action Aug. 26, 2009, U.S. Appl. No. 10/411,835, filed Apr. 11, 2003, 25 p.
Chen, Notice of Allowance Aug. 31, 2012, U.S. Appl. No. 10/412,045, filed Apr. 11, 2003, 10 p.
Chen, Final Office Action Jan. 25, 2012, U.S. Appl. No. 10/412,045, filed Apr. 11, 2003, 18 p.
Chen, Office Action Aug. 3, 2011, U.S. Appl. No. 10/412,045, filed Apr. 11, 2003, 18 p.
Chen, Final Office Action Apr. 19, 2010, U.S. Appl. No. 10/412,045, filed Apr. 11, 2003, 25 p.
Chen, Office Action Aug. 26, 2009, U.S. Appl. No. 10/412,045, filed Apr. 11, 2003, 17 p.
O'Neill, Office Action Jul. 23, 2012, U.S. Appl. No. 12/636,600, filed Dec. 11, 2009, 17 p.
Rao, Examiner's Answer May 26, 2011, U.S. Appl. No. 11/637,435, filed Dec. 12, 2006, 20 p.
Rao, Final Office Action Sep. 15, 2010, U.S. Appl. No. 11/637,435, filed Dec. 12, 2006, 15 p.
Rao, Office Action Sep. 10, 2009, U.S. Appl. No. 11/637,435, filed Dec. 12, 2006, 16 p.
Rao, Final Office Action Mar. 17, 2009, U.S. Appl. No. 11/637,435, filed Dec. 12, 2006, 15 p.
Rao, Office Action Sep. 22, 2008, U.S. Appl. No. 11/637,435, filed Dec. 12, 2006, 14 p.
Rao, Decision on Appeal Jun. 29, 2012, U.S. Appl. No. 10/706,362, filed Nov. 12, 2003, 6 p.
Rao, Examiner Answer Oct. 30, 2009, U.S. Appl. No. 10/706,362, filed Nov. 12, 2003, 24 p.
Rao, Final Office Action Apr. 15, 2009, U.S. Appl. No. 10/706,362, filed Nov. 12, 2003, 20 p.
Rao, Office Action Oct. 1, 2008, U.S. Appl. No. 10/706,362, filed Nov. 12, 2003, 19 p.
Rao, Office Action Jan. 9, 2008, U.S. Appl. No. 10/706,362, filed Nov. 12, 2003, 16 p.
Rao, Office Action Jul. 31, 2007, U.S. Appl. No. 10/706,362, filed Nov. 12, 2003, 17 p.
Rao, Office Action Dec. 5, 2006, U.S. Appl. No. 10/706,362, filed Nov. 12, 2003, 15 p.
McGhee, Decision on Appeal Jun. 6, 2012, U.S. Appl. No. 10/774,027, filed Feb. 6, 2004, 8 p.
McGhee, Examiner's Answer Oct. 30, 2009, U.S. Appl. No. 10/774,027, filed Feb. 6, 2004, 31 p.
McGhee, Final Office Action Apr. 24, 2009, U.S. Appl. No. 10/774,027, filed Feb. 6, 2004, 23 p.
McGhee, Office Action Oct. 15, 2008, U.S. Appl. No. 10/774,027, filed Feb. 6, 2004, 25 p.
McGhee, Office Action Mar. 4, 2008, U.S. Appl. No. 10/774,027, filed Feb. 6, 2004, 26 p.
Yang, Corrected Examiner's Answer Nov. 21, 2011, U.S. Appl. No. 12/030,757, filed Feb. 13, 2008, 2 p.
Yang, Examiner's Answer Nov. 10, 2011, U.S. Appl. No. 12/030,757, filed Dec. 13, 2008, 19 p.
Yang, Advisory Action Sep. 29, 2011, U.S. Appl. No. 12/030,757, filed Feb. 13, 2008, 3 p.
Yang, Final Office Action Jul. 14, 2011, U.S. Appl. No. 12/030,757, filed Feb. 13, 2008, 17 p.
Yang, Office Action Mar. 9, 2011, U.S. Appl. No. 12/030,757, filed Feb. 13, 2008, 33 p.
Rao, Final Office Action Nov. 20, 2012, U.S. Appl. No. 10/909,550, filed Aug. 2, 2004, 20 p.

(56) References Cited

OTHER PUBLICATIONS

Rao, Office Action Jun. 19, 2012, U.S. Appl. No. 10/909,550, filed Aug. 2, 2004, 24 p.
Rao, Advisory Action Oct. 8, 2010, U.S. Appl. No. 10/909,550, filed Aug. 2, 2004, 3 p.
Rao, Advisory Action Sep. 1, 2010, U.S. Appl. No. 10/909,550, filed Aug. 2, 2004, 3 p.
Rao, Final Office Action Jun. 3, 2010, U.S. Appl. No. 10/909,550, filed Aug. 2, 2004, 26 p.
Rao, Office Action Nov. 27, 2009, U.S. Appl. No. 10/909,550, filed Aug. 2, 2004, 17 p.
Rao, Office Action Jun. 23, 2009, U.S. Appl. No. 10/909,550, filed Aug. 2, 2004, 7 p.
Rao, Final Office Action Sep. 25, 2008, U.S. Appl. No. 10/909,550, filed Aug. 2, 2004, 19 p.
Rao, Office Action Apr. 23, 2008, U.S. Appl. No. 10/909,550, filed Aug. 2, 2004, 29 p.
Chia, Notice of Allowance May 31, 2012, U.S. Appl. No. 10/943,455, filed Sep. 17, 2004, 11 p.
Chia, Final Office Action Dec. 8, 2011, U.S. Appl. No. 10/943,455, filed Sep. 17, 2004, 23 p.
Chia, Office Action Jun. 22, 2010, U.S. Appl. No. 10/943,455, filed Sep. 17, 2004, 34 p.
Chia, Office Action Jan. 7, 2010, U.S. Appl. No. 10/943,455, filed Sep. 17, 2004, 21 p.
Chia, Office Action Jun. 11, 2009, U.S. Appl. No. 10/943,455, filed Sep. 17, 2004, 18 p.
Chia, Final Office Action Dec. 24, 2008, U.S. Appl. No. 10/943,455, filed Sep. 17, 2004, 17 p.
Chia, Office Action Mar. 21, 2008, U.S. Appl. No. 10/943,455, filed Sep. 17, 2004, 22 p.
Wang, Examiner's Answer Aug. 19, 2011, U.S. Appl. No. 11/183,199, filed Jul. 15, 2005, 23 p.
Wang, Advisory Action Feb. 23, 2011, U.S. Appl. No. 11/183,199, filed Jul. 15, 2005, 2 p.
Wang, Final Office Action Nov. 1, 2010, U.S. Appl. No. 11/183,199, filed Jul. 15, 2005, 19 p.
Wang, Office Action Apr. 28, 2010, U.S. Appl. No. 11/183,199, filed Jul. 15, 2005, 17 p.
Wang, Final Office Action Aug. 17, 2009, U.S. Appl. No. 11/183,199, filed Jul. 15, 2005, 16 p.
Wang, Office Action Feb. 13, 2009, U.S. Appl. No. 11/183,199, filed Jul. 15, 2005, 16 p.
Wang, Interview Summary Feb. 5, 2009, U.S. Appl. No. 11/183,199, filed Jul. 15, 2005, 2 p.
Wang, Final Office Action Oct. 28, 2008, U.S. Appl. No. 11/183,199, filed Jul. 15, 2005, 19 p.
Wang, Office Action Apr. 17, 2008, U.S. Appl. No. 11/183,199, filed Jul. 15, 2005, 41 p.
Wang, Final Office Action Oct. 9, 2007, U.S. Appl. No. 11/183,199, filed Jul. 15, 2005, 13 p.
Wang, Office Action Jan. 9, 2007, U.S. Appl. No. 11/183,199, filed Jul. 15, 2005, 15 p.
Randall, Examiner's Answer Jun. 9, 2010, U.S. Appl. No. 10/955,021, filed Sep. 30, 2004, 22 p.
Randall, Final Office Action Nov. 6, 2009, U.S. Appl. No. 10/955,021, filed Sep. 30, 2004, 25 p.
Randall, Office Action Apr. 1, 2009, U.S. Appl. No. 10/955,021, filed Sep. 30, 2004, 16 p.
Randall, Office Action Oct. 17, 2008, U.S. Appl. No. 10/955,021, filed Sep. 30, 2004, 16 p.
Randall, Office Action May 1, 2008, U.S. Appl. No. 10/955,021, filed Sep. 30, 2004, 18 p.
Daley, Corrected Examiner's Answer Nov. 1, 2011, U.S. Appl. No. 11/039,000, filed Jan. 18, 2005, 2 p.
Daley, Examiner's Answer Oct. 24, 2011, U.S. Appl. No. 11/039,000, filed Jan. 18, 2005, 20 p.
Daley, Final Office Action Feb. 17, 2011, U.S. Appl. No. 11/039,000, filed Jan. 18, 2005, 15 p.
Daley, Office Action Aug. 30, 2010, U.S. Appl. No. 11/039,000, filed Jan. 18, 2005, 15 p.
Daley, Final Office Action Nov. 27, 2009, U.S. Appl. No. 11/039,000, filed Jan. 18, 2005, 14 p.
Daley, Office Action May 28, 2009, U.S. Appl. No. 11/039,000, filed Jan. 18, 2005, 13 p.
Daley, Final Office Action Dec. 3, 2008, U.S. Appl. No. 11/039,000, filed Jan. 18, 2005, 15 p.
Daley, Office Action Jun. 5, 2008, U.S. Appl. No. 11/039,000, filed Jan. 18, 2005, 25 p.
Kapadekar, Examiner's Answer Mar. 2, 2011, U.S. Appl. No. 11/552,942, filed Oct. 25, 2006, 18 p.
Kapadekar, Final Office Action Jun. 11, 2010, U.S. Appl. No. 11/552,942, filed Oct. 25, 2006, 17 p.
Kapadekar, Office Action Oct. 30, 2009, U.S. Appl. No. 11/552,942, filed Oct. 25, 2006, 15 p.
Kapadekar, Final Office Action Jul. 24, 2009, U.S. Appl. No. 11/552,942, filed Oct. 25, 2006, 12 p.
Kapadekar, Office Action Jan. 14, 2009, U.S. Appl. No. 11/552,942, filed Oct. 25, 2006, 8 p.
Logan, Examiner's Answer Jul. 28, 2011, U.S. Appl. No. 11/500,734, filed Aug. 7, 2006, 2 p.
Logan, Examiner's Answer Jun. 28, 2011, U.S. Appl. No. 11/500,734, filed Aug. 7, 2006, 25 p.
Logan, Advisory Action Feb. 17, 2011, U.S. Appl. No. 11/500,734, filed Aug. 7, 2006, 2 p.
Logan, Office Action Sep. 29, 2010, U.S. Appl. No. 11/500,734, filed Aug. 7, 2006, 24 p.
Logan, Office Action Apr. 27, 2010, U.S. Appl. No. 11/500,734, filed Aug. 7, 2006, 23 p.
Logan, Final Office Action Dec. 14, 2009, U.S. Appl. No. 11/500,734, filed Aug. 7, 2006, 22 p.
Logan, Office Action Nov. 26, 2008, U.S. Appl. No. 11/500,734, filed Aug. 7, 2006, 20 p.
Rao, Examiner's Answer Jun. 28, 2011, U.S. Appl. No. 11/385,502, filed Mar. 21, 2006, 17 p.
Rao, Final Office Action Nov. 26, 2010, U.S. Appl. No. 11/385,502, filed Mar. 21, 2006, 11 p.
Rao, Office Action Jun. 25, 2010, U.S. Appl. No. 11/385,502, filed Mar. 21, 2006, 10 p.
Rao, Final Office Action Dec. 15, 2009, U.S. Appl. No. 11/385,502, filed Mar. 21, 2006, 10 p.
Rao, Office Action May 12, 2009, U.S. Appl. No. 11/385,502, filed Mar. 21, 2006, 9 p.
Motta, Final Office Action Nov. 19, 2012, U.S. Appl. No. 11/449,259, filed Jun. 7, 2006, 25 p.
Motta, Office Action Jul. 26, 2012, U.S. Appl. No. 11/449,259, filed Jun. 7, 2006, 20 p.
Motta, Decision on Appeal Jun. 20, 2012, U.S. Appl. No. 11/449,259, filed Jun. 7, 2006, 7 p.
Motta, Examiner's Answer Jul. 23, 2009, U.S. Appl. No. 11/449,259, filed Jun. 7, 2006, 28 p.
Motta, Interview Summary Feb. 12, 2009, U.S. Appl. No. 11/449,259, filed Jun. 7, 2006, 4 p.
Motta, Advisory Action Jan. 27, 2009, U.S. Appl. No. 11/449,259, filed Jun. 7, 2006, 3 p.
Motta, Final Office Action Nov. 13, 2008, U.S. Appl. No. 11/449,259, filed Jun. 7, 2006, 18 p.
Motta, Office Action Jul. 10, 2008, U.S. Appl. No. 11/449,259, filed Jun. 7, 2006, 22 p.
Motta, Examiner's Answer Nov. 25, 2011, U.S. Appl. No. 11/590,137, filed Oct. 30, 2006, 11 p.
Motta, Final Office Action Jul. 19, 2011, U.S. Appl. No. 11/590,137, filed Oct. 30, 2006, 11 p.
Motta, Office Action Mar. 11, 2011, U.S. Appl. No. 11/590,137, filed Oct. 30, 2006, 12 p.
Daley, Final Office Action Mar. 17, 2011, U.S. Appl. No. 11/676,997, filed Feb. 20, 2007, 34 p.
Daley, Office Action Aug. 17, 2010, U.S. Appl. No. 11/676,997, filed Feb. 20, 2007, 31 p.
Daley, Office Action Feb. 22, 2010, U.S. Appl. No. 11/676,997, filed Feb. 20, 2007, 27 p.

(56) References Cited

OTHER PUBLICATIONS

Motta, Interview Summary Apr. 12, 2012, U.S. Appl. No. 11/829,520, filed Jul. 27, 2007, 3 p.
Motta, Final Office Action Jan. 13, 2012, U.S. Appl. No. 11/829,520, filed Jul. 27, 2007, 27 p.
Motta, Interview Summary Nov. 29, 2011, U.S. Appl. No. 11/829,520, filed Jul. 27, 2007, 3 p.
Motta, Office Action Sep. 1, 2011, U.S. Appl. No. 11/829,520, filed Jul. 27, 2007, 14 p.
Daley, Examiner's Answer Nov. 2, 2010, U.S. Appl. No. 11/839,396, filed Aug. 15, 2007, 15 p.
Daley, Final Office Action May 25, 2010, U.S. Appl. No. 11/839,396, filed Aug. 15, 2007, 16 p.
Daley, Interview Summary Feb. 25, 2010, U.S. Appl. No. 11/839,396, filed Aug. 15, 2007, 3 p.
Daley, Office Action Dec. 21, 2009, U.S. Appl. No. 11/839,396, filed Aug. 15, 2007, 14 p.
Daley, Office Action Jul. 29, 2009, U.S. Appl. No. 11/839,396, filed Aug. 15, 2007, 23 p.
Rao, Final Office Action Sep. 21, 2012, U.S. Appl. No. 11/867,370, filed Oct. 4, 2007, 14 p.
Rao, Office Action May 3, 2012, U.S. Appl. No. 11/867,370, filed Oct. 4, 2007, 13 p.
Rao, Final Office Action Dec. 22, 2010, U.S. Appl. No. 11/867,370, filed Oct. 4, 2007, 10 p.
Rao, Office Action Sep. 3, 2010, U.S. Appl. No. 11/867,370, filed Oct. 4, 2007, 11 p.
Rao, Examiner's Answer Apr. 12, 2012, U.S. Appl. No. 11/871,867, filed Oct. 12, 2007, 14 p.
Rao, Final Office Action Oct. 11, 2011, U.S. Appl. No. 11/871,867, filed Oct. 12, 2007, 14 p.
Rao, Interview Summary Aug. 5, 2011, U.S. Appl. No. 11/871,867, filed Oct. 12, 2007, 4 p.
Rao, Office Action Apr. 29, 2011, U.S. Appl. No. 11/871,867, filed Oct. 12, 2007, 13 p.
Rao, Final Office Action Sep. 30, 2010, U.S. Appl. No. 11/871,867, filed Oct. 12, 2007, 14 p.
Rao, Office Action Mar. 25, 2010, U.S. Appl. No. 11/871,867, filed Oct. 12, 2007, 11 p.
Rao, Office Action Aug. 10, 2009, U.S. Appl. No. 11/871,867, filed Oct. 12, 2007, 14 p.
Chowdhary, Decision on Appeal Nov. 1, 2012, U.S. Appl. No. 11/005,312, filed Dec. 6, 2004, 8 p.
Chowdhary, Order Apr. 27, 2009, U.S. Appl. No. 11/005,312, filed Dec. 6, 2004, 3 p.
Chowdhary, Examiner's Answer Aug. 20, 2008, U.S. Appl. No. 11/005,312, filed Dec. 6, 2004, 28 p.
Chowdhary, Office Action Sep. 5, 2006, Nov. 1, 2012, U.S. Appl. No. 11/005,312, filed Dec. 6, 2004, 29 p.
Chowdhary, Final Office Action Mar. 21, 2007, U.S. Appl. No. 11/005,312, filed Dec. 6, 2004, 27 p.
Chowdhary, Office Action Jan. 11, 2008, U.S. Appl. No. 11/005,312, filed Dec. 6, 2004, 24 p.
Rao, Final Office Action Oct. 16, 2012, U.S. Appl. No. 13/350,355, filed Jan. 13, 2012, 18 p.
Rao, Office Action May 16, 2012, U.S. Appl. No. 13/350,355, filed Jan. 13, 2012, 28 p.
Okkonen, Office Action Dec. 28, 2005, U.S. Appl. No. 10/417,285, filed Apr. 15, 2003, 21 p.
Okkonen, Final Office Action May 1, 2006, U.S. Appl. No. 10/417,285, filed Apr. 15, 2003, 41 p.
Okkonen, Office Action Jan. 29, 2007, U.S. Appl. No. 10/417,285, filed Apr. 15, 2003, 41 p.
Okkonen, Office Action Aug. 6, 2007, U.S. Appl. No. 10/417,285, filed Apr. 15, 2003, 6 p.
Okkonen, Office Action Dec. 9, 2009, U.S. Appl. No. 11/650,777, filed Jan. 8, 2007, 17 p.
Okkonen, Final Office Action May 13, 2010, U.S. Appl. No. 11/650,777, filed Jan. 8, 2007, 24 p.
O'Neill, Office Action Jun. 26, 2006, U.S. Appl. No. 10/631,567, filed Jul. 31, 2003, 18 p.
O'Neill, Final Office Action Apr. 10, 2007, U.S. Appl. No. 10/631,567, filed Jul. 31, 2003, 31 p.
O'Neill, Office Action Jan. 14, 2008, U.S. Appl. No. 10/631,567, filed Jul. 31, 2003, 41 p.
O'Neill, Office Action Jul. 9, 2009, U.S. Appl. No. 10/631,567, filed Jul. 31, 2003, 14 p.
O'Neill, Final Office Action Jan. 22, 2009, U.S. Appl. No. 10/631,567, filed Jul. 31, 2003, 14 p.
Chen, Office Action Jan. 8, 2007, U.S. Appl. No. 10/646,324, filed Aug. 22, 2003, 9 p.
Chen, Office Action May 13, 2011, U.S. Appl. No. 11/923,383, filed Oct. 24, 2007, 22 p.
Chen, Final Office Action Nov. 10, 2011, U.S. Appl. No. 11/923,383, filed Oct. 24, 2007, 27 p.
O'Neill, Office Action Oct. 23, 2006, U.S. Appl. No. 10/654,149, filed Sep. 3, 2003, 13 p.
O'Neill, Office Action May 31, 2007, U.S. Appl. No. 10/654,149, filed Sep. 3, 2003, 13 p.
O'Neill, Final Office Action Dec. 13, 2007, U.S. Appl. No. 10/654,149, filed Sep. 3, 2003, 15 p.
O'Neill, Office Action Dec. 4, 2008, U.S. Appl. No. 10/654,149, filed Sep. 3, 2003, 14 p.
O'Neill, Final Office Action May 26, 2009, U.S. Appl. No. 10/654,149, filed Sep. 3, 2003, 15 p.
Rao, Office Action Feb. 7, 2007, U.S. Appl. No. 10/654,412, filed Sep. 3, 2003, 9 p.
Rao, Final Office Action Aug. 24, 2007, U.S. Appl. No. 10/654,412, filed Sep. 3, 2003, 13 p.
Rao, Office Action Mar. 5, 2008, U.S. Appl. No. 10/654,412, filed Sep. 3, 2003, 15 p.
Chen, Office Action Nov. 20, 2006, U.S. Appl. No. 10/646,319, filed Aug. 22, 2003, 8 p.
Chen, Office Action Aug. 16, 2011, U.S. Appl. No. 12/032,809, filed Feb. 18, 2008, 20 p.
Chen, Final Office Action Jan. 19, 2012, U.S. Appl. No. 12/032,809, filed Feb. 18, 2008, 24 p.
Rao, Office Action Aug. 16, 2006, U.S. Appl. No. 10/695,713, filed Oct. 29, 2003, 12 p.
Rao, Final Office Action Dec. 20, 2006, U.S. Appl. No. 10/695,713, filed Oct. 29, 2003, 13 p.
Rao, Office Action Oct. 21, 2009, U.S. Appl. No. 11/688,820, filed Mar. 20, 2007, 10 p.
Rao, Final Office Action May 3, 2010, U.S. Appl. No. 11/688,820, filed Mar. 20, 2007, 14 p.
Rao, Office Action Dec. 30, 2004, U.S. Appl. No. 10/689,309, filed Oct. 20, 2003, 5 p.
Rao, Office Action Jun. 24, 2009, U.S. Appl. No. 11/251,046, filed Oct. 14, 2005, 8 p.
Lilley, Office Action Oct. 24, 2006, U.S. Appl. No. 10/681,861, filed Oct. 8, 2003, 24 p.
Lilley, Final Office Action Jul. 23, 2007, U.S. Appl. No. 10/681,861, filed Oct. 8, 2003, 18 p.
Lilley, Office Action Nov. 16, 2007, U.S. Appl. No. 10/681,861, filed Oct. 8, 2003, 18 p.
Lilley, Final Office Action Jun. 16, 2008, U.S. Appl. No. 10/681,861, filed Oct. 8, 2003, 24 p.
O'Neill, Office Action Mar. 22, 2007, U.S. Appl. No. 10/721,658, filed Nov. 25, 2003, 14 p.
O'Neill, Final Office Action Sep. 25, 2007, U.S. Appl. No. 10/721,658, filed Nov. 25, 2003, 9 p.
O'Neill, Final Office Action Feb. 20, 2008, U.S. Appl. No. 10/721,658, filed Nov. 25, 2003, 13 p.
Rao, Office Action Oct. 5, 2004, U.S. Appl. No. 10/701,848, filed Nov. 5, 2003, 12 p.
Rao, Final Office Action May 5, 2005, U.S. Appl. No. 10/701,848, filed Nov. 5, 2003, 14 p.
Rao, Office Action Nov. 23, 2005, U.S. Appl. No. 10/701,848, filed Nov. 5, 2003, 13 p.
Rao, Final Office Action Aug. 15, 2006, U.S. Appl. No. 10/701,848, filed Nov. 5, 2003, 16 p.

(56) References Cited

OTHER PUBLICATIONS

Rao, Office Action Nov. 14, 2006, U.S. Appl. No. 10/706,219, filed Nov. 12, 2003, 12 p.
Rao, Final Office Action May 2, 2007, U.S. Appl. No. 10/706,219, filed Nov. 12, 2003, 17 p.
Rao, Office Action Dec. 13, 2007, U.S. Appl. No. 10/706,219, filed Nov. 12, 2003, 13 p.
Rao, Office Action Jun. 25, 2008, U.S. Appl. No. 10/706,219, filed Nov. 12, 2003, 10 p.
Rao, Final Office Action Jan. 6, 2009, U.S. Appl. No. 10/706,219, filed Nov. 12, 2003, 16 p.
Rao, Office Action Jul. 22, 2009, U.S. Appl. No. 10/706,219, filed Nov. 12, 2003, 6 p.
Rao, Office Action Mar. 26, 2009, U.S. Appl. No. 11/401,708, filed Apr. 11, 2006, 20 p.
Rao, Office Action Aug. 9, 2005, U.S. Appl. No. 10/695,524, filed Oct. 28, 2003, 19 p.
Chia, Office Action May 28, 2008, U.S. Appl. No. 10/719,114, filed Nov. 21, 2003, 10 p.
Chia, Final Office Action Dec. 2, 2008, U.S. Appl. No. 10/719,114, filed Nov. 21, 2003, 8 p.
Chia, Final Office Action May 4, 2009, U.S. Appl. No. 10/719,114, filed Nov. 21, 2003, 11 p.
Chia, Office Action Aug. 19, 2009, U.S. Appl. No. 10/719,114, filed Nov. 21, 2003, 8 p.
Chia, Final Office Action Mar. 17, 2010, U.S. Appl. No. 10/719,114, filed Nov. 21, 2003, 9 p.
Jacobi, Office Action Dec. 10, 2004, U.S. Appl. No. 10/697,458, filed Oct. 30, 2003, 16 p.
Jacobi, Final Office Action Jun. 14, 2005, U.S. Appl. No. 10/697,458, filed Oct. 30, 2013, 16 p.
Gustafson, Office Action Mar. 4, 2008, U.S. Appl. No. 10/761,735, filed Jan. 20, 2004, 25 p.
Gustafson, Office Action Sep. 8, 2008, U.S. Appl. No. 10/761,735, filed Jan. 20, 2004, 25 p.
Gustafson, Final Office Action Mar. 20, 2009, U.S. Appl. No. 10/761,735, filed Jan. 20, 2004, 27 p.
Rao, Office Action Sep. 25, 2008, U.S. Appl. No. 11/083,596, filed Mar. 18, 2005, 7 p.
Rao, Office Action Oct. 19, 2004, U.S. Appl. No. 10/765,817, filed Jan. 27, 2004, 8 p.
Rao, Office Action Feb. 4, 2008, U.S. Appl. No. 10/782,083, filed Feb. 19, 2004, 21 p.
Rao, Final Office Action Jul. 15, 2008, U.S. Appl. No. 10/782,083, filed Feb. 19, 2004, 25 p.
Gustafson, Office Action Jul. 24, 2007, U.S. Appl. No. 10/790,340, filed Mar. 1, 2004, 21 p.
Gustafson, Office Action Jun. 12, 2008, U.S. Appl. No. 10/790,340, filed Mar. 1, 2004, 20 p.
Gustafson, Office Action Dec. 23, 2008, U.S. Appl. No. 10/790,340, filed Mar. 1, 2004, 21 p.
Gustafson, Final Office Action Jul. 6, 2009, U.S. Appl. No. 10/790,340, filed Mar. 1, 2004, 21 p.
Lilley, Final Office Action Jul. 25, 2007, U.S. Appl. No. 10/646,975, filed Aug. 22, 2003, 13 p.
Lilley, Office Action Oct. 31, 2007, U.S. Appl. No. 10/646,975, filed Aug. 22, 2003, 15 p.
Lilley, Final Office Action Apr. 16, 2008, U.S. Appl. No. 10/646,975, filed Aug. 22, 2003, 14 p.
Rao, Office Action Jun. 30, 2006, U.S. Appl. No. 10/797,176, filed Mar. 10, 2004, 15 p.
Rao, Final Office Action Jul. 17, 2007, U.S. Appl. No. 10/797,176, filed Mar. 10, 2004, 26 p.
Rao, Final Office Action Oct. 31, 2007, U.S. Appl. No. 10/797,176, filed Mar. 10, 2004, 29 p.
Rao, Office Action Apr. 14, 2008, U.S. Appl. No. 10/797,176, filed Mar. 10, 2004, 31p.
Rao, Office Action Oct. 16, 2008, U.S. Appl. No. 10/797,176, filed Mar. 10, 2004, 33 p.
Rao, Final Office Action Nov. 25, 2009, U.S. Appl. No. 10/797,176, filed Mar. 10, 2004, 41 p.
Rao, Final Office Action Aug. 19, 2010, U.S. Appl. No. 10/797,176, filed Mar. 10, 2004, 5 p.
Okkonnen, Office Action Feb. 28, 2005, U.S. Appl. No. 10/807,694, filed Mar. 24, 2004, 18 p.
Okkonnen, Final Office Action Aug. 10, 2005, U.S. Appl. No. 10/807,694, filed Mar. 24, 2004, 17 p.
Okkonen, Office Action Mar. 14, 2006, U.S. Appl. No. 10/807,694, filed Mar. 24, 2004, 21 p.
Okkonen, Office Action Oct. 24, 2006, U.S. Appl. No. 10/807,694, filed Mar. 24, 2004, 16 p.
Okkonen, Office Action Jul. 10, 2007, U.S. Appl. No. 10/807,694, filed Mar. 24, 2004, 19 p.
Okkonen, Final Office Action Dec. 18, 2007, U.S. Appl. No. 10/807,694, 03/64/04, 22 p.
Okkonen, Office Action May 12, 2008, U.S. Appl. No. 10/807,694, filed Mar. 24, 2004, 22 p.
Okkonen, Final Office Action Nov. 20, 2008, U.S. Appl. No. 10/807,694, filed Mar. 24, 2004, 22 p.
Okkonen, Office Action Jun. 25, 2009, U.S. Appl. No. 10/807,694, filed Mar. 24, 2004, 34 p.
McGhee, Office Action Sep. 27, 2006, U.S. Appl. No. 10/797,825, filed Mar. 10, 2004, 7 p.
McGhee, Final Office Action Jun. 25, 2007, U.S. Appl. No. 10/797,825, filed Mar. 10, 2004, 6 p.
Yang, Office Action Jan. 28, 2008, U.S. Appl. No. 10/802,191, filed Mar. 17, 2004, 18 p.
Yang, Final Office Action Jun. 6, 2008, U.S. Appl. No. 10/802,191, filed Mar. 17, 2004, 19 p.
Yang, Office Action Sep. 5, 2008, U.S. Appl. No. 10/802,191, filed Mar. 17, 2004, 16 p.
Qumei, Final Office Action Nov. 23, 2007, U.S. Appl. No. 10/813,212, filed Mar. 30, 2004, 11 p.
Yang, Office Action Sep. 21, 2006, U.S. Appl. No. 10/635,991, filed Aug. 7, 2003, 10 p.
Yang, Office Action Jun. 2, 2010, U.S. Appl. No. 12/014,549, filed Jan. 15, 2008, 8 p.
Yang, Final Office Action Sep. 16, 2010, U.S. Appl. No. 12/014,549, filed Jan. 15, 2008, 7 p.
Yang, Office Action Nov. 2, 2006, U.S. Appl. No. 10/887,490, filed Jul. 8, 2004, 12 p.
Yang, Final Office Action Apr. 17, 2007, U.S. Appl. No. 10/887,490, filed Jul. 8, 2004, 13 p.
Marolia, Final Office Action Jan. 30, 2008, U.S. Appl. No. 10/852,396, filed May 24, 2004, 17 p.
Marolia, Office Action May 28, 2008, U.S. Appl. No. 10/852,396, filed May 24, 2004, 20 p.
Marolia, Office Action Dec. 8, 2008, U.S. Appl. No. 10/852,396, filed May 24, 2004, 19 p.
Marolia, Final Office Action Jun. 17, 2009, U.S. Appl. No. 10/852,396, filed May 24, 2004, 24 p.
Marolia, Office Action Dec. 14, 2009, U.S. Appl. No. 10/852,396, filed May 24, 2004, 19 p.
Marolia, Office Action Jun. 3, 2005, U.S. Appl. No. 10/888,841, filed Jul. 9, 2004, 8 p.
Marolia, Final Office Action Dec. 6, 2005, U.S. Appl. No. 10/888,841, filed Jul. 9, 2004, 10 p.
Marolia, Office Action May 4, 2006, U.S. Appl. No. 10/888,841, filed Jul. 9, 2004, 13 p.
Marolia, Final Office Action Jan. 12, 2007, U.S. Appl. No. 10/888,841, filed Jul. 9, 2004, 15 p.
Marolia, Office Action Jun. 18, 2007, U.S. Appl. No. 10/888,841, filed Jul. 9, 2004, 16 p.
Marolia, Final Office Action Nov. 27, 2007, U.S. Appl. No. 10/888,841, filed Jul. 9, 2004, 17 p.
Marolia, Office Action Apr. 28, 2009, U.S. Appl. No. 10/888,841, filed Jul. 9, 2004, 15 p.
Qumei, Office Action Apr. 21, 2008, U.S. Appl. No. 10/864,095, filed Jun. 9, 2004, 15 p.
Marolia, Office Action Dec. 11, 2007, U.S. Appl. No. 10/879,869, filed Jun. 28, 2004, 10 p.

(56) References Cited

OTHER PUBLICATIONS

Marolia, Final Office Action May 30, 2008, U.S. Appl. No. 10/879,869, filed Jun. 28, 2004, 15 p.
Marolia, Office Action Aug. 18, 2008, U.S. Appl. No. 10/879,869, filed Jun. 28, 2004, 17 p.
Marolia, Final Office Action Jan. 28, 2009, U.S. Appl. No. 10/879,869, filed Jun. 28, 2004, 18 p.
Rao, Office Action Jul. 25, 2007, U.S. Appl. No. 10/860,964, filed Jun. 4, 2004, 22 p.
Rao, Final Office Action Jan. 7, 2008, U.S. Appl. No. 10/860,964, filed Jun. 4, 2004, 26 p.
Rao, Office Action Apr. 30, 2008, U.S. Appl. No. 10/860,964, filed Jun. 4, 2004, 23 p.
Rao, Final Office Action Oct. 28, 2008, U.S. Appl. No. 10/860,964, filed Jun. 4, 2004, 29 p.
Yang, Office Action Jun. 27, 2007, U.S. Appl. No. 10/860,978, filed Jun. 4, 2004, 14 p.
Yang, Final Office Action Dec. 7, 2007, U.S. Appl. No. 10/860,978, filed Jun. 4, 2004, 16 p.
Yang, Office Action Jun. 20, 2008, U.S. Appl. No. 10/860,978, filed Jun. 4, 2004, 13 p.
Yang, Office Action Dec. 23, 2008, U.S. Appl. No. 10/860,978, filed Jun. 4, 2004, 13 p.
Yang, Final Office Action Jun. 19, 2009, U.S. Appl. No. 10/860,978, filed Jun. 4, 2004, 16 p.
Rao, Office Action Aug. 24, 2007, U.S. Appl. No. 10/868,050, filed Jun. 15, 2004, 15 p.
Rao, Office Action Feb. 4, 2008, U.S. Appl. No. 10/868,050, filed Jun. 15, 2004, 16 p.
Rao, Final Office Action Aug. 6, 2008, U.S. Appl. No. 10/868,050, filed Jun. 15, 2004, 18 p.
Rao, Office Action Apr. 15, 2008, U.S. Appl. No. 10/899,513, filed Jul. 26, 2004, 14 p.
Rao, Final Office Action Oct. 24, 2008, U.S. Appl. No. 10/899,513, filed Jul. 26, 2004, 16 p.
Rao, Office Action Jun. 11, 2007, U.S. Appl. No. 10/902,452, filed Jul. 29, 2004, 13 p.
Rao, Final Office Action Dec. 20, 2007, U.S. Appl. No. 10/902,452, filed Jul. 29, 2004, 10 p.
Rao, Final Office Action Jun. 23, 2008, U.S. Appl. No. 10/902,425, filed Jul. 29, 2004, 14 p.
Rao, Office Action Jan. 5, 2009, U.S. Appl. No. 10/902,452, filed Jul. 29, 2004, 16 p.
Rao, Final Office Action Jul. 20, 2009, U.S. Appl. No. 10/902,452, filed Jul. 29, 2004, 16 p.
Rao, Office Action May 13, 2010, U.S. Appl. No. 10/902,452, filed Jul. 29, 2004, 16 p.
Qumei, Office Action Jul. 12, 2007, U.S. Appl. No. 10/909,519, filed Aug. 2, 2004, 17 p.
Qumei, Final Office Action Dec. 20, 2007, U.S. Appl. No. 10/909,519, filed Aug. 2, 2004, 11 p.
Qumei, Office Action May 29, 2008, U.S. Appl. No. 10/909,519, filed Aug. 2, 2004, 21 p.
Qumei, Final Office Action Nov. 17, 2008, U.S. Appl. No. 10/909,519, filed Aug. 2, 2004, 24 p.
Qumei, Office Action Apr. 28, 2009, U.S. Appl. No. 10/909,519, filed Aug. 2, 2004, 23 p.
Chen, Office Action May 14, 2008, U.S. Appl. No. 10/932,175, filed Sep. 1, 2004, 18 p.
Chen, Final Office Action Feb. 6, 2009, U.S. Appl. No. 10/932,175, filed Sep. 1, 2004, 15 p.
Chen, Office Action Mar. 1, 2010, U.S. Appl. No. 10/932,175, filed Sep. 1, 2004, 16 p.
Chen, Final Office Action Sep. 21, 2010, U.S. Appl. No. 10/932,175, filed Sep. 1, 2004, 17 p.
Okkonen, Office Action Jan. 5, 2007, U.S. Appl. No. 10/945,466, filed Sep. 20, 2004, 5 p.
Okkonen, Office Action Aug. 10, 2007, U.S. Appl. No. 10/945,466, filed Sep. 20, 2004, 5 p.
Okkonen, Final Office Action Jan. 9, 2008, U.S. Appl. No. 10/945,466, filed Sep. 20, 2004, 7 p.
Okkonen, Office Action May 12, 2008, U.S. Appl. No. 10/945,466, filed Sep. 20, 2004, 6 p.
Okkonen, Office Action Nov. 12, 2008, U.S. Appl. No. 10/945,466, filed Sep. 20, 2004, 5 p.
Okkonen, Office Action Apr. 14, 2009, U.S. Appl. No. 10/945,466, filed Sep. 20, 2004, 5 p.
Rao, Office Action Aug. 27, 2007, U.S. Appl. No. 10/950,764, filed Sep. 27, 2004, 14 p.
Rao, Final Office Action Mar. 4, 2008, U.S. Appl. No. 10/950,746, filed Sep. 27, 2004, 17 p.
Rao, Office Action Nov. 3, 2008, U.S. Appl. No. 10/950,764, filed Sep. 27, 2004, 12 p.
Rao, Final Office Action Jun. 30, 2009, U.S. Appl. No. 10/950,764, filed Sep. 27, 2004, 15 p.
Chen, Office Action Jan. 29, 2008, U.S. Appl. No. 10/958,148, filed Oct. 4, 2004, 16 p.
Chen, Final Office Action Aug. 20, 2008, U.S. Appl. No. 10/958,148, filed Oct. 4, 2004, 19 p.
Chen, Office Action Apr. 14, 2009, U.S. Appl. No. 10/958,148, filed Oct. 4, 2004, 11 p.
Chen, Final Office Action Nov. 25, 2009, U.S. Appl. No. 10/958,148, filed Oct. 4, 2004, 12 p.
Chen, Office Action Apr. 1, 2010, U.S. Appl. No. 10/958,148, filed Oct. 4, 2004, 13 p.
Gustafson, Office Action Sep. 11, 2007, U.S. Appl. No. 11/010,913, filed Dec. 13, 2004, 27 p.
Gustafson, Office Action Feb. 1, 2008, U.S. Appl. No. 11/010,913, filed Dec. 13, 2004, 29 p.
Gustafson, Final Office Action Feb. 18, 2010, U.S. Appl. No. 11/010,913, filed Dec. 13, 2004, 31 p.
Ren, Office Action Jan. 22, 2008, U.S. Appl. No. 10/989,628, filed Nov. 16, 2004, 8 p.
Ren, Office Action Aug. 18, 2008, U.S. Appl. No. 10/989,628, filed Nov. 16, 2004, 7 p.
Ren, Final Office Action Nov. 24, 2009, U.S. Appl. No. 10/989,628, filed Nov. 16, 2004, 9 p.
Slyz, Office Action Mar. 1, 2010, U.S. Appl. No. 11/874,102, filed Oct. 17, 2007, 13 p.
Qumei, Office Action Apr. 9, 2007, U.S. Appl. No. 10/698,665, filed Oct. 30, 2003, 22 p.
Qumei, Office Action Jul. 29, 2010, U.S. Appl. No. 11/852,933, filed Sep. 10, 2007, 14 p.
Qumei, Final Office Action Feb. 17, 2011, U.S. Appl. No. 11/852,933, filed Sep. 10, 2007, 19 p.
Chen, Office Action Apr. 19, 2007, U.S. Appl. No. 10/903,394, filed Jul. 30, 2004, 31 p.
Chen, Final Office Action Oct. 18, 2007, U.S. Appl. No. 10/903,394, filed Jul. 30, 2004, 34 p.
Chen, Office Action May 13, 2008, U.S. Appl. No. 10/903,394, filed Jul. 30, 2004, 14 p.
Chen, Office Action Nov. 26, 2008, U.S. Appl. No. 10/903,394, filed Jul. 30, 2004, 14 p.
Chen, Final Office Action Apr. 21, 2009, U.S. Appl. No. 10/903,394, filed Jul. 30, 2004, 21 p.
Chen, Office Action Oct. 30, 2009, U.S. Appl. No. 10/903,394, filed Jul. 30, 2004, 19 p.
Chen, Final Office Action Apr. 29, 2010, U.S. Appl. No. 10/903,394, filed Jul. 30, 2004, 24 p.
Rao, Office Action Feb. 4, 2008, U.S. Appl. No. 11/047,212, filed Jan. 31, 2005, 9 p.
Rao, Final Office Action Sep. 3, 2008, U.S. Appl. No. 11/047,212, filed Jan. 31, 2005, 8 p.
Rao, Office Action Feb. 2, 2009, U.S. Appl. No. 11/047,212, filed Jan. 31, 2005, 8 p.
Rao, Final Office Action Sep. 25, 2009, U.S. Appl. No. 11/047,212, filed Jan. 31, 2005, 9 p.
Rao, Office Action Jan. 22, 2010, U.S. Appl. No. 11/047,212, filed Jan. 31, 2005, 9 p.
Rao, Final Office Action Jun. 10, 2010, U.S. Appl. No. 11/047,212, filed Jan. 31, 2005, 11 p.

(56) References Cited

OTHER PUBLICATIONS

Rao, Office Action Jan. 14, 2011, U.S. Appl. No. 11/047,212, filed Jan. 31, 2005, 9 p.
Kokkinen, Office Action Feb. 23, 2007, U.S. Appl. No. 10/688,640, filed Oct. 17, 2003, 23 p.
Kokkinen, Office Action Aug. 21, 2007, U.S. Appl. No. 10/688,640, filed Oct. 17, 2003, 23 p.
Kokkinen, Office Action Jul. 18, 2008, U.S. Appl. No. 10/688,640, filed Oct. 17, 2003, 28 p.
Kokkinen, Office Action Dec. 30, 2008, U.S. Appl. No. 10/688,640, filed Oct. 17, 2003, 29 p.
Kokkinen, Office Action Jul. 21, 2009, U.S. Appl. No. 10/688,640, filed Oct. 17, 2003, 30 p.
Kokkinen, Office Action Feb. 24, 2010, U.S. Appl. No. 10/688,640, filed Oct. 17, 2003, 33 p.
Kokkinen, Office Action Aug. 6, 2010, U.S. Appl. No. 10/688,640, filed Oct. 17, 2003, 26 p.
Okkonen, Office Action Apr. 19, 2007, U.S. Appl. No. 10/788,768, filed Feb. 27, 2004, 14 p.
Okkonen, Final Office Action Oct. 2, 2007, U.S. Appl. No. 10/788,768, filed Feb. 27, 2004, 18 p.
Okkonen, Office Action Mar. 20, 2008, U.S. Appl. No. 10/788,768, filed Feb. 27, 2004, 16 p.
Okkonen, Office Action Oct. 2, 2008, U.S. Appl. No. 10/788,768, filed Feb. 27, 2004, 17 p.
Okkonen, Final Office Action Apr. 14, 2009, U.S. Appl. No. 10/788,768, filed Feb. 27, 2004, 18 p.
Qumei, Final Office Action Sep. 7, 2007, U.S. Appl. No. 10/770,983, filed Feb. 3, 2004, 15 p.
Qumei, Office Action Jan. 25, 2008, U.S. Appl. No. 10/770,983, filed Feb. 3, 2004, 18 p.
Qumei, Office Action Jul. 3, 2008, U.S. Appl. No. 10/770,983, filed Feb. 3, 2004, 22 p.
Qumei, Office Action Dec. 19, 2008, U.S. Appl. No. 10/770,983, filed Feb. 3, 2004, 19 p.
Qumei, Final Office Action Jun. 11, 2009, U.S. Appl. No. 10/770,983, filed Feb. 3, 2004, 21 p.
Hamasaki, Office Action Jan. 9, 2008, U.S. Appl. No. 10/748,053, filed Dec. 30, 2003, 18 p.
Hamasaki, Final Office Action Aug. 20, 2008, U.S. Appl. No. 10/748,053, filed Dec. 30, 2003, 21 p.
Hamasaki, Office Action Feb. 27, 2009, U.S. Appl. No. 10/748,053, filed Dec. 30, 2003, 19 p.
Hamasaki, Final Office Action Sep. 11, 2009, U.S. Appl. No. 10/748,053, filed Dec. 30, 2003, 19 p.
Hamasaki, Final Office Action May 17, 2010, U.S. Appl. No. 10/748,053, filed Dec. 30, 2003, 21 p.
Rao, Office Action Feb. 6, 2009, U.S. Appl. No. 10/754,378, filed Jan. 9, 2004, 14 p.
Rao, Final Office Action Jul. 13, 2009, U.S. Appl. No. 10/754,378, filed Jan. 9, 2004, 25 p.
Rao, Office Action May 17, 2010, U.S. Appl. No. 10/754,378, filed Jan. 9, 2004, 43 p.
Marolia, Office Action Oct. 17, 2006, U.S. Appl. No. 10/754,313, filed Jan. 9, 2004, 16 p.
Marolia, Office Action Feb. 20, 2008, U.S. Appl. No. 10/754,313, filed Jan. 9, 2004, 11 p.
Gustafson, Office Action Jan. 4, 2007, U.S. Appl. No. 10/756,103, filed Jan. 13, 2004, 10 p.
Gustafson, Office Action Aug. 10, 2007, U.S. Appl. No. 10/756,103, filed Jan. 13, 2004, 11 p.
Gustafson, Office Action Jan. 22, 2008, U.S. Appl. No. 10/756,103, filed Jan. 13, 2004, 11 p.
Gustafson, Office Action Jul. 8, 2009, U.S. Appl. No. 10/756,103, filed Jan. 13, 2004, 21 p.
Gustafson, Final Office Action Dec. 18, 2009, U.S. Appl. No. 10/756,103, filed Jan. 13, 2004, 22 p.
Chen, Office Action Jul. 23, 2007, U.S. Appl. No. 10/646,230, filed Aug. 22, 2003, 14 p.
Chen, Final Office Action Dec. 28, 2007, U.S. Appl. No. 10/646,230, filed Aug. 22, 2003, 14 p.
Chen, Office Action Dec. 23, 2008, U.S. Appl. No. 10/646,230, filed Aug. 22, 2003, 25 p.
Chen, Final Office Action May 27, 2009, U.S. Appl. No. 10/646,230, filed Aug. 22, 2003, 28 p.
Chen, Office Action Dec. 2, 2009, U.S. Appl. No. 10/646,230, filed Aug. 22, 2003, 15 p.
Chen, Office Action May 27, 2010, U.S. Appl. No. 10/646,230, filed Aug. 22, 2003, 17 p.
Chen, Final Office Action Nov. 10, 2010, U.S. Appl. No. 10/646,230, filed Aug. 22, 2003, 17 p.
Chen, Office Action Aug. 23, 2011, U.S. Appl. No. 10/646,230, filed Aug. 22, 2003, 6 p.
Marolia, Office Action Aug. 17, 2007, U.S. Appl. No. 10/852,396, filed May 24, 2004, 17 p.
Qumei, Office Action Jun. 20, 2007, U.S. Appl. No. 10/813,212, filed Mar. 30, 2004, 10 p.
Chen, Office Action Jun. 12, 2008, U.S. Appl. No. 10/646,230, filed Aug. 22, 2003, 14 p.
Chen, Office Action Dec. 7, 2005, U.S. Appl. No. 10/411,784, filed Apr. 11, 2003, 15 p.
Chen, Final Office Action Nov. 6, 2007, U.S. Appl. No. 11/125,974, filed May 9, 2005, 10 p.
Gustafson, Office Action Jan. 22, 2009, U.S. Appl. No. 10/756,103, filed Jan. 13, 2004, 15.p.
Qumei, Office Action, Apr. 13, 2007, U.S. Appl. No. 10/770,983, filed Feb. 3, 2004, 11 .p.
Muller, N. J., "Focus on OpenView a guide to Hewlett-Packard's Network and Systems Management Platform," pp. 1-291, CBM Books, published 1995.
ILOG, "ILOG Delivers Enterprise-Wide Business Rule Management with ILOG Jrules 4.5," Press Release [Online] <http://www.ilog.com/corporate/releases/us/030610_jrules45.cfm>.
ILOG, "ILOG Jrules—Complete business rule management," [Online] <http://www.ilog.com/products/jrules/datasheet> (May 2003).
Verbauwhede et al., "Low power DSP's for wireless communications (embedded tutorial session)", Aug. 2000, pp. 303-310. [Online] <http://delivery.acm.org/10.1145/350000/34464 7/p303-verbauwhede. pdf>.
"Over the Air User Initiated Provisioning Recommended Practice for the Mobile Information Device Profile", Version 1.0, May 7, 2001.
Oma, "SyncML Device Management Tree and Description, Version 1.1.2," Dec. 2, 2003, pp. 1-44.
Lucent Technologies, "Wireless Intelligent Network Over-the-Air Service Provisioning," Technical Brochure, [Online] <http://www.lucent.com/livelink/146175-Brochure.pdf>, 1997.
3GPP2 C:R1001-A 2.0: Administration of Parameter Value Assignments for cdma2000 Spread Spectrum Standards, Release A: Jul. 14, 2000.
Albright, Brian, "Managing the force: Planning makes the difference," Frontline Solutions, Jan. 2001, retrieved from scholar.google.com search Jun. 15, 2006.
Bailey, E. C., "Maximum RPM: Taking the Red Hat Package Manager to the Limit," Copyright 2000 by Red Hat, Inc., 14 p.
Baker et al., "Compressing Differences of Executable Code," Apr. 22, 1999.
Bokun et al. (Active Badges—The Next Generation, Linux Journa, Oct. 1998, Issue 54).
Brown, Michael et al., PGP in Constrined Wireless Devices, 1-23, 9th USENIX Security Symposium Paper 2000, retrieved Apr. 16, 2007.
Burns et al., "In-Place Reconstruction of Delta Compressed Files," Univ of California, Santa Cruz, darrell@cs.scsc.edu; 12 pgs.
Ortiz, C. Enrique, "Introduction to OTA Application Provisioning," Nov. 2002, [Online] http://developers.sun.com/techtopics/mobility/midparticles/ota/ retrieved on Mar. 29, 2007.
Microsoft, "Computer Dictionary," Microsoft Press Third Edition, pp. 88, 190, 1997.
Deitel & Deitel, "C How to Program," 1994, Prentice-Hall, Inc., Second Edition, Chapter 5.

(56) References Cited

OTHER PUBLICATIONS

Digital Cellular Telecomminications System (Phase 2+) At Command Set for GSM Mobile Equipment (ME) (GSM 07.07 version 7.4.0 Release 1998), ETSI TS 100 916 V7.4.0 (Nov. 1999), 126 p.
Engstrom, Don, "Two Clicks to a Rejuvenated Mac: A Review of UpdateAgent—Cd Edition," Feb. 20, 2002, pp. 1-3.
Eppstein, D., "Fast Hierarchical Clustering and Other Applications of Dynamic Closest Pairs," Jan. 31, 2001, pp. 1-10. [Online] http://www.ics.uci.edu/-eppstein/projects/pairs/Papers/ Epp-SODA-98.pdf>.
Euroloader, "Technical Specification" Dec. 2001, ECCA Euroloader Specificaion, pp. 1-60.
Fowler et al., "Lossless Compression of Volumne Data," 1995, IEEE, pp. 43-50.
Funambol Inc., "Funambol DM Server Developer's Guide Version 3.0," Sep. 2006.
Guanluca, Moro, "On the Event Coordination in Multi-Component Systems," published 2002, pp. 315-322.
Hicks et al., Dynamic Software Updating, Jun. 2001. [Online] <citeseer.ist.psu.edu/336947.html>.
IEEE LAN MAN Standards Committee, "Draft Amendment to IEEE Standard for Local and Metropolitan Area Networks; Part 16: Air Interface for Fixed and Mobile Broadband Wireless Access Systems—Amendment to IEE Standards for Local and Metorpolitian Area Networks—Management Plane Procedures and Services," IEEE Draft Standards, No. 802. 16g-04/03, Dec. 2004, pp. 1-8, XP002469853.
Jansen et al., "Approx 2000, LNCS 1913," pp. 84-95, 2000, Springer-Verlag, Berlin Heidelberg 2000.
Luculli, Gabriele, "Efficient and Effective Simulation of Memory Maps for System-on-Chip," 11th IEEE Int'l. Conference and Workshop on the Engineering of Computer Baseed Systems, May 24-27, 2004, pp. 242-247.
Open Mobile Alliance, "Firmware Update Management Object," 2006.
Open Mobile Alliance, "OMA Device Management Security," Jul. 2005, Candidate Version 1.2.
Open Mobile Alliance, "SyncML Device Management Bootstrap," 2003.
Open Mobile Alliance, "Firmware Update Management Object," OMA-DM-V0__142004Oct28-D.
Open Mobile Alliance, "OMA Device Management Tree and Description_ver 1.2," Jun. 15, 2005 (OMA-YS-DM-TND-V1_2-20050615-C).
Paila et al. "Flute-File Delivery Over Unidirectional Transport," Network Working Group Request for Comments; 3926 Category; Experimental; Oct. 2004.
"Part 16: Air Interface for Fixed Broadband Wireless Access Systems," Sep. 22, 2005, pp. 1-257, XP007904329.
"Problem Tracking Task Reference," Continuus Software Corporation, Whole Manual, Part No. PTTR-041-011, 1996.
Riel, "Object-Oriented Design Heuristics," Apr. 30, 1996, Addison-Wesley Professional, Section 10.1.
Rodriguez et al., "TCP/IP Tutorial and Technical Overview," Copyright 2002, pp. 489-490.
Shapira et al., "In Place Differential File Compression," The Author 2005; Published by Oxford University Press on behalf of the British Computer Society; Advance Access published on Aug. 26, 2005; 15 p.
Starlin, Mark, UpdateAgent 8, Nov. 19, 2002, pp. 1-2.
Symbian, "Symbian OS powered Sony Ericsson P800 Smartphone to ship in Q32003" Mar. 2002 pp. 1-2.
Tansley, "Linux and Unix Shell Programming," Dec. 27, 1999, Addison-Wesley Professional, 2 p.
The Mac Observer, Update Agent Scouts Out an Update for Itself, May 9, 2000, pp. 1-3.
TIA/EIA/IS-683-A: Over-the-Air Service Provisioning of Mobile Stations in Spread Spectrum Systems: May 1998.
Veeraraghavan et al., "A distributed control strategy for wireless ATM networks," pp. 323•339, Wireless Networks 1995, retrieved from ACM database search Jun. 15, 2006.
Yang et al., "Reuse Linux Device Drivers in Embedded Systems," 1998 International Computer Symposium Workshop on Software Engineering and Database Systems Dec. 17-19, 1998.
Yau et al., "An approach to distributed component-based real-time application software development," 1998, pp. 275-283.
Hewlett-Packard Development Company, L.P., Office Action, European Application No. 04754355.8, Date: Jul. 5, 2013, pp. 1-11.
Hewlett-Packard Development Company, L.P., Office Action, European Application No. 04782849.6, Date: Jul. 3, 2013, pp. 1-5.

\* cited by examiner

NETWORK FOR UPDATING ELECTRONIC DEVICES

CROSS-REFERENCE TO RELATED APPLICATIONS

The present application claims the benefit of U.S. Provisional Patent Application Ser. No. 60/503,932 entitled "Network For Updating Mobile Handsets", filed Sep. 17, 2003, the complete subject matter of which is hereby incorporated herein by reference in its entirety.

The present application also hereby incorporates herein by reference in its entirety, the complete subject matter of U.S. Provisional Patent Application 60/428,069, filed Nov. 11, 2002.

The present application also hereby incorporates herein by reference in its entirety, the complete subject matter of PCT Application having publication number WO 02/41147 A1 and PCT application number PCT/US01/44034, filed on Nov. 19, 2001.

The present application also hereby incorporates herein by reference in its entirety, the complete subject matter of U.S. Provisional Patent Application 60/249,606 filed on Nov. 17, 2000.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices such as mobile phones and personal digital assistants (PDA's) often contain firmware and application software that are either provided by the manufacturers of the electronic devices, by telecommunication carriers, or by third parties. These firmware and application software often contain software bugs. New versions of the firmware and software are periodically released to fix the bugs, to introduce new features, or both.

Electronic devices, such as mobile handsets, access servers to retrieve update packages that are needed to update firmware and/or software. When thousands of mobile handsets simultaneously attempt to access the servers, some of them may not be able to get connected. There is a need for wireless networks to determine if individual mobile handsets can be updated. There is a need for wireless networks to facilitate downloading of update packages by mobile handsets.

Creating efficient and compact update packages for firmware/software updates is a big challenge. Managing update packages efficiently in a carrier network is also a great challenge. Managing the lifecycle of firmware and software in electronic devices, such as mobile handsets, is a complicated and important task.

Updating the updating software (update agent) in a wireless mobile electronic device may be challenging. If the update is not installed and executed properly, the update agent may be rendered corrupted or inoperable. Collecting updates (update packages from a plurality of sources in a secure mode may be challenging. Providing the electronic devices with downloadable access to the collected update packages may employ complex management tasks.

Further limitations and disadvantages of conventional and traditional approaches will become apparent to one of ordinary skill in the art through comparison of such systems with the present invention as set forth in the remainder of the present application with reference to the drawings.

SUMMARY OF THE INVENTION

Aspects of the present invention may be found in an update process-able by updating software. The update may comprise at least one modifiable download state associated with the update and at least one download group associated with at least one download state. The update may be associated with at least one download group. The updating software may be adapted to process a plurality of executable instructions for converting a first version of one of firmware and software to a second version of one of firmware and software in a mobile electronic device.

In an embodiment according to the present invention, the at least one download state may indicate that an update associated with the at least one download state is authorized for downloading.

In an embodiment according to the present invention, the at least one download state may indicate that an update associated with the at least one download state is unauthorized for downloading.

In an embodiment according to the present invention, the at least one download group may comprise at least one update authorized for downloading.

In an embodiment according to the present invention, the update may be associated with the at least one download group based upon the at least one download state of the associated update.

In an embodiment according to the present invention, the at least one download group may comprise a grouping of electronic devices authorized to download the update.

In an embodiment according to the present invention, the at least one download group may comprise at least one update unauthorized for downloading.

In an embodiment according to the present invention, the update may be associated with the at least one download group based upon the at least one download state of the associated update.

In an embodiment according to the present invention, the at least one download group may comprise a grouping of electronic devices unauthorized to download the update.

In an embodiment according to the present invention, the at least one download group may comprise a non-removable download group. The non-removable download group may comprise a grouping of electronic devices permitted to download the update regardless of client identification and authorization.

In an embodiment according to the present invention, electronic devices in the non-removable download group may share a particular parameter value.

In an embodiment according to the present invention, the particular parameter value may comprise unique hardware identification associated with one of the electronic device and a particular electronic device manufacturer.

In an embodiment according to the present invention, the particular parameter value may comprise a version of the one of firmware and software to be updated.

In an embodiment according to the present invention, the particular parameter value may be employed to facilitate selection of an update to be downloaded to an electronic device. The particular parameter value may be selected from at least one of electronic device model identification, electronic device manufacturer identification, a firmware version, a software version, an electronic device international mobile equipment identifier IMEI, a telephone number, and a device unique identification.

In an embodiment according to the present invention, the particular parameter value may also comprise a parameter request. The electronic device may be adapted to respond to the parameter request by transmitting a requested parameter.

Aspects of the present invention may also be found in an update management system comprising a server adapted to evaluate an update to determine at least one download state and at least one download group associated with the update. The update may comprise a plurality of executable instructions for converting a first version of one of firmware and software to a second version of one of firmware and software in a mobile electronic device.

In an embodiment according to the present invention, the server may be adapted to prioritize a plurality of matching updates by evaluating the at least one download state associated with each of the plurality of matching updates.

In an embodiment according to the present invention, the server may be adapted to select an update having a highest priority for updating one of firmware and software.

In an embodiment according to the present invention, the server may be adapted to select an update based upon an indicator associated with the update. The indicator may be identifiable through a conflict resolution analysis.

In an embodiment according to the present invention, a downloaded update may be quarantined and evaluated in at least one component of the system to prevent malicious attacks and electronic device damage.

In an embodiment according to the present invention, a plurality of updates may be stored in an update store module comprising non-volatile memory.

In an embodiment according to the present invention, the plurality of updates stored in the update store module may each comprise an associated update state. The update state may indicate that the plurality of updates comprises one of a new update, an update being testing, an approved update, a released update, an inactive update, and obsolete update, and a discarded update.

Aspects of the present invention may be found in a method of updating a plurality of mobile electronic devices. The method may comprise transmitting an update of one of firmware and software to a plurality of associated mobile electronic devices enabled to perform the update. The update may comprise a plurality of executable instructions for converting a first version of one of firmware and software to a second version of one of firmware and software in a mobile electronic device.

In an embodiment according to the present invention, the method may further comprise associating the mobile electronic devices based upon at least one of an identical electronic device make, an identical electronic device, an identical installed firmware version, an identical installed software version, an identical installed operating system, and an identically installed encryption implementation.

In an embodiment according to the present invention, the method may further comprise prompting an electronic device management system to select at least one group of associated mobile electronic devices to transmit the update to.

In an embodiment according to the present invention, the method may further comprise prompting an electronic device management system to select whether an update to be transmitted is one of a silent update and an opt-in update, and autonomously performing the silent update and prompting an electronic device end-user to authorize and participate in the opt-in update.

In an embodiment according to the present invention, the method may further comprise transmitting notifications to the associated electronic devices that an update is one of pending, in-progress, completed, failed, aborted, and successful.

Aspects of the present invention may also be found in an update generating software adapted to generate an update employable to converting a first version of one of firmware and software to a second version of one of firmware and software in a mobile electronic device. The update generating software may comprise software interfaces supporting a plurality of compiling and linking formats and software interfaces supporting zoning a generated update.

In an embodiment according to the present invention, zoning a generated update may comprise dividing the generated update into code segments.

In an embodiment according to the present invention, zoning a generated update may comprise employing different settings and rules for updating each particular code segment.

In an embodiment according to the present invention, zoning a generated update may comprise zone management. Zone management may comprise defining at least one of a pre-processor, a write unit size, an updateable zone, an excluded zone, an updating software zone, and a reserved write unit zone.

Aspects of the present invention may also be found in software for managing updates of one of firmware and software in a mobile electronic device. The software may comprise at least one communications-handling component, at least one data transfer-handling component, at least one display-handling component, and at least one event-handling component.

In an embodiment according to the present invention, the at least one communications-handling component may comprise at least one of a short message service (SMS)-based protocol, an extensible markup language (XML)-based protocol, and a device management based protocol.

In an embodiment according to the present invention, the at least one data transfer-handling component may comprise at least one of a download protocol compatible with Open Mobile Alliance (OMA)-specification and a simple object access protocol (SOAP)-based protocol.

In an embodiment according to the present invention, the at least one display handling-component may comprise a customer care module.

In an embodiment according to the present invention, the at least one event-handling component may comprise at least one of a firmware management client and a software management client.

In an embodiment according to the present invention, the software for managing may further comprise at least one update status descriptor handling component, at least one update storage handling component, at least one electronic device reset handling component, and at least one update status notification handling component.

Aspects of the present invention may also be found in a method for managing update processing in a mobile electronic device. The method may comprise storing an update in a designated non-volatile memory location, computing an update state descriptor, and storing the update state descriptor in another designated non-volatile memory location.

In an embodiment according to the present invention, the method may further comprise booting the mobile electronic device after the update state descriptor and the update are written to respective designated non-volatile memory locations.

In an embodiment according to the present invention, the method may further comprise identifying an update status of one of firmware and software to be updated.

Aspects of the present invention may also be found in updating code adapted to process a plurality of executable instructions for converting a first version of one of firmware and software to a second version of one of firmware and software in a mobile electronic device. The updating code may comprise a zoning component capable of processing non-contiguous code segments, a pre-processing component for reducing a size of the updating software, at least one updateable component, a digital signature decryption component, and a verification component.

In an embodiment according to the present invention, the updating code may operate independently of an operating system employed in the mobile electronic device.

In an embodiment according to the present invention, the updating code may be compiled and linked separately from firmware and software resident in the mobile electronic device.

In an embodiment according to the present invention, the updating code may be adapted to run independent of runtime libraries, compiler supplied runtime code, and linker supplied runtime code.

DETAILED DESCRIPTION OF THE INVENTION

Figure 1A:
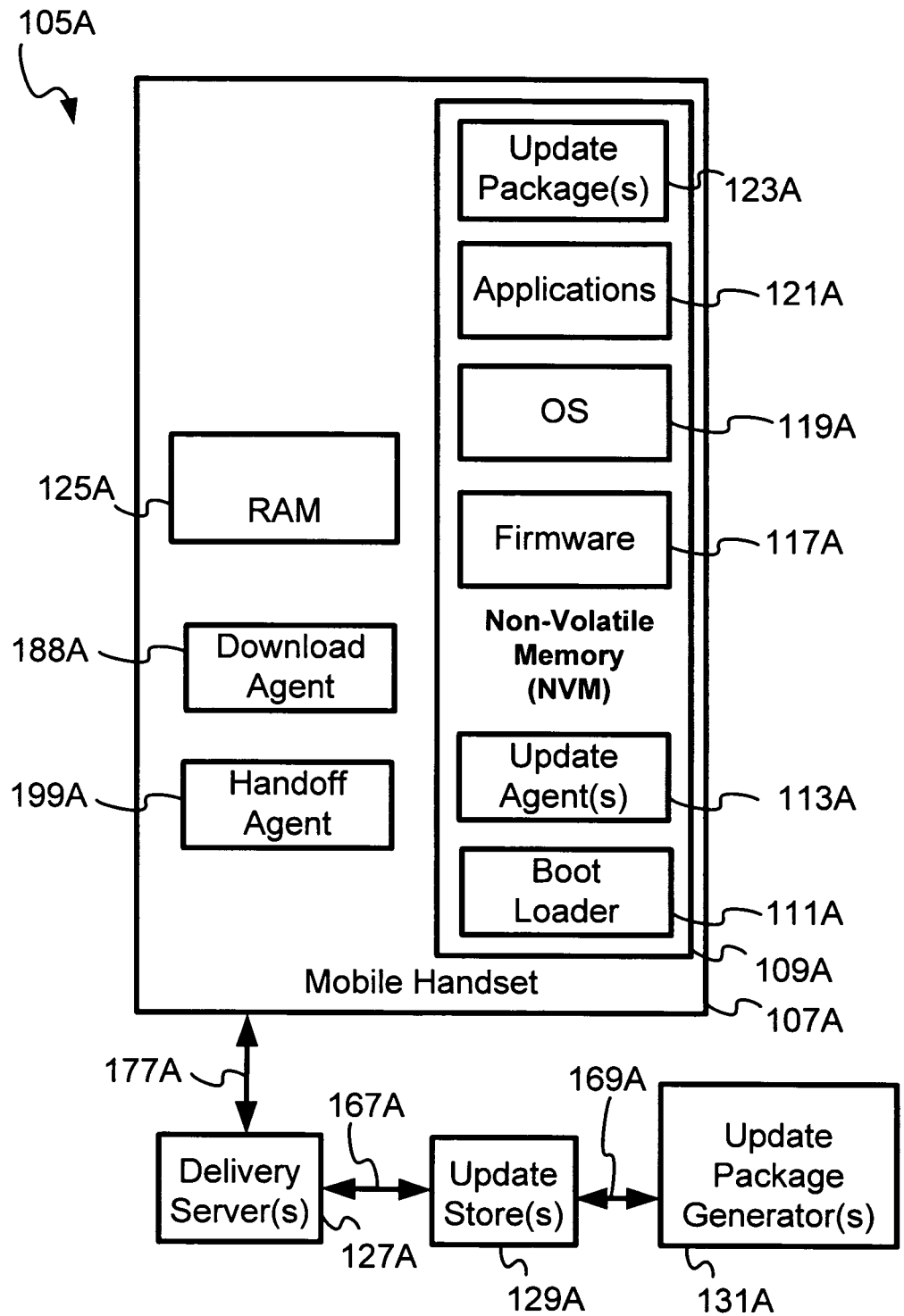
FIG. 1A is a block diagram of a provisioning system comprising an electronic device communicatively coupled to an electronic device network according to an embodiment of the present invention.

Aspects of the present invention may be found in a method of updating firmware/software components in electronic devices. More specifically, aspects of the present invention relate to the life cycle management of firmware and software in electronic devices such as, for example, mobile handsets, cellular telephones, personal digital assistants, pagers, personal computers, etc.

Aspects of the present invention may also be found in a network adapted to collect update packages from multiple sources and disseminate the update packages to a plurality of electronic devices.

In an embodiment according to the present invention, the electronic device updating software (update agent) may be updated. However, if the update is not installed and executed properly, the update agent may be rendered corrupted or inoperable. In another embodiment according to the present invention, updates (update packages) may be collected from a plurality of sources in a secure manner. Aspects of the present invention may also be found in providing the wireless mobile electronic devices with downloadable access to the collected update packages. In an embodiment according to the present invention, the network and/or the electronic devices may be adapted to manage complex tasks, such as for example, release management, security, life-cycle management, scalability, etc.

In an embodiment according to the present invention, firmware may be considered to be software placed in a read-only memory device in an embedded system in an electronic device. Firmware may also comprise software necessary to boot, initialize, and run the embedded software.

In an embodiment according to the present invention, flash memory may be a memory resource re-programmable or writeable in the field, for example. Flash memory has many characteristics that make it distinct from other types of memory. Flash memory may also be used as read-only memory.

In an embodiment according to the present invention, a software/firmware version may be defined as identification information associated with a firmware image or software application. The identification information may be numeric, such as, for example, version 1, version 2, version 2.2, version 3a, etc., but may also be textually descriptive.

In an embodiment according to the present invention, a simple network management protocol (SNMP) may be defined as a set of specifications standardizing the way hardware, firmware, and software processes are managed and monitored over the network. One example of an SNMP may be found in Request for Comments (RFC) 1157, dated May/1990, entitled "A simple network management protocol" by Internet Engineering Task Force.

In an embodiment according to the present invention, an SNMP agent may process electronic device and network component interfaces with a managed resource wherein the managed resource is adapted to respond to requests from an SNMP Manager and send tracking/event notifications.

In an embodiment according to the present invention, a Java 2 Enterprise Edition (J2EE) environment, developed by Sun Microsystems, may be adapted to provide a set of features for software/firmware developers, including object oriented messaging, web services, database access, and database management. J2EE application servers may also store applications written within the J2EE framework.

In an embodiment according to the present invention, Java Data-Base Connectivity (JDBC) may be defined as a J2EE application program interface (API) adapted to provide access to databases from a plurality of application vendors.

In an embodiment according to the present invention, an update package may be defined as a collection of data/meta-data and update/upgrade instructions that when bundled and delivered to an electronic device update agent are adapted to facilitate firmware/software updates in the electronic devices. The data/meta-data may include information associated with loading update(s)/upgrade(s) and verifying the contents of the update(s)/upgrade(s) and associated instructions. The update/upgrade instructions may comprise a set of executable instructions for converting from one version of electronic device firmware/software to another. The update/upgrade instructions may also comprise list of program changes facilitating migration from one version of electronic device firmware to another.

In an embodiment according to the present invention, a SNMP manager may be defined as software which may be installed in console form and may be usable to query managed objects from a SNMP agent.

In an embodiment according to the present invention, a management information base (MIB) may be defined as a component of a SNMP manager adapted to refer to collection(s) of managed objects residing in a virtual information store.

In an embodiment according to the present invention, a structure of management information (SMI) may be defined as a component of the SNMP manager adapted to refer to the programming structure being applied to describe and name software/firmware objects.

FIG. 1A is a block diagram of a network 105A for updating electronic devices, such as for example, mobile handset 107A. The electronic devices, such as for example, mobile handset 107A, may be communicatively coupled via a communications link 177A to a delivery server 127A that may be located in a wireless/carrier network. The delivery server 127A may also be communicatively coupled via communications link 167A to an update store 129A. The update store 129A may comprise a repository of update packages that may be generated by an update package generator 131A. The update store 129A may also communicative coupled via communications link 169A to the update package generator 131A.

The mobile handset 107A may comprise a non-volatile memory (NVM) 109A. The NVM 109A may comprise a boot loader 111A, an update agent 113A, a firmware 117A, an operating system (OS) 119A, one or more electronic device applications 121A, and an update package 123A. The update agent 113A may be adapted to update the firmware 117A, the operating system 119A, and/or the applications 121A of the mobile handset 107A employing an appropriate update package 123A.

The update agent 113A may employ a random access memory (RAM) 125A to update the firmware 117A, the OS 119A, and/or electronic device applications 121A. Updates may be conducted in a fault-tolerant manner by update agent 113A. The boot loader 111A may be executed during startup (or reboot) and may determine whether to execute the update agent 113A.

The determination of whether to execute the update agent 113A may be made by accessing status flags stored in the NVM 109A. If an update is to be conducted, the boot loader 111A may determine whether the update agent 113A is useable or corrupted. The determination of whether the update agent is corrupted or inoperable may be made based on computing a cyclic redundancy check (CRC) or a checksum and comparing the calculated values to expected (previously computed) reference values.

During an update of the update agent 113A, for example, if the update is interrupted, then the update agent 113A may be partially updated and hence corrupted. To prevent and/or avoid such a problem, a backup copy of the update agent 113A may be created, stored, and maintained in NVM 109 prior to conducting an update. If, during a subsequent reboot or startup, it is determined that the update agent 113A is corrupted, the backup copy of the update agent 113A may be invoked by the boot loader to conduct the update.

The boot loader 111A may be capable of determining whether the update agent 113A may be invoked or whether a backup copy of the update agent 113A in NVM 109A may be invoked upon determining, based upon evaluated status information, that an update may be conducted rather than a normal startup without performing an update.

A handoff agent 199A in the mobile handset 107A may facilitate setting of status information and addresses after an update package is downloaded to the mobile handset 107A from the delivery server 127A. A download agent 188A may facilitate the downloading of update packages to the electronic devices, for example, mobile handset 107.

In an embodiment according to the present invention, a plurality of delivery servers, such as for example, delivery server 127A, may be employed. A gateway (not shown) may also be employed. The gateway may act as a generic front-end to the plurality of delivery servers, such as for example, delivery server 127A, to provide a load balancing solution for such an update package delivery environment. Multiple update package generators 131A may also be supported. One or more update package generators may be located at a remote facility, such as for example, a manufacturers design and testing laboratory. The ability to transfer a collection of generated update packages, in some form of an update package catalog, from multiple remote manufacturing facilities or from remote laboratories may also be supported by the network 105A in an embodiment according to the present invention.

Typically, the life cycle of individual update packages may be managed in the network 105A by employing a management console supported by the update store 129A, or by some other appropriate system in the network 105A. In addition, a customer care interface to the update store 129A may also be provided in an embodiment according to the present invention to enable secure browsing, and discovery and manipulation of update package status by customer care representatives, for example.

Figure 1B:
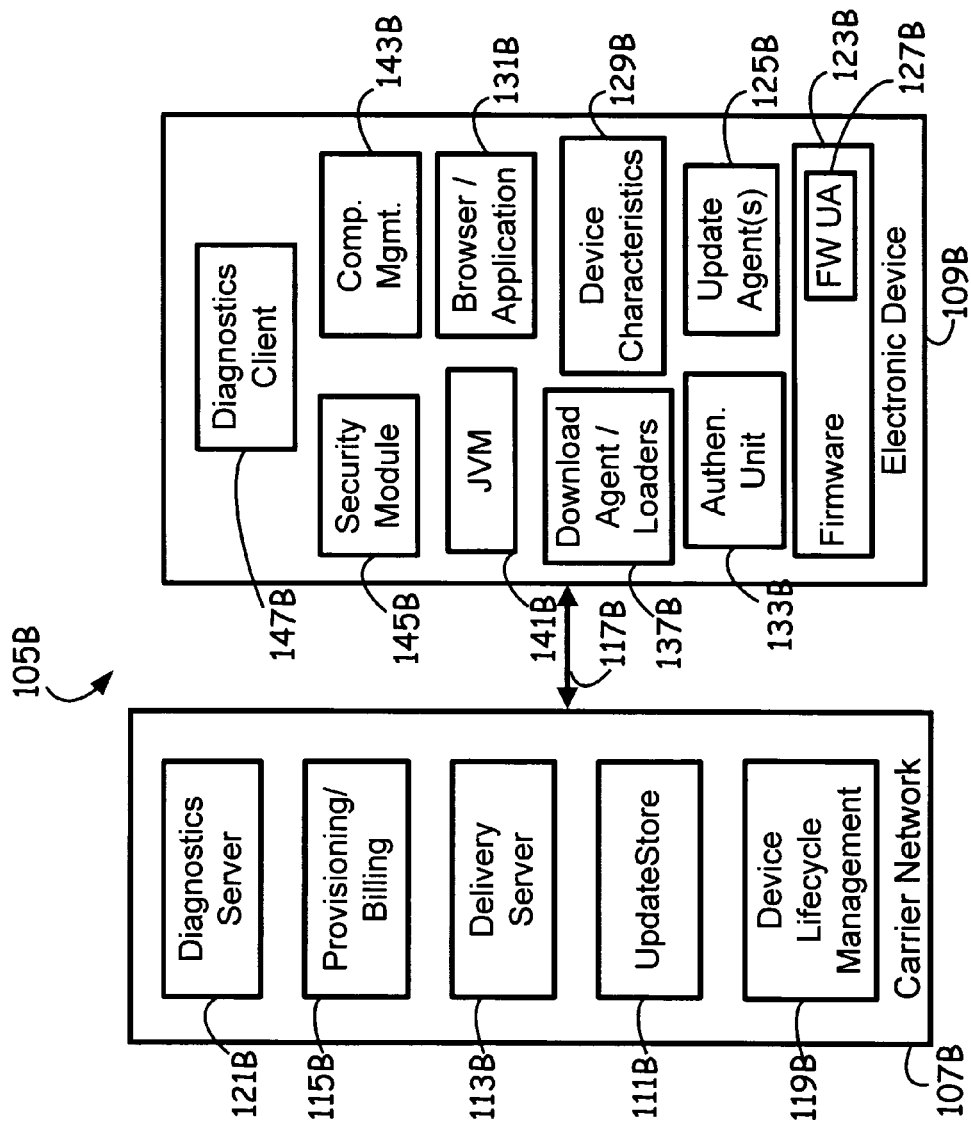
FIG. 1B is a block diagram illustrating an exemplary network for lifecycle management of firmware and software applications in electronic devices according to an embodiment of the present invention.

FIG. 1B is a block diagram illustrating an exemplary network for lifecycle management of firmware and software applications in electronic devices according to an embodiment of the present invention. FIG. 1B illustrates an exemplary electronic device network 105B comprising a carrier network 107B communicatively coupled to an electronic device 109B via communication link 117B. Although a single electronic device 109B is illustrated in FIG. 1B, a plurality of electronic devices may be communicatively coupled to the carrier network 107B. Electronic device 109B, for example, may comprise a mobile handset, a cellular telephone, a personal digital assistant, a pager, a personal computer, etc. The communication link 117 B may be via a wire or wirelessly. The carrier network 107B may comprise a diagnostics server 121B, a provisioning/billing server 115B, a delivery server 113B, an update store server 111B, and a device lifecycle management server 119B.

The diagnostics server 121B may be used to collect and analyze diagnostic information. The delivery server 113B may be adapted to dispense update packages to electronic device 109B. The update store server 111B may be used as a repository of update packages, associated update package files, and a database comprising a plurality of logs storing lifecycle management information associated with stored update packages.

In an embodiment according to the present invention, an update package may comprise, for example, a set of executable instructions for converting/updating/upgrading a firmware/software embedded in an electronic device. The network 105B, as illustrated in FIG. 1B, may also manage a plurality of configuration parameters associated with firmware/software executed in the electronic device 109B and dispense update packages to the electronic device 109B. Electronic device 109B may employ one or more update agent(s) 125B managing updates of software/firmware therein.

As illustrated in FIG. 1B, electronic device 109B may comprise firmware 123B, a firmware update agent 127B, one or more update agent(s) 125B, an authentication unit 133B, and device characteristics 129B. The one or more update agent(s) 125B may also be adapted to update the operating system and operating system components, software application components, software/firmware configuration parameters, and/or combinations thereof. Device characteristics component 129B may comprise electronic device information, such as for example, manufacturer identification information, model identification information, firmware version identification information, software version(s) identification information, hardware component identification information, operating system information, etc., of electronic device 109B.

As illustrated in FIG. 1B, electronic device 109B may also comprise a download agent/loaders component 137B, a Java virtual machine (JVM) 141B, a browser/application component 131B, a security module 145B, a component management module 143B, and a diagnostics client module 147B. The download agent/loaders component 137B may be adapted to download firmware/software updates, configuration parameters, etc. The security module 145B may be adapted to store and manage security information corresponding to various segments of non-volatile memory in the electronic device 109B. The security module 145B may also be capable of supporting access to various other applications of the electronic device 109B. The security module 145B may also support encryption/decryption and management of usernames and passwords in the electronic device 109B.

In an embodiment according to the present invention, the component management module 143B may be adapted to manage existing firmware/software components and additional new software components installed upon the electronic device 109B. The component management module 143B may be adapted to facilitate license management, installation, update, upgrade, and removal of software components, software applications, etc. The component management module 143B may also be adapted to employ device characteristics module 129B and authentication unit 133B during software component retrieval and/or associated update package retrieval from the carrier network 107B. In an embodiment according to the present invention, authentication unit 133B may support at least one authentication technique.

In an embodiment according to the present invention, download agent/loaders component 137B may retrieve information such as, for example, update packages, configuration parameters, and user data from servers in the carrier network 107B. Browser/applications component 131B may also be adapted to download data and/or software components, etc. from the plurality of servers in the carrier network 107B. In an embodiment according to the present invention, download agent/loaders component 137B may be adapted to upload data, and backup software and diagnostic information collected by the diagnostics client 147B, etc.

In an embodiment according to the present invention, update agent(s) 125B may be adapted to replace JVM 141B by performing the functions associated with JVM 141B. In another embodiment according to the present invention, update agent(s) 125B may also be adapted to update JVM 141B from one version to another.

The diagnostics client 147B, in an embodiment according to the present invention, may be adapted to collect electronic device and electronic device component performance-related data/information by monitoring, tracking and evaluating events in the electronic device 109B. Performance-related data/information may comprise performance of radio frequency (RF) communications, performance of baseband communications, software application(s) performance, error statistics, exceptions, frequency of errors and exceptions, etc. In an embodiment according to the present invention, diagnostics client 147B may also be adapted to monitor electronic device events and report/communicate the events and corresponding event frequency to the carrier network 107B.

In an embodiment according to the present invention, the diagnostic client 147B may also be adapted to collect and communicate configuration parameters to an appropriate server in the carrier network 107B, which may, for example, be diagnostic server 121B or delivery server 111B. Collecting configuration parameters may be initiated via an appropriate request from a server in the carrier network 107B, such as diagnostic server 121B or delivery server 113B. Collecting configuration parameters may also be initiated by the diagnostics client 147B and/or download agent/loaders component 137B in the electronic device, for example.

In an embodiment according to the present invention, the diagnostic client 147B may collect and communicate information on errors, exceptions, and problems in the electronic device 109B to carrier network servers, such as for example, diagnostics server 121B, device lifecycle management server 119B, delivery server 113B, etc., for processing and determinative evaluation.

In an embodiment according to the present invention, the update agent(s) 125B and the firmware update agent 127B may be adapted to employ block-by-block update techniques when updating firmware/software in a fault-tolerant mode in the electronic device 109B.

Device lifecycle management server 119B, in an embodiment according to the present invention, may be adapted to manage and configure the capabilities of the carrier network 107B and the electronic device 109B communicating therewith. The device lifecycle management server 119B may retrieve electronic device information, initiate transfer of update packages from update store server 111B, retrieve changed configuration parameters, changed provisioning protocols, changed billing information, etc., from the provisioning and billing server 115B in the carrier network 107B, for example.

In an embodiment according to the present invention, retrieved capability information may comprise numbers or codes identifying capability parameters of the electronic device 109B. In an embodiment according to the present invention, retrieved capability information may also comprise lists of services subscribed to by an end-user of the electronic device 109B. In an embodiment according to the present invention, retrieved electronic device information may also comprise the amount of available memory, power level, signal strength, etc., associated with the electronic device.

The offline functionality of the electronic device 109B is an important consideration because wireless services are often narrowband and subject to fading and congestion. To support offline use of the electronic device 109B, end-users may choose to back up and remotely erase data stored on the electronic device 109B, for example, if the electronic device 109B is lost, stolen, or misplaced.

In an embodiment according to the present invention, download agent/loaders component 137B may be adapted to upload end-user data and/or end-user content stored on the electronic device 109B to at least one of the plurality of servers in the carrier network 107B for backup and/or safe keeping. The uploaded data/information may be uploaded to the device lifecycle management server 119B, for example. The uploaded data/information may subsequently be downloaded/loaded into the electronic device 109B from device lifecycle management server 119B during a recovery of the electronic device.

In an embodiment according to the present invention, update agent(s) 125B may be adapted to remotely erase end-user data/information stored in the electronic device 109B when the electronic device 109B is lost, stolen, or misplaced.

In an embodiment according to the present invention, security module 145B may be adapted to disable the electronic device 109B upon command from at least one of the servers in carrier network 107B such as, for example, the provisioning/billing server 115B. Security module 145B may subsequently enable use of the electronic device 109B, if the end-user provides valid responses to security prompts and challenges presented by security module 145B.

In an embodiment according to the present invention, electronic device 109B may be remotely locked by at least one of the servers in the carrier network 107B when, for example, the provisioning/billing server 115B determines that payment for services is overdue, or when the device lifecycle management server 119B determines that the electronic device 109B may not be used on the carrier network 107B until updated to a different configuration or different version of firmware.

The electronic device 109B may be adapted to compress data/information in order to back-up data/information incrementally at the device lifecycle management server 119B or diagnostics server 121B. The data/information stored on the electronic device 109B may not be transferable all at once when a backup is undertaken and may be transferred in a plurality of data packets or files.

In an embodiment according to the present invention, the device lifecycle management server 119B may be adapted to maintain a software inventory of software components available in the electronic device 109B. The software inventory may be maintained at provisioning/billing server 115B. The device lifecycle management server 119B may be adapted to access the software inventory information.

The provisioning/billing server 115B may be adapted to initiate provisioning of new software applications and end-user services in the electronic device 109B. Provisioning may be facilitated by delivery server 113B, while downloading of configuration parameters and software/firmware may be facilitated by download agent/loaders component 137B. Updating firmware components may be facilitated by firmware update agent 123B and updating software components may be facilitated by update agent(s) 125B.

In an embodiment according to the present invention, updating operating system components may also be facilitated by a first update agent 125B, and a second or the first update agent 125B may facilitate updating software application components.

In an embodiment according to the present invention, the backed-up information stored on the electronic device 109B may be accessible by download agent/loaders component 137B and/or browser/application component 131B.

In an embodiment according to the present invention, locking electronic device 109B, for instances when the electronic device is lost or stolen, may be accomplished by erasing data/information (e.g., user's personal data located in an end-user data segment of the electronic device) and/or by disabling an end-user interface.

In an embodiment according to the present invention, initiation and management of routine and/or critical software/firmware maintenance in electronic device 109B may be conducted by diagnostics client 147B and/or component management module 143B.

In an embodiment according to the present invention, electronic device 109B may be a mobile handset capable of operating in a wireless carrier network 107B. The mobile handset may comprise firmware 123B and a firmware update agent 127B for updating the firmware 123B, an update agent 125B for updating software components such as, for example, JVM 141B, and additional update agent(s) 125B for updating operating system components, for example.

In an embodiment according to the present invention, delivery server 113B and update store server 111B may be located in a network server component. In an embodiment according to the present invention, functionality of update store server 111B and device lifecycle management server 119B may also be combined in one network server component. Other combinations of network server-side functionality within carrier network 107B are also contemplated.

The wireless electronic device network 105B may also be capable of managing configuration parameters in a plurality of electronic devices such as, for example, electronic device 109B. In an embodiment according to the present invention, firmware/software lifecycle management, for example, may be provided by the wireless electronic device network 105B. Firmware/software lifecycle management may comprise, for example, firmware and software downloading, firmware and software updating, associated update file uploading and downloading, remote locking and enabling of the electronic device 109B capability, etc. Update store server 111B in the wireless electronic device network 105 may be adapted to dispense update packages to the electronic device 109B. The electronic device 109B may employ update agent(s) 125B to update software and a firmware update agent 127B to update firmware 123B.

In an embodiment according to the present invention, electronic device 109B may comprise, for example, a mobile handset, such as, a cellular phone. The cellular phone may be adapted to update firmware and software components embedded therein. The cellular phone may also be adapted to perform diagnostic operations and communicate diagnostic information to carrier network 107B for collection of diagnostic statistics in diagnostics server 121B. Diagnostics communications may be evaluated in the carrier network 107B to determine appropriate update packages for installation in the cellular phone to fix bugs, change device configuration, and improve device performance.

Figure 2:
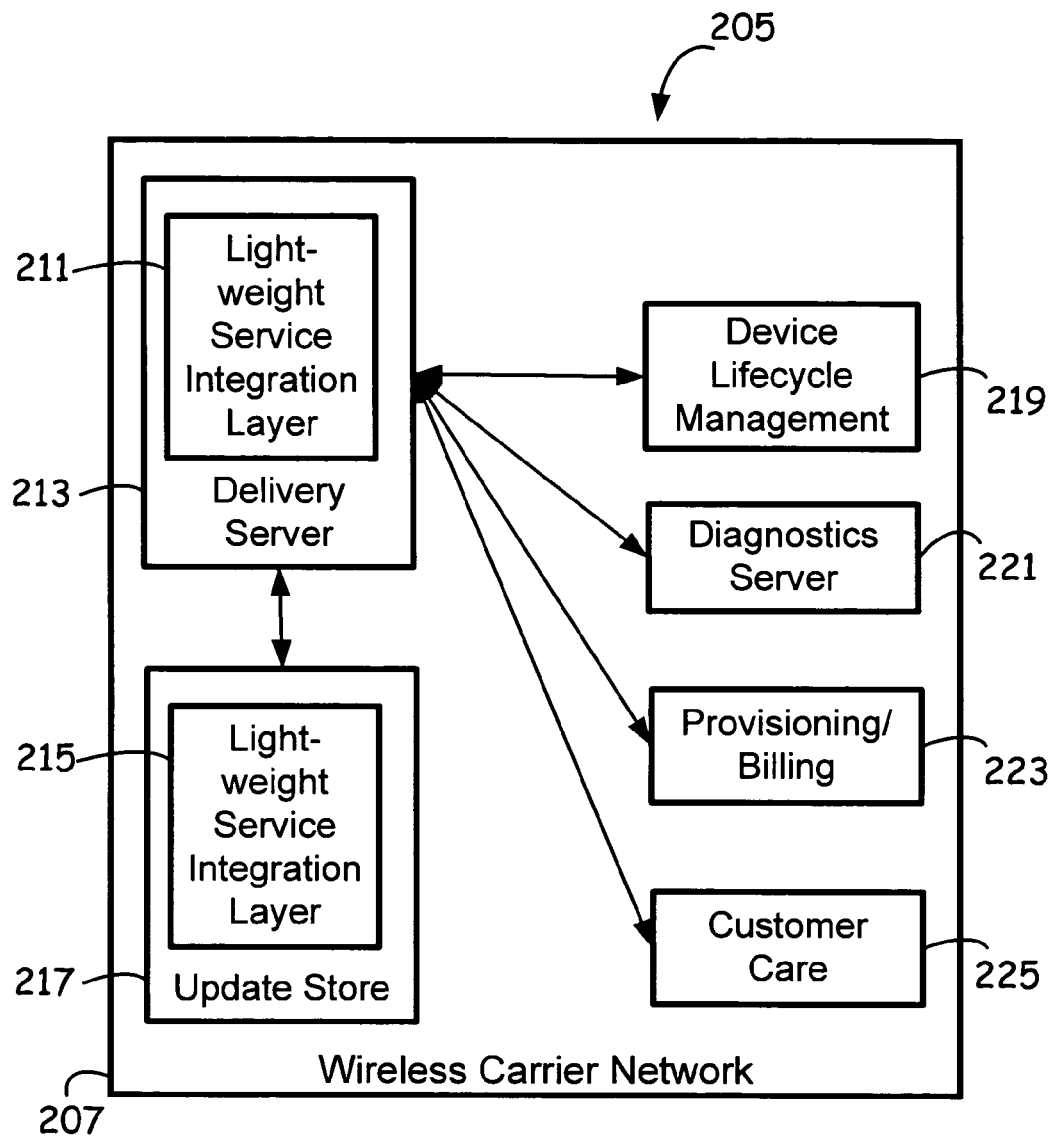
FIG. 2 is a block diagram illustrating an exemplary wireless carrier network facilitating lifecycle management of firmware and software in electronic devices according to an embodiment of the present invention.

FIG. 2 is a block diagram illustrating an exemplary wireless carrier network 205 facilitating lifecycle management of firmware and software in electronic devices according to an embodiment of the present invention. The wireless carrier network 205 may be adapted to facilitate lifecycle management of firmware and software in electronic devices by employing light-weight service integration layers 211, 215 in delivery server 213 and update store server 217, respectively. The lightweight service integration layers 211, 215 may be adapted to integrate different service features providing lifecycle management services.

The wireless carrier network 205 may make available service features supported by device lifecycle management server 219, diagnostics server 221, provisioning/billing server 223, and customer care server 225, via the lightweight service integration layers 211, 215. For example, the lightweight service integration layers 211, 215 may be employed by the delivery server 213 and the update store server 217, respectively, in accessing services provided by device lifecycle management server 219, diagnostics server 221, provisioning/billing server 223, and customer care server 225.

In an embodiment according to the present invention, the light-weight service integration layers 211, 215 may provide simple object access protocol (SOAP) and extensible markup language (XML)-based connectivity to the service features (service interface) supported by the device lifecycle management server 219, the diagnostics server 221, the provisioning/billing server 223, and the customer care server 225. The light-weight service integration layers 211, 215 may provide an XML and hypertext transfer protocol (http)-based interface to functions or commands provided by the device lifecycle management server 219, the diagnostics server 221, the provisioning/billing server 223, and the customer care server 225.

In an embodiment according to the present invention, specific functions and/or commands provided by, for example, the delivery server 213 or the update store server 217 may be translated into a sequence of interactions (SOAP or http-based). These interactions may be with one or more additional servers such as, for example, device lifecycle management server 219, the diagnostics server 221, the provisioning/billing server 223, and the customer care server 225.

Figure 3:
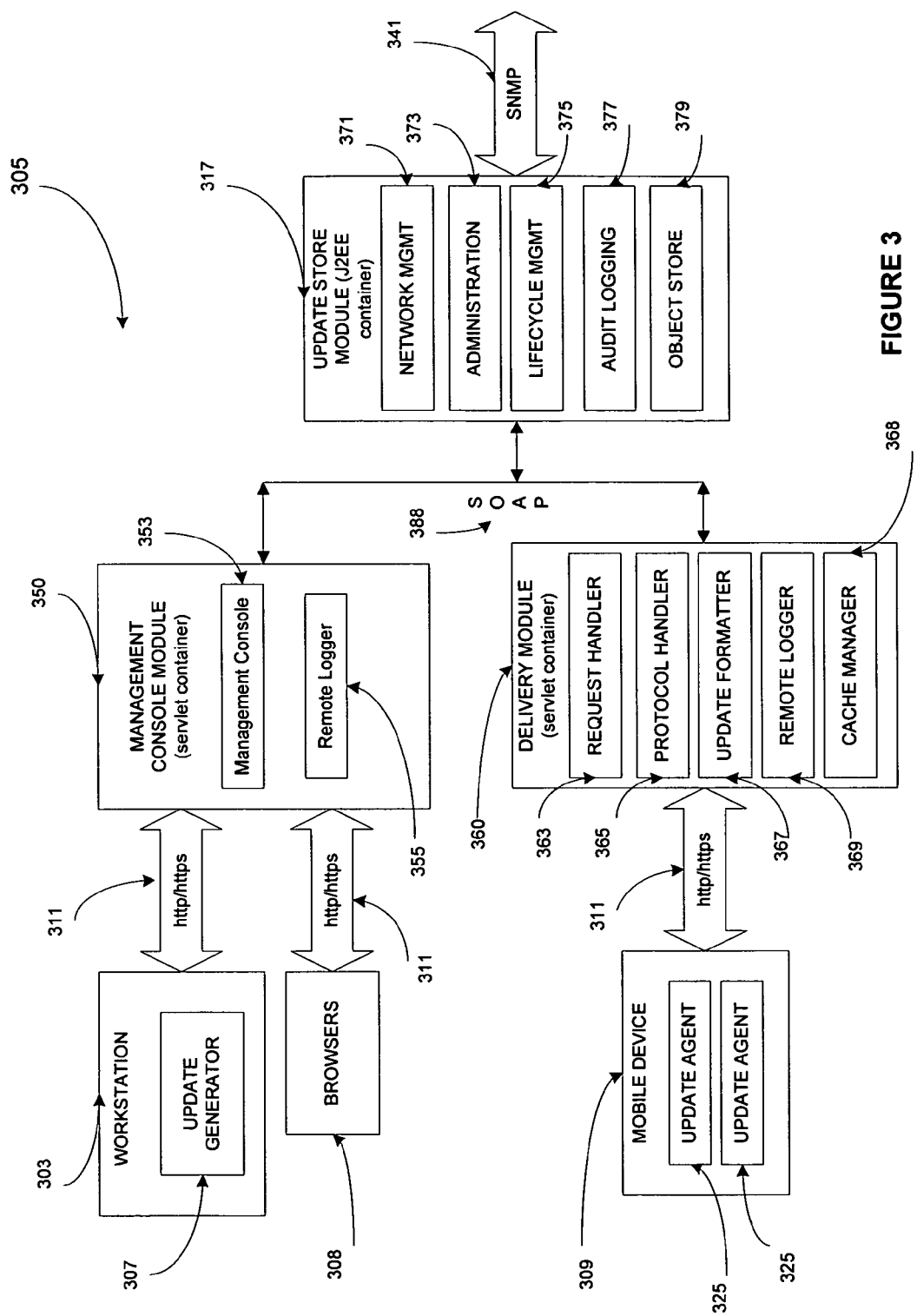
FIG. 3 is a block diagram illustrating an exemplary server deployment system according to an embodiment of the present invention.

An update management system for electronic devices in an electronic device network, according to an embodiment of the present invention, may comprise an update store server 217. The update store server 217 may be adapted to store, manage, and distribute user-defined-rules, update packages, and associated update package files. The update store server 217 may be managed via a user friendly, web-based interface through a management console module. In addition to update package management related tasks, the update store server 217 may be adapted to facilitate user management, transition logging, audit logging, system logging, and system administration features in a carrier network server component, as illustrated in FIG. 2. The update store server 217 may also be a part of the update management system. The locations of where the modules may logically be deployed are illustrated in FIG. 3, as described below. For example, a plurality of update store modules may reside in a J2EE application server in a single computer, or the modules may be deployed in hardware of a respective electronic device.

Aspects of the present invention may be found in an update store adapted for use with an update package generator in an electronic device network. The update store may also be associated with an update management system.

Aspects of the present invention may also be found in an update store module associated with an update management system. The update store module may be adapted to store, manage (via user-defined-rules), and distribute update packages to a plurality of electronic devices associated with an electronic device network. The update store module may be managed via a user-friendly, web-based interface through a management console module. The update store may also be capable of facilitating user management, logging/auditing, and system administration features in a plurality of carrier network server components.

A version is an identification attached to a firmware/software image. The identification may be alphabetical, numeric, and/or descriptive in some other way.

An SNMP agent may comprise processes facilitating interfaces between electronic devices and the network. The SNMP agent may be adapted to respond to requests from an SNMP manager and send event notifications, for example.

The Java 2 Enterprise Edition (J2EE) environment may provide a rich set of features for software developers, including object oriented messaging, web services, database access and management. J2EE application servers may also provide a container for applications written within the J2EE framework.

Java Data-Base Connectivity (JDBC) may comprise a J2EE application program interface (API) adapted to provide consistent access to databases from various vendors.

An SNMP manager may comprise a console that an end-user may use to query managed objects from the SNMP agent.

A management information base (MIB) may comprise a collection of managed objects residing in a virtual information store. The MIB may also be part of the SNMP manager.

The structure of management information (SMI) may also be a part of the SNMP manager and may comprise a structure used for describing and naming objects.

FIG. 3 is a block diagram illustrating an exemplary server deployment system 305 according to an embodiment of the present invention. FIG. 3 illustrates where the system modules may logically be deployed. A plurality of update store modules, for example, update store module 317, may reside in a J2EE (container) application server in a single computer, or the update store modules may be deployed in the hardware of a respective electronic device.

The update store module 317 may comprise an administration module 373, a network management module 371, a lifecycle management module 375, an audit logging module 377, and an object store module 379. The update store module 317 may use the simple object access protocol 1.1(SOAP 1.1) 388 to interface with other system components. Additionally, the update store module 317 may also follow the SNMP standards 341 for system management of configurations and alarms, and for interfacing with additional system components.

FIG. 3 also illustrates an exemplary configuration where modules may be logically deployed according to an embodiment of the present invention. The modules may be in the same J2EE application server in one computer, or may be deployed in a corresponding hardware device.

The update store module 317 may be implemented using the Java 2 Enterprise Edition (J2EE) and/or other server-side frameworks, such as for example:

J2EE framework may comprise Enterprise Java Beans 1.1 (EJB 1.1), a Java applet that runs within a web server environment, such as, servlet 2.3, Java Server Pages 1.1 (JSP 1.1), Java Database Connectivity 2.0 (JDBC 2.0), Java API for XML Processing 1.2 (JAXP 1.2), Java Message Service API 1.1 (JMS 1.1), and Java Server Faces 1.0 (JSF 1.0);

Javasoft Extensions (JAVAX) such as Java Data Objects 1.0 (JDO 1.0), Java management Extensions 1.0 (JMX 1.0), and Java Secure Socket Extension (JSSE);

Apache Jakarta Project such as Struts, and log4J debugging tools, and other Apache Projects such as Xerces, Xalan, and Ant; and other frameworks such as Java document object model (JDOM), a Java-based solution for accessing, manipulating and outputting extensible markup language (XML), and generic language universal environment (GLUE).

The update store module 317 may be extensible through interfaces by leveraging server-side application frameworks. Additionally, services provided by the update store module 317 may apply industry standard interfaces to maximize the ease of integration into/between existing systems and third-party systems. The update store module 317 may also support the SOAP 1.1 protocol 388 as a remote procedure call interface for public system services.

A management console module 350 comprising a management console 353 may manage the user interfaces to the update store module 317. The management console module 350 may also comprise a remote logger 355 for monitoring and logging electronic device activity and network activity.

The update management system 305 may be scalable in order to support hundreds to thousands or millions of electronic devices, such as mobile device 309, for example. In a high-volume production environment, delivery modules, such as delivery module 360, may be adapted to be session-clustered to handle update package requests and responses from the numerous electronic devices, such as, mobile device 309. Behind the plurality of delivery modules, such as delivery module 360, there may be another cluster of update store modules, such as, update store module 317. By using J2EE containers and network load balancing solutions, both the delivery module 360 and the update store module 317, or clusters thereof, may be adapted to provide both fault-tolerant operation modes and scalable performance.

The update store module 317 may offer a plurality of security mechanisms to protect electronic device components and leverage the application servers' runtime security policies. The update store module 317 may also support basic authentication and encryption passwords.

For example, the management console 353, a component of management console module 350, may require a valid pair of a username and a password to access a particular application. Definition and management of usernames and passwords may be managed through management console 353. The only interface that may involve further access control is the update store 317. The customer may be expected to setup a lightweight directory access protocol (LDAP) repository that will control access to the update store 317. This access control may apply to users of the management console 353, users of the update generator 307 when attempting to communicate with the Application Server, and anyone that directly accesses the update store 317. The update store 317 may comprise a license key that may be used during software/firmware installation. The installing server device may also require a valid license key before installation can take place.

To secure a channel, the update generator 307 deployed in a workstation 303 or other network device and/or browser(s) 308 may be adapted to use a secure socket layer (SSL) to encrypt server communication. The SSL protocol may provide verification of the update store module (317) server identity and integrity of exchanged conversations from modification and interception. The workstation 303 and/or browsers 308 may be adapted to communicate with the management console module 350, and the rest of the electronic device network 305 via hypertext transfer protocol(s) (http) 311. http is the protocol used for moving hypertext files across the Internet. http requires an http client program on one end and an http server program on the other end of a communication link.

Similarly, SSL may be used for communications between a delivery module 360, or cluster thereof, and the update store module 317, or cluster thereof. The delivery module 360 may comprise a request handler module 363, a protocol handler module 365, an update formatter module 367, a remote logger module 369, and a cache manager module 368. Additional security mechanisms may also be applied by a networking layer's router or firewall to restrict access to the update store module(s) 317 to a fixed, known, and/or predetermined list of respective delivery module(s) 360.

SSL or other networking security, including a virtual private network (VPN), may be used to ensure valid access to the update store module(s) 317 from third-party delivery/device management servers.

With a distributed solution, the update store module 317 may act as a content server component together with a $3^{rd}$ party device management solution.

Figure 4:
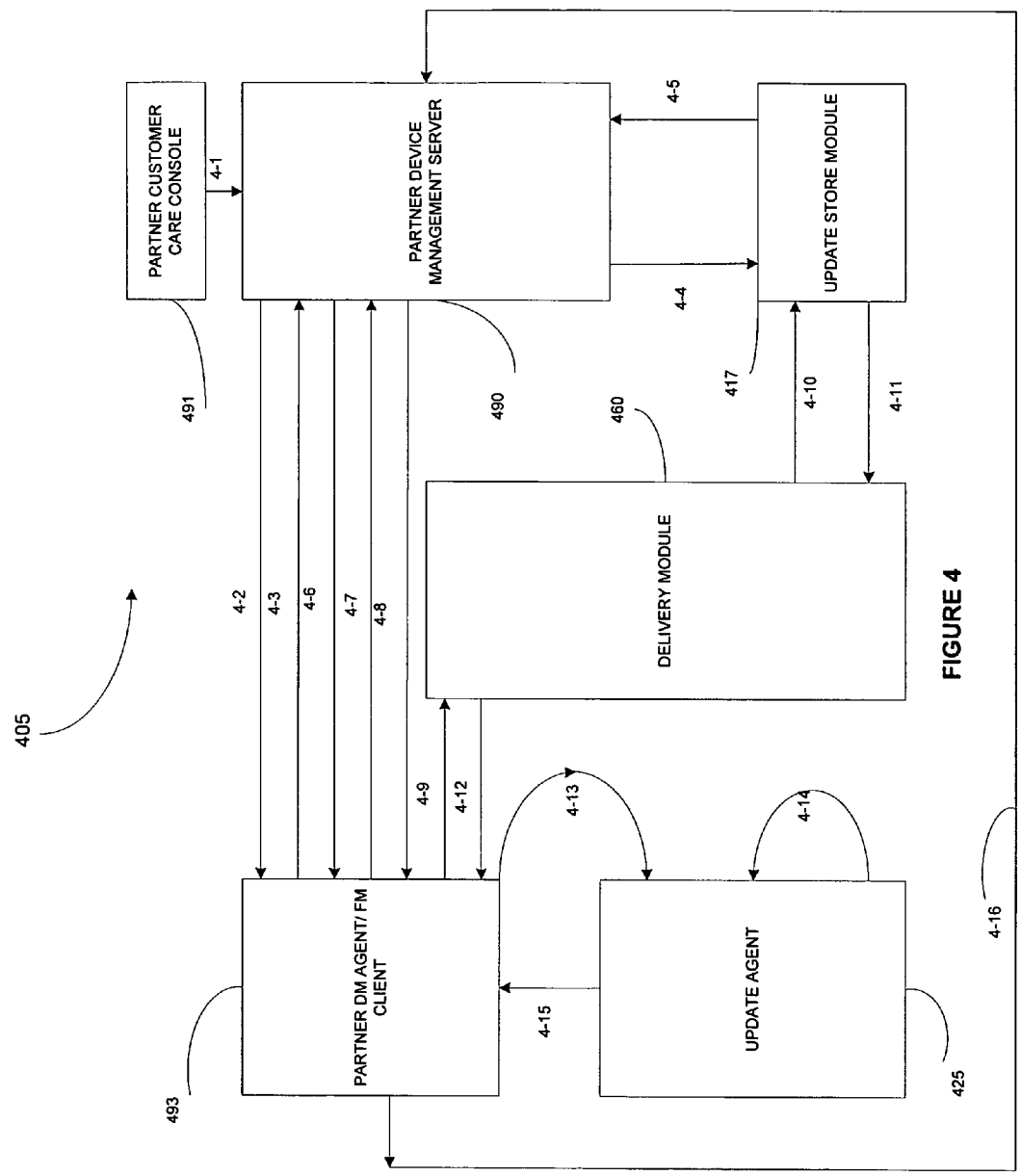
FIG. 4 is a flow diagram illustrating an exemplary commercial deployment method for a distributed solution according to an embodiment of the present invention.

FIG. 4 is data flow diagram illustrating an exemplary commercial deployment method 405 for a distributed electronic device network solution according to an embodiment of the present invention. According to an embodiment of the present invention, a partner customer care console (PCCC) 491 may be adapted to send an update notification (4-1) to a partner device management server (PDMS) 490. The PDMS 490 may be adapted to push the update notification (4-2) to the partner device management (DM) agent/firmware management (FM) client (PDM/FM) 493. The PDM/FM 493 may be adapted to respond by sending electronic device profile information and end-user subscriber information (4-3) to the PDMS 490. The PDMS 490 may be adapted to request update package information (4-4) from the update store module 417. The update store module 417 may be adapted to respond to the information request by returning/transmitting the requested update package information (4-5) to the PDMS 490.

The PDMS 490 may be adapted to transmit the update package information (4-6) to the PDM/FM 493 wherein the PDM/FM 493 may be adapted to transmit a confirmation of the update package requested (4-7) associated with the transmitted update package information to the PDMS 490. The PDMS 490 may be adapted to transmit the universal resource locator (URL) (i.e., server location) of the update package (4-8) to the PDM/FM 493.

The PDM/FM 493 may transmit the electronic device profile information (4-9) to the delivery module 460. The delivery module 460 may request the update package (4-10) from the update store module 417, wherein the update store module 417 may respond by transmitting the update package (4-11) to the delivery module 460. The delivery module 460 may download the requested update package (4-12) to the PDM/FM 493.

The PDM/FM 493 may transmit the update package (4-13) whole or in parts to the update agent 425, wherein the update agent 425 may facilitate and perform the update/upgrade (4-14) on the electronic device'(s) software/firmware. The update agent 425 may respond by transmitting confirmation of update package completion (4-15) to the PDM/FM 493. The PDM/FM 493 may transmit a confirmation that the update is complete (4-16) to the PDMS 490.

Exemplary functions of the update store module 417 may comprise responding to update package information requests using an update package descriptor file (not shown); responding to update package information requests coming from delivery module 460 with an update package; auditing a trail/log consolidator for all of the plurality of delivery module(s) 460; and centralizing management via a management console of a cluster of electronic device components.

Exemplary functions of the delivery module 460 may comprise scalable deployment via a plurality of delivery module(s) 460 to manage large numbers of update package information requests from a plurality of mobile electronic device clients; retrieving requested update packages from a cache or the update store module 417, and delivering update packages to the plurality of client' electronic devices using the appropriate corresponding protocol and data format.

Functions of the $3^{rd}$ party device management server, for example, PDMS 490, may comprise managing subscriber/device information; initiating (short message service (SMS), wireless application protocol (WAP) push) an update process from a customer care console or batch process; and tracking successful update notification messages.

The embedded solution may be different from the distributed solution because the delivery module 460 may be embedded in the $3^{rd}$ party device management/delivery server solution.

Figure 5:
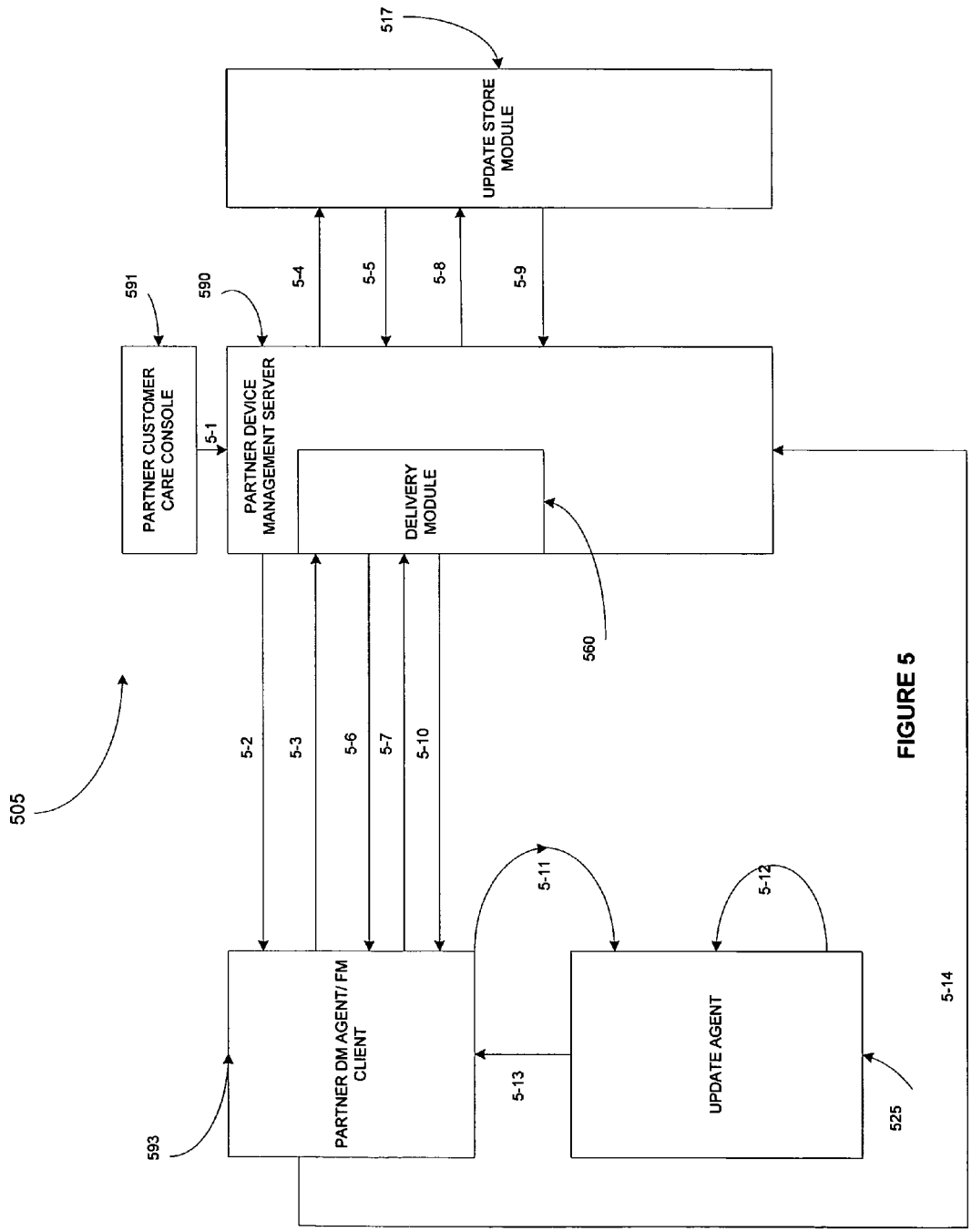
FIG. 5 is a flow diagram illustrating an exemplary commercial deployment method of an embedded solution according to an embodiment of the present invention.

FIG. 5 is a data flow diagram illustrating an exemplary commercial deployment method 505 of an embedded electronic device firmware/software update solution according to an embodiment of the present invention. According to an embodiment of the present invention, a partner customer care console (PCCC) 591 may be adapted to send an update notification (5-1) to a partner device management server (PDMS) 590. The PDMS 590 may be adapted to push the update notification (5-2) to the partner DM agent/FM client (PDM/FM) 593. The PDM/FM 593 may be adapted to respond with electronic device profile information and end-user subscriber information (5-3) to a delivery module 560 embedded in the PDMS 590. The PDMS 590 may be adapted to request update package information (5-4) from the update store module 517. The update store module 517 may be adapted to respond to the information request by returning/transmitting the requested update package information (5-5) to the PDMS 590.

The delivery module 560 embedded in the PDMS 590 may be adapted to transmit the update package information (5-6) to the PDM/FM 593, wherein the PDM/FM 593 may be adapted to transmit a confirmation of the update package requested (5-7) associated with the transmitted update package information to the delivery module 560 embedded in the PDMS 590. The PDMS 590 may request the update package (5-8) from the update store module 517, wherein the update store module 517 may respond by transmitting the update package (5-9) to the PDMS 590. The delivery module 560 embedded in the PDMS 590 may download the requested update package (5-10) to the PDM/FM 593.

The PDM/FM 593 may transmit the update package (5-11) in whole or in parts to the update agent 525, wherein the update agent 525 may facilitate and perform the update/upgrade (5-12) on the electronic device'(s) software/firmware. The update agent 525 may respond by transmitting confirmation of update package completion (5-13) to the PDM/FM 593. The PDM/FM 593 may transmit a confirmation that the update is complete (5-14) to the PDMS 590.

Exemplary functions of the update store module 517 may comprise responding to a plurality of update package information requests using an update package descriptor file; respond to update package requests; and centralize management via a management console for a cluster of update store module(s) 517.

Functions of the 3$^{rd}$ party device management server, for example, PDMS 590, may comprise:

managing subscriber/device information;

initiating (short message service (SMS), wireless application protocol (WAP) push) the update process from a customer care console, for example, PCCC 591, or a batch process;

handling large numbers of update package requests from a plurality of mobile electronic device clients;

retrieving requested update packages from a cache or the update store module(s) 517;

delivering update package using the appropriate protocol and data format to the plurality of client electronic devices; and tracking successful update notifications.

Figure 6:
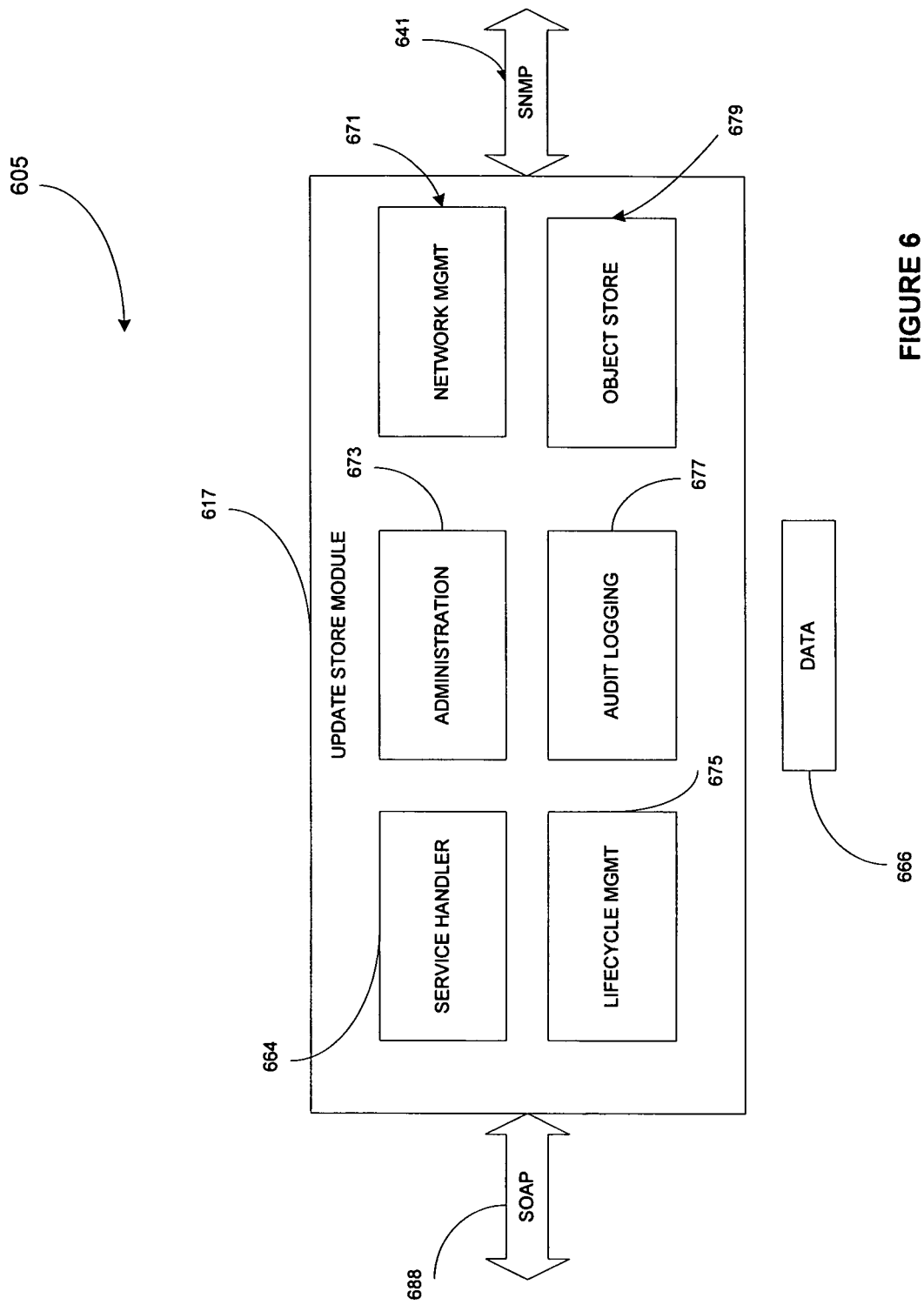
FIG. 6 is a block diagram illustrating a plurality of submodules in an exemplary update store module according to an embodiment of the present invention.

FIG. 6 is a block diagram 605 illustrating a plurality of exemplary update store module 617 components that may correspond, for example, to the update store module 517 illustrated in FIG. 5, according to an embodiment of the present invention.

In order to meet the extensibility needs for the update store module 617, the update store module 617 may be designed to be modular. The update store module 617 according to an embodiment of the present invention may comprise at least the following software components:

a service handler module 664;

simple object access protocol (SOAP) communication layer 688, that may correspond, for example, to the SOAP communication layer 388 illustrated in FIG. 3, to handle service requests from a management console, a delivery module, and/or a 3$^{rd}$ Party software;

a lifecycle management module 675 for managing the lifecycle of update packages including subscriber groups;

an administration module 673 for managing users, roles, access rights, and download groups;

an audit-logging module 677 for managing transaction, audit, and system logging activities;

a network management module 671 for managing network functions and processes, for example;

a simple network management protocol (SNMP) communication configuration 641 for the update store module; and an object store module 679 for storing object relational mapping and persistence layer information.

The update store module 617 may also have one or a plurality of associated data storage memory device(s) 666, either externally or internally configured therewith.

Figure 7:
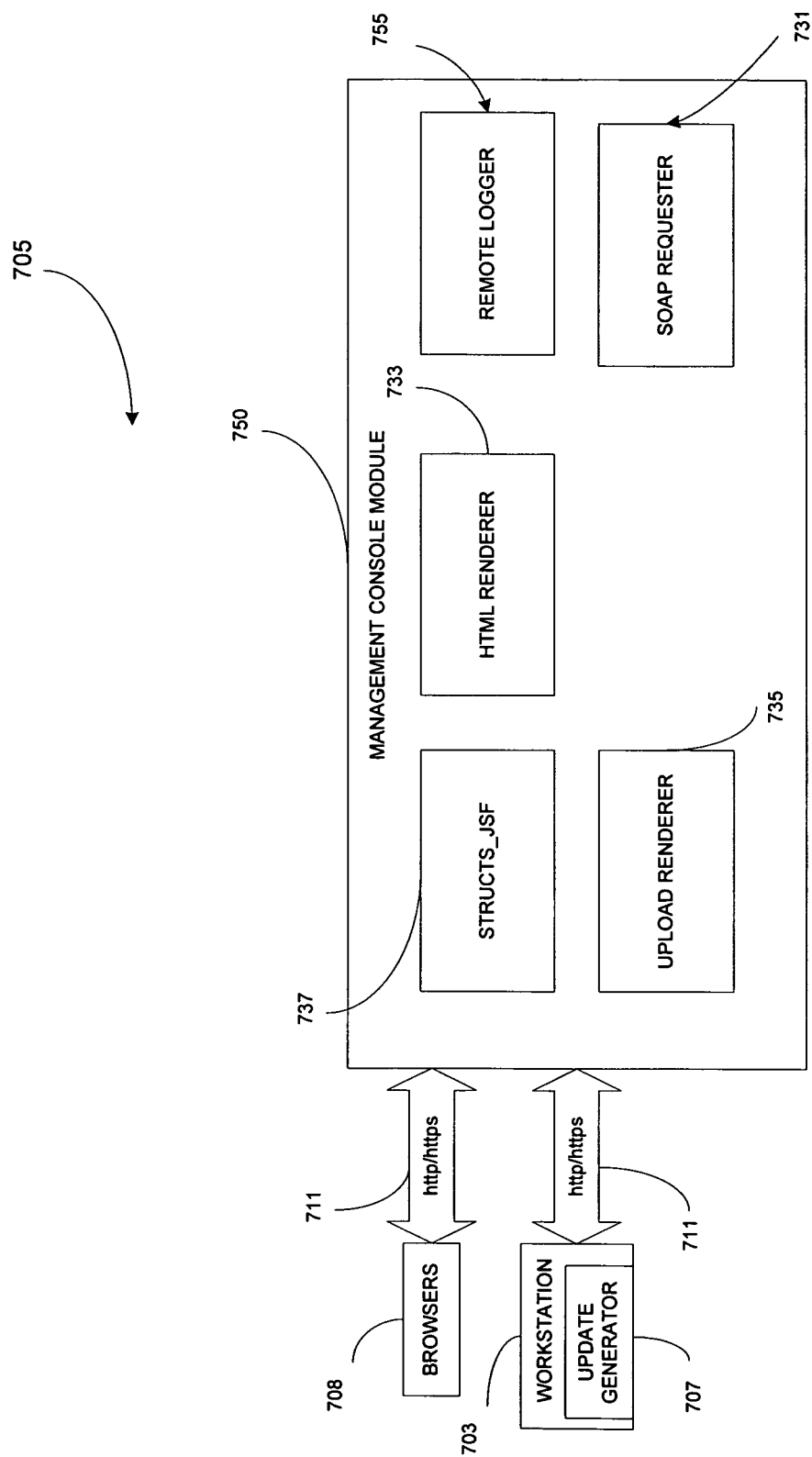
FIG. 7 is a block diagram illustrating an exemplary management console module in an electronic device network according to an embodiment of the present invention.

FIG. 7 is a block diagram 705 illustrating an exemplary management console module 750, that may correspond, for example, to the management console module 350 illustrated in FIG. 3, according to an embodiment of the present invention. The management console module 750 may comprise a remote logger module 755, a SOAP requester module 731, an html renderer module 733, an upload renderer module 735 and a structs_jsf module 737.

Administrative tasks undertaken during daily operation of the update management system, such as for example, the update management system illustrated in FIG. 3 may be done via hypertext markup language (HTML) pages using a web browser with or without secure socket layer (SSL) (56 or 128-bits) encryption. The HTML pages may minimize use of proprietary extensions or tags to ensure compatibility with older browser versions or different browser software.

The management console module 750 may be adapted to communicate with a plurality of browsers 708 and a plurality of workstations 703. Each of the workstations 703 may comprise an update package generator 707. The browsers 708 and the workstations 703 may communicate with the management console module 750 via hypertext transfer protocol(s) (http/https) 711. https is the secure version of http. http is the protocol used for moving hypertext files across the Internet, for example. http ordinarily requires an http client program on one end and an http server program on the other end of a communication link. The management console module 750 may be a web application running in a servlet container.

Figure 8:
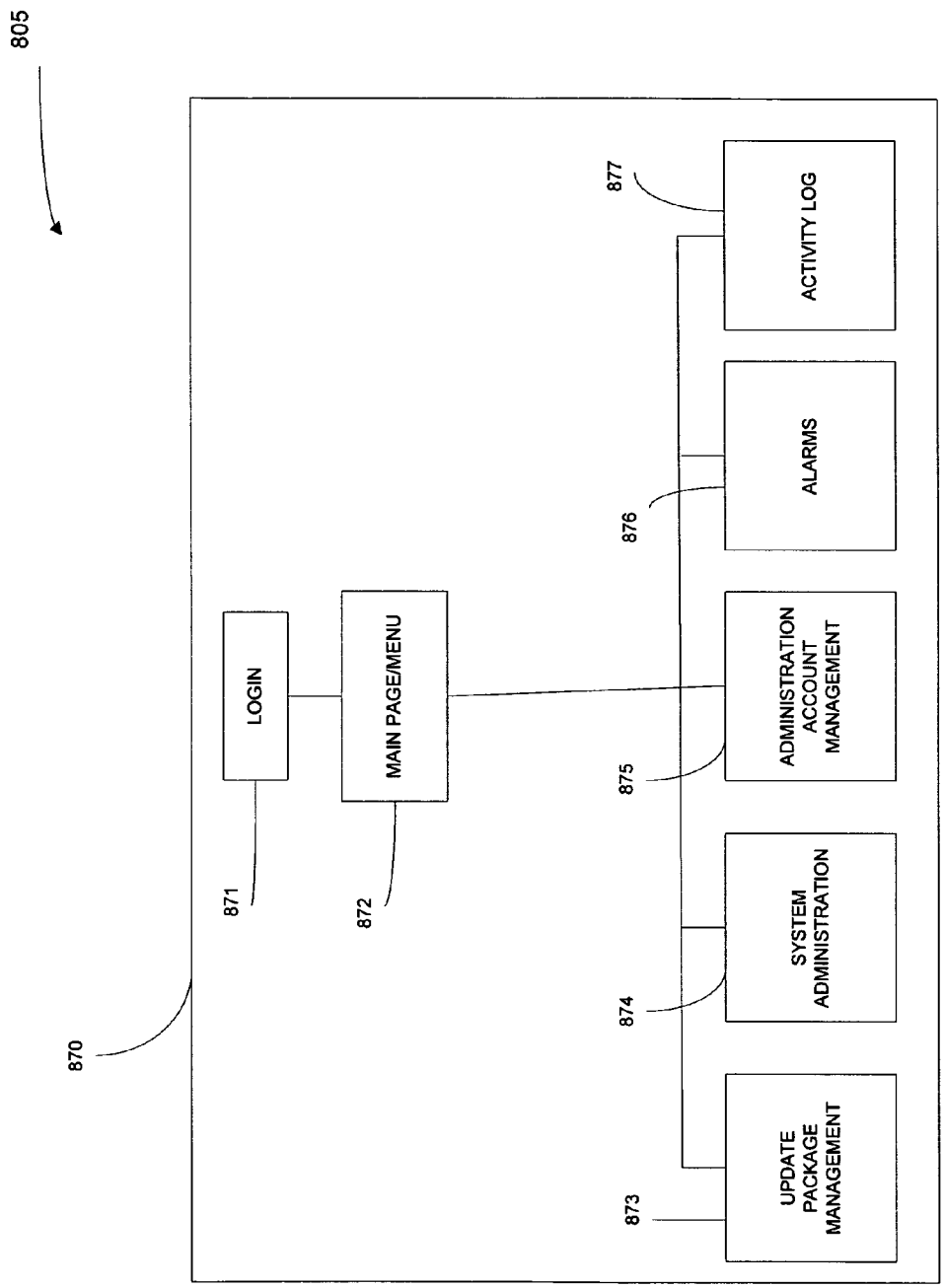
FIG. 8 is a block diagram illustrating an exemplary site structure in an electronic device network according to an embodiment of the present invention.

FIG. 8 is a block diagram 805 illustrating an exemplary management site structure 870 for a user-friendly customer/end-user interface in an electronic device network according to an embodiment of the present invention. The site structure 870 may comprise a login screen 871 where a user name and password may be entered permitting access to the rest of the site. The site structure 870 may also comprise a main page/menu screen 872. The main page/menu screen 872 may provide a portal to a plurality of other information screens such as, for example, an update package management screen 873, a system administration screen, 874, an administration account management screen 875, an alarms screen 876, and an activity log screen 877. The above screens are exemplary and additional and other screens may be provided.

Figure 9:
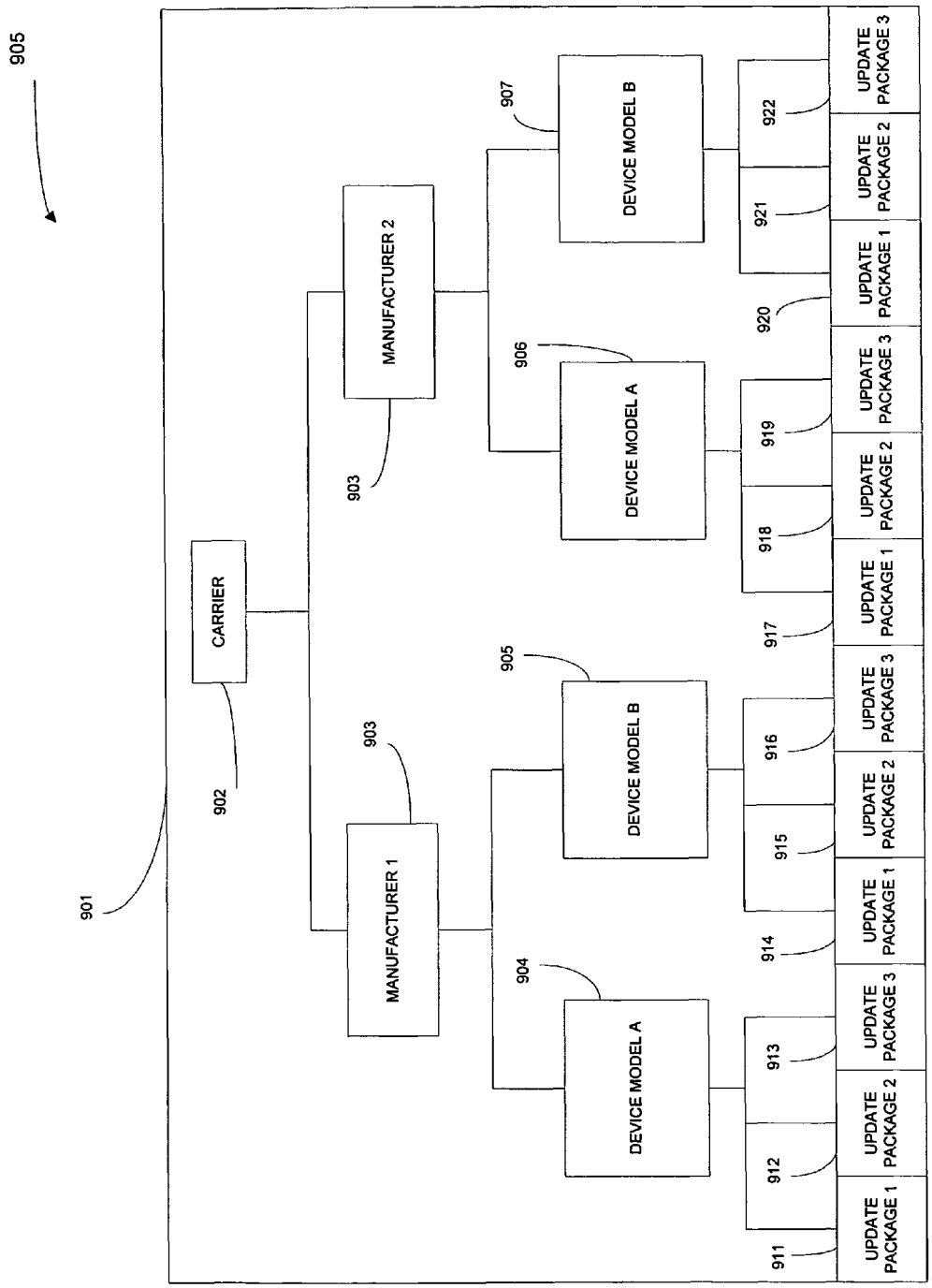
FIG. 9 is a block diagram illustrating an exemplary update package user interface structure in an electronic device network according to an embodiment of the present invention.

FIG. 9 is a block diagram 905 illustrating an exemplary update package, electronic device, manufacturer, and carrier hierarchy 901 for an electronic device network according to an embodiment of the present invention. Update packages, such as update packages 911-922, as illustrated in FIG. 9, may be stored in a hierarchical structure based upon an electronic device model and manufacturer update package-storing schema. FIG. 9 illustrates one way that an update store, such as for example, update store 317 illustrated in FIG. 3, may be organized in an embodiment according to the present invention. In FIG. 9, the carrier electronic device network 902 may also own the update environment.

In an embodiment according to the present invention, the carrier electronic device network 902 may comprise the top rung of the hierarchy 901, and a plurality of different carriers may be adapted to apply a similar hierarchy.

Below the carrier electronic device network 902, a plurality of manufacturers, such as for example, manufacturers 1 and 2 903 may be organized. In FIG. 9, manufacturer 1 and manufacturer 2 are illustrated, for example. Although only two electronic device manufacturers 903 are shown in FIG. 9, the update package hierarchical structure may comprise a plurality of electronic device manufacturers 903. Below the respective device manufacturers 903, the respective device models 904-907 are illustrated. For example, under manufacturer 1, there are illustrated in FIG. 9, device model A 904 and device model B 905 and under manufacturer 2, there are illustrated, device model A 906 and device model B 907. Again, although only two electronic device models are illustrated for each respective electronic device manufacturer 903 in FIG. 9, the update package hierarchical structure may comprise a plurality of device models for each respective electronic device manufacturer.

Each device model may be associated with a particular collection of update packages. For example, as illustrated in FIG. 9, under model A 904 (manufacturer 1) update packages 1-3 (911-913) are illustrated, under device model B 905 (manufacturer 1) update packages 1-3 (914-916) are illustrated, under model A 906 (manufacturer 2) update packages 1-3 (917-919) are illustrated, and under device model B 907 (manufacturer 2) update packages 1-3 (920-922) are illustrated. Again, although only three update packages for each respective device model are shown in FIG. 9, a plurality of update packages may comprise the update package hierarchical structure.

Figure 10:
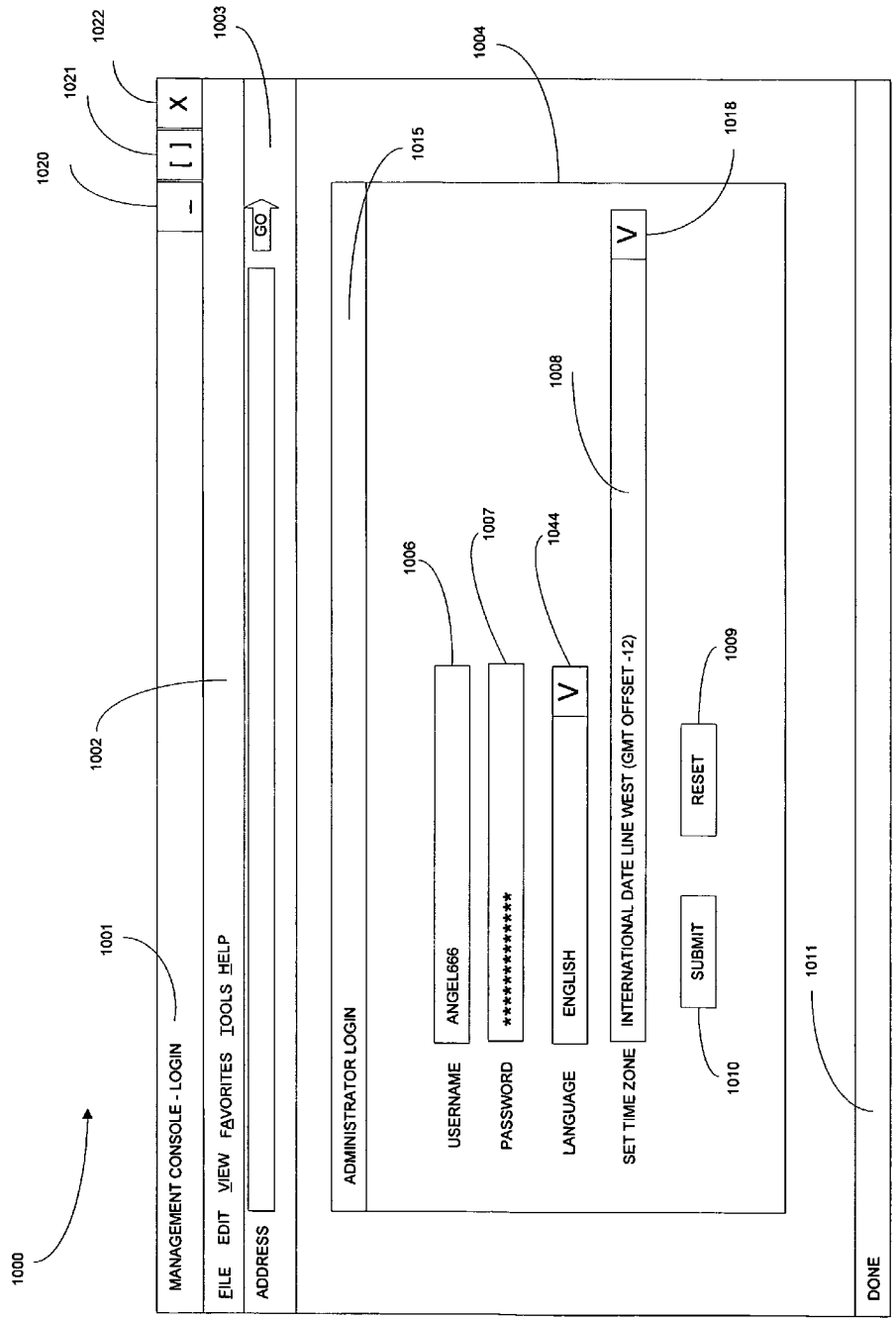
FIG. 10 is a block diagram illustrating an exemplary management console login screen displayable on an electronic device according to an embodiment of the present invention.

FIG. 10 is an illustration of an exemplary management console login screen 1000 according to an embodiment of the present invention. Authentication to an update store module, such as for example, update store 129A illustrated in FIG. 1A, may be managed through a management console login function 1001. When a user first accesses the management console 1001, or whenever a timeout period has been reached, the user may be directed to the login page 1000 and the login process.

The login screen 1000 may comprise an administrator login window 1004 for administrator login 1015 comprising the following prompts or entries: a username or a case sensitive username 1006, a password or a case sensitive password 1007, a set time zone function 1008 and a set time zone button 1018 adapted to provide a predefined list of selectable supported time zones, and a set language button 1044 adapted to provide a predefined list of selectable supported languages. The login screen 1000 may also comprise a submit button 1010 and a reset button 1009. The login screen 1000 may also comprise a title bar 1001, a navigational toolbar 1002, a maximize/minimize button 1020, a maximize screen/restore screen button 1021, and an exit program button 1022. The login screen 1000 may also comprise an Internet address entry toolbar 1003 and a task progress bar 1011.

Management of username(s) 1006 and password(s) 1007 may be carried out from an Administration/Admin Account screen. By default, installation of the update store module, such as for example, update sore module 129A illustrated in FIG. 1A, may create a system administrator initially having username "administrator" and password "administrator" (all typed in small letters). It should be noted that the update store module may also be integrated with generic lightweight directory access protocol (LDAP) servers (not shown) in an embodiment according to the present invention.

Figure 11:
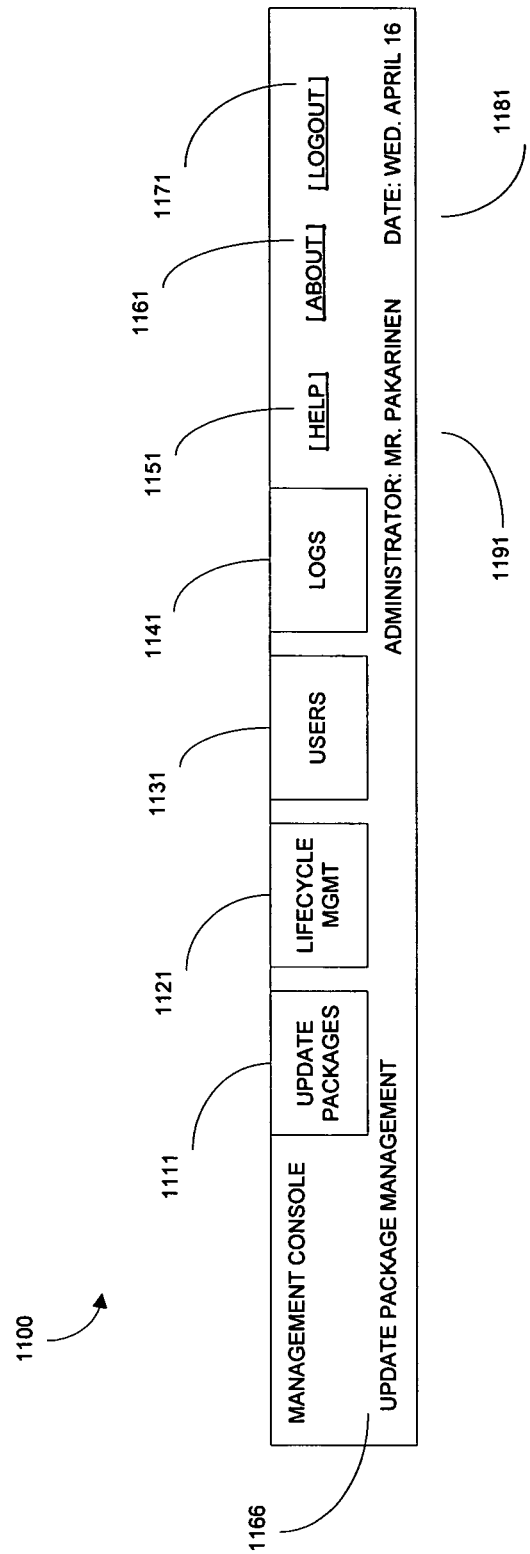
FIG. 11 is a block diagram illustrating an exemplary management console header frame according to an embodiment of the present invention.

FIG. 11 is an illustration of an exemplary management console header frame 1100 according to an embodiment of the present invention. The management console header frame 1100 illustrated in FIG. 11 may be a component of each screen in the management console. In FIG. 11, the management console header frame 1100 is shown in the update package management mode 1166, for example. The management console header frame 1100 may have a tab-based structure. The header frame 1100 may comprise functions or applications divided into the following categories activated by tabs or buttons, for example, an update packages tab 1111 comprising update package management features; a lifecycle management tab 1121 comprising defining rules for lifecycle management; a users tab 1131 comprising user management features including user information, user access rights, and user download group management; and a logs tab 1141 comprising a logging management feature including transaction-logs, audit-logs, and system-logs.

In addition to the above mentioned tabs, the header may also include links for help 1151 to an HTML-based help system bundled into the management console, an about link 1161 linking to an about screen, and a logout link 1171 permitting users to log out.

The default screen for an end-user may be an update package management screen, such as for example, the screen illustrated in FIG. 12, below for example. The current user's name 1191 and the current date/time 1181 may be displayed in the management console header frame 1100 according to an embodiment of the present invention.

Figure 12:
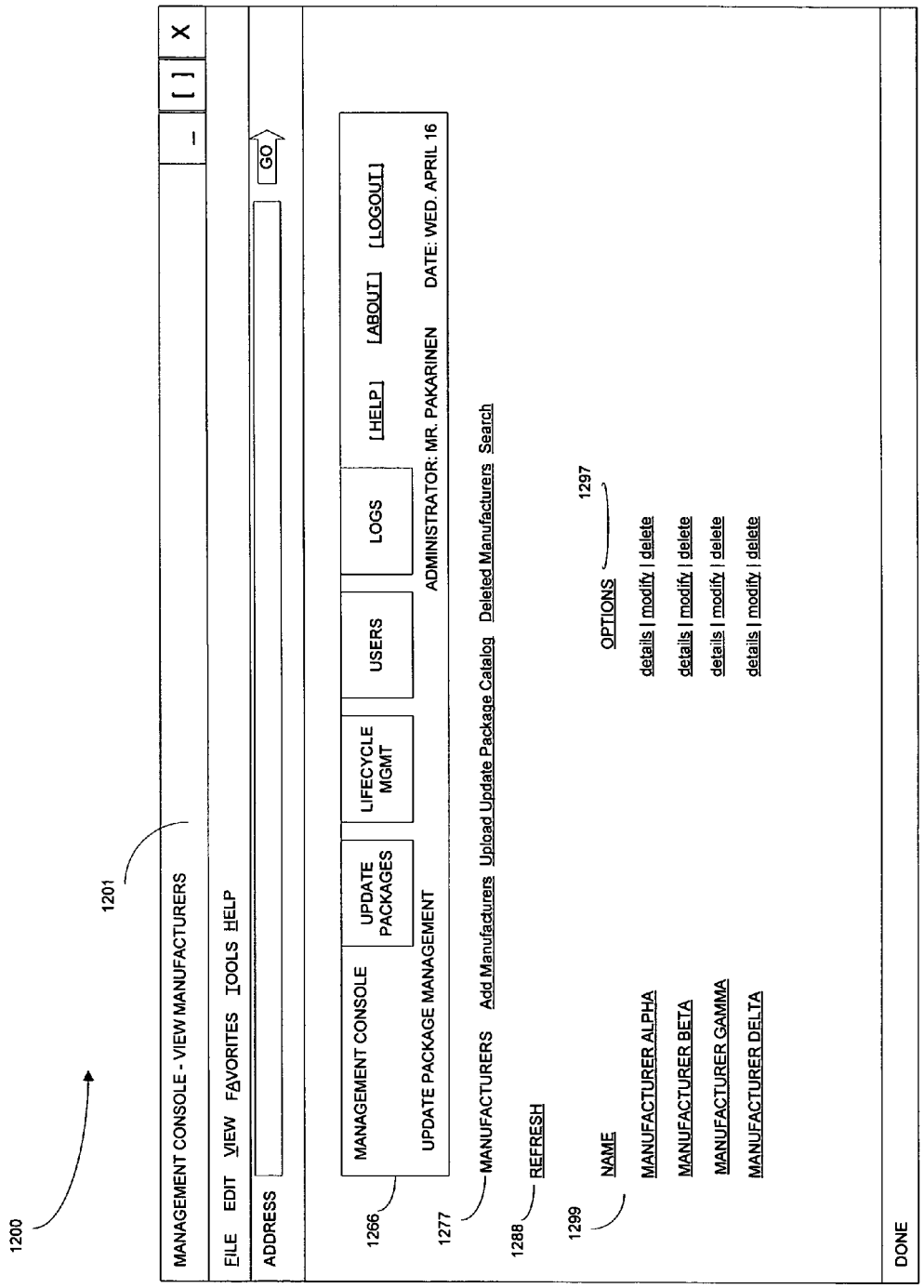
FIG. 12 is a block diagram illustrating an exemplary management console main screen displayable on an electronic device according to an embodiment of the present invention.

FIG. 12 is an illustration of an exemplary management console view manufacturers screen 1200 according to an embodiment of the present invention. The screen 1200 may comprise a program identification bar 1201 identifying which portion of the module the user is in. The screen 1200 may also comprise a management console header frame 1266 that may correspond, for example, to the management console header 1100 illustrated in FIG. 11. In the view manufacturers screen 1200, as illustrated in FIG. 12, a user may be enabled to select from a row of functions 1277 comprising manufacturers, add manufacturers, upload update package catalog, view deleted manufacturers, and search for manufacturers. The user may also select to refresh 1288 the screen 1200 to show new or modified information. The view manufacturers screen 1200 may comprise a plurality of manufacturers listed by name 1299. A plurality of options 1297 may be associated with each manufacturer name, such as for example, details, modify, and delete.

Figure 13:
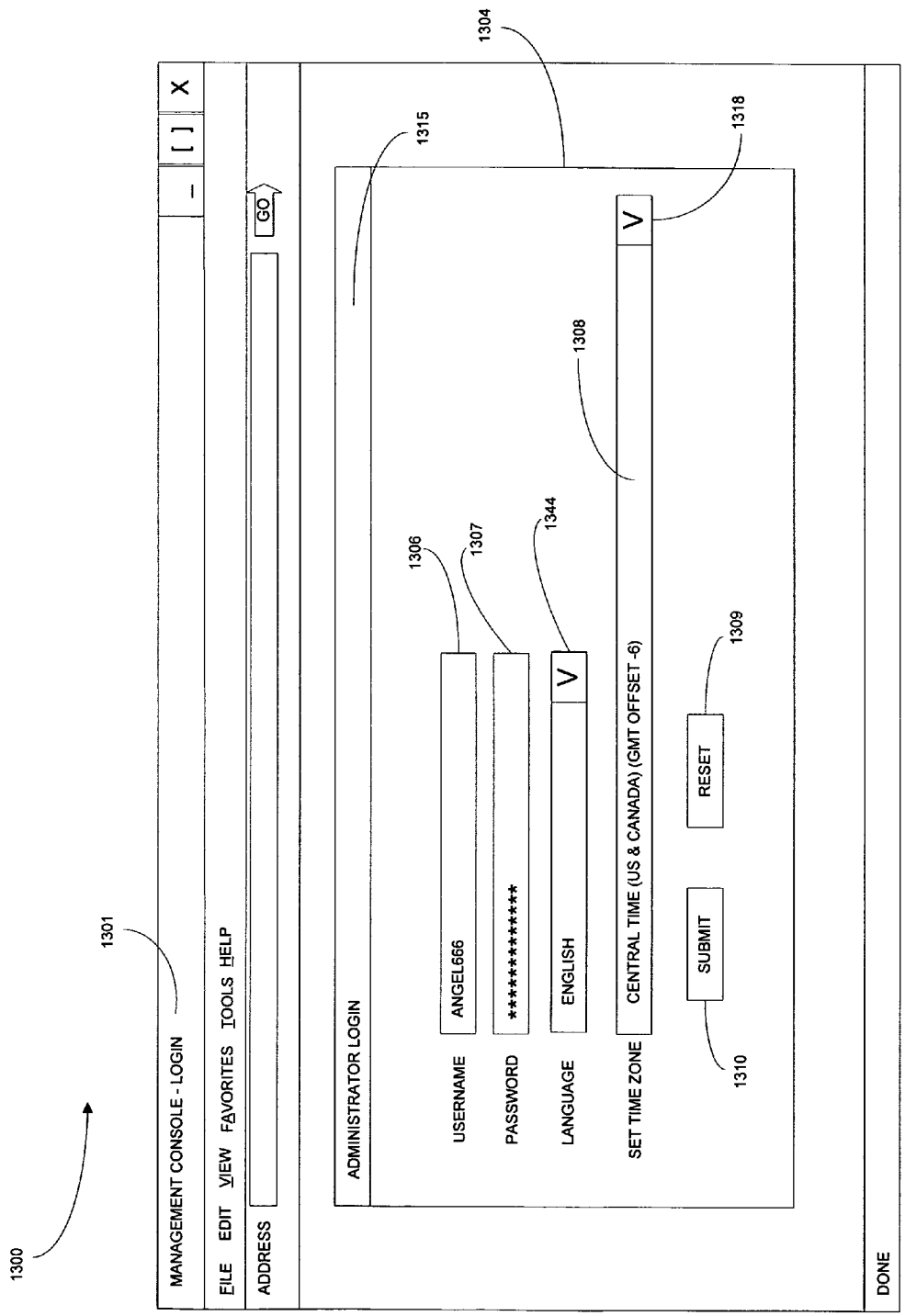
FIG. 13 is a block diagram illustrating time zone selection in an exemplary management console login screen displayable on an electronic device according to an embodiment of the present invention.

FIG. 13 illustrates time zone selection in an exemplary management console login screen 1300 according to an embodiment of the present invention. The screen 1300 may comprise a program identification bar 1301 identifying which portion of the module the user is in. During each login, the user may be prompted to select a time zone in which all times will be displayed in for that particular session. Using web cookies, the system may be adapted to remember the last setting used for a particular browser. The time zones that are selectable may be based on a list supported by the operating system.

The login screen 1300 may comprise an administrator login window 1304 for administrator login 1315 comprising the following functions: a username or a case sensitive username 1306, a password or a case sensitive password 1307, set time zone 1308 and a button 1318 adapted to provide a predefined list of selectable supported time zones, and a set language function button 1344 adapted to provide a predefined list of selectable supported languages. The screen may also comprise a submit button 1310 and a reset button 1309.

Time zone support may allow users to see all user interface timestamps in their respective time zone. Date and time data may be stored in the system in the format of universal coordinated time (UTC). An administrator may set the default time zone for the users. Each user may override the default setting and specify a preferred time zone be saved for subsequent system access.

TABLE 1

Supported Time Zones

| Offset to UTC | Time zone |
|---|---|
| −12 | International Date Line West |
| −11 | Midway Island, Samoa |
| −10 | Hawaii |
| −9 | Alaska |
| −8 | Pacific Time (US & Canada); Tijuana |
| −7 | Arizona |
| −7 | Chihuahua, La Paz, Mazatlan |
| −7 | Mountain Time (US & Canada) |
| −6 | Central America |
| −6 | Central Time (US & Canada) |
| −6 | Guadalajara, Mexico City, Monterrey |
| −6 | Saskatchewan |
| −5 | Bogota, Lima, Quito |
| −5 | Eastern Time (US & Canada) |
| −5 | Indiana (East) |
| −4 | Atlantic Time (Canada) |
| −4 | Caracas, La Paz |
| −4 | Santiago |
| −3.5 | Newfoundland |
| −3 | Brasilia |
| −3 | Beunos Aires, Georgetown |
| −3 | Greenland |
| −2 | Mid-Atlantic |
| −1 | Azores |
| −1 | Cape Verde Is |
| 0 | Casablanca, Monrovia |
| 0 | Greenwich Mean Time, Dublin, Edinburgh, Lisbon, London |
| 1 | Amsterdam, Berlin, Bern, Rome, Stockholm, Vienna |
| 1 | Belgrade, Bratislava, Budapest, Ljublijana, Prague |
| 1 | Brussels, Copenhagen, Madrid, Paris |
| 1 | West Central Africa |
| 2 | Athens, Istanbul, Minsk |
| 2 | Bucharest |
| 2 | Cairo |
| 2 | Harare, Pretoria |
| 2 | Helsinki, Kyiv, Riga, Sofia, Talinn, Vilnius |
| 2 | Jerusalem |
| 3 | Baghdad |
| 3 | Kuwait, Riyadh |
| 3 | Moscow, St. Petersburg, Volgograd |
| 3 | Nairobi |
| 3 | Tehran |
| 4 | Abu Dhabi, Muscat |
| 4 | Baku, Tbilisi, Yerevan |
| 4.5 | Kabul |
| 5 | Islamabad, Karachi, Tashkent |
| 5.5 | Chennai, Kolkata, Mumbai, New Delhi |
| 5.75 | Kathmandu |
| 6 | Almaty, Novosibirsk |
| 6 | Astana, Dhaka |
| 6 | Sri Jayawardenepura |
| 6.5 | Rangoon |
| 7 | Bangkok, Hanoi, Jakarta |
| 7 | Krasnoyarsk |
| 8 | Beijing, Chongqing, Hong Kong, Urumqi |
| 8 | Irkutsk, Ulaan Bataar |
| 8 | Kuala Lumpur, Singapore |
| 8 | Perth |
| 8 | Taipei |
| 9 | Osaka, Sapporo, Tokyo |
| 9 | Seoul |
| 9 | Yakutsk |
| 9.5 | Adelaide |
| 9.5 | Darwin |
| 10 | Brisbane |
| 10 | Canberra, Melbourne, Sydney |
| 10 | Guam, Port Moresby |
| 10 | Hobart |
| 10 | Vladivostok |
| 11 | Magadan, Solomon Is., New Caledonia |
| 12 | Auckland, Wellington |
| 12 | Fiji, Kamchatka, Marshall Is. |
| 13 | Nuku'alofa |

Table 1 illustrates an exemplary listing of supported time zones usable in an update store module according to an embodiment of the present invention.

Figure 14:
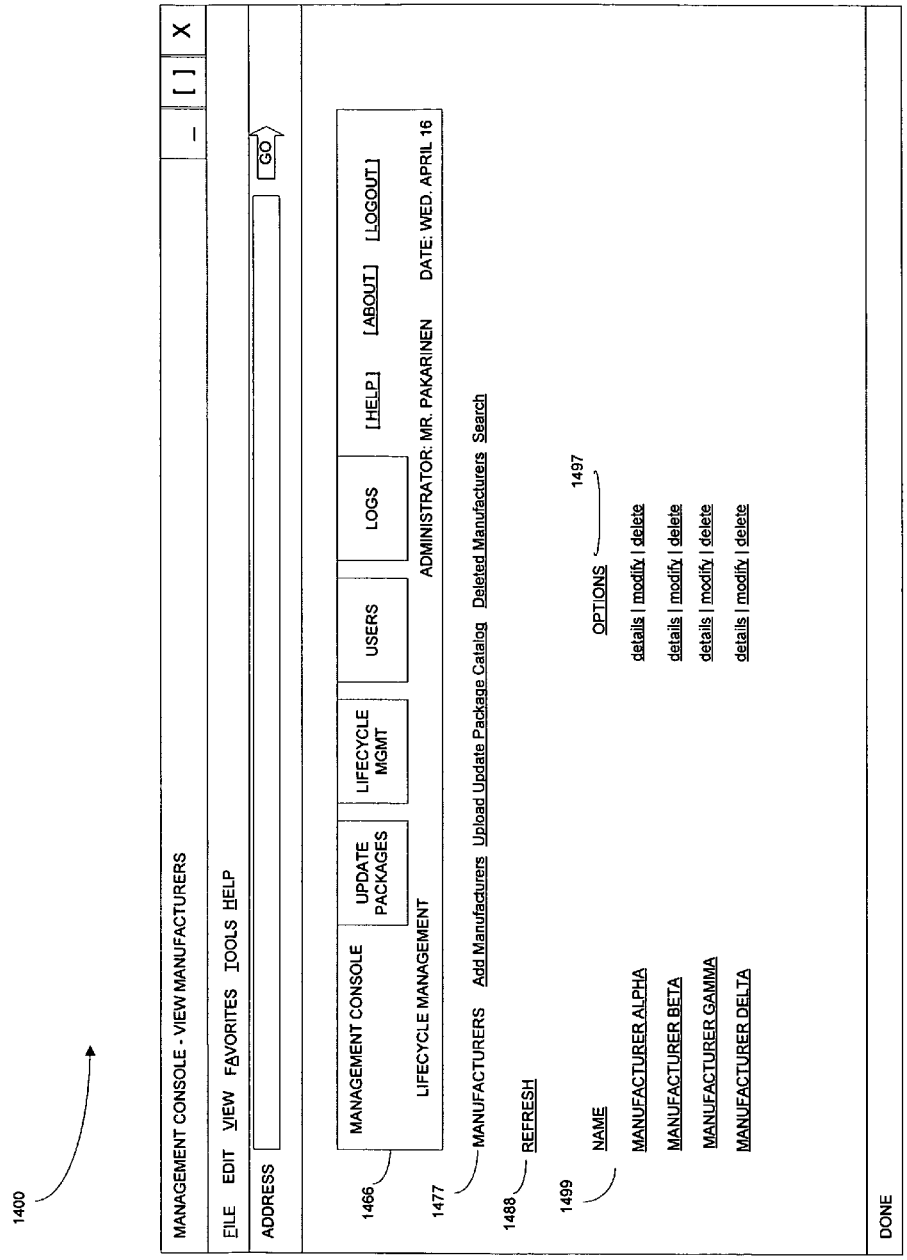
FIG. 14 is a block diagram illustrating an exemplary manufacturer management screen displayable on an electronic device according to an embodiment of the present invention.

FIG. 14 is an illustration of an exemplary view manufacturers management screen 1400 and management console header frame 1466 having a lifecycle management tab, such as for example, lifecycle management tab 1121 as illustrated in FIG. 11, selected in accordance with an embodiment of the invention. The user may be able to add a new electronic device manufacturer to the update store module if permitted by a defined user's role, for example, an administrative role.

The electronic device system may prompt the end-user for a unique name of the manufacturer, when a new manufacturer is being added, determine whether manufacturer information regarding the named manufacturer has already been entered or created, and determine whether to create a new manufacturer folder, if no previously created matching folder is located.

In FIG. 14, the management console view manufacturers screen 1400 may comprise management console header frame 1466. In the view manufacturers screen 1400, as illustrated in FIG. 14, the user may select from a row of functions 1477 comprising manufacturers, add manufacturers, upload update package catalog, view deleted manufacturers, and search for manufacturers.

The end-user may also select to refresh 1488 the screen 1400 to show new or modified information. The view manufacturers screen 1400 may also comprise a plurality of manufacturers listed by name 1499, such as for example, manufacturer alpha, manufacturer beta, manufacturer gamma, and manufacturer delta. Although only four exemplary manufacturers are illustrated in FIG. 14, numerous additional manufacturers may also be listed and manipulated.

A plurality of options 1497 may also be associated with each manufacturer name, such as for example, details, modify, and delete. Although only the exemplary options, such as, for example, details, modify, and delete are illustrated in FIG. 14, numerous additional options may be listed and manipulated.

Figure 15:
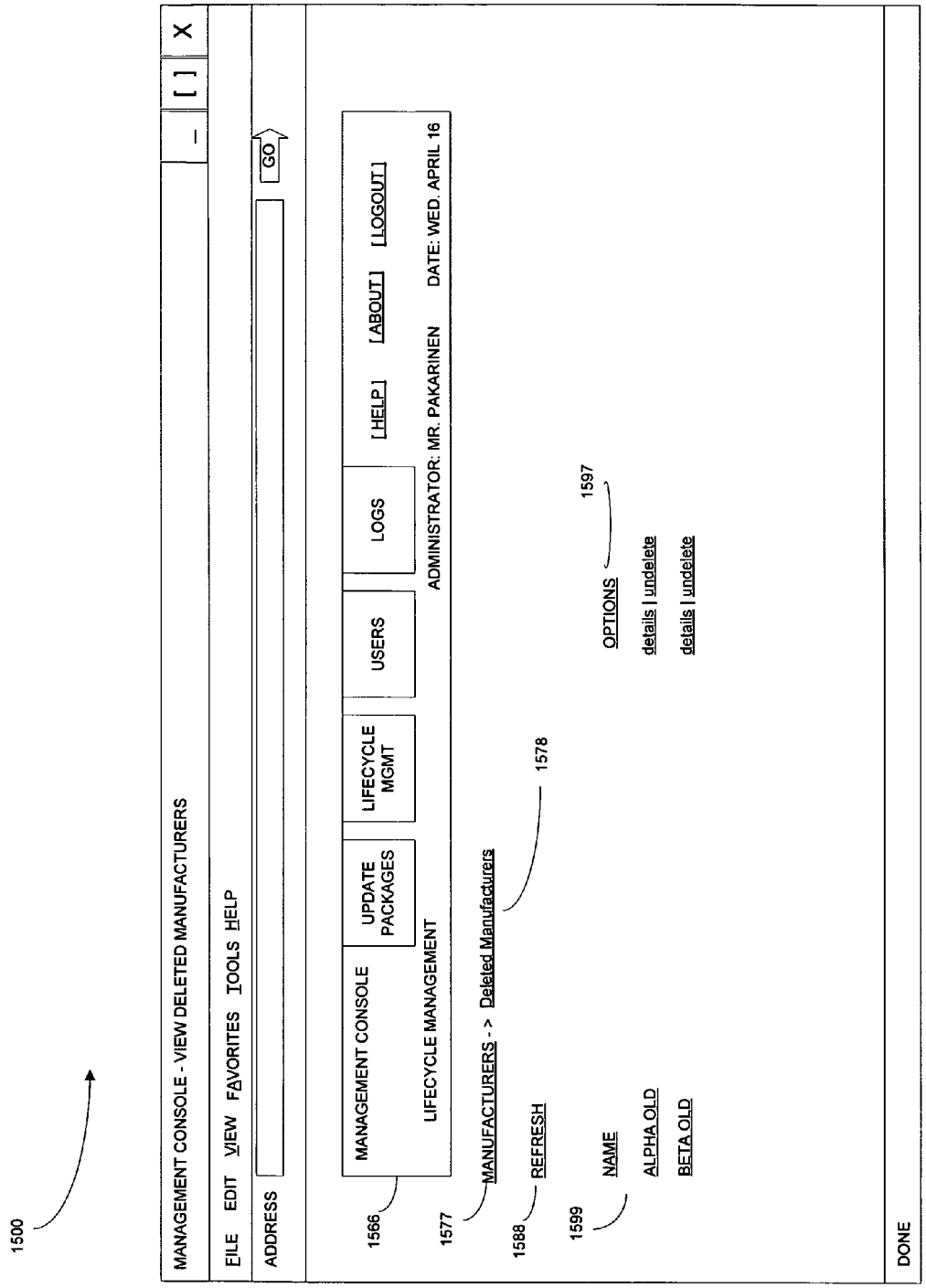
FIG. 15 is a block diagram illustrating an exemplary view deleted manufacturer screen displayable on an electronic device according to an embodiment of the present invention.

FIG. 15 is an illustration of an exemplary view deleted manufacturers screen 1500 and management console header 1566 according to an embodiment of the present invention. Deletion of an electronic device manufacturer entry/record may be permitted when the entry/record contains no associated client electronic devices. No client devices may be displayed when the electronic device network technology advances beyond the electronic device technology for a particular electronic device manufacturer, or when no continued license agreements exist between the electronic device network and the electronic device manufacturer. The actual manufacturer record represented by 1599 may or may not be removed from the database. Prior to the release of new electronic devices, unnecessary records may be marked as obsolete or deleted and may not be visible to non-administrative end-users.

In an embodiment according to the present invention, a screen may be displayed showing deleted manufacturers 1578, wherein an end-user may be permitted to undelete an electronic device manufacturer, if applicable. Once undeleted, the electronic device manufacturer record may show up in the view manufacturers screen 1500, i.e., the screen showing all active manufacturers. End-users endowed with appropriate (for example, read/write) privileges may also be able to add new client electronic devices to the electronic device manufacturer entry.

While engaging the view deleted manufacturers screen 1500, the end-user may be provided selections such as manufacturer 1577, and deleted manufacturers 1578. The end-user may also be able to refresh 1588 the screen when an entry has been changed, added or deleted. The screen 1500 may comprise a list of names of deleted manufacturers 1599, such as for example, alpha old and beta old, as illustrated in FIG. 15. Associated with each of the deleted manufacturers, an end-user may be provided with options 1507, such as for example, details and undelete.

Figure 16:
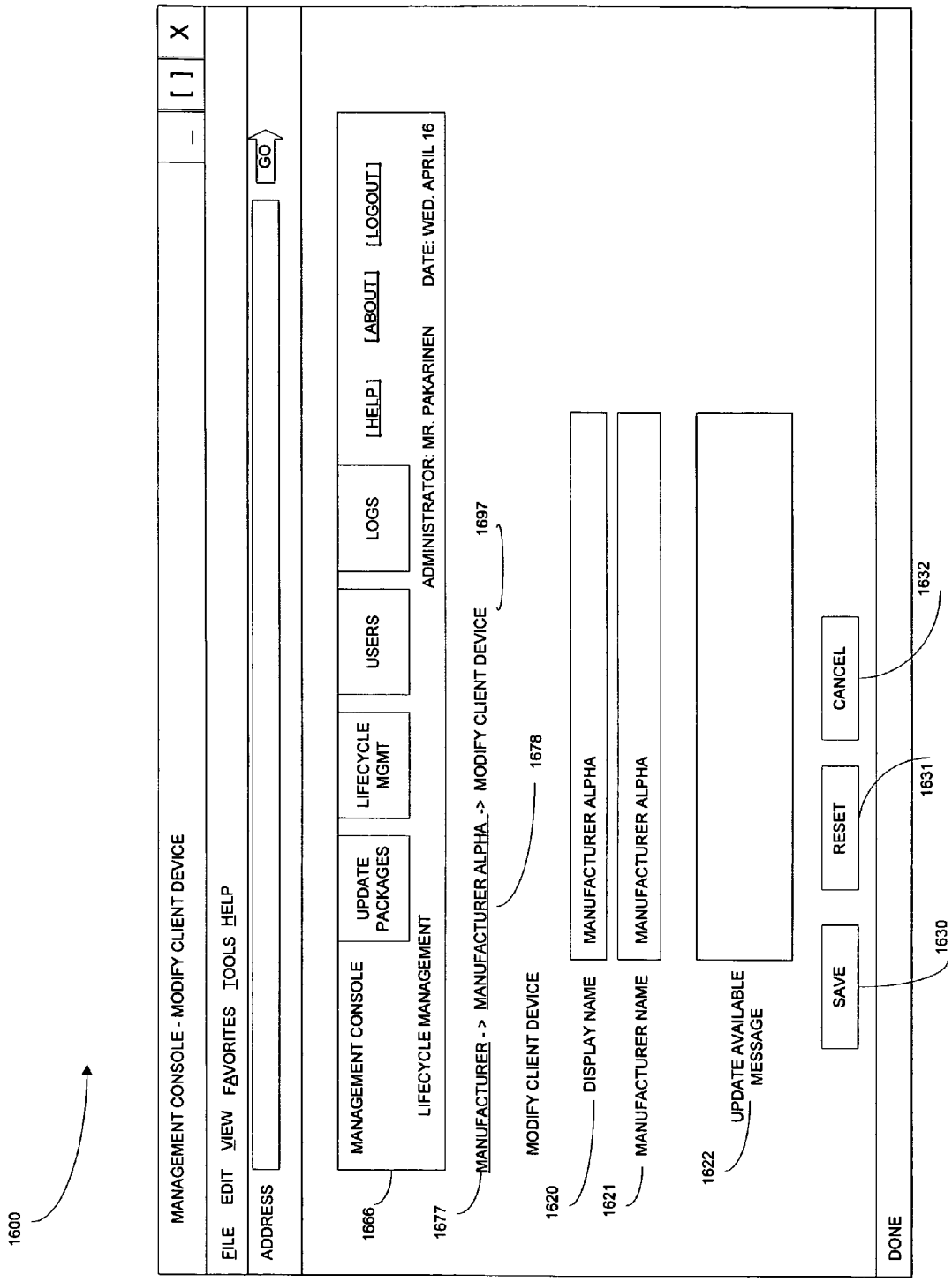
FIG. 16 is a block diagram illustrating an exemplary modify manufacturer client device data screen displayable on an electronic device according to an embodiment of the present invention.

FIG. 16 is an illustration of an exemplary modify client device screen 1600 and a management console header frame 1666 having the lifecycle management tab selected, such as for example, lifecycle management tab 1121 as illustrated in FIG. 11, according to an embodiment of the present invention. The end-user may be enabled to select from the following screen options: manufacturer 1677, manufacturer alpha 1678, for example, and modify client device 1697. The end-user may modify the manufacturer name 1621, display name 1620, and an update available message box 1622. By default, the display name 1621 may correspond to the manufacturer name 1620, as illustrated in FIG. 16. An end-user may change the display name 1620 to another name, if desired. Update package selection criteria may be based upon an original manufacturer name 1621, therefore, in some instances, a request for an update package may correspond accordingly. The modify client screen 1600 may also be provided with buttons, such as for example, save 1630, reset 1631, and cancel 1632.

Figure 17:
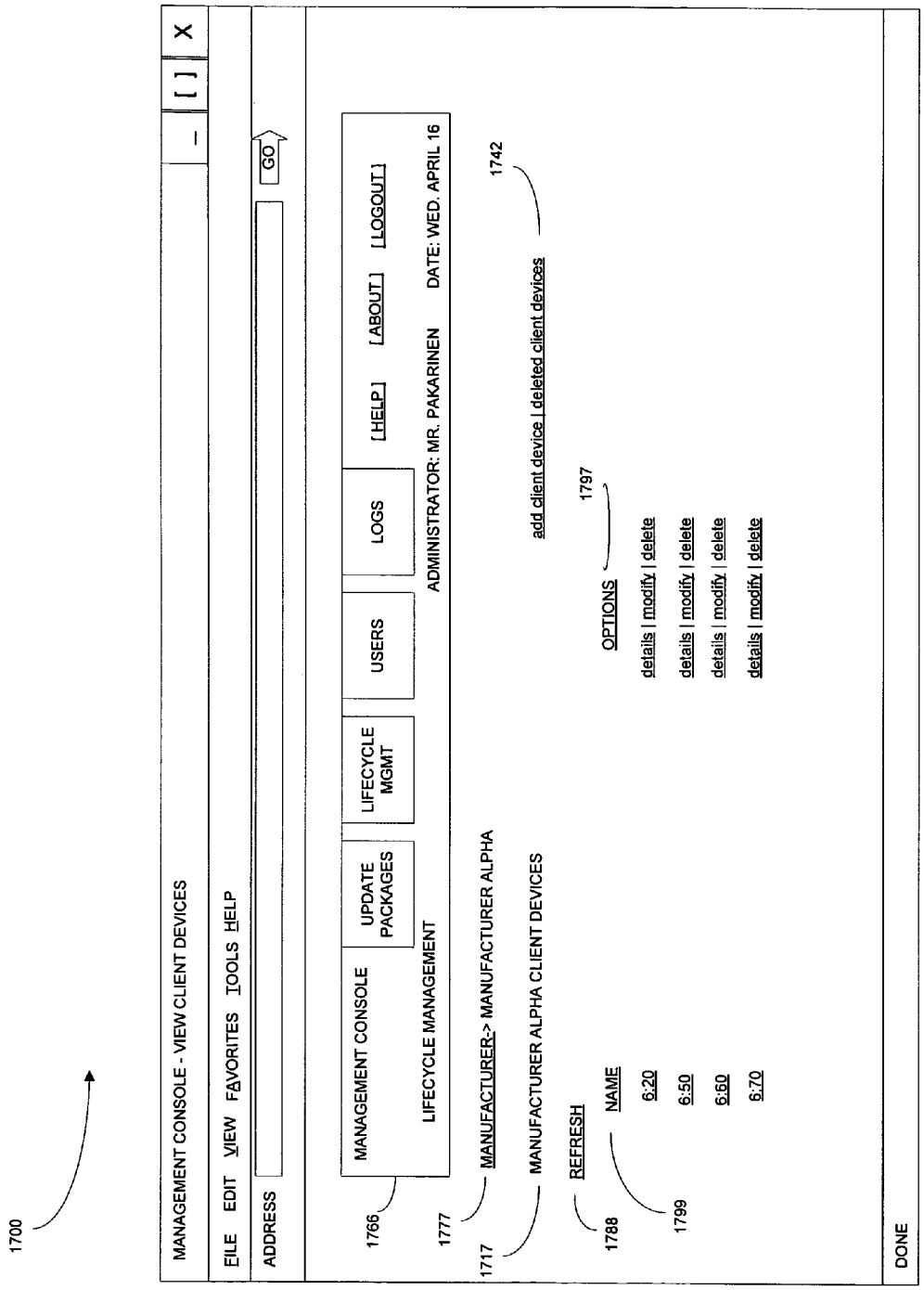
FIG. 17 is a block diagram illustrating an exemplary view client electronic device screen displayable on an electronic device according to an embodiment of the present invention.

FIG. 17 illustrates an exemplary view client devices screen 1700 and management console header frame 1766 having the lifecycle management tab selected, such as for example, lifecycle management tab 1121 as illustrated in FIG. 11, according to an embodiment of the present invention. The end-user may add a new client electronic device or view deleted client devices 1742 listed under a particular manufacturer name 1717 selected from a manufacturer selection 1777. The electronic device system may prompt the end-user for a name 1799 of the client electronic device, as illustrated in FIG. 17, check whether an entry for that particular model has already been created, and create a new entry if no corresponding entry is located. The end-user may also be provided with a plurality of options 1797, such as for example, details, modify, and delete.

Figure 18:
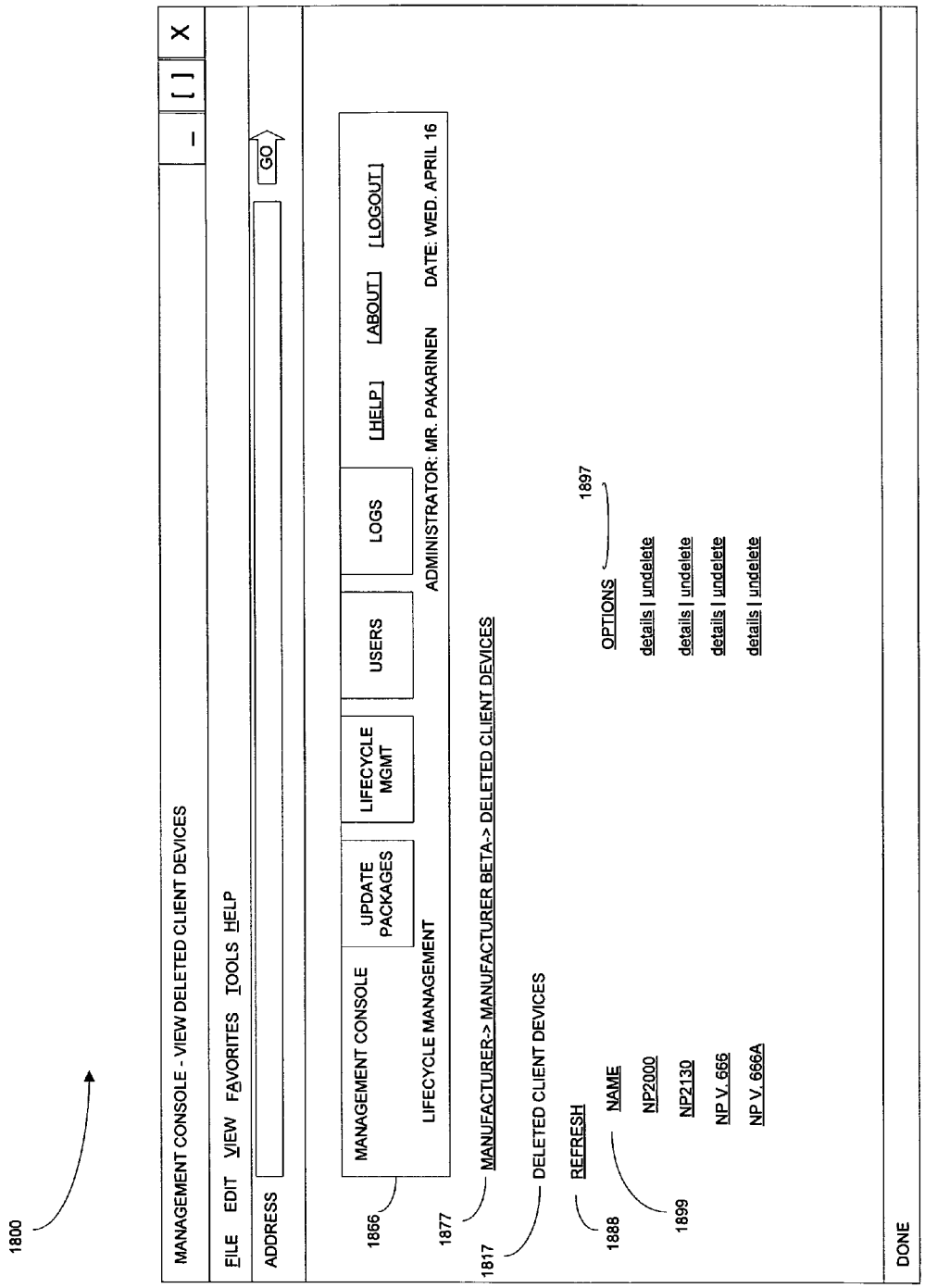
FIG. 18 is a block diagram illustrating an exemplary view deleted client devices screen displayable on an electronic device according to an embodiment of the present invention.

FIG. 18 is a block diagram illustrating an exemplary view deleted client devices screen 1800 and management console header 1866, according to an embodiment of the present invention. The view deleted client devices screen 1800 may provide end-user options such as refresh 1888 and manufacturer selection 1877. An end-user endowed with appropriate (for example, read/write) privileges may be able to delete an existing client electronic device for which no corresponding update packages are being stored, exist, or are authorized. The system may be adapted to confirm the deletion via a super-administrator function, for example. The actual record corresponding to a deleted electronic/client device may not actually be removed from the database. Rather, the record corresponding to a deleted electronic/client device may be marked as deleted and may not be visible to any end-user other than an administrator of super-administrator, for example. The view deleted client device screen 1800 may show all of the deleted client electronic devices by name 1899, thus permitting an end-user to undelete the device information and see details corresponding to a deleted client electronic device 1897. Once undeleted, the client electronic device may again show up in a client device screen showing all active client electronic devices. End-users endowed with appropriate (for example, read/write) privileges may also add update packages to the electronic device entry.

Figure 19:
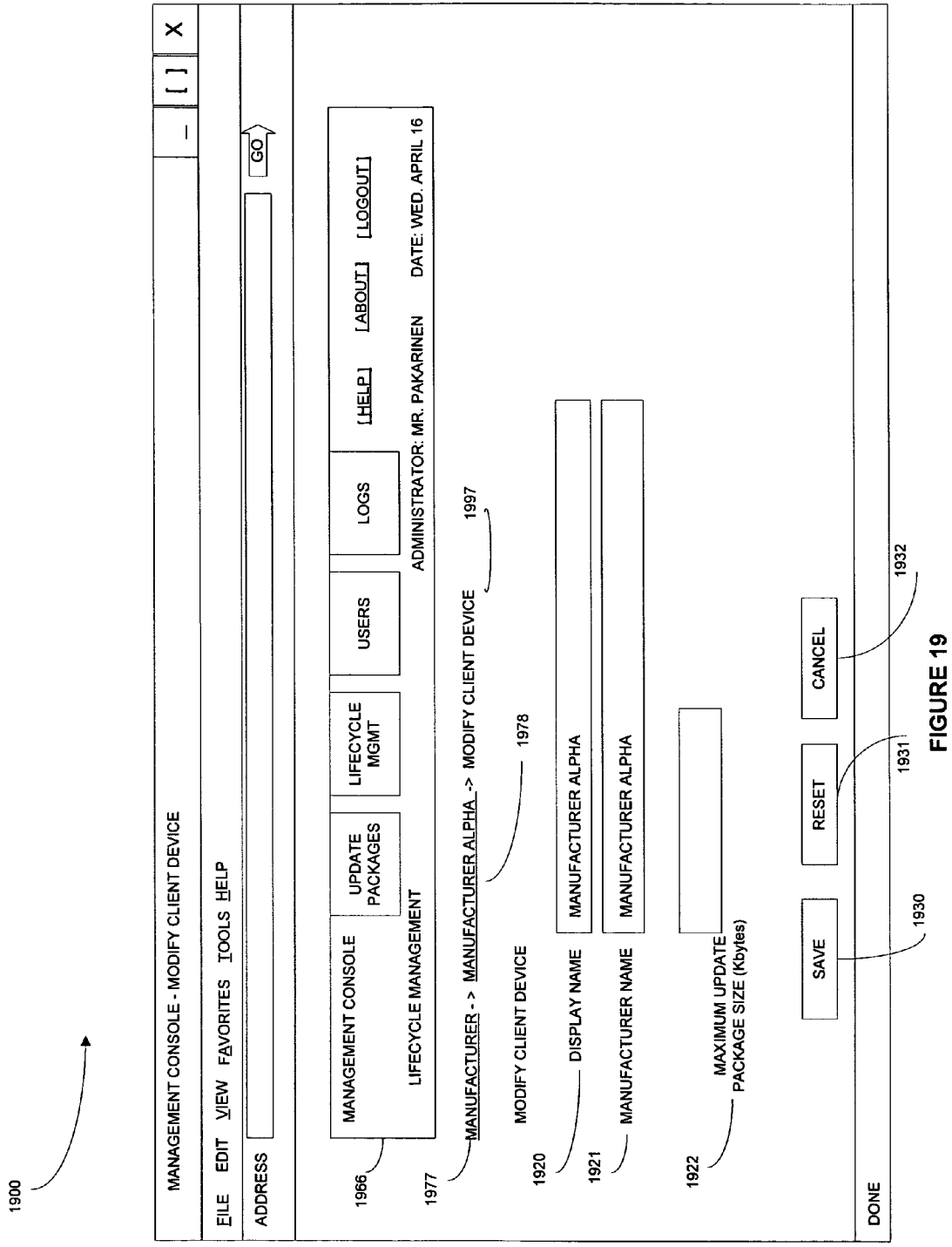
FIG. 19 is a block diagram illustrating an exemplary modify client device screen displayable on an electronic device according to an embodiment of the present invention.

FIG. 19 illustrates an exemplary modify client device screen 1900 and management console header frame 1966 having the lifecycle management tab selected, such as for example, lifecycle management tab 1121 as illustrated in FIG. 11, according to an embodiment of the present invention. The modify client device screen 1900 may provide an end-user option such as manufacturer selection 1977. The end-user may modify the client electronic device manufacturer name 1921, display name 1920, and maximum update package size (in Kbytes) 1922. By default, the display name 1920 may correspond to the client device name. The end-user may change the display name 1920 to another name, if desired. Update package selection criteria may be based upon an original client device name, and not the display name 1920. All requests for the update packages associated therewith may use a corresponding client device name. The end user may be enabled to select from the following screen options: manufacturer 1977, manufacturer alpha 1978, for example, and modify client device 1997. The modify client screen 1900 may also be provided with buttons such as for example, save 1930, reset 1931, and cancel 1932.

Figure 20:
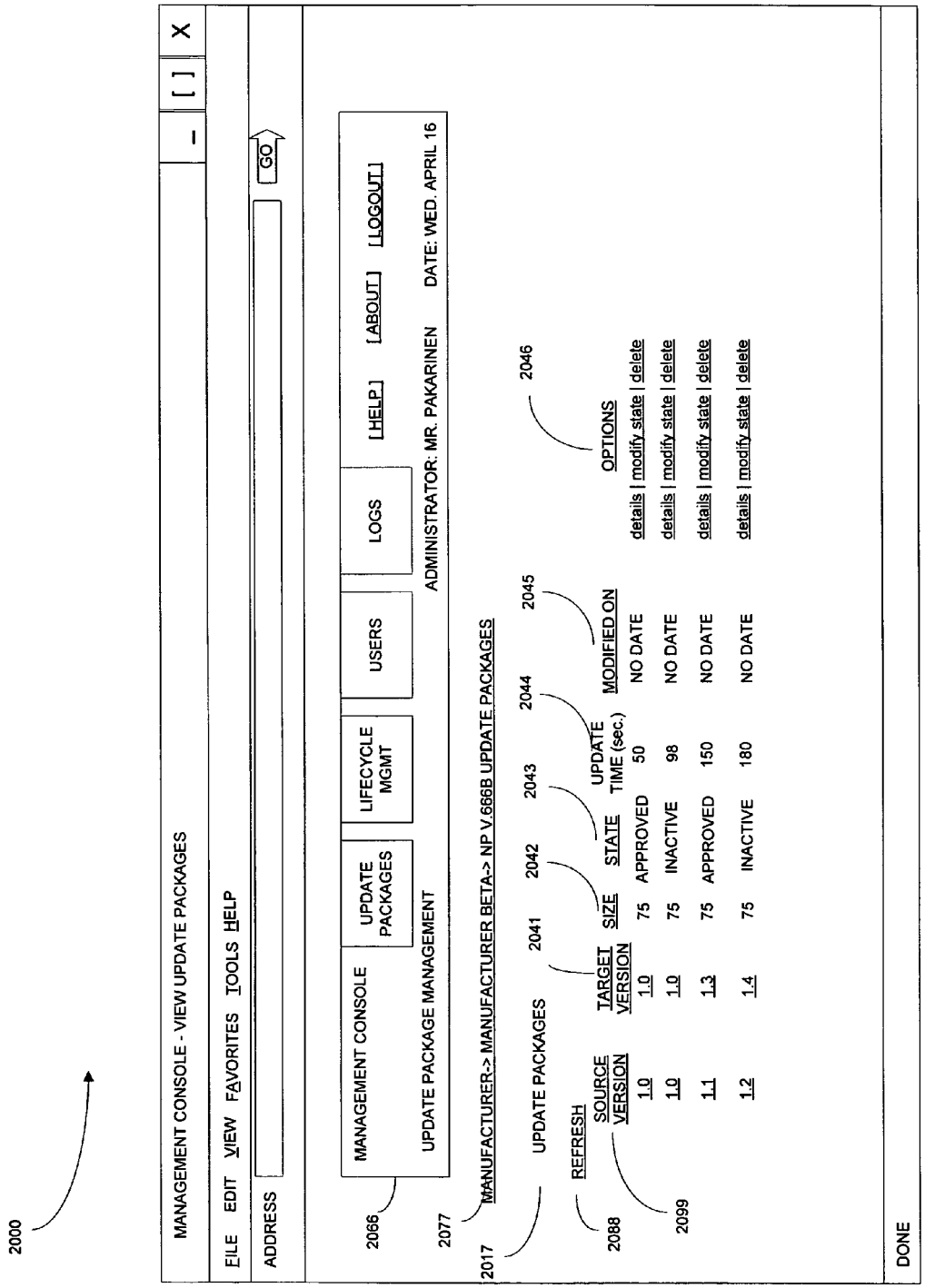
FIG. 20 is a block diagram illustrating an exemplary view update packages screen displayable on an electronic device according to an embodiment of the present invention.

FIG. 20 illustrates an exemplary update package management screen 2000 and management console header frame 2066 having the update packages management tab selected, such as for example, update management tab 1111 as illustrated in FIG. 11, according to an embodiment of the present invention. The end user may be enabled to select from the following screen options: manufacturer 2077, manufacturer beta, for example, and update package NP V.666B. The end-user may add update packages under a particular client electronic device name, for example, manufacturer beta. The data format of the update package may comprise an update package catalog from an update generator. The electronic device system displayed in the screen 2000 may be adapted to verify whether the update package being added already exists in the system.

Using the update package management screen 2000, an end-user may access the following functions, for example: upload an update package catalog, the catalog comprising a list of update packages 2017 capable of and ready to be uploaded from an associated update store module, such as for example update store module 129A illustrated in FIG. 1A; delete update packages from the catalog, the catalog comprising a list of the deleted update packages that may be undeleted; and a search for update packages in the update package catalog, for example.

An update package management screen 2000, according to an embodiment of the present invention may, for example, comprise the following columns:

a source version column 2099 parsed from an update package catalog;

a target version column 2041 parsed from an update package catalog;

a size of update package column 2042 comprising the actual size of the update package, including update package metadata and security headers;

a state of the update package column 2043 comprising the current state of the update package;

a time that updating to memory takes column 2044 for each particular update package and an estimated time for firmware update processing on a mobile device using a particular update package;

a modified-on date column 2045 comprising the date of the last change to the update package and/or corresponding update package information; and an options column 2046 comprising details, modified state, and delete actions for each update package.

Figure 21:
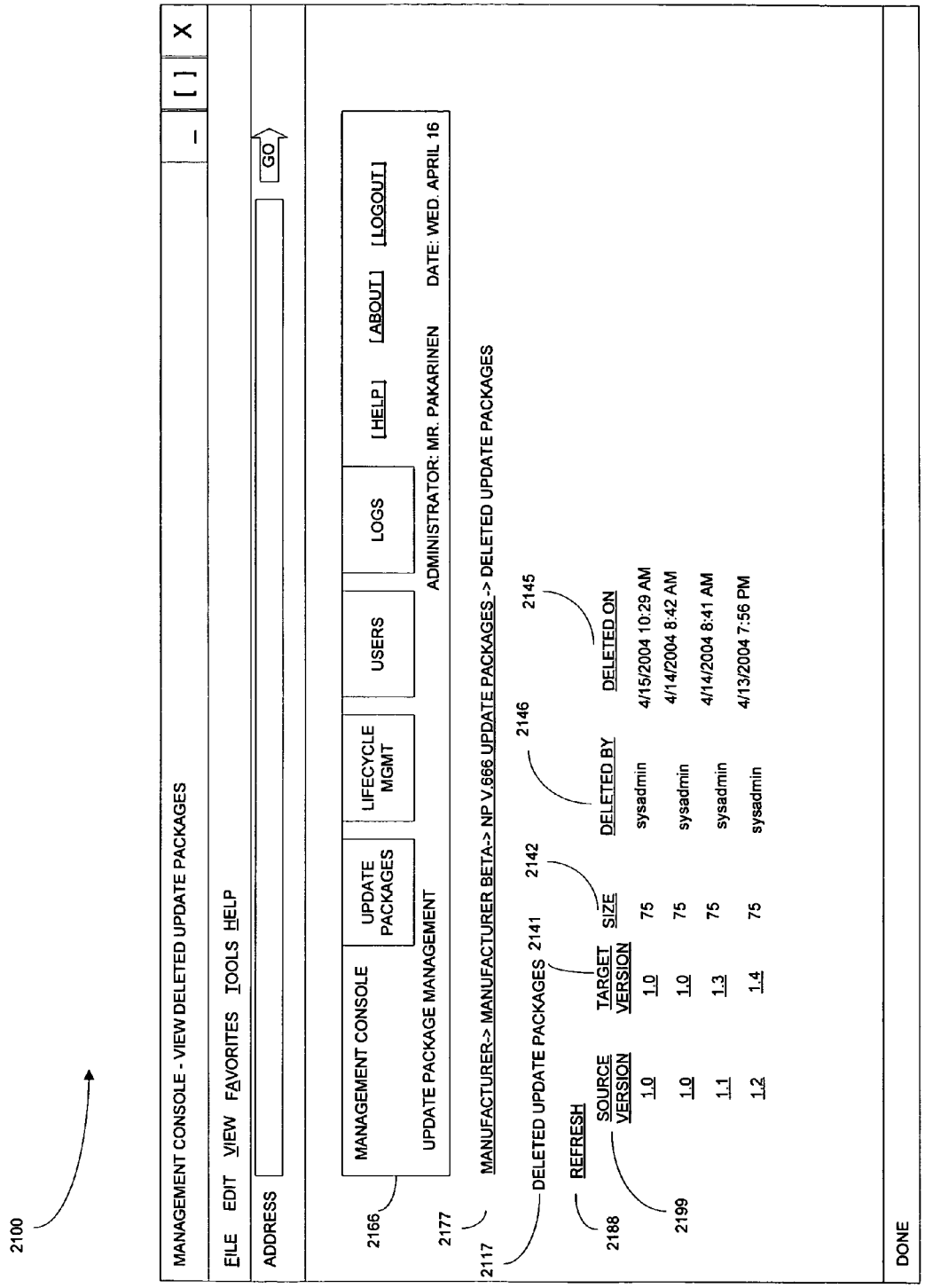
FIG. 21 is a block diagram illustrating an exemplary view deleted update packages screen displayable on an electronic device according to an embodiment of the present invention.

FIG. 21 illustrates an exemplary deleted update packages screen 2100 and a management console header frame 2166 having the update package management tab selected, according to an embodiment of the present invention. An end-user having appropriate (for example, read/write) privileges may delete an existing update package for a variety of reasons. An electronic device system in accordance with the present invention may confirm the deletion via a super administrator function. The end-user may be enabled to select from the following screen options: manufacturer 2177, manufacturer beta, for example, and update packages NP V.666B, and deleted update packages. The actual deleted record may be removed from the database. Rather, the deleted record may be marked as deleted and may be visible to an authorized end-user. The screen 2100 may show all deleted update packages 2117 permitting an authorized end-user to undelete a particular update package. Once undeleted, the update package may show up in the screen that shows all active update packages, such as for example, screen 2000 illustrated in FIG. 20, and end-users endowed with appropriate (for example, read/write) privileges may add update packages to the entry/record.

The update package management screen 2100 according to an embodiment of the present invention may comprise the following columns: a source version column 2199 parsed from the update package catalog; a target version column 2141 parsed from the update package catalog; a size column of update package column 2142 comprising the actual size of the update package, including update package metadata and security headers; a deleted-by column 2046 comprising the name of the end-user who deleted the update package; and a deleted-on date column 2145 comprising the date of deletion of the update package and/or corresponding update package information.

Figure 22:
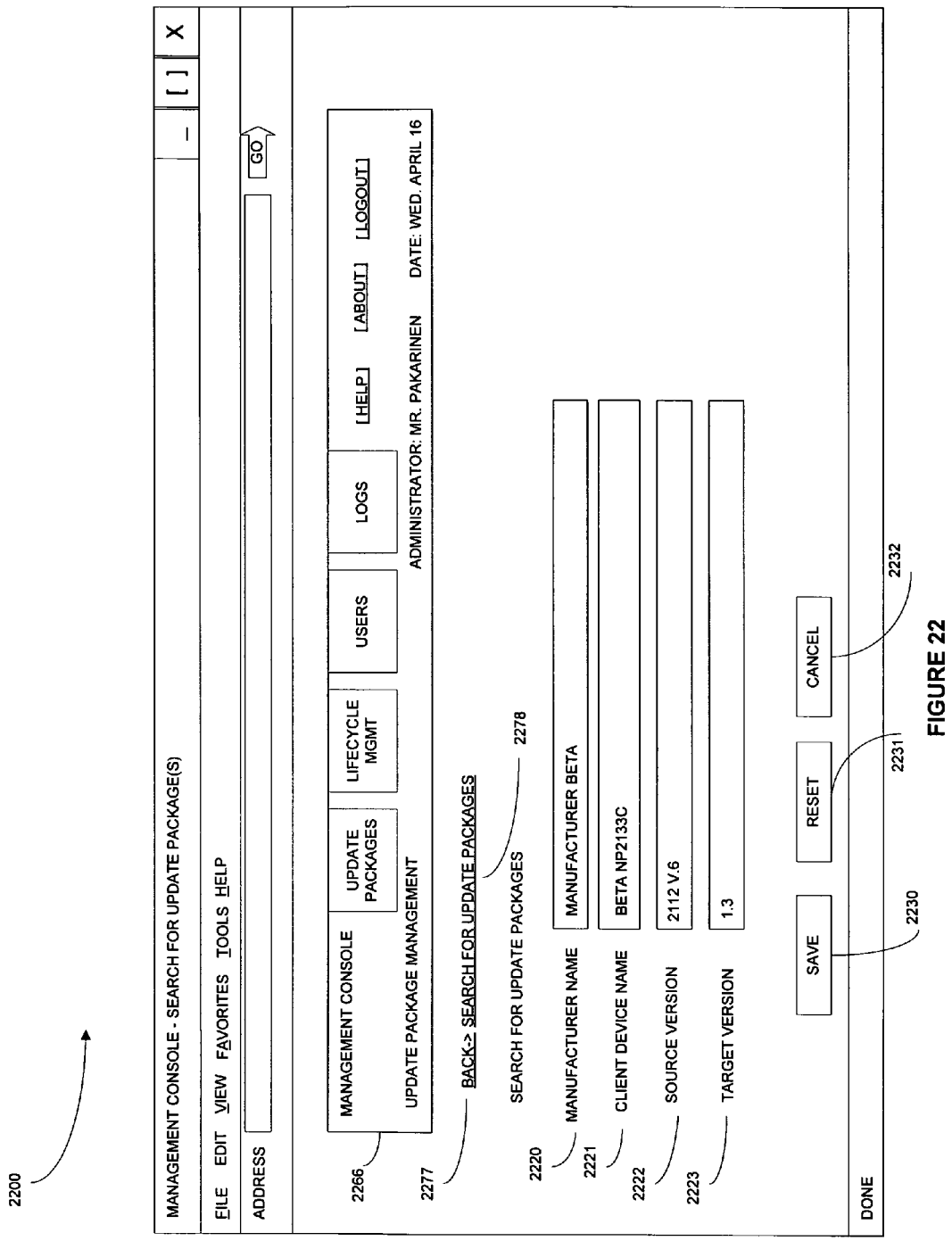
FIG. 22 is a block diagram illustrating an exemplary update package searching screen displayable on an electronic device according to an embodiment of the present invention.

FIG. 22 illustrates an exemplary update package search screen 2200 and a management console header frame 2266, according to an embodiment of the present invention. The search criteria may comprise, for example, a manufacturer name 2220, a client electronic device name 2221, a source version 2222, and a target version 2223 of the update package being searched for. Entering the above-named search criteria into a plurality of search criteria prompt boxes may produce a list of update packages satisfying the entered criteria. The search screen 2200 may also be available from the first screen of the update package management set of screens, such as for example, screen 1200 illustrated in FIG. 12. The end-user may go back 2277 or search further 2278 for additional update packages. The search screen 2200 may also comprise a plurality of buttons, such as for example, save button 2230, reset button 2231, and cancel button 2232.

Figure 23:
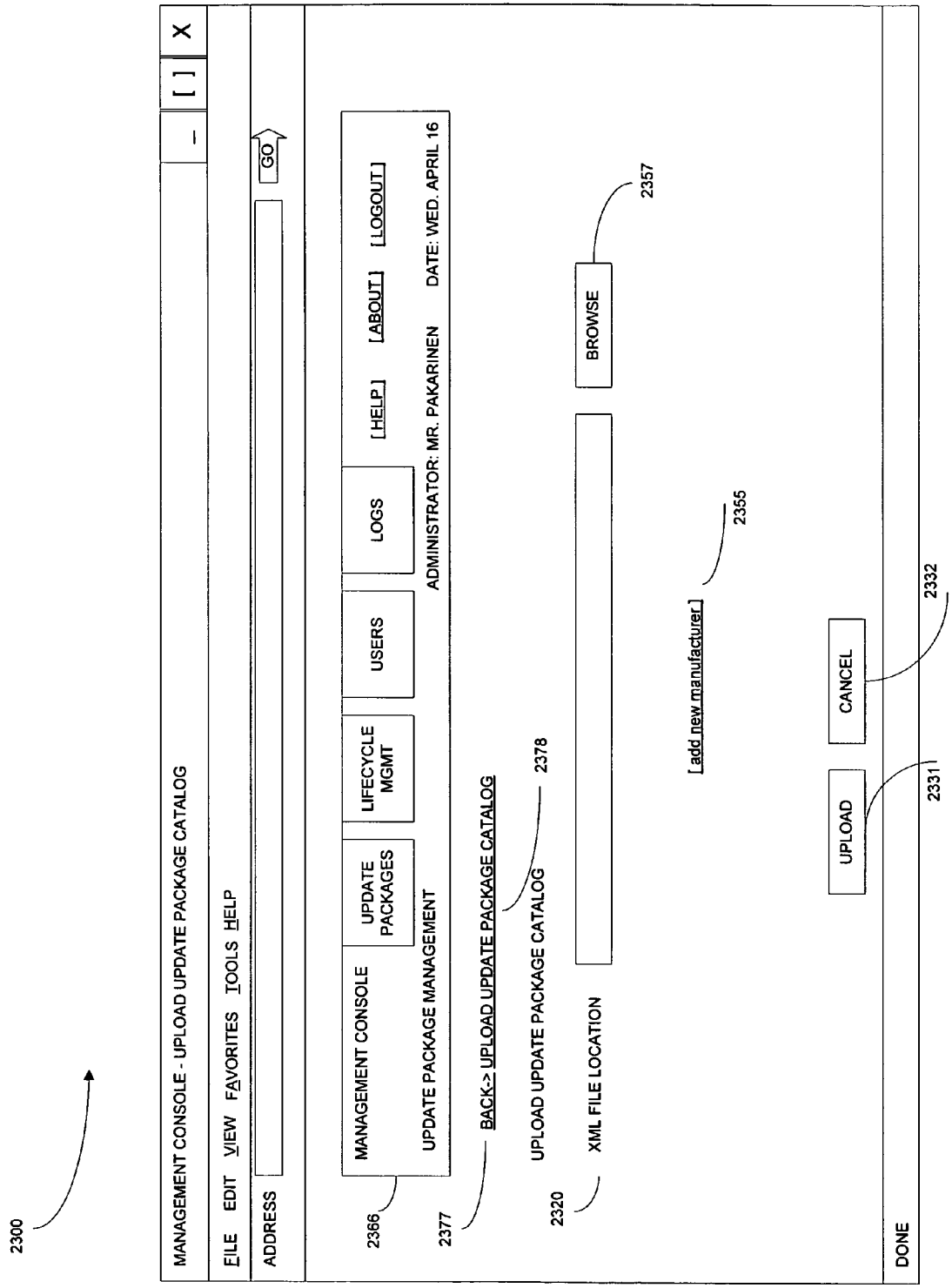
FIG. 23 is a block diagram illustrating an exemplary update package catalog uploading screen displayable on an electronic device according to an embodiment of the present invention.

FIG. 23 illustrates an exemplary update package catalog upload screen 2300 and a management console header 2366, according to an embodiment of the present invention. An update package catalog (UPC) may be used to upload a set of update packages. The UPC may be an extensible markup language (XML) file containing binary update package images along with corresponding meta-data information, eliminating the need to specify meta-data manually. A single UPC file may contain multiple binary update package images for a particular manufacturer and corresponding client electronic devices.

An XML file may be uploaded, for example, if the corresponding manufacturer and client electronic device entries/records are present and exist on the receiving system at the time of upload. If the entries/records are not present, then the end-user may enter (add new manufacturer 2355) the manufacturer name and/or client electronic device name (add new client electronic device) and corresponding information, for example, before the upload commences. The upload screen 2300 may have links for conveniently entering manufacturer information, etc., and may provide a file location entry box 2320. Files may also be located via a browse function button 2357 and associated lookup screen.

Update package upload from an update generator, such as for example, update package generator 131A illustrated in FIG. 1A, may be implemented by opening an HTML-based upload screen 2300 directly from the update generator application, for example. From the upload screen 2300, the end user may be enabled to select the update package catalog to be uploaded 2378, or go back 2377, manage an update package parsing screen 2400, such as for example as illustrated in FIG. 24, below, upload 2331 the particular update packages to the update store module, such as for example, update store module 129A illustrated in FIG. 1A, and/or cancel the upload process 2332.

Figure 24:
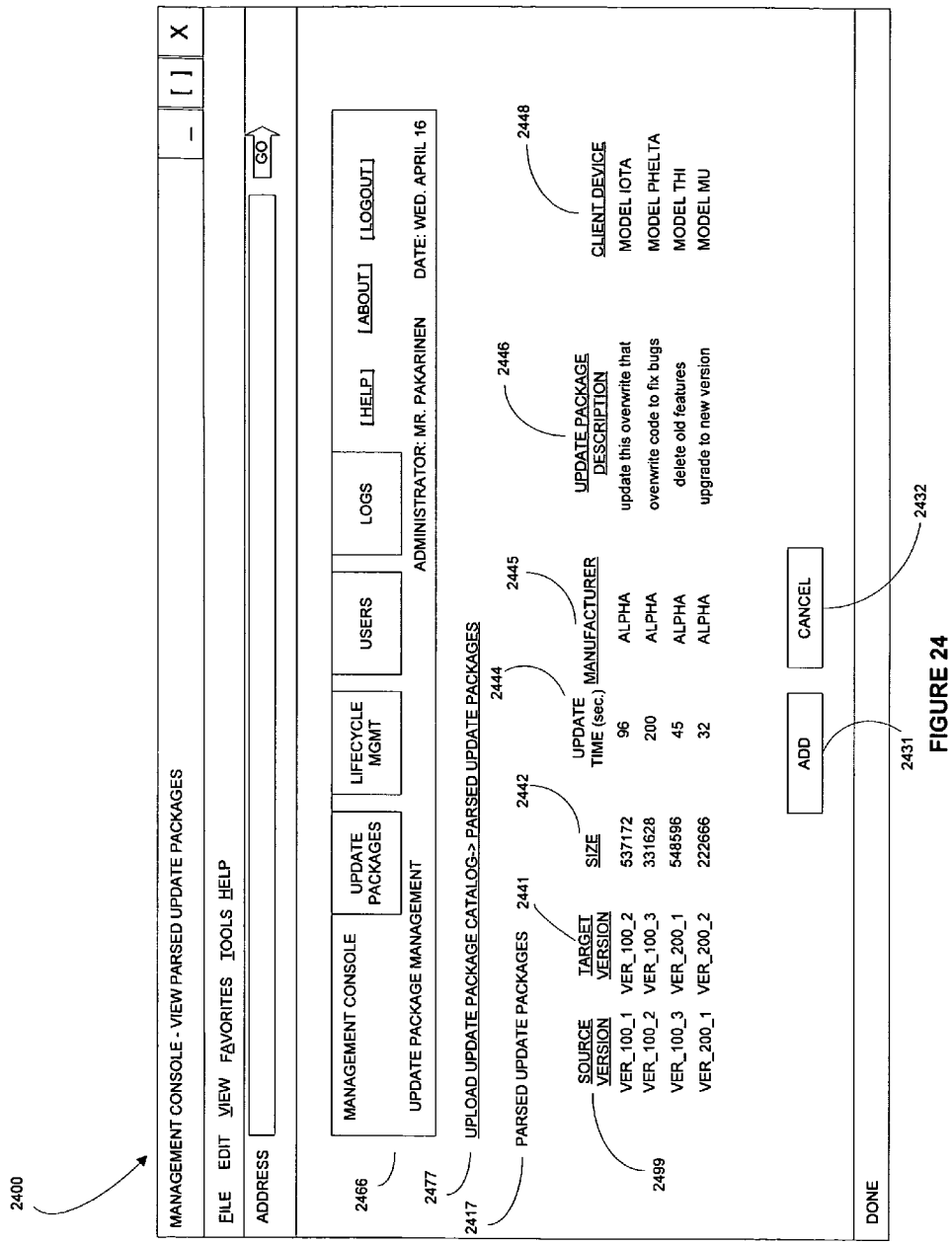
FIG. 24 is a block diagram illustrating an exemplary parsed update packages viewing screen displayable on an electronic device according to an embodiment of the present invention.

FIG. 24 illustrates an exemplary update package-parsing screen 2400 and a management console header frame 2466, according to an embodiment of the present invention. When a new update package is uploaded, the system may verify and validate the update package to ensure the integrity and validity of the update package before the update package is accepted by update store module, such as for example, update store module 129A illustrated in FIG. 1A.

By managing user roles, a system administrator may define a role for uploading only, e.g., if the end-user has the uploading role, the end-user may not access any other screens except the upload screen and the update package-parsing screen, for example.

The update package catalog from the management console application may be implemented as described above and the end-user may view parsed update packages 2477. Depending upon the end-user's access rights, one end-user may be presented with a completely different screen and program functionality from the management console that another end-user having different access rights may be presented with. After a physical file (update package, for example) is uploaded to the update store module, such as for example, update store module 129A illustrated in FIG. 1A, the update store module 129A may be adapted to parse the content and show the results to the end-user.

From the update package parsing screen 2400, the end-user may be able to select update packages to be uploaded to the electronic device system, including any additional information such as, for example, update time 2444 and update package description 2446 for each update package to be uploaded.

The update package-parsing screen 2400 may show all parsed update packages 2417 permitting an end-user to select a particular update package. Once selected, the update package may show up in the update package-parsing screen 2400 that shows all active update packages, and end-users endowed with appropriate (for example, read/write) privileges may be able to add update packages to the entry/record.

The update package parsing screen 2400, according to an embodiment of the present invention, may comprise the following columns: a source version column 2499 parsed from the update package catalog; a target version column 2441 parsed from the update package catalog; a size of update package column 2442 comprising the actual size of the update package, including update package metadata and security headers; an update time column 2444; a manufacturer name column 2445; an update package description column 2446; a corresponding client electronic device column 2448; an add button 2431; and a cancel button 2432.

Figure 25:
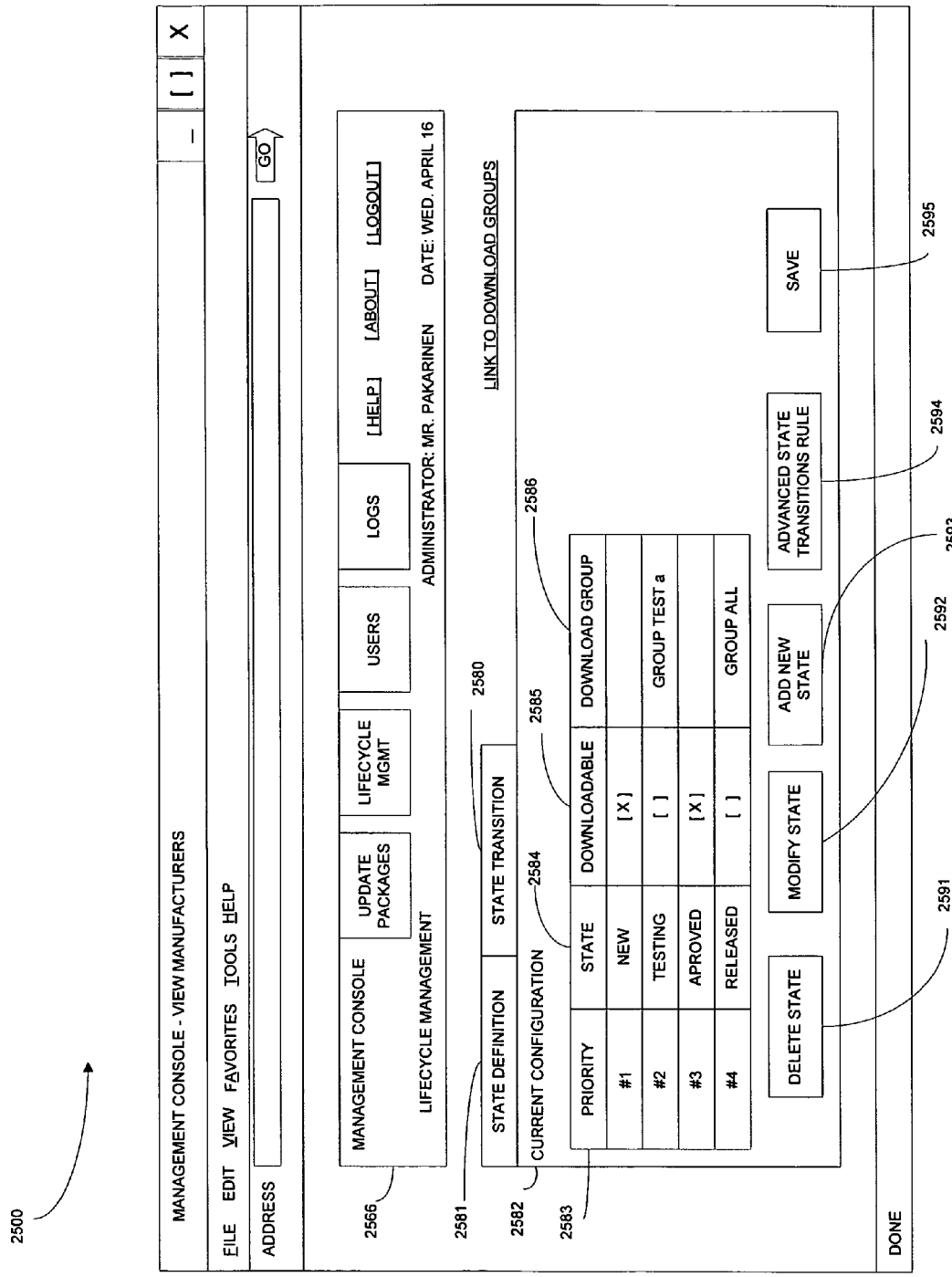
FIG. 25 is a block diagram illustrating an exemplary view manufacturers and update manufacturer device state definition screen displayable on an electronic device according to an embodiment of the present invention.

FIG. 25 illustrates an exemplary update state definition screen 2500 and a management console header frame 2566 having the lifecycle management tab selected, according to an embodiment of the present invention. From the update state definition screen 2500, an end-user may be able to modify the update package states. By managing update package states, an end-user may define the lifecycle workflow for update packages in the electronic device update system. Rule-based workflow coordinates and enforces which update package may be selected, who may be permitted to download the update package, and the next state of transition for each update package.

From the state definition screen 2500, (i.e., having the state definition tab selected), an end-user may modify the update package states. From the lifecycle current configuration sub-screen 2582, an end-user may create and manage update package states for lifecycle current configuration(s) for the update store modules, such as for example, update store module 129A illustrated in FIG. 1A. From the lifecycle current configuration sub-screen 2582, an end-user may also set the following items. The end-user may be enabled to set the priority 2583 of the state 2584. Given the current lifecycle configuration, for any update package request resolved to more than one downloadable update package, the high priority (e.g., #1 being the highest) state may be selected as the update package for download. The end-user may also set the state 2584. The state 2584 may comprise the name of the state and the state name may be unique 2584.

The end-user may also set a check box 2585 to indicate that a particular update package is downloadable, for example. When the update package has the check box in the downloadable column 2585 selected, the end-user may specify a download group 2586 for the particular entry. The downloadable parameter 2585 may also be used for the lifecycle management of update packages. Downloading update package may be built upon the following restrictions, for example. There may be one source version per downloadable state. There may be multiple downloadable states provided that the downloadable states are different from each other. If the entered update selection criteria illustrated in FIG. 22, for example, retrieves more than one update package, the priority 2583 of the state may be used to identify the unique update package to retrieve.

The end-user may also set the download group 2586. If the downloadable parameter checkbox (column 2585) is not selected, the download group list box 2586 may be grayed out and may not be selectable. There may be only one state having the "group all" download group selected.

The end-user may also be able to delete a state 2591, modify a state 2592, add a new state 2593, apply an advanced state transitions rule 2594, and save update package information 2595, for example, via a plurality of buttons on the current screen 2500. The end-user may also be enabled to select a state definition sub-screen 2581 and a state transition sub-screen 2580 by selecting the appropriate tabs.

Figure 26:
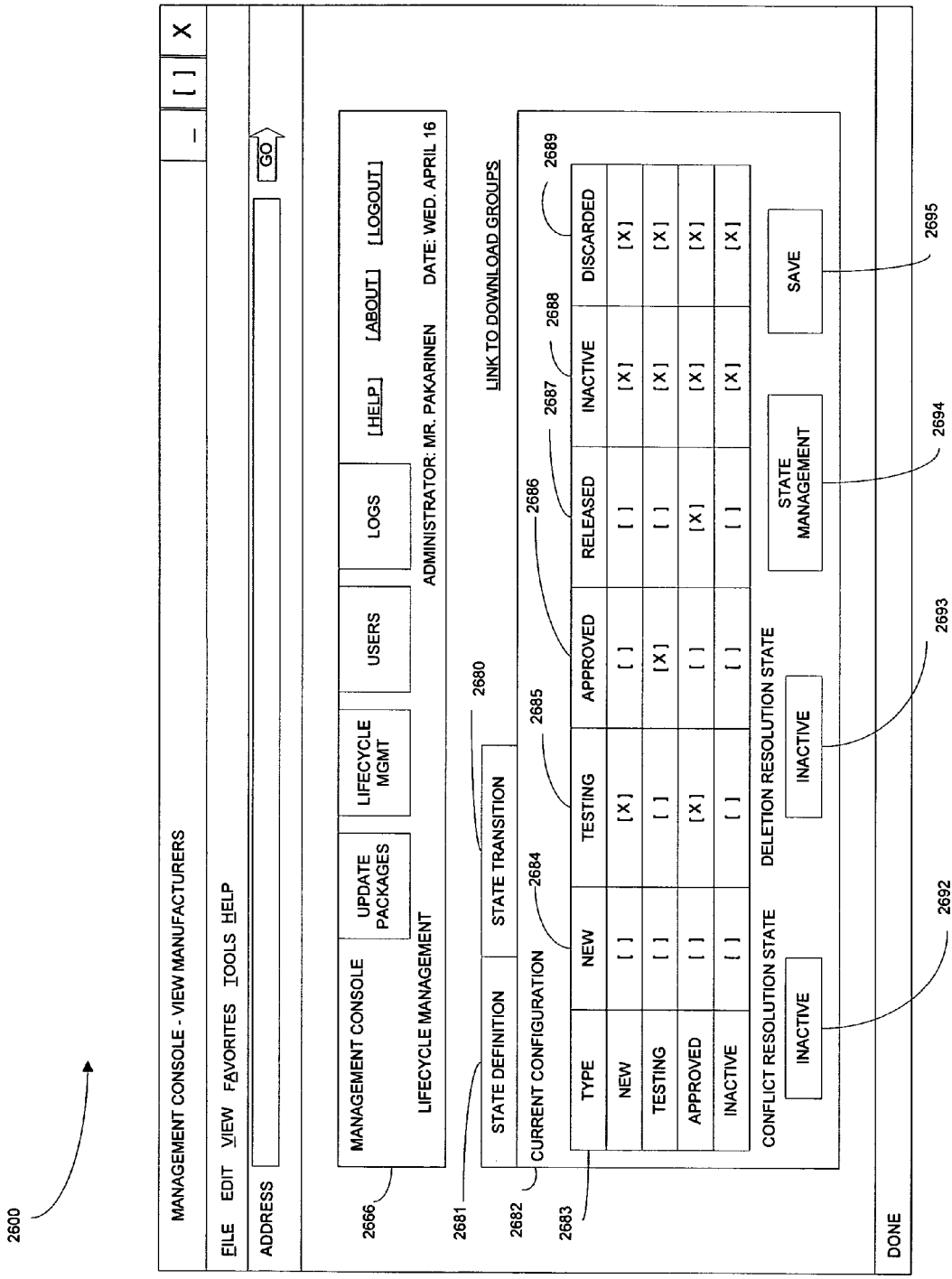
FIG. 26 is a block diagram illustrating an exemplary view manufacturers and update manufacturer device lifecycle transition screen displayable on an electronic device according to an embodiment of the present invention.

FIG. 26 illustrates an exemplary lifecycle management screen 2600 and a management console header frame 2666 having the state transition tab selected, such as for example, state transition tab 2680 according to an embodiment of the present invention. From the lifecycle management screen 2600, an end-user may be enabled to manage rules providing implementation of transitional states from any state to another. The end-user may also specify which states are the conflict resolution state 2692 and the deletion resolution state 2693. The end-user may also be enabled to select a state management button 2694 and save modifications via a save button 2695.

By default, when an end-user creates a new state, all state transitions (for example, 2684, 2685, 2686, 2687, 2688, and 2689) are unchecked. The end-user may define transitional rules before a new state is used in lifecycle management functions.

Two special states may be specified for the system. The first special state may be a conflict resolution state 2692. Update packages may be set to the conflict resolution state 2692 of the update store module under at least the following conditions. For example, due to update package management, whenever a new downloadable update package enters the system, any previously downloadable update package having the same source version may have its state changed to the conflict resolution state 2692. If there are multiple update package conflicts, all of the update packages may be changed to the conflict resolution state 2692. The rule may also be applicable to all downloadable update packages, wherein the downloadable update packages may be changed to indicate that the update packages no longer downloadable, for example.

The second special state may be a deletion resolution state 2693. When an update package indicated as being non-downloadable is to be deleted from the system, all update packages to be deleted may be indicated as such in a deletion resolution state indicator 2693, for example. An update package indicated as being downloadable may not be deleted, for example.

The update store module, such as for example, update store module 129A illustrated in FIG. 1A, may support the following lifecycle management rules. A client server, such as for example, client servers 493, 593 illustrated in FIGS. 4 and 5, may send an additional parameter in an update package request. The client server, such as 493 and 593 for example, may process the request by applying the following rules.

For example, in a default state no additional parameter may be sent. The server may only look for downloadable update packages for the downloadable group selected, permitting fast retrieval for a majority of the client server requests.

Alternatively, the update package may be sent with a parameter. The client server, such as 493 and 593 for example, may look first for any downloadable update packages in which the client server is a part of the downloadable group. In case of multiple matching update packages, then the downloadable update package having the highest priority of state may be used to identify a unique update package to retrieve. There may be only one state having "group all" download group. There may be only one source version per downloadable state. There may be multiple downloadable states for the same source version as long as the states are all different from one another. If the update selection criteria employed retrieves more than one update package, the priority of the retrieved update packages may be used to identify the unique update package to be retrieved. An end-user may not delete the state if the download group "group all" is assigned.

The conflict resolution state 2692 and the deletion resolution state 2693 may be defined using non-downloadable state indicators. The non-downloadable states assigned to the two special states may not be deleted. When the state having multiple update packages and the same source version are changed to the "downloadable state", all of the update packages having the same source versions may also be changed to the state defined as the conflict resolution state 2692. When a state is deleted, all the states having the deleted state may be changed to the state defined the deletion resolution state 2693. A deleted state may not be downloadable.

From the lifecycle management screen 2600, an end-user may be able to modify the update package states. From the lifecycle current configuration sub-screen 2682, an end-user may be enabled to create and manage update package states for lifecycle current configuration for the update store modules. From the lifecycle current configuration sub-screen 2682, an end-user may also set the following items. The end-user may be enabled to select a state definition sub-screen 2681 or a state transition sub-screen 2680.

The end-user may be enabled to select the type of update package in an update package type column 2683. The end-user may also be enabled to provide additional information and settings by checking boxes in a plurality of parameter entry boxes and columns, such as for example, new column 2684, testing column 2685, approved column 2686, released column 2687, inactive column 2688, and discarded column 2689.

Figure 27:
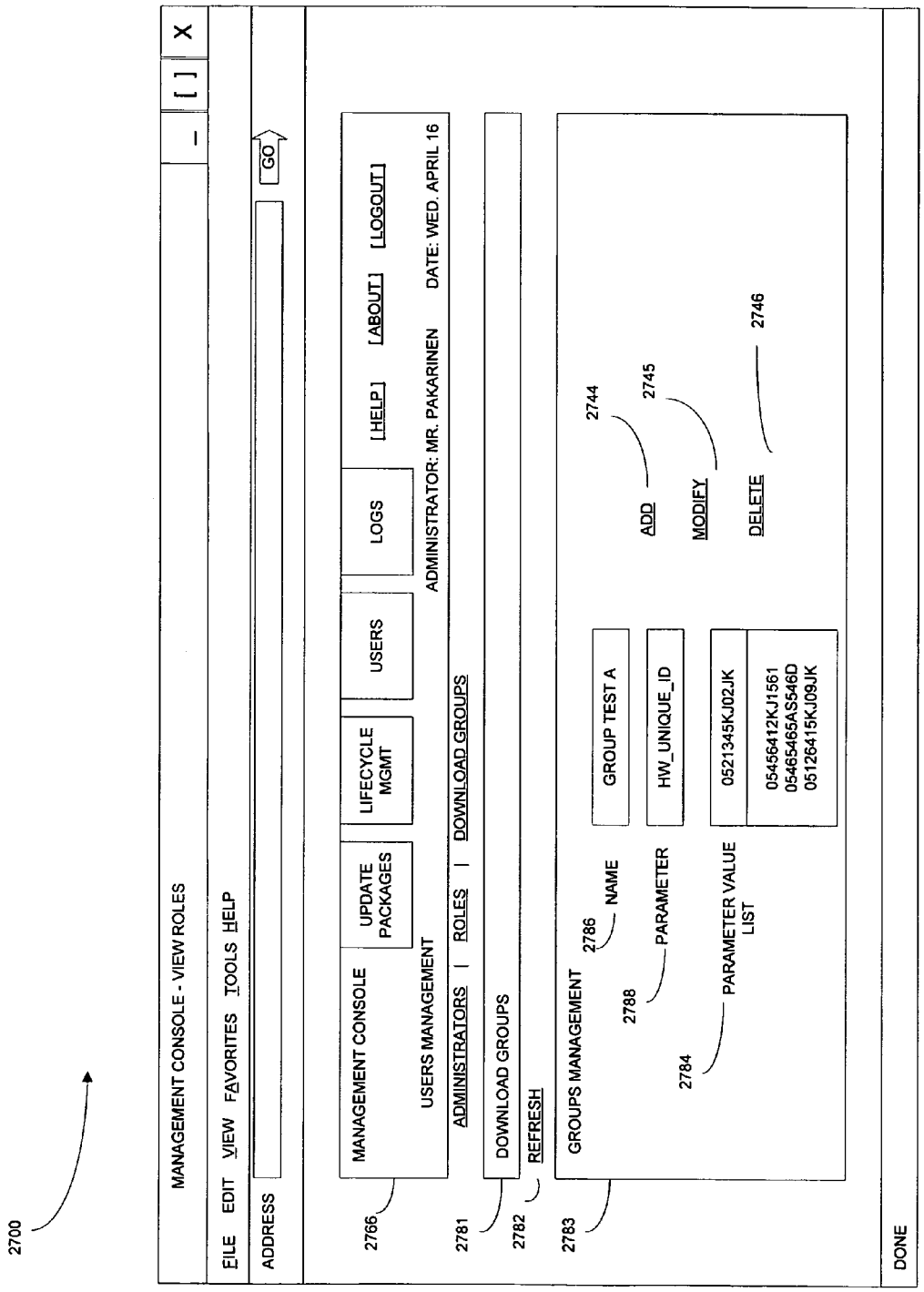
FIG. 27 is a block diagram illustrating an exemplary view roles and download group management screen displayable on an electronic device according to an embodiment of the present invention.

FIG. 27 illustrates an exemplary download group users management view roles screen 2700 and a management console header frame 2766 having the users tab selected, such as for example, users tab 1131 illustrated in FIG. 11, according to an embodiment of the present invention. The end-user may be a member of a download group 2781, for example. A download group 2781 may have the following attributes: a unique group name 2786, an identification parameter name 2788 determining which parameter specifies the client identification information; and a parameter value list 2784 that is a case-sensitive, regular expression matching the client identification information. An administrator may be enabled to ensure that correct values are specified to ensure the values are verified. The end-user may be enabled to add information 2744 to a download group, modify information 2745 related to a download group, and delete information 2746 related to a download group in a groups management sub-screen 2783. The end-user may also refresh 2782 the users management group view roles screen 2700 as information is modified.

An end-user account may contain the following information. Required fields which may be marked with an asterisk (*) (not shown) in an embodiment according to the present invention, for example: a unique username *, a password *, a first name *, a last name *, an e-mail address, a phone number, a mobile number, a description/notes, a role *, and an account creation date (time-stamped by the system).

An administrator may be enabled to create (add) 2744 a new user account with a unique username 2786. An initial password for a new account may twice be requested and confirmed.

An administrator may be enabled to delete 2746 an existing user account. The system may confirm the deletion before committing.

An administrator may be enabled to modify 2745 all of the attributes of any user account employing the following conditions: the user password may never be visible, the administrator may only set the user password to a new value, and the administrator may maintain a unique login name for the end-users.

There may be a default administrator role for full level access to the system, such as for example, the super-administrator role. Only the administrator or super-administrator role may be enabled to define and modify user information, system settings, and additional roles. The administrator may assign an upload-only role, wherein an end-user may insert and only insert new update packages into any folder in the system. The update store module, such as for example, update store module 129A illustrated in FIG. 1A, may create a manufacturer entry/record or client device model entry/record to support the new update package. If the update package already exists, then the new update package may replace or overwrite the old update package. The administrator may also permit an end-user with appropriate granted access to modify the update package status, for example.

User roles may be used to determine access control to update packages. Each end-user may be assigned one role and may inherit the role's associated permissions to the update packages. A role may, for example, take on the following attributes: a unique role name, and an access control permission (none, read, write, etc.) for records/entries and update packages.

An administrator may be enabled to create a new role for an end-user. The electronic device system may have, for example, a default access control matrix allowing appropriate (for example, read/write) permission for all records/entries and update packages.

An administrator may also be enabled to delete an existing role, if no end-user is assigned to the role. The system may confirm the deletion with the administrator.

There may be access control associated with update packages. The exemplary table below illustrates the behavior for appropriate (for example, read/write) permissions on records/entries (for example, manufacturers name and client model). The access control framework may be specified in a user account management section, for example.

TABLE 2

| | Access Rights Management | |
|---|---|---|
| | Read Permission | Write Permission |
| Folder | Can only see the list of items within the folder. | Can add update package files to the folder. (Read implied) |

Table 2 illustrates a listing of access rights management according to an embodiment of the present invention.

There may be support for a download group in the update store module, such as for example, update store module 129A illustrated in FIG. 1A. A download group may comprise a grouping of client identification information identifying end-users enabled to download an update package having a particular indicated download state.

There may be a default group or non-removable download group in the update store module. The default group may, for example, permit connected clients to download update packages regardless of the client identification information provided.

The system may use the simple network management protocol (SNMP) notification mechanism to generate and receive alarm notifications. A SNMP notification may be referred to as an SNMP trap. Alarm notification messages may be sent in SNMP notification format over an electronic device carrier network to any end-user-specified SNMP console. In addition to the management information base (MIB), the update management system may provide a number of specific MIB for alarms and configurations.

A private management information base (MIB) including all managed objects may be defined. The private MIB may be defined in accordance with the structure of management information rules. A MIB may be provided by an application server and may be loaded into an SNMP console for an end-user to view, query, and manage the configuration and alarm objects.

The update management system may be managed by employing available SNMP console applications.

Figure 28:
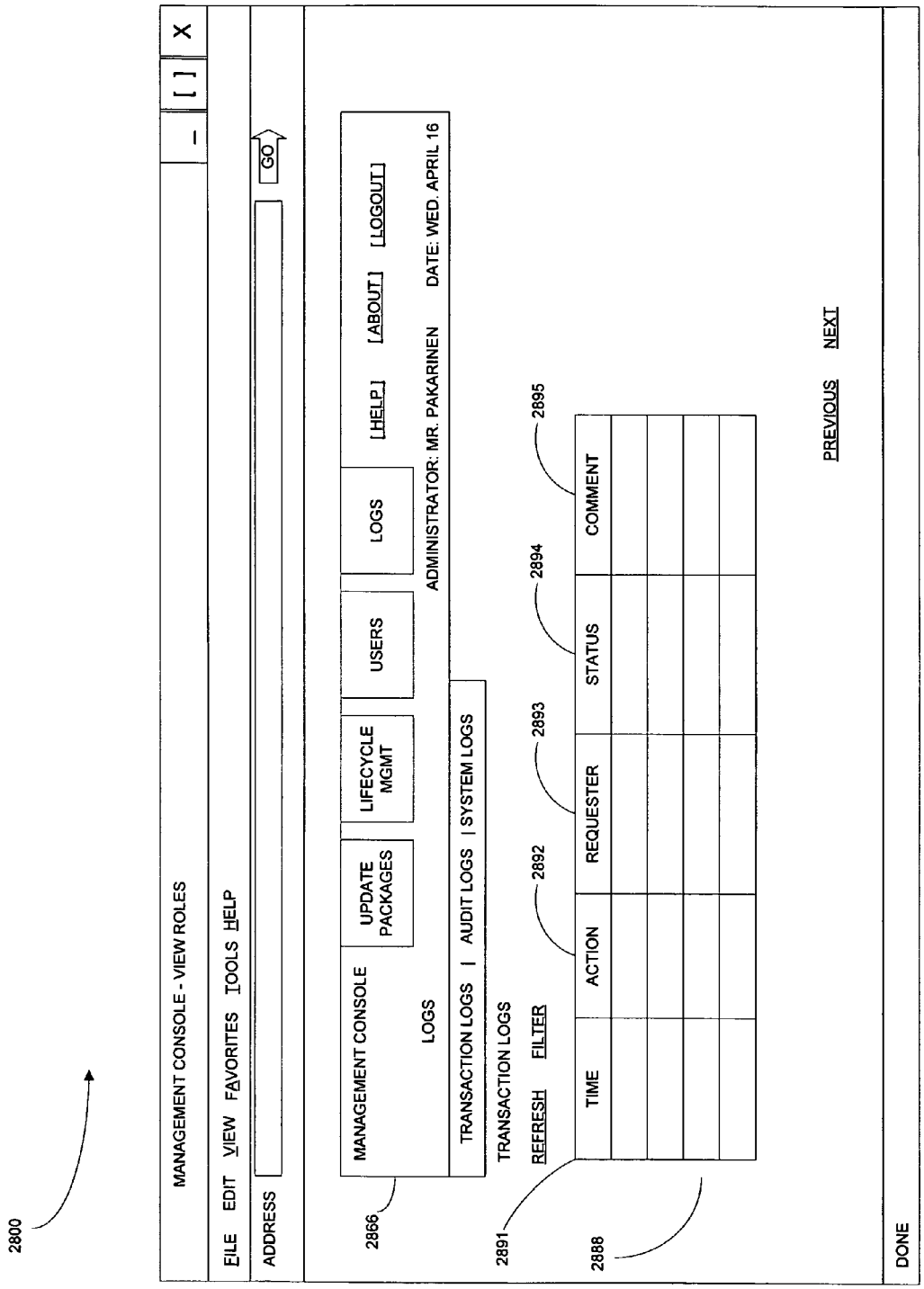
FIG. 28 is a block diagram illustrating an exemplary view roles and transaction log screen displayable on an electronic device according to an embodiment of the present invention.

FIG. 28 illustrates an exemplary view roles/transaction log screen 2800 and a logs management console header frame 2866, according to an embodiment of the present invention. The update management system, such as for example, update management system 105A illustrated in FIG. 1A, may employ a plurality of logging services. The logging services may be consolidated to allow administrators a central place to review logs for all update store modules, such as for example, 129A illustrated in FIG. 1A, and delivery servers, such as for example, 127A illustrated in FIG. 1A, currently deployed. The update management system, such as for example, 105A illustrated in FIG. 1A, may maintain at least one of the following logs: a transaction log, an audit log, and a system log, for example. Each of the logs (for example, transaction log 2888 as illustrated in FIG. 28) may support at least some of the following features: a time/date range filter to limit the amount of log to be displayed sort-able in a date/time column 2891, and refreshable on a configurable interval, an action column 2892, a requester column 2893, a status column 2894, and a comments column 2895.

The transaction log may be consolidated from all the download modules currently in the update management system, such as for example, 105A illustrated in FIG. 1A. The transaction log may display detail information for each attempt from client(s) to request update packages.

Figure 29:
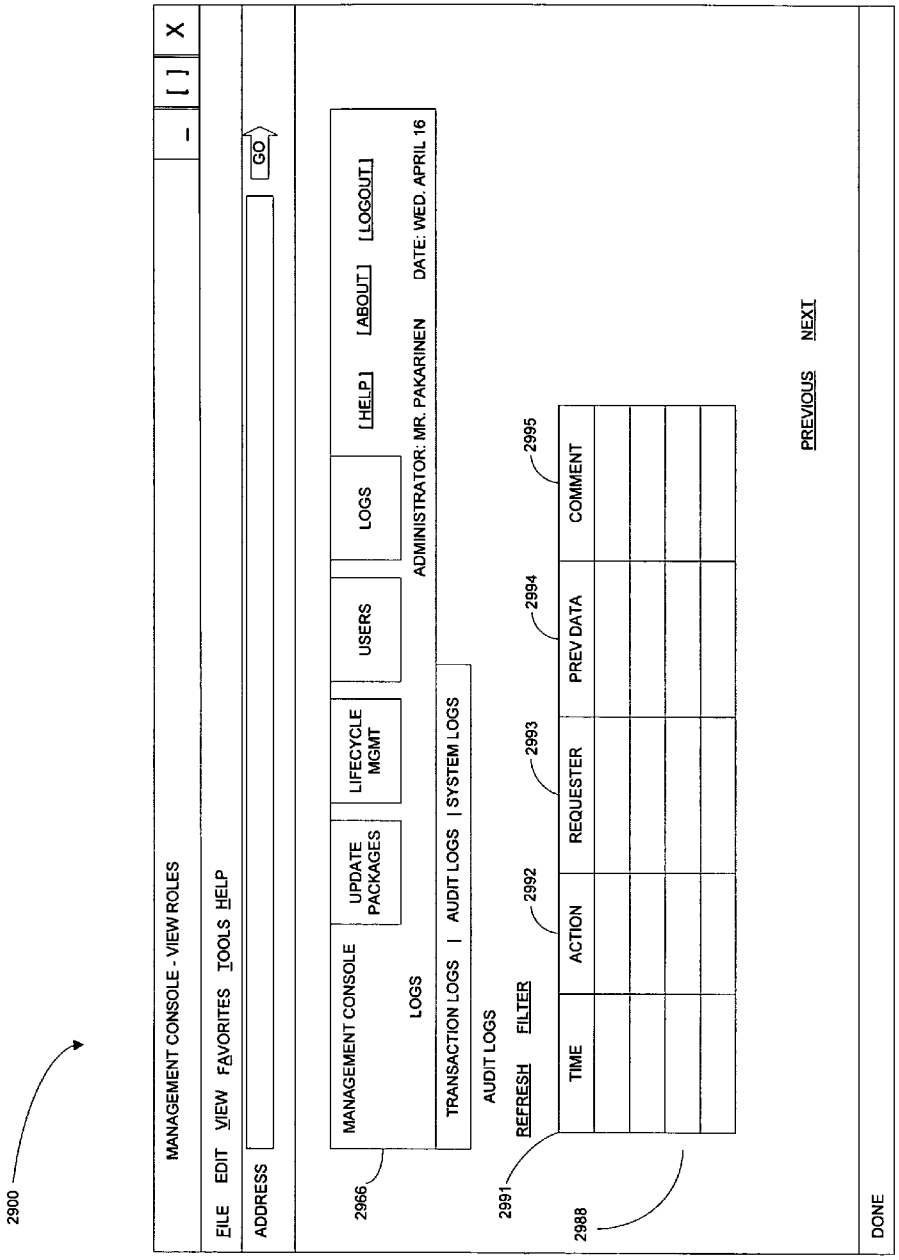
FIG. 29 is a block diagram illustrating an exemplary view roles and audit log screen displayable on an electronic device according to an embodiment of the present invention.

FIG. 29 illustrates an exemplary view roles/audit log screen 2900 and a logs management console header frame 2966, according to an embodiment of the present invention. The audit log 2988 may provide detailed audit trails of actions performed by all end-users of the update management system, such as for example, 105A illustrated in FIG. 1A. The end-user actions may comprise lifecycle management definition and modification, modification of system parameters, and uploading of update packages, for example. Each of the logs (for example, audit log 2988 as illustrated in FIG. 29) may support at least some of the following features: a time/date range filter to limit the amount of log to be displayed sort-able in a date/time column 2991, and refreshable on a configurable interval, an action column 2992, a requester column 2993, a status column 2994, and a comments column 2995.

Figure 30:
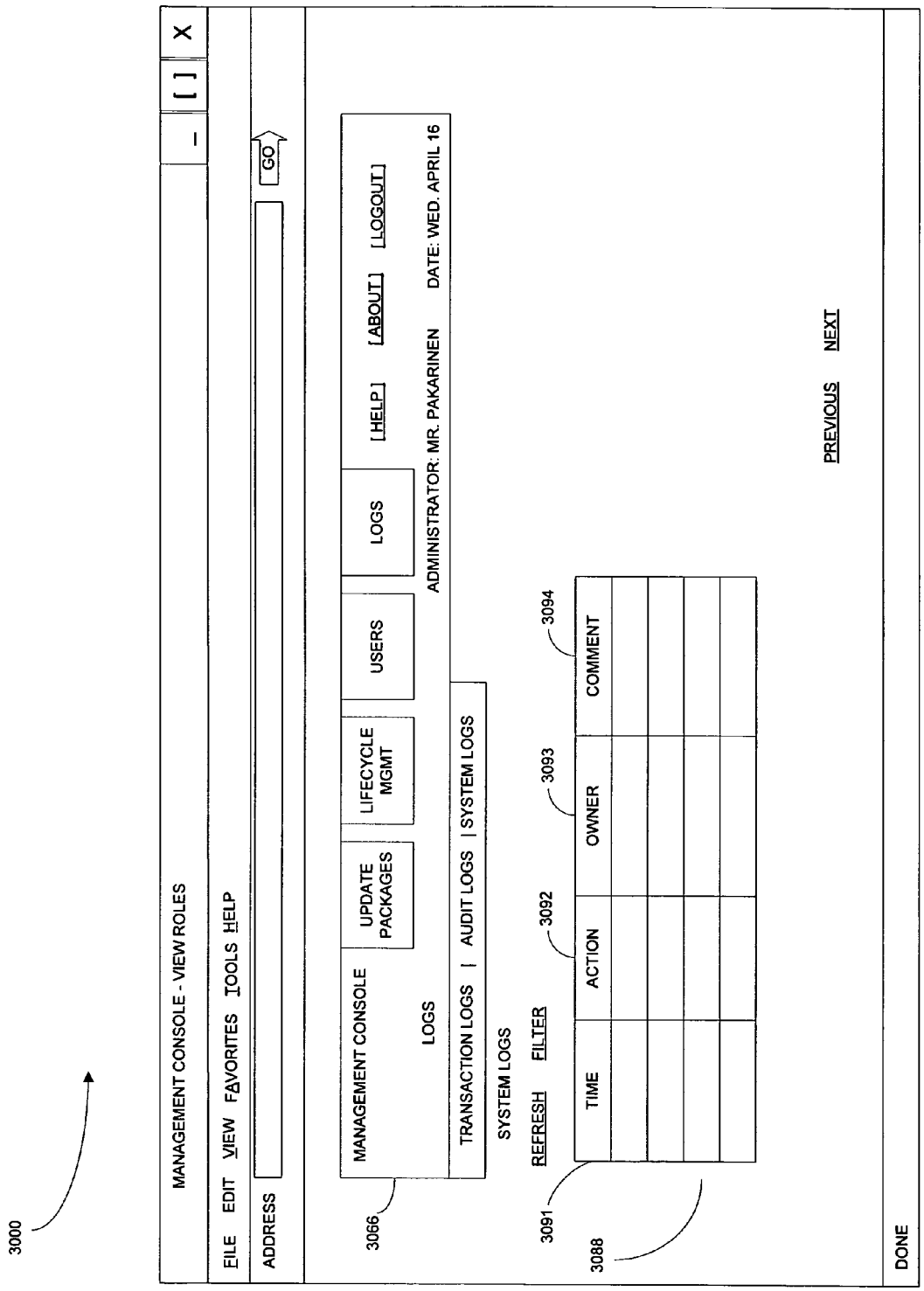
FIG. 30 is a block diagram illustrating an exemplary view roles and system log screen displayable on an electronic device according to an embodiment of the present invention.

FIG. 30 illustrates an exemplary view roles/system log screen 3000 and a logs management console header frame 3066, according to an embodiment of the present invention. The system log 3088 may display all other remaining system activities not considered in a transaction trail/log and/or an audit trail/log. System information may be useful for administrators in troubleshooting the system. Each of the logs (for example, system log 3088 as illustrated in FIG. 29) may support at least some of the following features: a time/date range filter to limit the amount of log to be displayed sort-able in a date/time column 3091, and refreshable on a configurable interval, an action column 3092, an owner column 3093, and a comments column 3094.

Figure 31:
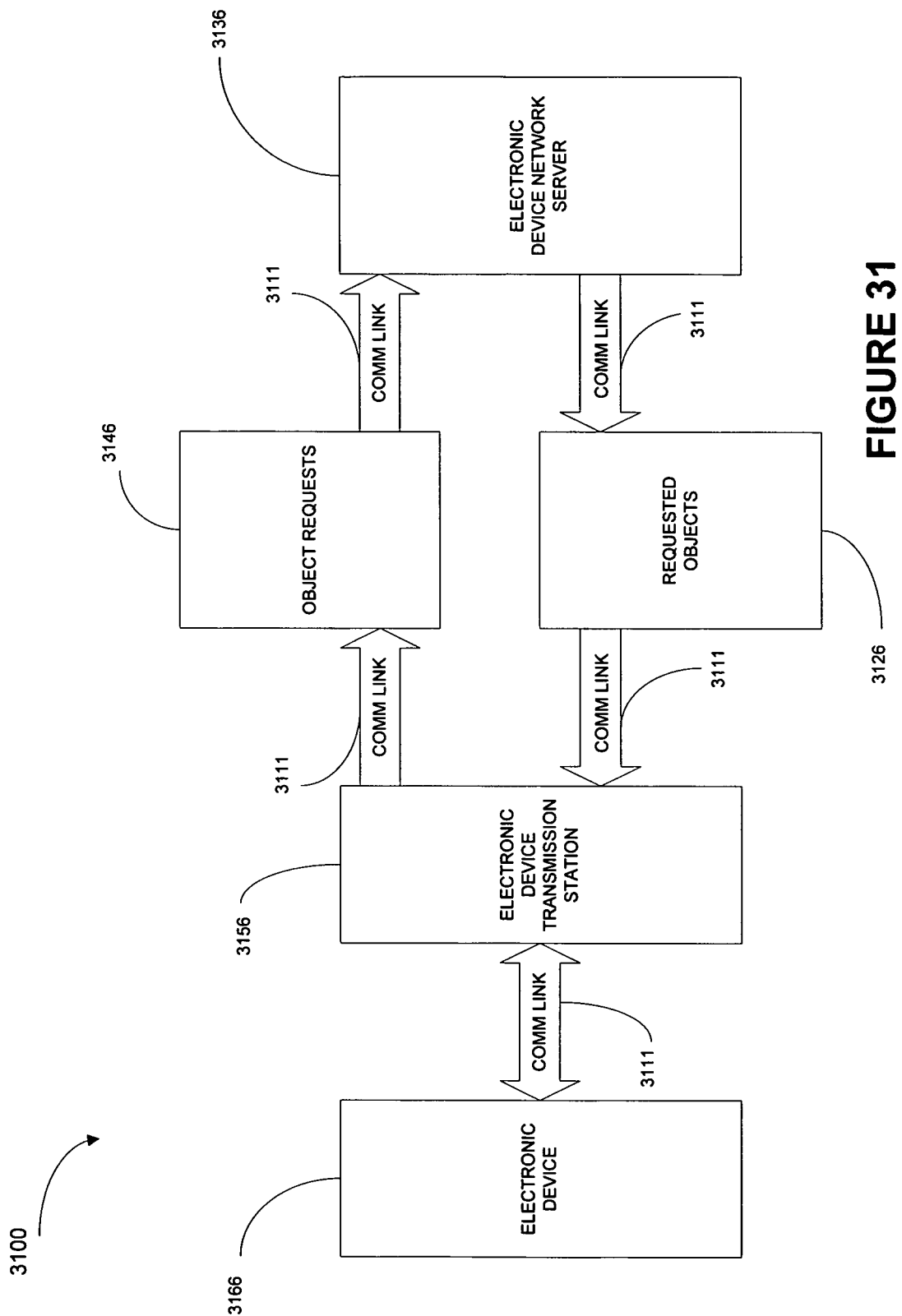
FIG. 31 is a block diagram illustrating an exemplary electronic device network employing an update package request and delivery method according to an embodiment of the present invention.

FIG. 31 is a block diagram illustrating an exemplary electronic device network 3100, according to an embodiment of the present invention. Aspects of the present invention may be found in updating separate components having significant interdependencies in a wireless electronic device comprising methods for tracking and ensuring that software dependencies are accounted for during an update process.

Aspects of the present invention may be found in a method of updating an electronic device 3166 wherein the electronic device may communicate an update request via a communications link 3111 to an electronic device transmission station or transmission tower 3156. In FIG. 31, all communications links, regardless of the individual protocols employed, wired, wireless, optical, etc., are identified by reference numeral 3111, for example. The electronic device transmission station 3156 may transmit object request(s) 3146 associated with the update package request from the electronic device 3166 via another wired or wireless communications link 3111 to the electronic device network server 3136 managing update requests. The electronic device network server 3136 may respond to the update package (object) requests 3146 by transmitting the requested objects 3126 via a communications link 3111 to the electronic device transmission station 3156 and ultimately to the electronic device 3166.

Dependencies may exist between different objects within a software system and at different levels of the system. For example, Java midlets/applets may have a dependency to a particular keyboard/video/mouse (KVM) arrangement. A KVM arrangement may have dependencies associated with a particular firmware revision. A particular firmware revision may have dependencies associated with a particular set of configuration parameters stored in separate files in the file system.

Dependencies may be managed via a joint server-client solution adapted to track revisions of objects within a particular manufacturers device, maintain a list of dependencies between objects based upon a manufacturer-by-manufacturer analysis, and ensure that dependencies are accommodated before allowing update of a requested electronic device object.

Mobile electronic devices, such as cellular phones/handsets, for example, may contain a catalog (management information base (MIB)) containing the identity and revision of each updateable component within the mobile electronic device 3166. When the mobile electronic device 3166 requests, from the electronic device network 3100, an update package for updating a particular component, the mobile electronic device 3166 may also transmit the corresponding catalog to the server 3136 along with and as part of the request.

The electronic device network server 3136 may be adapted to maintain a list of valid components for a particular electronic device/model 3166, and a list of dependencies associated with each component. The electronic device network server 3136 may evaluate the requested item(s), and compare the requested item(s) to a list of dependencies associated with the electronic device catalog. If there is a dependency match in the catalog, and the revision of the object in the catalog is later than a required revision, the request may be fulfilled or served.

If the electronic device catalog indicates that there are items which may not support a newly requested update item, the electronic device may be updated recursively until the electronic device 3166 is able to support the requested update item. The end-user may be notified of dependencies via the electronic device user interface (UI), and may be prompted to also upgrade associated components.

The aforementioned method works well for objects that are adapted to be upgraded at the application level. Individual component upgrades at the application level may not affect the basic abilities of the mobile electronic device 3166, for example, the ability to successfully boot, acquire service, and make/receive voice/data connections to the electronic device network. Additionally, if the upgrades are performed in a particular order, the objects being upgraded at this level may be updated in independent sessions.

The same may not be said of firmware/software upgrades and their associated dependencies. The update of firmware/software and firmware/software dependent information may happen at the same time, so that when a new firmware/software boots, the data upon which the firmware/software update depends may immediately be made available. The configuration data and code may match on a version-by-version basis in order for the upgrade operation to be successful.

Figure 32:
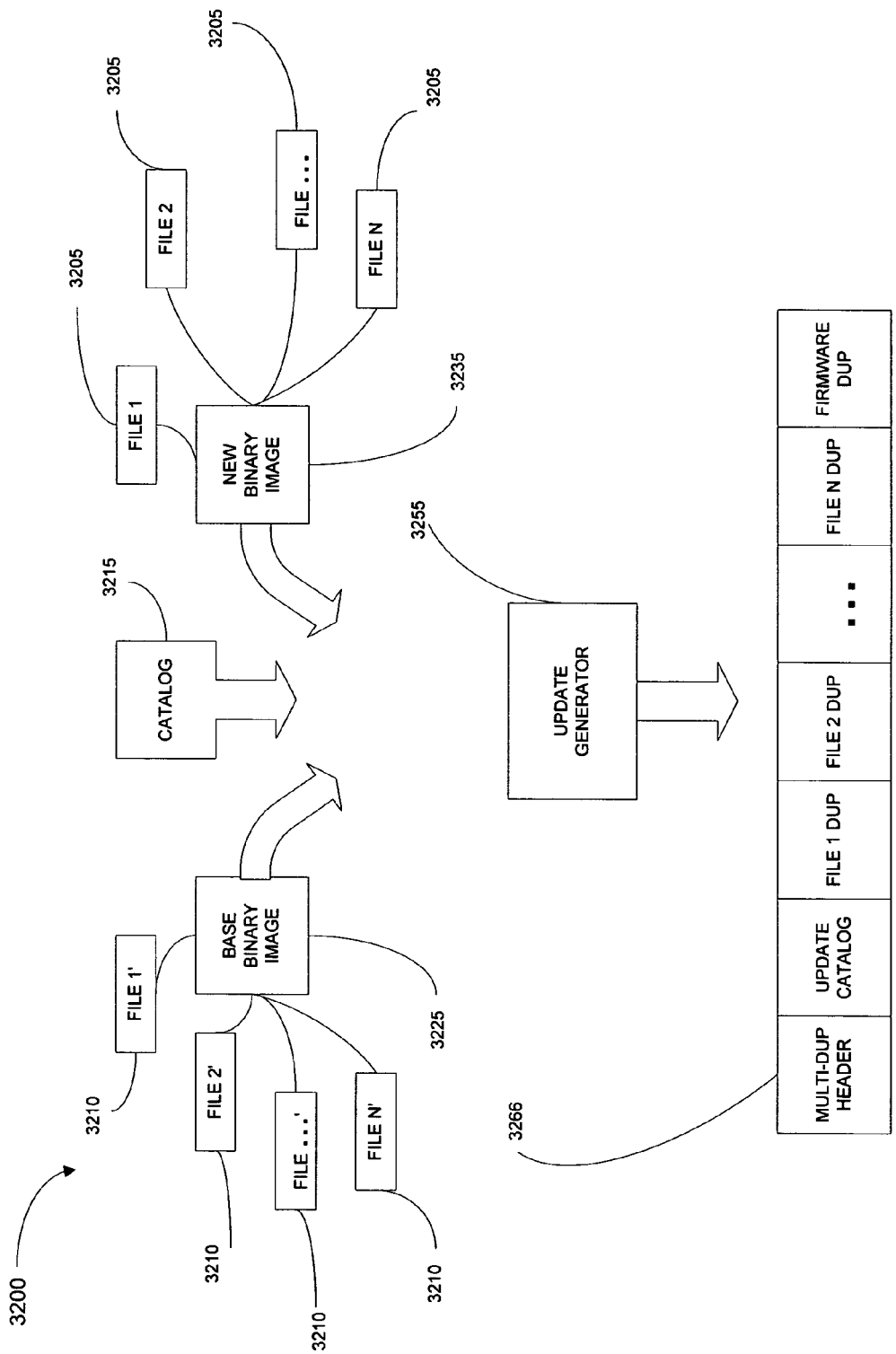
FIG. 32 is a block diagram illustrating an exemplary method of update package generation according to an embodiment of the present invention.

FIG. 32 is a block diagram illustrating an exemplary method of update package generation 3200, according to an embodiment of the present invention. In an embodiment according to the present invention, the update generator 3255 may take as input, at least two binaries, such as for example, executable and linking files (elf files), comprising a base binary image 3225 and a new binary image 3235 and a plurality of associated files (file 1'-file N', 3210) and (file 1-file N, 3205) and generate an update package 3266 having instructions for updating an electronic device's firmware. The upload update package catalog 3215 may also be included in the update package 3266 created.

Aspects of the present invention may be found in adding not only firmware binaries, such as 3225 and 3235, for example, but also any firmware dependent files (file 1'-file N', 3210) and (file 1-file N, 3205), for example, as inputs to the update generator 3255. The files 3210, 3205 may comprise data and/or code.

In an embodiment according to the present invention, the base binary image 3225 of the electronic device may be used to create a universal dictionary that may be used to encode different firmware/software dependent files being bundled in the upgrade process in mini-update packages. The mini-update packages may be bundled into a single update package 3266 along with a firmware update package to create a multi-duplex update package (multi-DUP) 3266, i.e., an update package adapted to update a plurality of software application, firmware, and other electronic device components using one update package.

A catalog 3215 comprising all firmware dependencies may be included in the new multi-DUP 3266. The dependency information may be prepared by the manufacturer and provided as an input at the time of update package creation. The dependencies may be applicable to configuration data pertaining to firmware, but could also be applications required by a particular firmware package. The catalog 3215 may contain identifier and revision information for a particular object to be updated, as well as an indication of whether the update may remain uncompressed or be compressed. Object identifiers and revision numbers may be defined based upon a manufacturer-by-manufacturer analysis.

Once the multi-DUP 3266 is delivered to the electronic device, an update agent in the electronic device may interrogate the header and compare the files present in the multi-DUP 3266 with a list resident in the update catalog. If the header and catalog compare favorably, the update agent may be enabled to proceed. However, if files are missing from the multi-DUP 3266, the update agent may interrogate the file system of an electronic device network server to locate the additional dependent files there. If the files are found, the update may proceed. If not, the update package 3266 may be removed and the update status of the electronic device components may be set to "no update required".

Having the update agent check the file system provides flexibility for the update agent to work with additional management protocols. If this approach is taken, the management protocols may be used to deliver appropriate files (compressed or uncompressed) to the electronic device. The multi-DUP 3266 may not contain mini-DUPs associated with the files, but may have a catalog entry indicating that an upgrade of this component is required. The update agent may know whether or not to uncompress the files by interrogating the entry in the dependency catalog.

Aspects of the present invention may be found in an update agent (updating software) adapted to update peripheral files in a file system. The update agent may create a new (updated) version of the peripheral files while maintaining the old (backup) peripheral file and preserving the peripheral filenames. Once the new (updated) versions of the peripheral files have been successfully created, updating/upgrading of the firmware/software associated with the peripheral filed may proceed. During the update/upgrade process, the update agent may also write the contents of the new peripheral files over and into the old peripheral files and file storage locations and update the electronic device's catalog information with information from the catalog 3215 in the multi-DUP 3266 delivered to the electronic device. The electronic device may be reset and the software may be booted. The dependencies may all be accounted for upon completion of the update.

Aspects of the present invention may be found in a method of facilitating update of individual components (other than firmware), accounting for dependencies between components, permitting a roll-back mechanism to recover from aborted updates, and providing an electronic device flexibility to work with defined management protocols, as necessary, but also be adapted to provide a stand-alone electronic device update.

Figure 33:
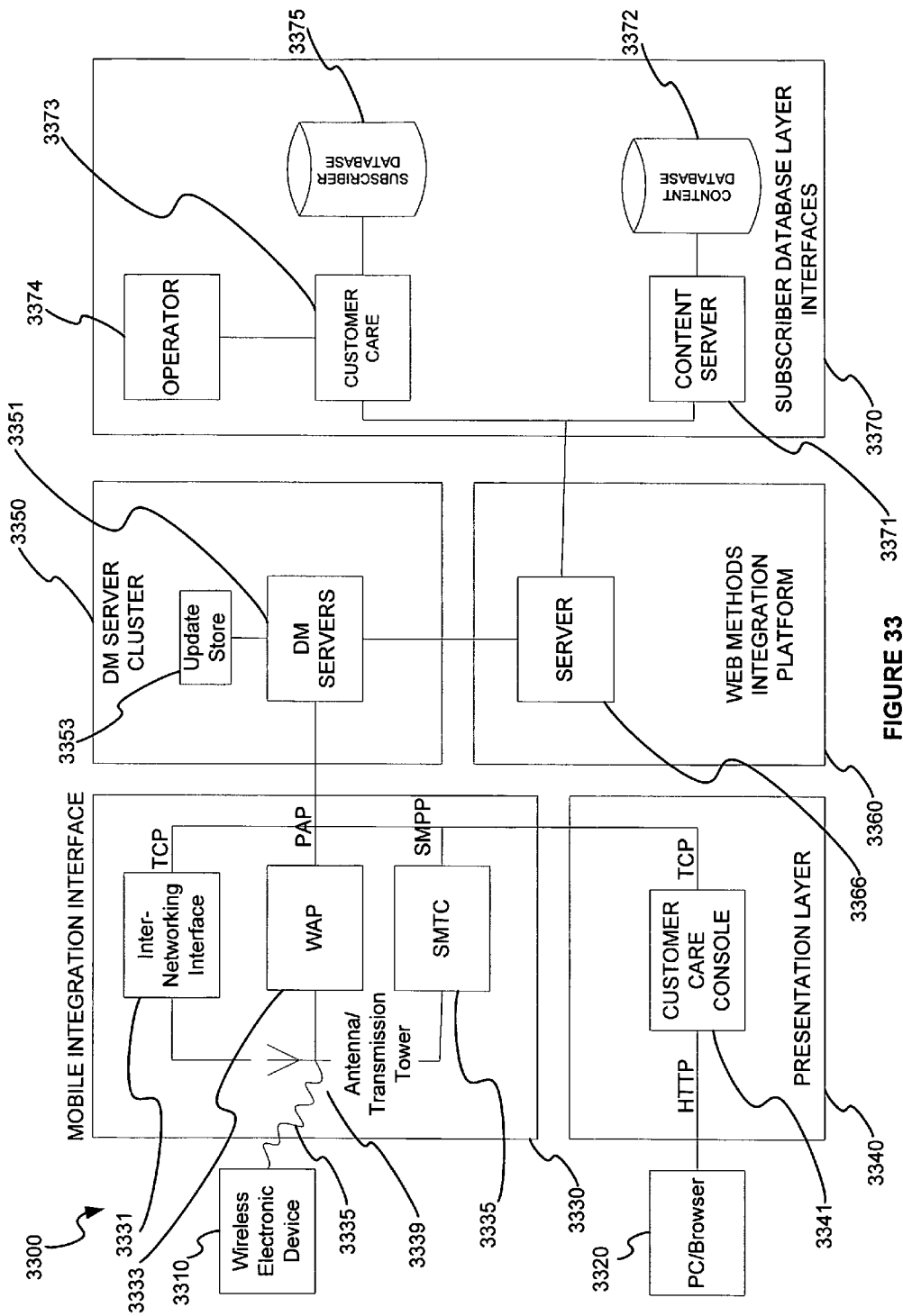
FIG. 33 is a block diagram illustrating an exemplary electronic device network operator deployment according to an embodiment of the present invention.

FIG. 33 is a block diagram illustrating an exemplary electronic device network operator deployment system 3300 according to an embodiment of the present invention. In an embodiment according to the present invention, delivery of updates to electronic devices, such as for example, wireless electronic device 3310 may be practiced via a wireless communication link 3335 from remote servers by employing protocols and methods adapted to work in conjunction with existing firewalls and other existing security infrastructure, such as those found in carrier networks, electronic device networks, and manufacturer networks, for example. The wireless electronic device 3310 may be wirelessly and communicatively coupled to an antenna/transmission tower 3339 in a mobile integration interface 3330, for example.

In an embodiment according to the present invention, the mobile integration interface 3330 may comprise an inter-networking interface 3331, a wireless application protocol (WAP) interface 3333, and/or a short message transmission control (SMTC) interface 3335, for example.

In an embodiment according to the present invention, the inter-networking interface 3331 may comprise a transmission control protocol (TCP). The WAP interface 3333 may comprise a password authentication protocol (PAP). The SMTC interface 3335 may comprise a short message peer-to-peer protocol (SMPP).

In an embodiment according to the present invention, the mobile integration interface module 3330 may also be communicatively coupled to device management (DM) servers 3351 in a DM server cluster 3350, for example. The DM servers 3351 may also be communicatively coupled to another remote server 3366 located in a web methods integration platform module 3360, for example.

In an embodiment according to the present invention, the system 3300 illustrated in FIG. 33 may also comprise a presentation layer 3340 adapted to provide an interface between an end-user and the system 3300. The presentation layer 3340 may comprise a textual user-friendly interface and/or a graphical user-friendly interface. The presentation layer 3340 may comprise a customer care website 3341. The customer care website 3341 may be communicatively coupled to an end-user PC/Browser 3320 via hypertext transfer protocol (HTTP), for example. The customer care website 3341 may also be communicatively coupled to DM servers 3351 in the DM server cluster 3350 via the transmission control protocol (TCP).

In an embodiment according to the present invention, the system 3300 may also comprise a subscriber database layer interfaces module 3370 comprising a content server 3371, a customer care server 3373, a network operator deployment server 3374, a content database 3372, and a subscriber/customer database 3375. The subscriber database layer interfaces module 3370 may be communicatively coupled to a server 3366 in the web methods integration platform 3360, for example. The content server 3371 may be communicatively coupled to the content database 3372, for example. The customer care server 3373 may be communicatively coupled to the subscriber/customer database 3375, for example. The network operator deployment server 3374 may also be communicatively coupled to the customer care server 3373.

In an embodiment according to the present invention, update download design and implementation may be implemented according to a standard based upon the Open Mobile Alliance Over-The-Air (OMA OTA) version 1.0, for example.

In an embodiment according to the present invention, low-level metadata naming conventions and high-level metadata naming conventions may be seamlessly integrated to provide full reporting and data-mining capabilities by employing the high-level naming schemes.

In an embodiment according to the present invention, the system 3300 may be designed such that typographical errors and other human data entry errors do not impact reporting and data-mining results. Low-level metadata may comprise the form of parameters contained in the wireless electronic device 3310, for example. High-level metadata may comprise more verbose names used for presentation and queries.

In an embodiment according to the present invention, update packages may be "quarantined" and verified as a security measure. Update packages may be inspected for viruses and/or other malicious code. The update packages may be temporarily quarantined in a server, in the electronic device, or both, for example.

In an embodiment according to the present invention, in a default lifecycle configuration, an uploaded update package having a status indicated as 'NEW' may not be immediately downloadable. Depending upon the lifecycle configuration, the "NEW" update package may be validated and approved prior to being downloadable.

In an embodiment according to the present invention, the system 3300 may be developed with the consideration that electronic device update providers may consider "Broadcast Upgrading". "Broadcast Upgrading" may be defined herein as the ability to send an upgrade/update out to all associated electronic devices in the associated network, for example, those having the same make, model and/or software version simultaneously to accomplish/perform the update.

In an embodiment according to the present invention, the system 3300 may be provided with a customer care console, such as for example, customer care website 3341 illustrated in FIG. 33, where an end-user may interface with a user-friendly customer/subscriber database 3375, for example. The customer/subscriber database 3375 may comprise update packages and indicate update package availability, for example. An end-user may be capable of sending short messaging service (SMS) messages to other customers/subscribers in the customer/subscriber database 3375 as well as being able to track update notification messages coming back from client electronic devices, such as for example, wireless electronic device 3310.

In an embodiment according to the present invention, an update store 3353 may be integrated with and communicatively coupled to servers, such as for example, device management (DM) servers 3351 in DM server cluster module 3350, for example. The update store 3353 may also be associated with another server 3366 in the web methods integration platform 3360 to facilitate the use of third party integration technology for interactions and content retrieval, for example.

In an embodiment according to the present invention, the update store 3353 may be designed to be compliant with known server components, such as for example, DM servers, generic delivery servers, and/or provisioning servers.

In an embodiment according to the present invention, the system 3300 may be adapted to supply billing event information to an existing billing infrastructure and to offer "For Fee" type updates, for example. The system 3300 may comprise information to be exported to peripheral billing systems, for example.

In an embodiment according to the present invention, the system 3300 may be adapted to manage individual customer records, electronic device make and model information, firmware/software version information, update history information, etc., for example. The management of the information may be facilitated through third party resources, for example. However, the information may be verified and individual transactions may also be logged, for example. Each electronic device may be provided with a unique identifier to provide data regarding the version of firmware/software that was most recently downloaded to electronic device and additionally and a firmware/software download history.

In an embodiment according to the present invention, the update store 3353 and lifecycle management server (illustrated in FIGS. 3 through 32, for example) in the system 3300 may be adapted to report and log all errors. The logged error messages may be adapted to include and provide a customer/subscriber with sufficient information to take action to overcome and/or correct the error. Error messages may be logged in the management console (illustrated in FIGS. 3-*through* 32, for example) and exported over the simple network management protocol (SNMP) interface to a selected SNMP console, for example.

In an embodiment according to the present invention, the logging of transactions and associated parameters may be configurable to include a variable and a plurality of parameters. The plurality of parameters may be stored in a plurality of fields.

In an embodiment according to the present invention, update package delivery may be based upon electronic device "delivery readiness", such as for example, sufficient available memory (flash memory, for example) and other device readiness characteristics.

In an embodiment according to the present invention, update package delivery may be based upon the OMA OTA standard, wherein checking for available memory (flash memory, for example) may be facilitated in a firmware management client, for example, which may provide the OMA OTA standard based upon an update package descriptor file in accordance with an embodiment of the present invention.

In an embodiment according to the present invention, the update management system 3300 may publish transaction information, such as for example, billing and security events (alarms and upload failures). Alarms may also be transmitted over a standard simple network management protocol (SNMP).

In an embodiment according to the present invention, the update store 3353 may be adapted to access rights delegated to a 3rd party lightweight directory access protocol (LDAP) system server, for example.

In an embodiment according to the present invention, end-users may employ security mechanisms and security protocols to control access to server components, prevent unauthorized access to server components, restrict logins to authorized networks, administrators, end-users, and user management tools, and provide intrusion detection and secure system logging, for example.

In an embodiment according to the present invention, the update store 3353 may employ user authentication. The data transport throughout the update management system 3300 may be implemented over virtual private networks (VPNs). A secure sockets layer (SSL) for a transport layer may also be employed.

In an embodiment according to the present invention, security protocols may include encryption algorithms, cipher suites, and other secure protocols for the transmission of data between interfaces, such as the WAP interface 3333, the SMTC interface 3335, and the inter-networking interface 3331 in the mobile integration interface module 3330, for example, as illustrated in FIG. 33. The interfaces may ingest update packages from update package suppliers and additionally from other approved sources.

In an embodiment according to the present invention, the system 3300 may also employ internationalization. The user interfaces (textual and/or graphical interfaces) that the customer may be provided may include error messages and help menus designed to facilitate double byte code to facilitate Asian language support functionality, for example.

In an embodiment according to the present invention, error code messages may be easily configurable and may convey an explanation of the associated error problem and also provide related explanatory documentation, such as for example, error programs and associated documentation.

In an embodiment according to the present invention, the DM Server 3351 in DM server cluster 3350, for example, may be provided with access to the customer care console 3373 permitting an administrator the ability to view a list of customers/subscribers with associated customer/subscriber parameters from the customer/subscriber database 3375, for example. Electronic device clients may also choose one or a group of end-users to push updates to and also to choose whether the update is to be a silent update or an opt-in update, for example. Upon initiating the update environment, update notifications may be sent to the affected corresponding devices.

In an embodiment according to the present invention, the specific protocol for interfacing between the DM Servers 3351 and a DM agent for example, may be proprietary to the Bitfone Corp., but may also be adapted to follow the SyncML DM server specification. The specific protocol may also be adapted to follow the OMA OTA version 1.0 specification in accordance with another embodiment of the present invention.

In an embodiment according to the present invention, the update store 3353 may employ at least two sets of criteria to select an appropriate update package, for example, a mandatory set of criteria and an optional set of criteria.

In an embodiment according to the present invention, mandatory criteria may comprise for example, an electronic device model name, an electronic device manufacturer name, and software/firmware version identification information.

In an embodiment according to the present invention, the optional criteria may be configurable by an end-user and may include a plurality of parameters, such as for example, a device international mobile equipment identifier (IMEI), a FLEx file version (a FLEx file is an information formatting program, for example), a phone number, and a unique device ID. In an embodiment according to the present invention, only one optional criterion may be employed in any given time, for example, there may always will be four parameters employable for determining an appropriate corresponding electronic device update package.

In an embodiment according to the present invention, the update store 3353 may store a descriptor file corresponding to each update package. The descriptor file may describe each update package in terms of size, description, and approximate update time, for example. The update store 3353 may also provide an application program interface (API) for retrieving the descriptor file based upon the same parameters used to select an associated update package.

Aspects of the present invention may be found in an end-to-end system architecture for securely deploying and installing over the air (OTA) firmware upgrades to electronic devices, such as for example, mobile handsets. The system may be adapted to provide upgrades/updates capable of updating the core embedded operating system (OS) of an electronic device by employing read only memory (ROM-type) updates.

In an embodiment according to the present invention, the system may facilitate modification of firmware/software in embedded devices, such as for example, handheld, wireless mobile handsets. The firmware/software in the electronic device may be a particular version, for example. Two different versions of firmware/software may be analyzed. The information employed to perform the analysis may comprise a set of executable instructions to modify/convert a first version of the firmware/software into a second version of the firmware/software. The translation information may economically be packaged and compressed as small as possible for OTA transmission, for example. Delivery of the update package to the embedded, electronic device may also be supported in an embodiment according to the present invention.

TABLE 3

Exemplary System Components
Update Package Generator
Management Console
Update Store
Delivery Module
Download Agent
Firmware Management Agent
Handoff Agent
Update Agent Table 3 lists exemplary system components that may be employed in an embodiment according to the present invention.

In an embodiment according to the present invention, the system 3300 may employ an over-the-air (OTA) method to flash a core embedded operating system (OS) of an electronic device stored in non-volatile memory (NVM).

Figure 34:
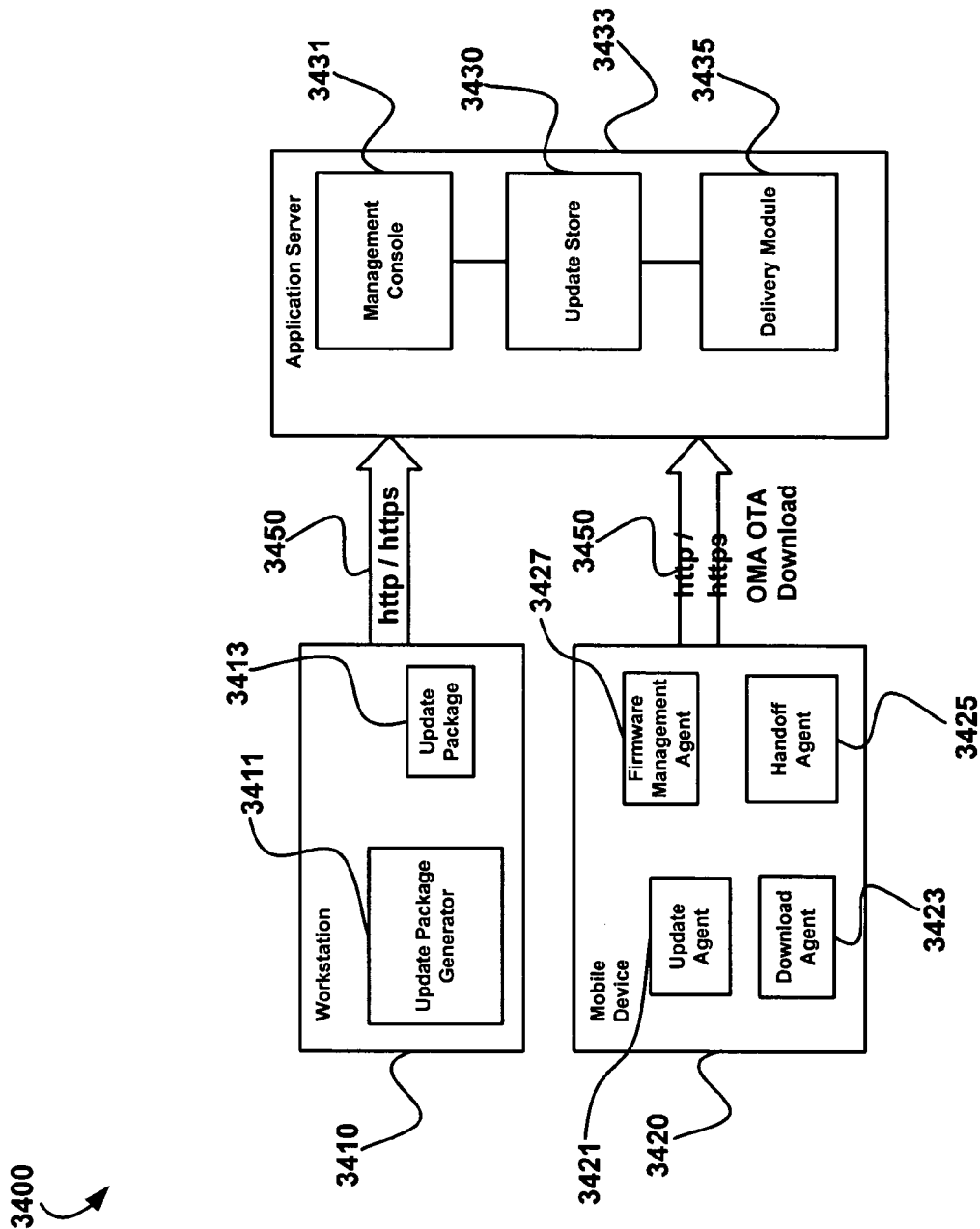
FIG. 34 is a block diagram illustrating an exemplary system and interface architecture according to an embodiment of the present invention.

FIG. 34 is a block diagram illustrating an exemplary system 3400 and interface architecture according to an embodiment of the present invention. The workstation node 3410 may comprise a computer adapted to run an update package generator 3411 to generate update packages 3413, for example. Each workstation node 3410 in FIG. 34 may represent a discrete computing system.

In an embodiment according to the present invention, the update generator 3411 may produce update packages by performing byte-level analysis upon sequential firmware images (different versions). An update package 3413 may comprise a binary set of executable instruction for converting a first version of firmware/software into a second version of firmware/software. The update package generator 3411 may package and compress updates employing compression techniques. The update package generator 3411 may also be adapted to manage projects enabling a customer to organize electronic device firmware/software images by electronic device model, for example.

In an embodiment according to the present invention, the update package generator 3411 may employ the update package 3413 as an interface. The update package 3413 may comprise a container for the translation instructions/code/data. An electronic device having embedded firmware/software may employ the update package 3413 to initiate update of firmware/software. Performing the update modifies the firmware/software in the electronic device.

In an embodiment according to the present invention, the update package generator 3411 may also be capable of uploading an update package 3413 directly to the update store 3430 without exiting update package generating program execution. Uploading may be accomplished by launching an Internet browser, for example.

In an embodiment according to the present invention, the update package generator 3411 may be adapted to preprocess firmware/software images to facilitate byte-level analysis of the firmware/software modifications. Preprocessing may provide the update package generator algorithm a modified firmware/software image more likely to match a current/existing firmware/software image. The update package generator algorithm employing preprocessing may be adapted to produce an update package 3413 approximately 80% smaller an update package produced without employing preprocessing. In order to incorporate preprocessing in the update package generator algorithm, the update package generator 3411 may employ linker information from the firmware/software build process. The update package generator 3411 may support the following linker file formats, for example.

Link Information Source
    ELF (executable and linking format) Files
    IEEE-695 (Institute of Electrical and Electronics Engineers) Files
    Symbian 7.0.5

In an embodiment according to the present invention, preprocessing may be employed in processor platforms to perform address instruction interpretation. In an embodiment according to the present invention, the update generator 3411 may be employed by the following processor platforms and may support "big endian" and "little endian" byte order, for example.

Supported Prediction Targets
    ARM THUMB Family
    NEC V800 Family
    Motorola MCore Family
    Infineon C166/ST10 Family A processor platform may be either "big endian" or "little endian" based upon the manner in which the processor platform encodes multiple byte values. There is no difference in performance between the two encoding methods.

In an embodiment according to the present invention, zoning may be employed to divide a firmware/software image into a plurality of code segments having different settings and rules for updating a particular segment. The most common settings for zone management may comprise defining the following, for example: a preprocessor, a write unit size, an updateable zone, an excluded zone, an update agent zone, and a reserved write unit zone.

In an embodiment according to the present invention, the update package 3413 may be authenticated and the transmitting source may also be authenticated. The update package generator 3411 may provide the firmware/software developers the ability to digitally "sign" the update package 3413, for example. The update agent 3421 may be adapted to complement the authentication functionality by providing means to decrypt and verify the update package 3413, for example. An MD5 (message digest 5) algorithm may be employed to calculate a signature of the update package 3413 and then encrypt that signature using an RSA (by RSA Data Security, Inc.) public/private key infrastructure. The encrypted signature may be employed in the update package 3413 ensuring that update package may be delivered to an electronic device.

In an embodiment according to the present invention, the system application server 3433 may comprise an update store 3430, a management console module 3431, and a delivery module 3435 for example. In an embodiment according to the present invention, the application server 3433 may be Java 2 Enterprise edition (J2EE) application server, for example, and the update store 3430, management console module 3431, and delivery module 3435 may comprise J2EE software components.

In an embodiment according to the present invention, the management console module 3431 may facilitate a web-based view into the status, data store, and operational logs of the update store 3430. The management console module 3431 may also invoke a provided application protocol interface (API) of the update store 3430 for uploading and management the update packages, such as for example, update package 3413.

In an embodiment according to the present invention, the update store 3430 may provide wireless electronic device carrier networks and electronic device manufacturers with a system for managing deployment of update packages, such as for example, update package 3413. The update store 3430 may also provide database and business logic to ensure that appropriate authentic update packages are made available to the intended electronic devices.

In an embodiment according to the present invention, the update store 3430 may perform at least the following activities, for example.
    Storing update packages, log data, system status
    Managing the update package life cycle
    Maintaining status and transition state information about the update packages
    Limiting the download of some update packages to correspondingly limited groups
    Expanding the functionality of the update stores exposed as external interfaces
    Uploading, retrieving and managing update packages
    Storing alarms, system-wide logs, and status information In an embodiment according to the present invention, the update store may incorporate a rules-based approach to life-cycle management of update packages, such as for example, update package 3413. The rules may be designed around sets of "mandatory" selection criteria and "optional" selection criteria.

In an embodiment according to the present invention, the mandatory criteria may alt least comprise the following for example.
    Manufacturer Name
    Model Name
    Firmware Version (Source)

In an embodiment according to the present invention, the optional selection criteria may be any other parameter selected or specified by the electronic device manufacturers and the electronic device carrier networks. The optional criteria may be supported by the electronic devices and may be transmitted as part of a simple object access protocol (SOAP) request for an update package, such as for example, update package 3413. The update store 3430 may support the three mandatory criteria as well as up to one additional optional criterion when performing an update package selection determination, for example.

To support large number of clients requesting the download of update packages, the update management system 3400 may provide for a logical and physical separation of an update package downloading service in an implementation of the delivery module 3435 in accordance with an embodiment of the present invention. The logical separation may support the following deployment scenarios, for example.

High throughput and availability environment: cluster of delivery modules each having its own hardware and associated application server, for example.

Test or pilot environment: one delivery module running in the same hardware and application server as the update store, for example.

In an embodiment according to the present invention, the delivery module 3435 may perform at least the following activities, for example.

Protocol handler: the delivery module 3435 may support open mobile alliance (OMA) downloading of generic content protocol via hypertext transfer protocol (HTTP) and/or hypertext transfer protocol secure (HTTPS) 3450. The delivery module 3435 may be a fully functional OMA download server and may also be compatible with OMA download agents, such as download agent 3423 for downloading update packages, such as for example, update package 3413.

Cluster front-end: the delivery module 3435 may be designed for low-cost scalability to handle large numbers of clients. The delivery module 3435 may also provide a simple object access protocol (SOAP) connection to the update store 3430 to retrieve an appropriate update package to return to the requesting client.

Cache handler: The deliver module 3435 may be adapted to reduce load on the update store 3430 by only requesting update packages that are not currently in cache of the delivery module 3435.

In an embodiment according to the present invention, the electronic device may be a node adapted to consume the update package 3413 generated by the update package generator 3411. The electronic device may comprise embedded firmware/software. The electronic device may comprise a mobile handset, for example.

In an embodiment according to the present invention, a firmware management agent (FM) 3427 may control negotiation and downloading of firmware/software to the electronic device. The electronic device manufacturers may implement the bulk of the firmware management agent (FM) 3427 because the manufacturer maintain proprietary detailed knowledge about the firmware/software run time environment of corresponding manufactured electronic devices. The implementation set forth herein may provide a skeleton (template) that the electronic device manufacturers may employ to reduce firmware/software development time.

In an embodiment according to the present invention, the FM 3427 may provide at least the following features during a download of a firmware/software update package, for example.

Send and receive XML messages via HTTP application protocol

Interface with device SMS manager

Display minimum set status and information

Allow opt-in

In an embodiment according to the present invention, the FM 3427 may minimally comprise the following, for example.

SMS (short message service) Message Handler

Data Transfer Handler

Display Handler

Event Handler

In an embodiment according to the present invention, the short message service (SMS) message handler may be adapted to parse a notification SMS message received from electronic device SMS message manager firmware/software. The notification SMS message may comprise a universal resource locator (URL) string employable to connect to the application server 3433, upload electronic device specific information, and download a firmware/software update package, such as for example, update package 3413.

In an embodiment according to the present invention, a data transfer handler may facilitate interfacing to the hypertext transfer protocol (HTTP) application protocol services for opening an HTTP connection, sending request methods to an HTTP server for upload and download, and closing an HTTP connection when completed.

In an embodiment according to the present invention, the display handler may be adapted to display downloading progress text messages, interactive text messages, such as for example, and opt-in message, and other text messages.

In an embodiment according to the present invention, the event handler may be adapted to process key press events, startup events, timeout events, network events, data events, and other events.

In an embodiment according to the present invention, a 3rd party vendor may implement the FM 3427. The FM 3427 may be adapted to store an update package in non-volatile memory (for example, flash) as a filename instead of as an address space, for example. By using a 3rd party FM, the update agent 3421 may also be adapted to employ a filename instead of an address space, for example. When starting an update, the update agent 3421 may load an update state descriptor (USD) from a non-volatile memory address. One field in the USD may be employed to store the address of an update package. The memory address space may be defined at linking time. The handoff agent 3425 may also be a software mechanism adapted to perform the following functions, for example.

1. Store an update package 3413 at a designated non-volatile flash memory location 2. Compute an update state descriptor (USD) and store the computed USD at the designated non-volatile flash memory location 3. Reboot the electronic device once the USD and the update package 3413 have successfully been written into the designated non-volatile flash memory address 4. Provide firmware/software update status to the device manager (DM) software In an embodiment according to the present invention, the handoff agent 3425 may also comprise the following, for example.

Update Status Descriptor Handler

Update Package Storage Handler

Device Reset Handler

Update Status Notification Handler

In an embodiment according to the present invention, the update status descriptor handler may be adapted to generate the update status descriptor (USD) and store the USD at a predefined non-volatile flash memory location.

In an embodiment according to the present invention, the update package storage handler may be adapted to store associated firmware/software update package data at a predefined non-volatile flash memory location.

In an embodiment according to the present invention, the device-reset handler may be adapted to reset the electronic device.

In an embodiment according to the present invention, the update status notification handler may be adapted to read and determine the firmware/software update status from a predefined non-volatile memory location (e.g., flash).

In an embodiment according to the present invention, the download agent 3423 may be adapted to download firmware/software update packages in the electronic device and may also confirm that an update package download is completed. In order to comply with the open mobile alliance (OMA) specifications, downloading the firmware update package 3413 may comprise the following, for example.

1. Prior to downloading a firmware/software update package 3413, a download descriptor file describing the firmware/software update package 3413 may be downloaded. The download descriptor file may comprise information/metadata concerning the firmware/software update package 3413 and instructions employable by the electronic device download agent 3423 for downloading and processing the firmware/software update package 3413.

2. After processing and evaluating the download descriptor file, the download agent 3423 may download the firmware/software update package 3413 using standard hypertext transfer protocol (HTTP) version 1.1 protocol.

3. After downloading the firmware/software update package 3413, the download agent 3423 may store the firmware/software update package 3413 via the application program interface (API) provided by the handoff agent 3425.

In an embodiment according to the present invention, the download agent 3423 may comprise the following, for example.

HTTP (hypertext transfer protocol) Message Handler
XML (extensible markup language) Parser Handler
Content Storage Handler
Capability Check Handler In an embodiment according to the present invention, the HTTP Message Handler may be adapted to send the HTTP methods to the HTTP server and parse the responses, for example.

In an embodiment according to the present invention, the XML Parser Handler may be adapted to parse download descriptors (OMA and Bitfone Corp.) and generate XML for sending to the HTTP server prior to downloading a firmware/software update package, for example.

In an embodiment according to the present invention, the Content Storage Handler may be adapted to interface with services provided by the handoff agent 3425 to store a firmware/software update package 3413 in a predefined non-volatile flash memory location.

In an embodiment according to the present invention, the update agent 3421 may be adapted to process firmware/software updates in electronic devices and employ translation information contained in the update package 3413 to transform/convert a first version firmware/software to a second version of firmware/software. The update agent 3421 may support fault-tolerant updates such that any interruption including power removal during an update may not damage the firmware/software image being updated. Upon recovery from a power interruption, for example, the update agent 3421 may be adapted to continue and complete the firmware/software update.

In an embodiment according to the present invention, the update agent 3421 may be provided operating instructions by the update package generator 3411 and be adapted to operate in a plurality of electronic device environments. The update agent 3421 may be adapted to update a desired firmware/software image bit-for-bit equal to arrive at the intended, updated firmware/software image.

In an embodiment according to the present invention, the update agent 3421 may provide the following features, for example.

May support "Zoning" to coordinate non-contiguous code segments
May support pre-processing to reduce update package size
May support updateable update agent
May support update processing, for example, 1N vs 2N
May support digital signature decryption, authentication, and verification In an embodiment according to the present invention, the update package 3413 may be arranged according to an update package format. The update package format may comprise a specification describing packaging of transformations produced by the update package generator 3411 and consumed by the update agent 3421, for example. The specification may determine what the update agent 3421 is enabled to read, write, modify, covert, etc. The update package specification may comprise information related to transport of the update package 3413 between the update package generator 3411 and the update agent 3421, for example.

In an embodiment according to the present invention, in order to place the update agent 3421 into an embedded device, such as for example, mobile device 3420, an integration process may be performed and followed. A set of design patterns may be identified for integrating the update agent 3421 into a mobile device 3420, for example. The system according to the present invention may be adapted to support and be compatible with a plurality of electronic devices. A compatible system architecture may be facilitated in the update package generator 3411 permitting integration work with a plurality of physical architectures, supporting direct memory access to firmware/software, and supporting a multitude of computer processing unit-types (CPU-types).

The update package generator 3411 as illustrated in FIG. 34 is adapted to be flexible when modifications are to be made to the core engine architecture, for example. Each node may have a target system and development environment. The workstation 3410 as illustrated in FIG. 34 may be adapted to run the update package generator software, for example. The workstation 3410 may be a computer at a device manufacturer's facility. The update package generator 3411 may be implemented in Java, so that the workstation 3410 may be adapted to run virtually any operating system supporting a Java virtual machine, for example. The update package generator 3411 may be developed using Borland's JBuilder 8 Enterprise software on a Windows-based machine, for example.

The update management system (application server 3433 illustrated in FIG. 34, for example) may be developed according to the Java 2 Enterprise Edition (J2EE) 1.3.1 Application Program Interface (API) specifications and may be compatible with other J2EE application servers, for example.

The update management system (for example, application server 3433 illustrated in FIG. 34) may support the following Java Development Kits (JDK), for example.

JDK 1.4.1_02 or higher on 64-bit Solaris hardware
JDK 1.4.1_02 or higher on Linux 2.4.20 on Intel 32-bit processors The update management system (for example, application server 3433 illustrated in FIG. 34) may be adapted to support most enterprise-class Relational Database Management Systems (RDBMS) with the appropriate Java Database Connectivity (JDBC) drivers, for example. For verification & validation testing of update management system (for example, application server 3433 illustrated in FIG. 34), the following database system may be employed, for example.

Oracle 9i Release 2 (9.2.0.2) and Oracle 9i 9.2.0.3 JDBC Drivers for Oracle Call Interface (OCI) client In an embodiment according to the present invention, the specific electronic device to be employed may be an unknown entity because device architectures for embedded mobile electronic devices vary widely. However, electronic device firmware/software components designed for electronic devices may be abstracted in at least the following two ways. 1) Implementation in American National Standards Institute (ANSI) C in a cross-platform manner and 2) Compiled to support many different known central processing units (CPUs), for example.

In an embodiment according to the present invention, the update agent component may be implemented in pure ANSI C, for example. Strict conformance to coding standards may be enforced.

In an embodiment according to the present invention, the update agent (for example update agent 3421 illustrated in FIG. 34) may run on top of an electronic device operating system (OS), for example. The update agent 3421 may be independent of any source code in the existing code of an electronic device because the update agent 3421 may be compiled and linked separately. The update agent 3421 may be designed so that it does not use any runtime libraries or compiler/linker supplied runtime code in accordance with an embodiment of the present invention, for example.

Several different CPUs (for example, ARM, Motorola, etc.) and several different build environments (for example, ARM, Green Hills, Windriver, etc.) may be supported in an embodiment according to the present invention. Several different combinations of build environments and CPUs may also be supported, for example.

In an embodiment according to the present invention, in order to support broad cross-platform capabilities in the update agent 3421, for example, many different interfaces may be offered that the update agent may be adapted to interact with in the electronic devices. The interfaces may be called device wrappers. Device wrappers may be adapted to wrap the functionality to be implemented for a particular electronic device. The electronic device manufacturers may not implement wrappers at integration time, because the electronic device manufacturers possess the requisite knowledge of their own electronic devices.

In an embodiment according to the present invention, the firmware manager client 3427, the download agent 3423, and the handoff agent 3425 may be operating system (OS) dependent and may be designed to take advantage of the existing functionality of the OS. In an embodiment according to the present invention, the firmware manager client 3427, the download agent 3423, and the handoff agent 3425 may be able to run on various microprocessors, such as for example, ARM 7TDMI, ARM 9, Infineon C166 family, and NEC v850e, for example. The source code for the download firmware/software components may be implemented in ANSI C.

In an embodiment according to the present invention, each component of the system illustrated in FIG. 34, for example, may be related as follows.

Complex calculations may be performed in the update package generator 3411 rather than the update agent 3421, for example.

Update agent footprint may be adapted to be as small as possible, for example.

Update agent 3421 may be coded in ANSI C or another efficient programming language/systems.

Memory consumption of the update agent 3421 may be kept to a minimum.

In an embodiment according to the present invention, the update package generator may have a primary function of generating update packages as small as possible, for example. To perform this function, the speed of creating an update package may be a secondary consideration. An update package may be created within approximately three minutes, for example. The average time to create an update package may not exceed six minutes, for example. An individual update package may be created within an hour in a worst-case scenario.

In an embodiment according to the present invention, performance of the update management system (for example, application server 3433 illustrated in FIG. 34) may be dependent upon the following factors, for example:

Update package size;
Java application server; and
Server hardware.

In an embodiment according to the present invention, assuming the Weblogic, low-end Sun server, and no overhead from over-the-air data transmission. The update management system (for example, application server 3433 illustrated in FIG. 34) may be expected to perform minimally at the following level for at least 100 concurrent clients, for example, for a 150K update package, the average download time may comprise 20 seconds.

In an embodiment according to the present invention, the time needed to apply an update to firmware/software may vary. The following factors may be involved in predicting update-processing times, for example.

Number Of Banks Updated
Flash Block Erase Time
Flash Block Write Time
CPU Clock Rate
Algorithm Overhead Per Bank
General Algorithm Overhead
Memory Speed
Memory Access Bus Speed
Temperature To support the analysis performed by the update package generator 3411, the workstation 3410 may be provided at least 1 GB of random access memory (RAM) and a computer-processing unit (CPU) operating at approximately 2 GHz or more. Additionally, if update package catalogs are to be sent directly to the update store 3430, then the workstation 3410 may also be adapted to support networking capability, for example.

In an embodiment according to the present invention, the update management system (for example, application server 3433 illustrated in FIG. 34) may be developed according to the Java 2 Enterprise Edition (J2EE) 1.3.1 application program interface (API) specification, for example. The update management system (for example, application server 3433 illustrated in FIG. 34) may comprise the following exemplary servers, for example.

BEA Systems, Inc., Weblogic server 8.1
Orion Application Server 2.0.1

In an embodiment according to the present invention, the update management system (for example, application server 3433 illustrated in FIG. 34) may be designed to the J2EE standard platform and may be compatible with other J2EE application servers, for example.

In an embodiment according to the present invention, the update management system (for example, application server 3433 illustrated in FIG. 34) may employ a Java platform, such as for example, Java Development Kit (JDK) 1.4, for example. However, other operating systems, such as for example, Solaris and Linux may also be employed on several different types of hardware, for example.

In an embodiment according to the present invention, the update management system (for example, update management system 3400 illustrated in FIG. 34) may be designed to support most enterprise-class RDBMS with the appropriate JDBC drivers, for example. For verification & validation testing the following database system may be employed: Oracle 9i Release 2 (9.2.0.2) and Oracle 9i 9.2.0.3 JDBC Drivers for OCI client.

In an embodiment according to the present invention, the runtime environment of the update agent 3421 may be constrained in many regards. The design of the update agent may realize a balance between supporting small update package sizes, fault tolerance, and limited resources, for example.

In an embodiment according to the present invention, each node of the system may employ a different type of verification and validation, for example, in order to verify the output of the update package generator 3411, the update package 3413 may be employed. For example, if the firmware/software update is successful, then verification may be assumed. Validation of the update package generator may be little more difficult and may only be achieved by employing benchmarks, for example. If, for example, the size of update packages generated remains consistently small compared to previous generations of the update package generator 3411, the functioning of the update package generator 3411 may be validated.

In an embodiment according to the present invention, with hypertext transfer protocol (HTTP) and web services at the core, the update management system (for example, application server 3433 illustrated in FIG. 34) may be validated like any other web system, for example. The following tools may be employed to validate and verify server components.

Standard commercial web testing tools, such as for example, Mercury Interactive's LoadRunner and open-source tools, such as for example, JMeter and TestMaker, may be used to verify a correct update package is being retrieved given particular lifecycle management settings, for example.

Bitfone's internal tool, SIMDA may also be used for both verification and load testing. SIMDA may be designed for development and testing, for example.

Third-party clients may support the open mobile alliance (OMA)-download protocol, which may also be used to validate the update management system, for example.

In an embodiment according to the present invention, the download manager (a.k.a. the download agent 3423) along with the firmware management client 3427 may be tested employing a hypertext transfer protocol (HTTP) simulator and in conjunction with the delivery module 3435. Open mobile alliance (OMA) standards for OMA over-the-air (OTA) download test cases may also be employed, for example.

In an embodiment according to the present invention, the update agent 3421 may be packaged as a library. In an embodiment according to the present invention, one of the target platforms may be the Windows operating system family, for example. Under the Windows operating system family, a software package named "WinAgent", for example, may be developed to test an update of firmware/software, as well as test possible fault tolerance recovery scenarios in accordance with an embodiment of the present invention.

In an embodiment according to the present invention, the system 3400 may also offer many levels of security protecting each firmware/software component.

In an embodiment according to the present invention, the firmware/software comprising may reside on computer systems. Proper physical barriers may already exist to limit access to these computers. An end-user expecting to use the update package generator 3411 or access another firmware/software component may be prompted for the proper credentials in order to log into the computer. The login validation/authentication may be handled by the operating system employed in the computers.

In an embodiment according to the present invention, access to the update store 3435, for example, may be facilitated via an access control list, for example. In an embodiment according to the present invention, system administrators may set-up users and roles to define the security level for all access to the update store 3435. The update management system may facilitate fine-grain read/write access to individual update packages, including the ability to perform "upload-only" access for external electronic device manufacturers, for example.

In an embodiment according to the present invention, the update package generator 3411 may be bundled with a hardware-based license enforcement scheme. This may be employed through the use of a hardware key dongle (an Ethernet connector that attaches to a personal computer memory card international association (PCMCIA) card, or other alternative systems) that may be placed in a universal serial bus (USB) or parallel port of a workstation, such as for example, workstation 3410. Other firmware/software components may also employ a similar lockdown. When discussing the security of the update package generator 3411, three types of security may be examined, for example.

Update Package Generator to Update Store Security Implementation: To secure the update package generator 3411 to update store 3430 security channel when using a network connection, the hypertext transport protocol secure (HTTPS) protocol may be used, guaranteeing both authentication of who is connecting and who is being connected to, as well as the assuring the integrity of the link due to the encrypted channel.

Update Package Generator to Management Console Security Implementation: In an embodiment according to the present invention, if the update package catalog to be transferred to the application server 3433 is saved to disk, no security may be offered because it may be assumed that an end-user may have secured the save. The management console 3431 may open the file. Additional security measures may be added to the update package catalog by an end-user process, for example.

Update Package Generator to Update Agent Security Implementation: In an embodiment according to the present invention, an important aspect of the overall security scheme may be to protect the update packages 3413 themselves. The following three important criteria may be protected, for example.

Integrity (Was the update package 3413 modified during transit?)

Source (Is the update package 3413 coming from the intended source?)

Content (Is the end-user entitled to the update package 3413?)

In an embodiment according to the present invention, to protect the integrity of the update package 3413 and to guarantee the source, an encrypted signature scheme may be supported in the update package generator 3411 and the update agent 3421. One of the records of the update package 3421 may hold an encrypted signature employing a selected signature and encryption scheme. When the update agent 3421 validates the encrypted signature, the update agent may determine where the update package 3421 came from and also ensure that the update package 3421 wasn't tampered with during transport to the electronic device, for example.

In an embodiment according to the present invention, protection of content may be more difficult to guarantee. In an embodiment according to the present invention, the download agent 3423 send a unique device value to the delivery module 3435 or the update store 3430 so that the update package 3413 may be encrypted on the fly. The update agent 3421 may be adapted to only open an update package 3413 intended for the specific electronic device that the update agent 3421 is running on.

Update Management System Access Security: In an embodiment according to the present invention, three layers of access security to the update management system may be provided.

Client Device Access Security

System User Access Security (via the Management Console)

Server-to-Server Access Security

Client Device Access Security: In an embodiment according to the present invention, the update management system may support secure sockets layer (SSL) version 2.0 (40-bits or larger key) to fully encrypt the data connection from the client devices, depending on the capability of the client devices, for example.

System User Access Security: In an embodiment according to the present invention, the update management system may support secure sockets layer (SSL) version 2.0 (40-bits or larger key) to fully encrypt management console access via standard browsers, for example.

Server-to-Server Access Security: In an embodiment according to the present invention, the update management system may support the following network security scheme, for example.

Secure Sockets Layer (SSL) version 2.0 (40-bits or larger key) for server-to-server connections Operating System Virtual Private Network (VPN) security In an embodiment according to the present invention, the update management system may be employed as a client for database services. The update store 3430 may rely upon the configured database server for access and integrity protection of the data. For the small number of critical data (such as passwords), the update management system may only store a hashed or encrypted value and not the clear text value.

Download Agent Security: In an embodiment according to the present invention, the download agent 3423 may support secure sockets layer (SSL) or wireless transport layer security (WTLS) to ensure privacy and integrity for transporting the update package 3413 from the application server 3433 to a client device. Electronic device manufacturers may provide SSL or WTLS security support, for example. The download agent 3423 may be implemented employing only the HTTP protocol in an embodiment according to the present invention.

In an embodiment according to the present invention, the server-side may support redundant configurations so that if a server fails, another server may be available to take the failed server's place.

In an embodiment according to the present invention, fault tolerance is important in the update agent 3421. The update agent 3421 may be 100% recoverable in case of any interruption, short of a hardware failure.

In an embodiment according to the present invention, the system 3400 may be adapted to support flexible deployment architectures. The following deployment scenarios represent configurations in accordance with embodiments of the present invention.

Figure 35:
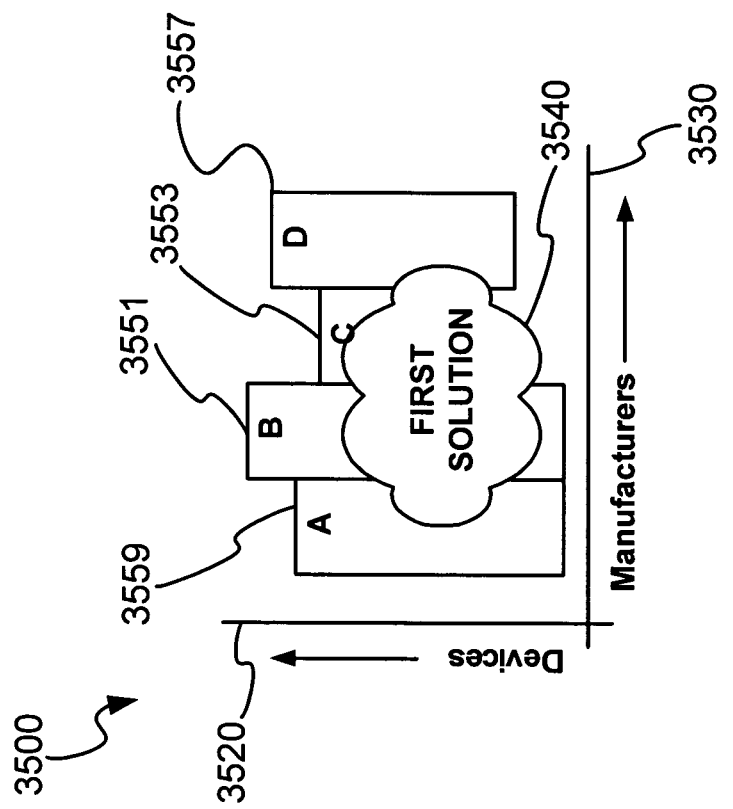
FIG. 35 is a block diagram illustrating an exemplary support system for electronic device updating according to an embodiment of the present invention.

FIG. 35 is a graphical representation 3500 illustrating an exemplary support system for electronic device updating according to an embodiment of the present invention. In FIG. 35, the abscissa represents electronic device manufacturers 3530 and the ordinate represents electronic devices 3520, for example. FIG. 35 illustrates a first solution 3540 cloud that may be integrated into many devices electronic devices or electronic device manufacturers. One electronic device manufacturer C 3553, for example, may be adapted to employ the first solution in most of manufacturer C's 3553 electronic devices. The extent that the first solution 3540 cloud graphically covers a range of electronic devices marketed and sold by particular electronic device manufacturers (for example 3559, 3551, 3553, and 3557) represents how well the first solution may be integrated/implemented into the electronic device manufacturer's electronic device line of products.

Figure 36:
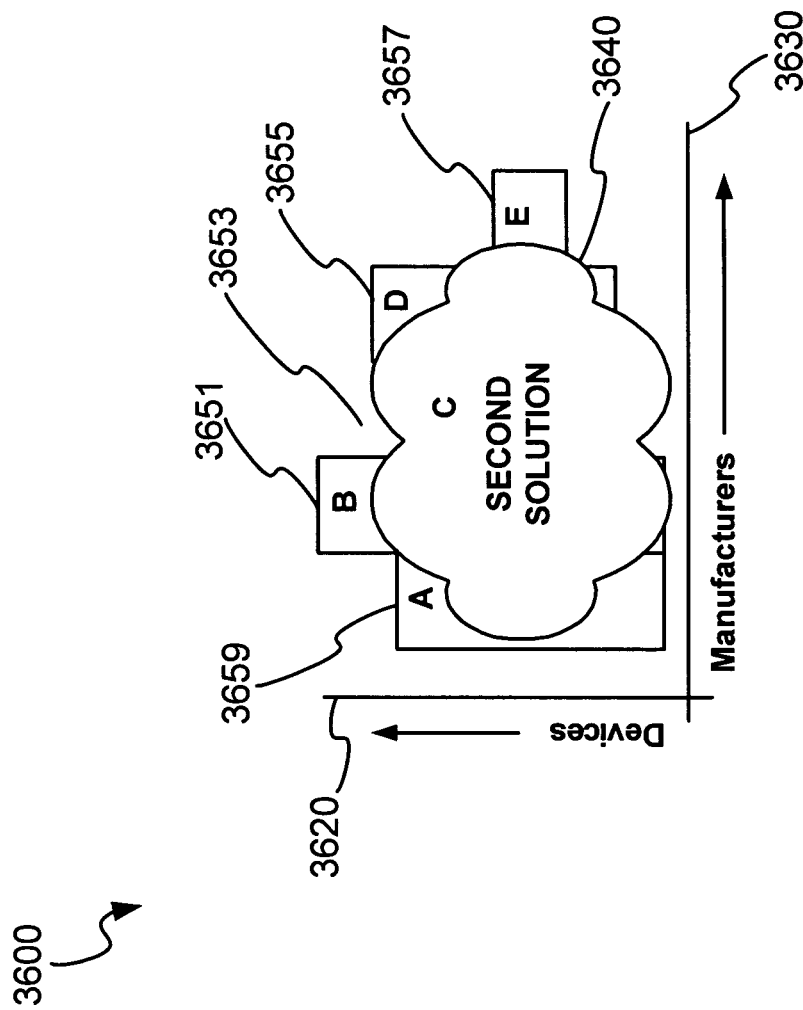
FIG. 36 is a block diagram illustrating an exemplary support system for electronic device updating according to an embodiment of the present invention.

FIG. 36 is a graphical representation 3600 illustrating an exemplary support system for electronic device updating according to an embodiment of the present invention. In FIG. 36, the abscissa represents electronic device manufacturers 3630 and the ordinate represents electronic devices 3620, for example. FIG. 36 illustrates that a second solution 3640 cloud may be integrated into many more devices electronic devices and/or electronic device manufacturers than the first solution 3540 cloud illustrated in FIG. 35.

One electronic device manufacturer C 3653, for example, (hidden behind the second solution 3640 cloud) may be adapted to employ the second solution in all of manufacturer C's 3553 electronic devices. The extent which the second solution 3640 cloud covers a range of electronic devices marketed and sold by particular electronic device manufacturers (for example 3659, 3651, 3653, 3655, and 3657) represents how well the second solution 3640 may be integrated/implemented into the electronic device manufacturer's electronic device line of products.

Figure 37:
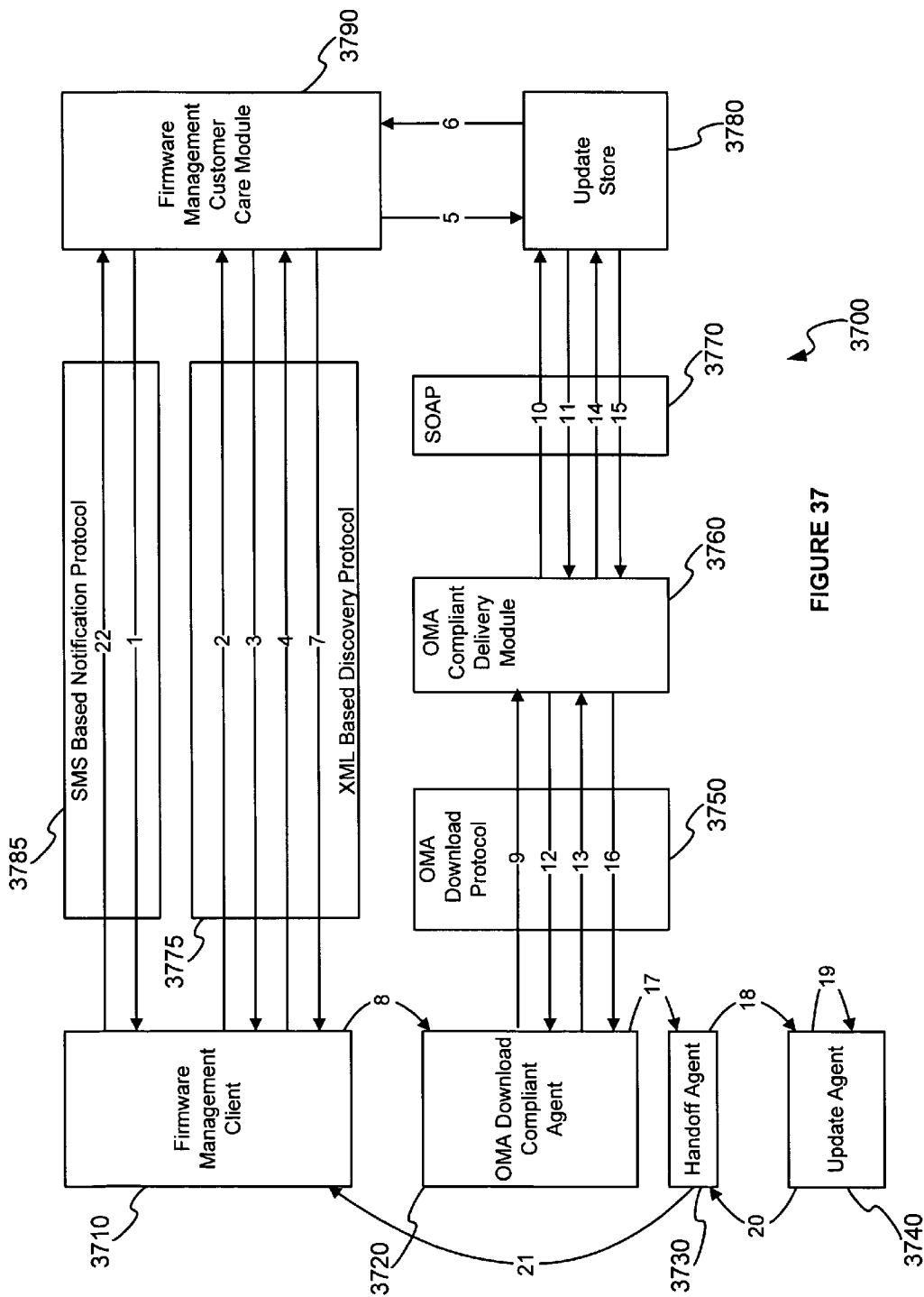
FIG. 37 is a flow diagram illustrating an exemplary commercial deployment method for a distributed solution according to an embodiment of the present invention.

FIG. 37 is a flow diagram 3700 illustrating an exemplary commercial deployment method for a distributed solution according to an embodiment of the present invention. The system employed for the commercial deployment method may comprise a firmware management client 3710, an OMA-compatible, download-compliant agent 3720, a handoff agent 3730, an update agent 3740, an OMA download protocol 3750, an OMA-compliant delivery module 3760, a simple object access protocol (SOAP) 3770, an update store 3780, a firmware management customer care module 3790, a short message service (SMS)-based notification protocol 3785, and an extensible markup language (XML)-based discovery protocol 3775, for example.

In an embodiment according to the present invention, the method may comprise sending a push notification message from the firmware management customer care module 3790 to the firmware management client 3710 1 employing the SMS-based notification protocol 3785, for example. The method may also comprise sending an electronic device and subscriber information message from the firmware management client 3710 to the firmware management customer care module 3790 2 employing the XML-based discovery protocol 3775, for example. The method may also comprise sending a server credentials message from the firmware management customer care module 3790 to the firmware management client 3710 3 employing the XML-based discovery protocol 3775, for example. The method may also comprise sending a universal resource locator (URL) request message of an update package descriptor file from the firmware management client 3710 to the firmware management customer care module 3790 4 employing the XML-based discovery protocol 3775, for example.

In an embodiment according to the present invention, the method may also comprise sending a request for the URL of the update package descriptor file from the firmware management customer care module 3790 to the update store module 3780 5, for example. The update store 3780 may return the URL of the update package descriptor file to the firmware management customer care module 3790 6, for example. The method may also comprise transmission of the URL of the update package descriptor file from the firmware management customer care module 3790 to the firmware management client 3710 7 employing the XML-based discovery protocol 3775, for example. The method may also comprise initiating the OMA download compliant agent 3720 with the URL of the update package descriptor file 8, for example.

In an embodiment according to the present invention, the method may also comprise the download agent 3720 employing the descriptor file URL to request the descriptor file from the delivery module 3760 employing the OMA download protocol 3750 9, for example. The method may also comprise the delivery agent 3760 employing the SOAP protocol 3770 to request the update package descriptor file from the update store module 3780 10, for example. The method may also comprise transmitting the update package descriptor file and the update package descriptor file URL employing the SOAP protocol 3770 from the update store 3780 to the delivery module 3760 11, for example. The method may also comprise the delivery module 3760 transmitting the update package descriptor file and the update package descriptor file URL employing the OMA download protocol 3750 to the OMA download compliant agent 3720 12, for example.

In an embodiment according to the present invention, the method may also comprise the OMA download compliant agent 3720 transmitting an update package request to the delivery module 3760 employing the OMA download protocol 3750 13, for example. The method may also comprise the delivery agent 3760 employing the SOAP protocol 3770 to request the update package from the update store module 3780 14, for example. The method may also comprise transmitting the update package, employing the SOAP protocol 3770, from the update store 3780 to the delivery module 3760 15, for example. The method may also comprise the delivery module 3760 transmitting the update package, employing the OMA download protocol 3750, to the OMA download compliant agent 3720 16, for example.

In an embodiment according to the present invention, the method may also comprise initiation of the handoff agent 3730 with update package location information 17, for example. The method may also comprise the handoff agent 3730 setting flags, causing the electronic device to reboot, and initiating the update agent 3740 18, for example. The method may also comprise updating one of firmware and software in the electronic device 19, for example. The method may also comprise setting the update-completed flag 20, for example. The method may also comprise initiating a device management agent (firmware management client 3710) when the update is completed 21, for example. The method may also comprise sending a confirmation notification message from the firmware management client 3710 to the firmware management customer care console 3790 confirming that the update is completed 22 employing the SMS-based notification protocol 3785, for example.

Figure 38:
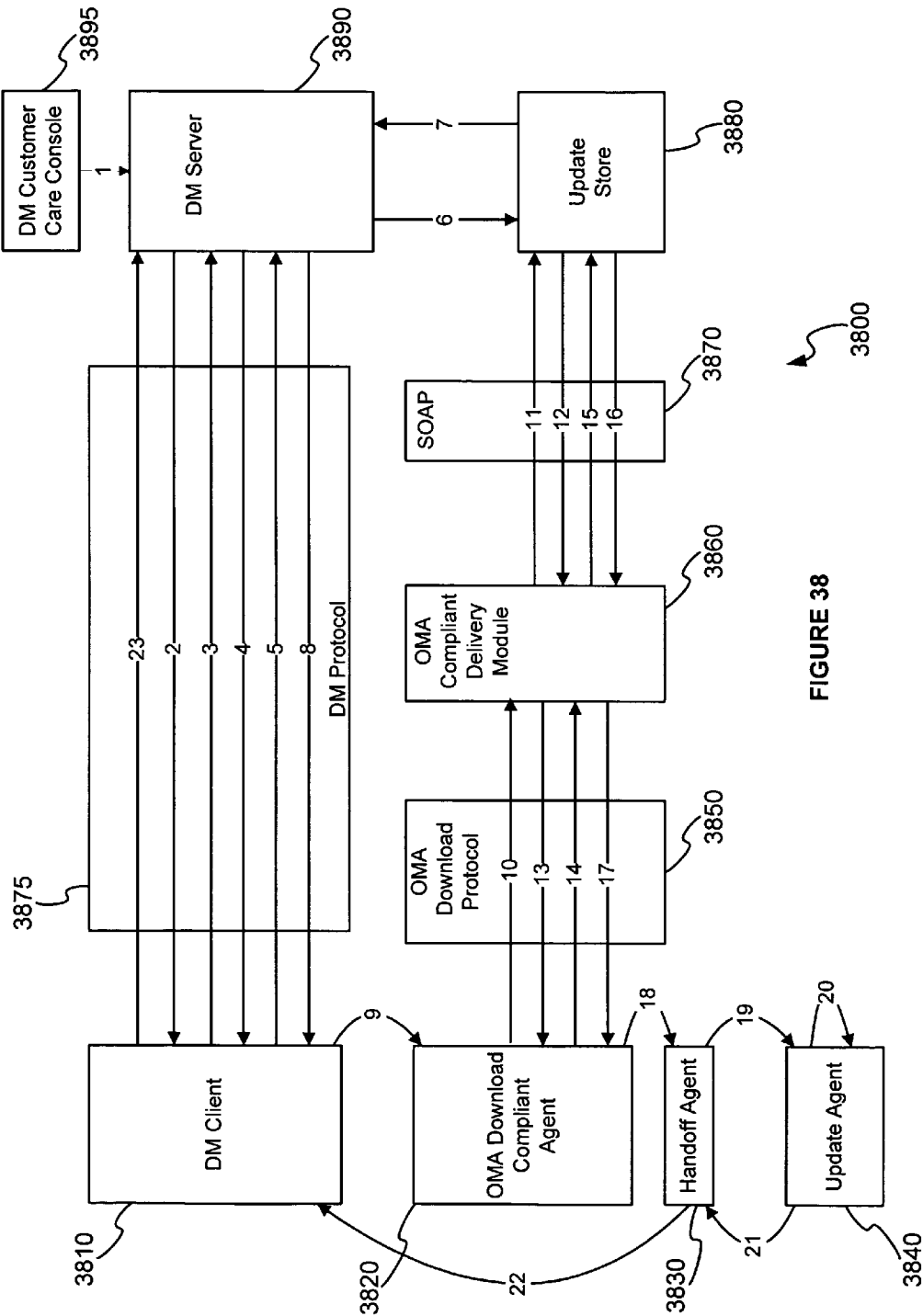
FIG. 38 is a flow diagram illustrating an exemplary commercial deployment method for a distributed solution according to an embodiment of the present invention.

FIG. 38 is a flow diagram 3800 illustrating an exemplary commercial deployment method for a distributed solution according to an embodiment of the present invention. The system employed for the commercial deployment method illustrated in FIG. 38 may comprise a device management (DM) client 3810, an OMA compatible download compliant agent 3820, a handoff agent 3830, and update agent 3840, an OMA download protocol 3850, an OMA compliant delivery module 3860, a simple object access protocol (SOAP) 3870, an update store 3880, a DM server 3890, a DM customer care console 3895, and a DM protocol 3875, for example.

In an embodiment according to the present invention, the method may comprise sending an update notification message from the DM customer care console 3895 to the DM server 3890 1 employing the DM protocol, for example. The method may also comprise sending a push notification message from the DM server 3890 to the DM client 3810 2 employing the DM protocol, for example. The method may also comprise sending an electronic device and subscriber information message from the DM client 3810 to the DM server 3890 3 employing the DM protocol, for example. The method may also comprise sending a server credentials message from the DM server 3890 to the DM client 3810 4 employing the DM protocol, for example. The method may also comprise sending a universal resource locator (URL) request message of an update package descriptor file from the DM client 3810 to the DM server 3890 5 employing the DM protocol, for example.

In an embodiment according to the present invention, the method may also comprise sending a request for the URL of the update package descriptor file from the DM server 3890 to the update store module 3880 6, for example. The update store module 3880 may return the URL of the update package descriptor file to the DM server 3890 7, for example. The method may also comprise transmission of the URL of the update package descriptor file from the DM server 3890 to the DM client 3810 8 employing the DM protocol, for example. The method may also comprise initiating the OMA download compliant agent 3820 with the URL of the update package descriptor file 9, for example.

In an embodiment according to the present invention, the method may also comprise the download agent 3820 employing the descriptor file URL to request the descriptor file from the delivery module 3860 employing the OMA download protocol 3850 10, for example. The method may also comprise the delivery agent 3860 employing the SOAP protocol 3870 to request the update package descriptor file from the update store module 3880 11, for example. The method may also comprise transmitting the update package descriptor file and the update package descriptor file URL, employing the SOAP protocol 3870, from the update store 3880 to the delivery module 3860 12, for example. The method may also comprise the delivery module 3860 transmitting the update package descriptor file and the update package descriptor file URL, employing the OMA download protocol 3850, to the OMA-download-compliant agent 3820 13, for example.

In an embodiment according to the present invention, the method may also comprise the OMA download compliant agent 3820 transmitting an update package request to the delivery module 3860 employing the OMA download protocol 3850 14, for example. The method may also comprise the delivery agent 3860 employing the SOAP protocol 3870 to request the update package from the update store module 3880 15, for example. The method may also comprise transmitting the update package, employing the SOAP protocol 3870, from the update store 3880 to the delivery module 3860 16, for example. The method may also comprise the delivery module 3860 transmitting the update package, employing the OMA download protocol 3850, to the OMA-download-compliant agent 3820 17, for example.

In an embodiment according to the present invention, the method may also comprise initiation of the handoff agent 3830 with update package location information 18, for example. The method may also comprise the handoff agent 3830 setting flags, causing the electronic device to reboot, and initiating the update agent 3840 19, for example. The method may also comprise updating one of firmware and software in the electronic device 20, for example. The method may also comprise setting the update-completed flag 21, for example. The method may also comprise initiating a device management agent 3810 when the update is completed 22, for example. The method may also comprise sending a confirmation notification message from the DM client 3810 to the DM server 3890 confirming that the update is completed 23, employing the DM protocol, for example.

In an embodiment according to the present invention, the method illustrated in FIG. 38 may comprise a commercial end-to-end system incorporating a Device Management (DM) client 3810 and DM server 3890. The embodiment illustrated in FIG. 38 may be the most likely commercial deployment as the device management standard becomes more pervasive in the market.

Figure 39:
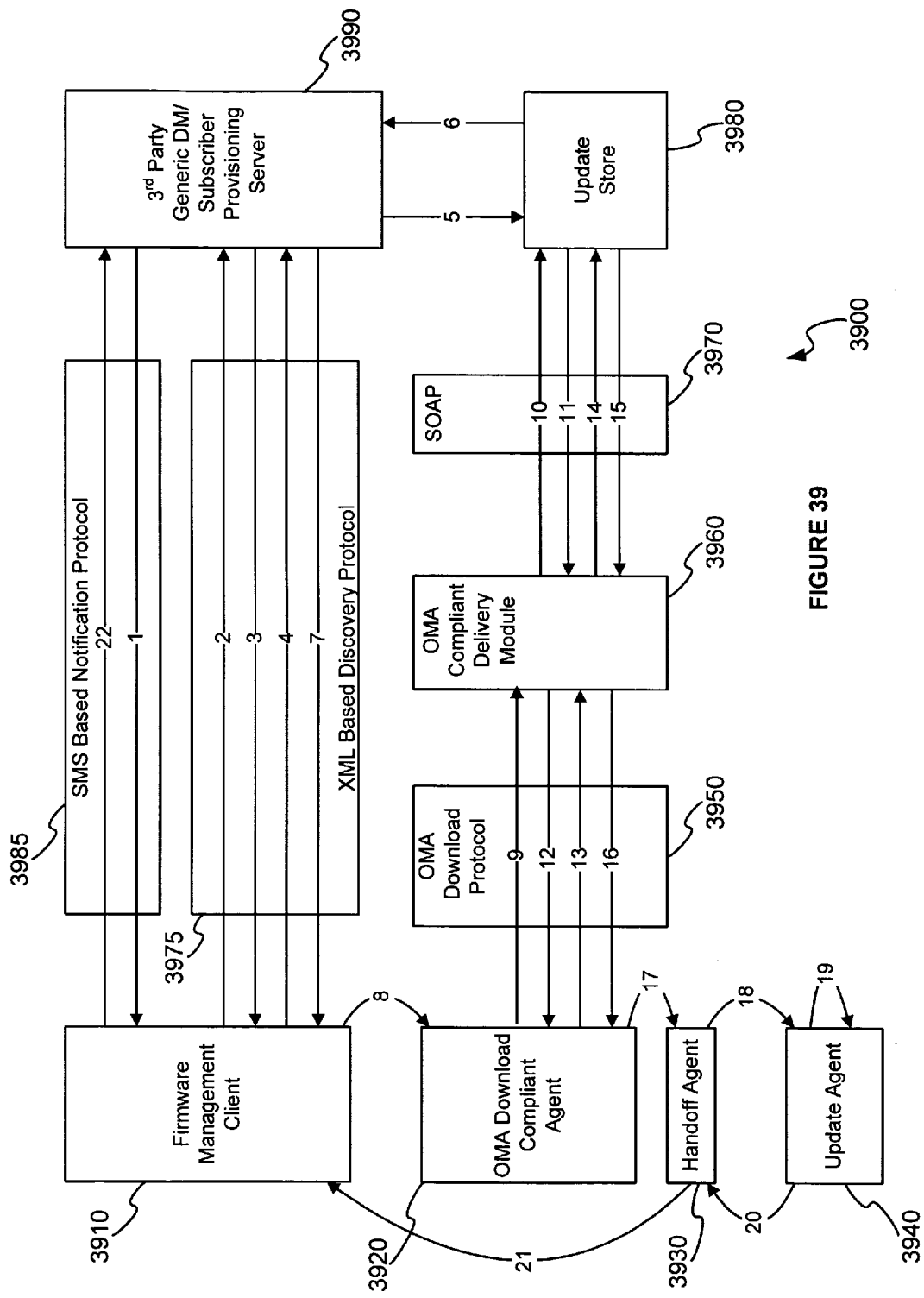
FIG. 39 is a flow diagram illustrating an exemplary commercial deployment method for a distributed solution according to an embodiment of the present invention.

FIG. 39 is a flow diagram 3900 illustrating an exemplary commercial deployment method for a distributed solution according to an embodiment of the present invention. The system employed for the commercial deployment method illustrated in FIG. 39 may comprise a firmware management (FM) client 3910, an OMA-compatible download compliant agent 3920, a handoff agent 3930, an update agent 3940, an OMA-download protocol 3950, an OMA-compliant delivery module 3960, a simple object access protocol (SOAP) 3970, an update store 3980, a $3^{rd}$ party generic device management (DM) server/subscriber provisioning system 3990, a short message service (SMS)-based notification protocol 3985, and an extensible markup language (XML)-based discovery protocol 3975, for example.

In an embodiment according to the present invention, the method may comprise sending a push notification message from the $3^{rd}$ party generic device management (DM) server/subscriber provisioning system 3990 to the firmware management client 3910 1 employing the SMS-based notification protocol 3985, for example. The method may also comprise sending an electronic device and subscriber information message from the firmware management client 3910 to the $3^{rd}$ party generic device management (DM) server/subscriber provisioning system 3990 2 employing the XML-based discovery protocol 3975, for example. The method may also comprise sending a server credentials message from the 3rd party generic device management (DM) server/subscriber provisioning system 3990 to the firmware management client 3910 3, employing the XML-based discovery protocol 3975, for example. The method may also comprise sending a universal resource locator (URL) request message of an update package descriptor file from the firmware management client 3910 to the 3rd party generic device management (DM) server/subscriber provisioning system 3990 4, employing the XML-based discovery protocol 3975, for example.

In an embodiment according to the present invention, the method may also comprise sending a request for the URL of the update package descriptor file from the 3rd party generic device management (DM) server/subscriber provisioning system 3990 to the update store module 3980 5, for example. The update store 3980 may return the URL of the update package descriptor file to the 3rd party generic device management (DM) server/subscriber provisioning system 3990 6, for example. The method may also comprise transmission of the URL of the update package descriptor file from the $3^{rd}$ party generic device management (DM) server/subscriber provisioning system 3990 to the firmware management client 3910 7, employing the XML-based discovery protocol 3975, for example. The method may also comprise initiating the OMA-download-compliant agent 3920 with the URL of the update package descriptor file 8, for example.

In an embodiment according to the present invention, the method may also comprise the download agent 3920 employing the descriptor file URL to request the descriptor file from the delivery module 3960 employing the OMA download protocol 3950 9, for example. The method may also comprise the delivery agent 3960 employing the SOAP protocol 3970 to request the update package descriptor file from the update store module 3980 10, for example. The method may also comprise transmitting the update package descriptor file and the update package descriptor file URL employing the SOAP protocol 3970 from the update store 3980 to the delivery module 3960 11, for example. The method may also comprise the delivery module 3960 transmitting the update package descriptor file and the update package descriptor file URL employing the OMA download protocol 3950 to the OMA download compliant agent 3920 12, for example.

In an embodiment according to the present invention, the method may also comprise the OMA download compliant agent 3920 transmitting an update package request to the delivery module 3960 employing the OMA download protocol 3950 13, for example. The method may also comprise the delivery agent 3960 employing the SOAP protocol 3970 to request the update package from the update store module 3980 14, for example. The method may also comprise transmitting the update package, employing the SOAP protocol 3970, from the update store 3980 to the delivery module 3960 15, for example. The method may also comprise the delivery module 3960 transmitting the update package, employing the OMA download protocol 3950, to the OMA download compliant agent 3920 16, for example.

In an embodiment according to the present invention, the method may also comprise initiation of the handoff agent 3930 with update package location information 17, for example. The method may also comprise the handoff agent 3930 setting flags, causing the electronic device to reboot, and initiating the update agent 3940 18, for example. The method may also comprise updating one of firmware and software in the electronic device 19, for example. The method may also comprise setting the update-completed flag 20, for example. The method may also comprise initiating the firmware management client 3910 when the update is completed 21, for example. The method may also comprise sending a confirmation notification message from the firmware management client 3910 to the $3^{rd}$ party generic device management (DM) server/subscriber provisioning system 3990 confirming that the update is completed 22 employing the SMS-based notification protocol, for example.

The method illustrated in FIG. 39 may comprise a likely scenario with many server-side partners who do not have a device/firmware management client of their own.

Figure 40:
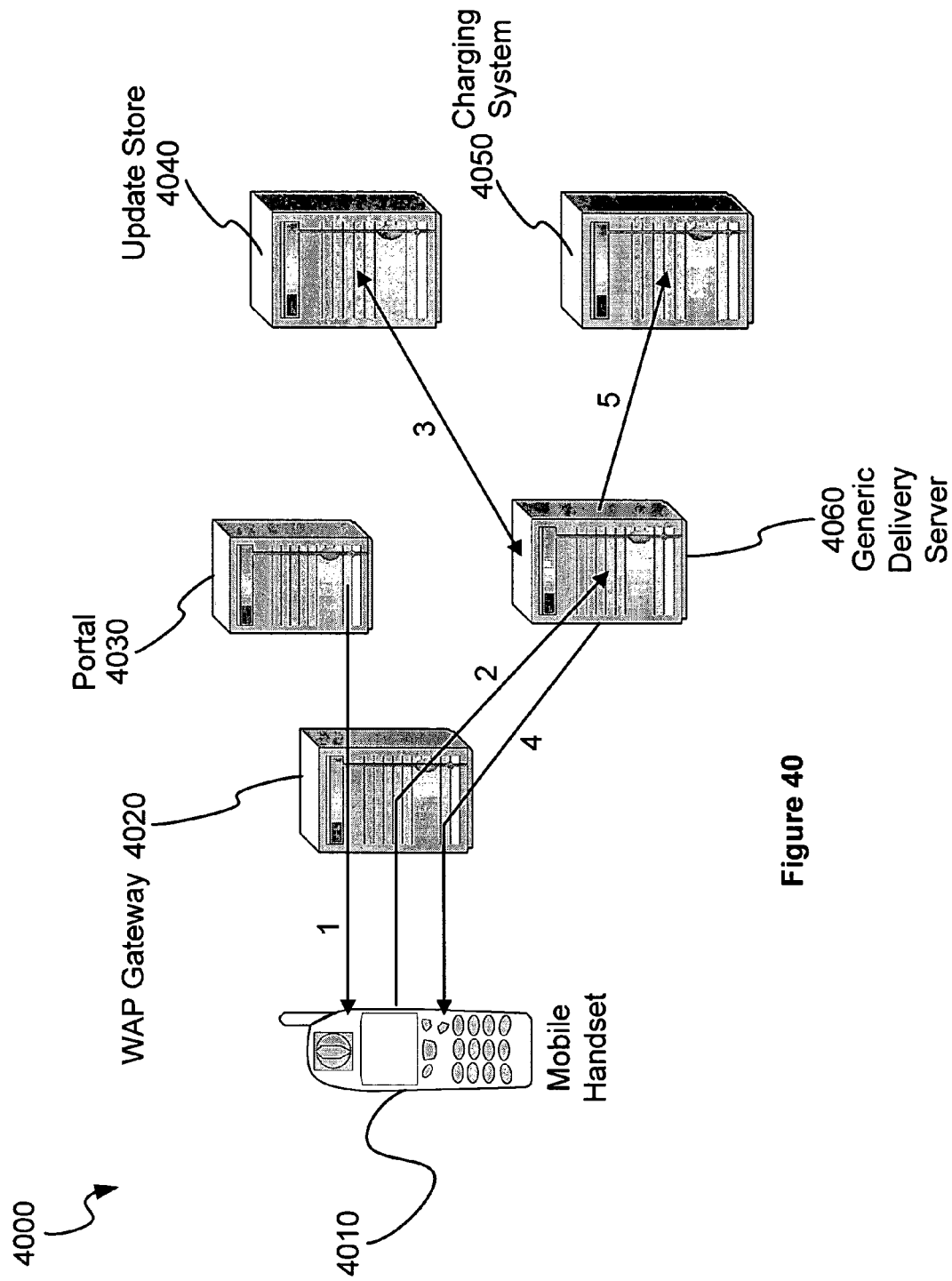
FIG. 40 is a block diagram illustrating an exemplary system and interface architecture according to an embodiment of the present invention.

FIG. 40 is a block diagram illustrating an exemplary system and interface architecture 4000 according to an embodiment of the present invention.

FIG. 40 illustrates a system 4000 comprising an electronic device, such as for example, mobile handset 4010, a server/computer operating a wireless application protocol (WAP) gateway 4020, a server/computer acting as a portal 4030, a server/computer acting as a generic delivery server 4060, a server/computer acting as a billing system 4050, and a server/computer acting as an update store 4040, for example.

In an embodiment according to the present invention, the firmware management client 3710, the OMA download compliant agent 3720, the handoff agent 3730 and the update agent 3740 may be resident in an electronic device, such as for example, the mobile handset shown in FIG. 40. For example, in FIG. 37, the OMA-compliant delivery module 3760 may be resident in a server/computer, such as for example, the server/computer acting as a generic delivery server 4060 illustrated in FIG. 40. For example, in FIG. 37, the update store module 3780 may be resident in a server/computer, such as for example, the server/computer acting as an update store 4040 illustrated in FIG. 40. For example, in FIG. 38, the DM customer care console 3895 may be resident in a server/computer, such as for example, the server/computer acting as a portal 4030 illustrated in FIG. 40.

In an embodiment according to the present invention, the mobile handset 4010, the WAP gateway 4020, and the portal 4030 illustrated in FIG. 40 may be adapted to interface 1 via the SMS-based notification protocol 3785 and 3985 and the XML-based discovery protocol 3775 and 3995 illustrated in FIGS. 37 and 39, and the DM protocol 3875 illustrated in FIG. 38, for example.

In an embodiment according to the present invention, the mobile handset 4010, the WAP gateway 4020, and the server/computer acting as a generic delivery server 4060 illustrated in FIG. 40 may be adapted to interface 2 & 4 via the OMA download protocol 3750, 3850, and 3950 illustrated in FIGS. 37-39, for example.

In an embodiment according to the present invention, the servers/computers acting as generic delivery server 4060, update store 4040, the charging system 4050 illustrated in FIG. 40 may be adapted to interface 3 & 5 via the SOAP protocol 3770, 3870, and 3970 illustrated in FIGS. 37-39, for example.

An embodiment according to the present invention may comprise an end-to-end system adapted to incorporate the update store, the handoff agent, and the update agent with the generic delivery server and generic download client respectively. The update agent may be adapted to interface with the generic download client and the update store may be adapted to interface with the generic delivery server.

In an embodiment according to the present invention, the system 4000 may enable the upload scenario to be deployed with minimal redesign and customization efforts. The system 4000 may prevent and minimize the effects human error may have on delivering successful updates to electronic devices, communication errors, and processing errors, for example. Error code messages may be easily configurable and may clearly convey the meaning of the problem. Related explanatory documentation may also be provided, including error programs, and documentation.

An embodiment according to the present invention may support end-to-end testing that may comprise standards-based testing for scalability, reliability and performance, for example. Reports may be produced that indicate download and re-flash time, capacity, % uptime, and transactions per second, for example. Download and re-flash time may be tested on a sample of update packages, for example, 30 update packages ranging from 10 KB to 600 KB.

Accordingly, the present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of updating a plurality of mobile electronic devices, the method comprising:
    selecting an update package for updating one of firmware and software, according to at least one modifiable download state, including a conflict resolution state and a deletion resolution state, associated with the update package, wherein the download state is based upon a modifiable status of the update package;
    transmitting the selected update package to a plurality of associated mobile electronic devices, wherein the update package comprises a plurality of executable instructions for converting a first version of one of firmware and software to a second version of one of firmware and software in mobile electronic devices of the download group; and
    wherein the plurality of associated mobile electronic devices comprises a grouping of electronic devices unauthorized to download the update package and a non-removable download group, the non-removable download group comprising a grouping of electronic devices permitted to download the update package regardless of client identification and authorization.

2. The method according to claim 1, further comprising associating the mobile electronic devices based upon at least one of an identical electronic device make, an identical electronic device, an identical installed firmware version, an identical installed software version, an identical installed operating system, and an identically installed encryption implementation.

3. The method according to claim 1, further comprising prompting an electronic device management system to select at least one group of associated mobile electronic devices to transmit the update package to.

4. The method according to claim 1, further comprising prompting an electronic device management system to select whether an update package to be transmitted is for one of a silent update and an opt-in update, and autonomously performing the silent update and prompting an electronic device end-user to authorize and participate in the opt-in update.

5. The method according to claim 4, further comprising transmitting notifications to the associated electronic devices that an update is one of pending, in-progress, completed, failed, aborted, and successful.

6. A method for managing update processing in a mobile electronic device, the method comprising:
storing an update package in a designated non-volatile memory location, in the mobile electronic device;
computing an update state descriptor, according to at least one modifiable download state, including a conflict resolution state and a deletion resolution state, associated with the update package, in the mobile electronic device, wherein the update state descriptor includes a field employed to store an address of the update package; and
after computing the update state descriptor, storing the update state descriptor in another designated non-volatile memory location, in the mobile electronic device.

7. The method according to claim 6, further comprising booting the mobile electronic device after the update state descriptor and the update package are written to respective designated non-volatile memory locations.

8. The method according to claim 6, further comprising identifying an update status of one of firmware and software to be updated.

9. An update management system for distributing an update package adapted to be processed by an updating software, the system comprising:
at least one server having a processor that maintains at least one modifiable download state associated with the update package, including a conflict resolution state and a deletion resolution state, wherein the download state is based upon a modifiable status of the update package; and
wherein the at least one server distributes the update package to members of at least one download group depending upon the at least one download state, and wherein the updating software is adapted to process a plurality of executable instructions for converting a first version of one of firmware and software to a second version of one of firmware and software in a mobile electronic device;
wherein the members of at least one download group comprise a grouping of electronic devices unauthorized to download the update package and a non-removable download group, the non-removable download group comprising a grouping of electronic devices permitted to download the update package regardless of client identification and authorization.

10. The system according to claim 9, wherein the at least one download state indicates that an update package associated with the at least one download state is authorized for downloading.

11. The system according to claim 9, wherein the at least one download state indicates that an update package associated with the at least one download state is unauthorized for downloading.

12. The system according to claim 9, wherein the at least one download group comprises at least one update package authorized for downloading.

13. The system according to claim 9, wherein the update package is associated with the at least one download group based upon the at least one download state of the associated update package.

14. The system according to claim 9, wherein the at least one download group comprises a grouping of electronic devices authorized to download the update package.

15. The system according to claim 9, wherein the at least one download group comprises at least one update package unauthorized for downloading.

16. The system according to claim 15, wherein the update package is associated with the at least one download group based upon the at least one download state of the associated update package.

17. The system according to claim 9, wherein electronic devices in the non-removable download group share a particular parameter value.

18. The system according to claim 17, wherein the particular parameter value comprises unique hardware identification associated with one of the electronic device and a particular electronic device manufacturer.

19. The system according to claim 17, wherein the particular parameter value comprises a version of the one of firmware and software to be updated.

20. The system according to claim 17, wherein the particular parameter value is employed to facilitate selection of an update package to be downloaded to an electronic device, the particular parameter value is selected from at least one of an electronic device model identification, an electronic device manufacturer identification, a firmware version, a software version, an electronic device international mobile equipment identifier IMEI, a telephone number, and a device unique identification.

21. The system according to claim 17, wherein the particular parameter value comprises a parameter request, wherein the electronic device is adapted to respond to the parameter request by transmitting a requested parameter.

22. An update management system comprising:
a server having a processor adapted to evaluate an update package to determine at least one modifiable download state, including a conflict resolution state and a deletion resolution state, and at least one download group associated with the update package, wherein the download state is based upon a modifiable status of the update package, and wherein the update package comprises a plurality of executable instructions for converting a first version of one of firmware and software to a second version of one of firmware and software in a mobile electronic device; and
wherein the at least one download group comprises a grouping of electronic devices unauthorized to download the update package and a non-removable download group, the non-removable download group comprising a grouping of electronic devices permitted to download the update package regardless of client identification and authorization.

23. The system according to claim 22, wherein the server is adapted to prioritize a plurality of matching updates by evaluating the at least one download state associated with each of the plurality of matching updates.

24. The system according to claim 23, wherein the server is adapted to select an update package having a highest priority for updating one of firmware and software.

25. The system according to claim 23, wherein the server is adapted to select an update package based upon an indicator associated with the update package, wherein the indicator is identifiable through a conflict resolution analysis.

26. The system according to claim 23, wherein a downloaded update package is quarantined and evaluated in at least one component of the system to prevent malicious attacks and electronic device damage.

27. The system according to claim 22, wherein a plurality of update packages are stored in an update store module comprising non-volatile memory.

28. The system according to claim 27, wherein the plurality of update packages stored in the update store module each comprise an associated update state, wherein the update state indicates that the plurality of update packages comprise one of a new update package, an update package being testing, an approved update package, a released update package, an inactive update package, an obsolete update package, and a discarded update package.

29. An update generation system adapted to generate an update package for converting a first version of one of firmware and software to a second version of one of firmware and software in a mobile electronic device, the update generation system comprising:
   at least one processor that generates the update package using the first and the second versions of one of firmware and software and software linker information received via an interface supporting a plurality of compiling and linking formats;
   wherein the at least one processor employs software interfaces supporting zoning a generated update package for a mobile device, wherein zoning a generated update package comprises dividing the generated update package into code segments and employing different settings and rules for updating different code segments; and
   wherein the zoning includes: a preprocessor, a write unit size, an updateable zone, an excluded zone, an update agent zone, and a reserved write unit zone.

30. The system according to claim 29, wherein zoning a generated update comprises zone management, wherein zone management comprises defining at least one of a pre-processor, a write unit size, an updateable zone, an excluded zone, an updating software zone, and a reserved write unit zone.

31. A system for managing updates of one of firmware and software in a mobile electronic device, the system comprising:
   at least one processor operably coupled to interface circuitry that communicates via a wireless network, and to memory having stored therein executable code comprising:
      firmware management code that controls negotiation and downloading to the electronic device of an update package for updating one or both of firmware and software in the electronic device according to at least one modifiable download state, including a conflict resolution state and a deletion resolution state, associated with the update package, the firmware management code comprising:
      at least one communications handling component;
      at least one data transfer handling component;
      at least one display handling component; and
      at least one event-handling component; and
      at least one component that determines if the electronic device belongs to a grouping of electronic devices unauthorized to download the update package, and determines if the electronic device belongs to a non-removable download group, the non-removable download group comprising a grouping of electronic devices permitted to download the update package regardless of client identification and authorization.

32. The system according to claim 31, wherein the at least one communications handling component comprises at least one of a short message service (SMS)-based protocol, an extensible markup language (XML)-based protocol, and a device management based protocol.

33. The system according to claim 31, wherein the at least one data transfer handling component comprises at least one of a download protocol compatible with Open Mobile Alliance (OMA)-specification and a simple object access protocol (SOAP)-based protocol.

34. The system according to claim 31, wherein the at least one display handling component comprises a customer care module.

35. The system according to claim 31, wherein the at least one event handling component comprises at least one of a firmware management client and a software management client.

36. The system according to claim 31, wherein the executable code comprises:
   at least one update status descriptor handling component;
   at least one update storage handling component;
   at least one electronic device reset handling component; and
   at least one update status notification handling component.

37. A non-transitory computer readable medium having stored therein updating code executable by a processor to process a plurality of executable instructions for converting a first version of one of firmware and software to a second version of one of firmware and software in a mobile electronic device, the updating code comprising:
   a zoning component capable of processing non-contiguous code segments, wherein zoning comprises dividing the code segments of an update package for the mobile device and employing different settings and rules for updating different code segments;
   a pre-processing component for reducing a size of the updating software;
   at least one updateable component;
   a digital signature decryption component; and
   a verification component.

38. The computer readable medium according to claim 37, wherein the updating code operates independently of an operating system employed in the mobile electronic device.

39. The computer readable medium according to claim 37, wherein the updating code is compiled and linked separately from firmware and software resident in the mobile electronic device.

40. The computer readable medium according to claim 37, wherein the updating code is adapted to run independent of runtime libraries, compiler supplied runtime code, and linker supplied runtime code.

* * * * *

UNITED STATES PATENT AND TRADEMARK OFFICE
CERTIFICATE OF CORRECTION

| | | |
|---|---|---|
| PATENT NO. | : 8,555,273 B1 | Page 1 of 1 |
| APPLICATION NO. | : 10/943455 | |
| DATED | : October 8, 2013 | |
| INVENTOR(S) | : Teck Chia et al. | |

It is certified that error appears in the above-identified patent and that said Letters Patent is hereby corrected as shown below:

In the Claims:

In column 59, line 61, in Claim 13, delete "claim 9," and insert -- claim 12, --, therefor.

In column 61, line 50, in Claim 31, after "component;" delete "and".

Signed and Sealed this
Seventeenth Day of December, 2013

Margaret A. Focarino
*Commissioner for Patents of the United States Patent and Trademark Office*